US008285573B1

(12) United States Patent
Ballaro et al.

(10) Patent No.: US 8,285,573 B1
(45) Date of Patent: Oct. 9, 2012

(54) PRIORITIZING ORDERS/RECEIPT OF ITEMS BETWEEN USERS

(75) Inventors: Charles A. Ballaro, Apex, NC (US); Alexey Lef, Chennai (IN); Natalia Potochniak, Raleigh, NC (US); Ronald Angerer, Durham, NC (US)

(73) Assignee: SciQuest Inc., Cary, NC (US)

(*) Notice: Subject to any disclaimer, the term of this patent is extended or adjusted under 35 U.S.C. 154(b) by 998 days.

(21) Appl. No.: 12/283,281

(22) Filed: Sep. 9, 2008

Related U.S. Application Data

(63) Continuation-in-part of application No. 12/007,815, filed on Jan. 15, 2008.

(60) Provisional application No. 61/130,028, filed on May 27, 2008.

(51) Int. Cl.

| | |
|---|---|
| ***G06F 17/50*** | (2006.01) |
| ***G06F 9/44*** | (2006.01) |
| ***G06Q 10/00*** | (2012.01) |
| ***G06Q 20/00*** | (2012.01) |
| ***G06G 1/14*** | (2006.01) |

(52) U.S. Cl. .................................. 705/7; 705/5; 705/22

(58) Field of Classification Search .................. 705/7, 5, 705/22

See application file for complete search history.

(56) References Cited

U.S. PATENT DOCUMENTS 5,710,889 A 1/1998 Clark et al.
5,861,906 A 1/1999 Dunn et al.
5,970,475 A 10/1999 Barnes et al. .................. 705/27
6,003,006 A 12/1999 Colella et al. .................... 705/2
6,016,499 A 1/2000 Ferguson
6,134,549 A 10/2000 Regnier et al.
6,144,726 A 11/2000 Cross ........................... 379/112
6,175,836 B1 1/2001 Aldred
6,249,773 B1 6/2001 Allard et al.
6,493,742 B1 12/2002 Holland et al.
6,505,172 B1 1/2003 Johnson et al.
6,513,038 B1 1/2003 Hasegawa et al.
6,564,213 B1 5/2003 Ortega et al.
6,622,127 B1 * 9/2003 Klots et al. ...................... 705/28
6,629,079 B1 9/2003 Spiegel et al.

(Continued)

FOREIGN PATENT DOCUMENTS

JP 2002-175217 6/2002

(Continued)

OTHER PUBLICATIONS

Optimizing customer insight, Usama fayyad, Intelligent Enterprise, May 12, 2003 vol. 6 Iss 8, pp. 22 6pages.*

(Continued)

*Primary Examiner* — Matthew Gart
*Assistant Examiner* — Harshad Parikh
(74) *Attorney, Agent, or Firm* — Morgan, Lewis & Bockius LLP

(57) ABSTRACT

In an embodiment, a computer-implemented method operating at a server system is disclosed. The server hosts and electronic procurement system. A first user purchase request to purchase an item is received, and a second user purchase request to purchase the same item is received. A determination is made if there is sufficient stock of the item available to fulfill both user purchase requests. The first and second user purchase requests are prioritized, if there is insufficient stock of the item available to fulfill both purchase requests. A purchase order is generated for at least one of the first and second user purchase requests in accordance with the prioritizing. Related methods and systems are also disclosed.

35 Claims, 156 Drawing Sheets

U.S. PATENT DOCUMENTS

| | | | | |
|---|---|---|---|---|
| 6,687,693 | B2 | 2/2004 | Cereghini et al. | |
| 6,728,758 | B2 | 4/2004 | Sato | |
| 6,775,658 | B1 * | 8/2004 | Zothner | 706/47 |
| 6,795,707 | B2 | 9/2004 | Martin et al. | |
| 6,850,900 | B1 | 2/2005 | Hare et al. | 705/26 |
| 6,892,185 | B1 | 5/2005 | Van Etten et al. | 705/27 |
| 6,920,430 | B1 | 7/2005 | Berton et al. | 705/26 |
| 6,961,734 | B2 | 11/2005 | Kauffman | 707/103 Z |
| 7,082,408 | B1 | 7/2006 | Baumann et al. | |
| 7,117,165 | B1 | 10/2006 | Adams et al. | 705/26 |
| 7,124,107 | B1 | 10/2006 | Pishevar et al. | 705/37 |
| 7,146,002 | B1 * | 12/2006 | Smith et al. | 379/265.13 |
| 7,308,416 | B2 * | 12/2007 | Peachey-Kountz et al. | 705/7.12 |
| 7,350,698 | B2 * | 4/2008 | Viswanath et al. | 235/376 |
| 7,359,871 | B1 | 4/2008 | Paasche et al. | 705/26 |
| 7,366,684 | B1 | 4/2008 | Douglas | 705/26 |
| 7,379,781 | B2 * | 5/2008 | Treichler et al. | 700/99 |
| 7,478,058 | B2 * | 1/2009 | Byrne | 705/26.2 |
| 7,640,193 | B2 | 12/2009 | Crespo et al. | 705/26 |
| 7,644,197 | B1 | 1/2010 | Waldorf et al. | |
| 7,647,247 | B2 | 1/2010 | Abraham et al. | 705/26 |
| 7,698,167 | B2 | 4/2010 | Batham et al. | |
| 7,715,548 | B2 * | 5/2010 | Croak et al. | 379/266.02 |
| 7,752,146 | B2 * | 7/2010 | Lert, Jr. | 705/500 |
| 7,848,953 | B2 * | 12/2010 | Kahlon et al. | 705/22 |
| 7,970,671 | B2 | 6/2011 | Hahn-Carlson et al. | |
| 8,024,236 | B2 * | 9/2011 | Vitulli et al. | 705/28 |
| 8,046,275 | B2 * | 10/2011 | Simon et al. | 705/28 |
| 8,170,998 | B2 * | 5/2012 | Churi et al. | 707/690 |
| 2001/0034733 | A1 | 10/2001 | Prompt et al. | |
| 2001/0042023 | A1 * | 11/2001 | Anderson et al. | 705/26 |
| 2001/0051917 | A1 | 12/2001 | Bissonette et al. | |
| 2002/0007287 | A1 | 1/2002 | Straube et al. | |
| 2002/0052801 | A1 | 5/2002 | Norton et al. | 705/26 |
| 2002/0055888 | A1 | 5/2002 | Beran et al. | 705/26 |
| 2002/0065736 | A1 | 5/2002 | Willner et al. | |
| 2002/0077939 | A1 | 6/2002 | Nicastro et al. | 705/29 |
| 2002/0078039 | A1 | 6/2002 | Cereghini et al. | |
| 2002/0111879 | A1 | 8/2002 | Melero et al. | 705/26 |
| 2002/0120714 | A1 | 8/2002 | Agapiev | |
| 2002/0133466 | A1 | 9/2002 | Pugh | |
| 2002/0143726 | A1 | 10/2002 | Planalp et al. | |
| 2002/0161861 | A1 | 10/2002 | Greuel | |
| 2002/0174089 | A1 | 11/2002 | Tenorio | 707/1 |
| 2002/0178120 | A1 | 11/2002 | Reid et al. | 705/59 |
| 2003/0028507 | A1 * | 2/2003 | Pauliks et al. | 707/1 |
| 2003/0040935 | A1 | 2/2003 | Magee | 705/1 |
| 2003/0105684 | A1 * | 6/2003 | Dunn et al. | 705/28 |
| 2003/0120641 | A1 | 6/2003 | Pelletier | 707/3 |
| 2003/0126024 | A1 * | 7/2003 | Crampton et al. | 705/22 |
| 2003/0130910 | A1 | 7/2003 | Pickover et al. | 705/27 |
| 2003/0135582 | A1 | 7/2003 | Allen et al. | |
| 2003/0144924 | A1 | 7/2003 | McGee | |
| 2003/0149631 | A1 * | 8/2003 | Crampton et al. | 705/22 |
| 2003/0220843 | A1 | 11/2003 | Lam et al. | 705/26 |
| 2003/0225650 | A1 | 12/2003 | Wilson et al. | |
| 2004/0034595 | A1 | 2/2004 | Kugeman et al. | 705/40 |
| 2004/0059645 | A1 | 3/2004 | Wirth, Jr. | 705/27 |
| 2004/0103042 | A1 | 5/2004 | Ryu et al. | 705/26 |
| 2004/0117290 | A1 | 6/2004 | Shacham | 705/37 |
| 2004/0117355 | A1 | 6/2004 | Lef et al. | 707/3 |
| 2004/0148232 | A1 | 7/2004 | Fushimi et al. | |
| 2004/0172344 | A1 * | 9/2004 | Stockwell et al. | 705/28 |
| 2004/0177114 | A1 | 9/2004 | Friedman et al. | |
| 2004/0210489 | A1 * | 10/2004 | Jackson et al. | 705/22 |
| 2004/0210526 | A1 | 10/2004 | Brown | 705/40 |
| 2004/0267629 | A1 | 12/2004 | Herrmann et al. | 705/26 |
| 2004/0267630 | A1 | 12/2004 | Au et al. | 705/26 |
| 2004/0267676 | A1 | 12/2004 | Feng et al. | 705/400 |
| 2005/0060245 | A1 | 3/2005 | Hoffman et al. | 705/28 |
| 2005/0075979 | A1 | 4/2005 | Leavitt et al. | 705/40 |
| 2005/0086122 | A1 | 4/2005 | Cirulli et al. | 705/26 |
| 2005/0165659 | A1 | 7/2005 | Gruber | 705/26 |
| 2005/0177507 | A1 | 8/2005 | Bandych et al. | 705/40 |
| 2005/0187825 | A1 | 8/2005 | Kirkley | |
| 2005/0240493 | A1 | 10/2005 | Johnson et al. | 705/27 |
| 2005/0246216 | A1 | 11/2005 | Rosen, III et al. | 705/8 |
| 2005/0262088 | A1 | 11/2005 | Solis et al. | |
| 2006/0089907 | A1 | 4/2006 | Kohlmaier et al. | |
| 2006/0224412 | A1 | 10/2006 | Frank et al. | 705/1 |
| 2006/0235789 | A1 | 10/2006 | Koch | 705/39 |
| 2006/0259427 | A1 | 11/2006 | Randell et al. | 705/40 |
| 2006/0287954 | A1 | 12/2006 | DeWitt et al. | 705/40 |
| 2007/0016514 | A1 | 1/2007 | Al-Abdulqader et al. | 705/37 |
| 2007/0038566 | A1 | 2/2007 | Shestakov et al. | 705/44 |
| 2007/0050261 | A1 * | 3/2007 | Lin | 705/22 |
| 2007/0100842 | A1 | 5/2007 | Wykes et al. | 707/100 |
| 2007/0124213 | A1 * | 5/2007 | Esau et al. | 705/26 |
| 2007/0143665 | A1 | 6/2007 | Machiraju et al. | 715/513 |
| 2007/0185785 | A1 | 8/2007 | Carlson et al. | |
| 2007/0232223 | A1 * | 10/2007 | Bilange | 455/3.06 |
| 2007/0255578 | A1 | 11/2007 | Salomon et al. | |
| 2007/0299736 | A1 | 12/2007 | Perrochon et al. | 705/26 |
| 2008/0091577 | A1 | 4/2008 | Holmes et al. | |
| 2008/0114712 | A1 * | 5/2008 | Gleim et al. | 706/47 |
| 2008/0120189 | A1 * | 5/2008 | Singh et al. | 705/16 |
| 2008/0162164 | A1 | 7/2008 | Segler et al. | 705/1 |
| 2008/0189341 | A1 | 8/2008 | Blea et al. | |
| 2008/0195506 | A1 | 8/2008 | Koretz et al. | 705/27 |
| 2008/0228625 | A1 | 9/2008 | Isaf et al. | |
| 2008/0281662 | A1 * | 11/2008 | Ginsburg et al. | 705/8 |
| 2008/0312987 | A1 * | 12/2008 | Damodaran et al. | 705/7 |
| 2009/0157548 | A1 | 6/2009 | Gong | 705/44 |
| 2009/0222279 | A1 | 9/2009 | Reiz | 705/1 |
| 2009/0289107 | A1 * | 11/2009 | Prentice | 235/380 |
| 2010/0023452 | A1 | 1/2010 | Brown | 705/40 |
| 2010/0030675 | A1 | 2/2010 | Hanan et al. | 705/34 |

FOREIGN PATENT DOCUMENTS

WO WO 01/42882 A2 6/2001

OTHER PUBLICATIONS

Notice of Allowance, U.S. Appl. No. 12/283,275, Mar. 16, 2011, 14 pgs.
Notice of Allowance, U.S. Appl. No. 12/283,280, Mar. 24, 2011, 6 pgs.
Notice of Allowance, U.S. Appl. No. 12/286,508, Mar. 16, 2011, 11 pgs.
Office Action, U.S. Appl. No. 12/007,815, May 13, 2011, 18 pgs.
Final Office Action, U.S. Appl. No. 12/283,277, May 2, 2011, 10 pgs.
Office Action, U.S. Appl. No. 12/283,282, Apr. 13, 2011, 17 pgs.
Office Action, U.S. Appl. No. 12/286,506, Mar. 14, 2011, 15 pgs.
Office Action, U.S. Appl. No. 12/286,507, May 13, 2011 24 pgs.
Notice of Allowance, U.S. Appl. No. 12/283,280, Jan. 28, 2011, 11 pgs.
Office Action, Canadian Patent Application 2513715, Aug. 31, 2009, 4 pgs.
Office Action, European Patent Application 03787246.2, Mar. 22, 2007, 5 pgs.
Office Action, U.S. Appl. No. 12/283,274, Dec. 22, 2010, 13 pgs.
Office Action, U.S. Appl. No. 12/283,277, Sep. 29, 2010, 9 pgs.
Office Action, U.S. Appl. No. 12/283,278, Jun. 9, 2010, 9 pgs.
Office Action, U.S. Appl. No. 12/283,278, Jan. 22, 2010, 7 pgs.
Office Action, U.S. Appl. No. 12/283,280, Aug. 19, 2009, 15 pgs.
Office Action, U.S. Appl. No. 12/283,280, Jan. 28, 2009, 14 pgs.
Office Action, U.S. Appl. No. 12/286,506, Jul. 28, 2010, 15 pgs.
Office Action, U.S. Appl. No. 12/286,506, Sep. 30, 2009, 13 pgs.
Office Action, U.S. Appl. No. 12/286,508, Oct. 14, 2009, 16 pgs.
Office Action, U.S. Appl. No. 12/286,508, Jun. 22, 2010, 18 pgs.
Supplementary European Search Report, EP Application 03787246, Aug. 16, 2006, 2 pgs.
Watson, Tailor catalogs to capture savings, Purchasing, Dec. 13, 2007, vol. 136, Iss. 15, 2 pgs.
International Search Report for PCT/US2003/038346 dated Jan. 3, 2005.
Office Action for U.S. Appl. No. 10/318,814, dated Oct. 5, 2004.
Notice of Allowability for U.S. Appl. No. 10/318,814, Apr. 27, 2005.
Office Action for U.S. Appl. No. 12/283,274 dated Sep. 6, 2011, 15 pgs.
Office Action for U.S. Appl. No. 12/283,276 dated Jul. 7, 2011, 7 pgs.
Final Office Action for U.S. Appl. No. 12/286,506 dated Sep. 22, 2011, 12 pgs.

Office Action for U.S. Appl. No. 12/283,279 dated Sep. 29, 2011, 12 pgs.
Notice of Allowance for U.S. Appl. No. 12/283,275 dated Jun. 30, 2011, 8 pgs.
Notice of Allowance for U.S. Appl. No. 12/283,280 dated Jul. 12, 2011, 7 pgs.
Notice of Allowance for U.S. Appl. No. 12/286,508 dated Jul. 25, 2011, 7 pgs.
Notice of Allowance for U.S. Appl. No. 12/283,278 dated Sep. 27, 2011, 8 pgs.
"Commerce One Announces Largest Commercially-Available Pre-Packed Catalog Content for Rapid Implementation of Electronic Procurement," Business Editors. Business Wire, New York: Jun. 10, 1998, 3 pgs.
Ballaro, Office Action, U.S. Appl. No. 12/007,815, Oct. 27, 2011, 20 pgs.
Ballaro, Office Action, U.S. Appl. No. 12/283,277, Oct. 7, 2011, 15 pgs.
Ballaro, Office Action, U.S. Appl. No. 12/283,282, Nov. 3, 2011, 33 pgs.
Ballaro, Office Action, U.S. Appl. No. 12/286,507, Oct. 27, 2011, 24 pgs.
Omelayenko, An Analysis of Integration Problems of XML-Based Catalogs for B2B Electronic Commmerce, Proceedings of the 9th IFIP 2.6 Working Conference on Database Semantics (DS-9), Hong Kong, Apr. 25-28, 2001, 15 pgs.
Open Catalog Interface, Release 2.0B, SAP AG, Nov. 7, 2000, 24 pgs.

* cited by examiner

| | | | | | | | |
|---|---|---|---|---|---|---|---|
| 3:34 PM | NEIL | PUNCHOUT ACCESS REMOVED | PUNCHOUT ACCESS | GATEWAY, INC. | | | |
| 3:34 PM | NEIL | PUNCHOUT ACCESS ADDED | PUNCHOUT ACCESS | XEROX | | | |
| 3:34 PM | NEIL | PUNCHOUT ACCESS ADDED | PUNCHOUT ACCESS | FISCHER SCIENTIFIC | | | |
| 3:34 PM | NEIL | PUNCHOUT ACCESS ADDED | PUNCHOUT ACCESS | WEST PRESS | | | |
| 3:34 PM | NEIL | PUNCHOUT ACCESS ADDED | PUNCHOUT ACCESS | IKON OFFICE PRODUCTS | | | |
| 7:49 AM | CHRISTINE | MODIFIED | PERMISSIONS : CART/REQUISITION | MODIFY PO CLAUSES IN PR/PO | VALUE | FALSE (INHERITED) | FALSE |
| 7:49 AM | CHRISTINE | MODIFIED | PERMISSIONS : CART/REQUISITION | WITHDRAW PR | VALUE | FALSE (INHERITED) | FALSE |
| 7:49 AM | CHRISTINE | MODIFIED | PERMISSIONS : CART/REQUISITION | BYPASS REVIEW | VALUE | FALSE (INHERITED) | FALSE |
| 7:49 AM | CHRISTINE | MODIFIED | PERMISSIONS : CART/REQUISITION | ALLOW EDITING OF TAX, SHIPPING, AND HANDLING | VALUE | FALSE (INHERITED) | FALSE |
| 7:49 AM | CHRISTINE | MODIFIED | PERMISSIONS : CART/REQUISITION | LINE-LEVEL EXTERNAL ATTACHMENTS | VALUE | FALSE (INHERITED) | FALSE |
| 7:49 AM | CHRISTINE | MODIFIED | PERMISSIONS : CART/REQUISITION | VIEW SENSITIVE CREDIT CARD DETAILS | VALUE | FALSE (INHERITED) | FALSE |
| 7:49 AM | CHRISTINE | MODIFIED | PERMISSIONS : CART/REQUISITION | SELECT CREDIT CARD FROM PROFILE | VALUE | FALSE (INHERITED) | FALSE |
| 7:49 AM | CHRISTINE | MODIFIED | PERMISSIONS : CART/REQUISITION | MANUALLY OVERRIDE PRICING | VALUE | FALSE (INHERITED) | FALSE |
| 7:49 AM | CHRISTINE | MODIFIED | PERMISSIONS : CART/REQUISITION | EDIT CREDIT CARD | VALUE | FALSE (INHERITED) | FALSE |
| 7:49 AM | CHRISTINE | MODIFIED | PERMISSIONS : CART/REQUISITION | EDIT PO NUMBER | VALUE | FALSE (INHERITED) | FALSE |
| 7:49 AM | CHRISTINE | MODIFIED | PERMISSIONS : CART/REQUISITION | EDIT USER'S CART ASSIGNEES | VALUE | FALSE (INHERITED) | FALSE |
| 7:49 AM | CHRISTINE | MODIFIED | PERMISSIONS : CART/REQUISITION | ASSIGN CARD TO ANOTHER USER | VALUE | FALSE (INHERITED) | FALSE |
| 7:49 AM | CHRISTINE | MODIFIED | PERMISSIONS : CART/REQUISITION | DO NOT PERMIT PLACE ORDER | VALUE | FALSE (INHERITED) | FALSE |

RESULTS PER PAGE 20 ☐ ◁PAGE 1 ☐ OF 11▷

GRAINGER, INC. ORGANIZATION PRICE USD NO CONTRACT ORGANIZATION EDIT...

| VERSION | NOTE | DATE AVAILABLE | REVIEWED BY... | DATE REVIEWED | DATE EFFECTIVE | COMMENTS | STATUS | SELECT |
|---|---|---|---|---|---|---|---|---|
| 1 | GRAINGER_WEET_102410.CSV WAS T...MORE... | 6:15 PM | | | | | NOT REVIEWED | ☐ |
| 0 | | 7:05 PM | | | | | IMPLICITLY APPROVED | ☐ |

MATRIX TECHNOLOGIES ORGANIZATION PRICE USD NO CONTRACT ORGANIZATION EDIT...

| VERSION | NOTE | DATE AVAILABLE | REVIEWED BY... | DATE REVIEWED | DATE EFFECTIVE | COMMENTS | STATUS | SELECT |
|---|---|---|---|---|---|---|---|---|
| 1 | | 12:29 PM | | | | PRICING UPDATE | NOT REVIEWED | ☐ |
| 0 | | 11:19 PM | | | | | IMPLICITLY APPROVED | ☐ |

OFFICE MAX ORGANIZATION PRICE USD NO CONTRACT ORGANIZATION EDIT...

| VERSION | NOTE | DATE AVAILABLE | REVIEWED BY... | DATE REVIEWED | DATE EFFECTIVE | COMMENTS | STATUS | SELECT |
|---|---|---|---|---|---|---|---|---|
| 1 | OFFICE_MAX_CONTRACT_WEET_10239... MORE... | 11:27 AM | | | | | NOT REVIEWED | ☐ |
| 0 | | 11:19 PM | | | | | IMPLICITLY APPROVED | ☐ |

SCIQUEST, INC ORGANIZATION PRICE USD NO CONTRACT ORGANIZATION EDIT...

| VERSION | NOTE | DATE AVAILABLE | REVIEWED BY... | DATE REVIEWED | DATE EFFECTIVE | COMMENTS | STATUS | SELECT |
|---|---|---|---|---|---|---|---|---|
| 6 | | 11:28 AM | | | | | NOT REVIEWED | ☐ |
| 5 | | 7:46 AM | | | | IMPORTING NON-ERRORED ROWS | NOT REVIEWED | ☐ |
| 4 | | 7:39 AM | | | | | NOT REVIEWED | ☐ |
| 3 | | 10:20 AM | | | | | NOT REVIEWED | ☐ |
| 2 | | 11:40 AM | | | | | NOT REVIEWED | ☐ |
| 1 | | 11:40 AM | | | | | NOT REVIEWED | ☐ |
| 0 | | 7:44 AM | | | | | NOT REVIEWED | ☐ |

| | Item | Jan (4118) | Feb (4120) | Mar (4122) | Apr (4124) |
|---|---|---|---|---|---|
| 4102 | Purchase Price | | | | |
| 4104 | Purchase Quantity | | | | |
| 4106 | Date | | | | |
| 4108 | Average Cost | | | | |
| 4110 | Shelf Age | | | | |
| 4112 | Markup | | | | |
| 4114 | Sale Price | | | | |
| 4116 | Inventory | | | | |

SEARCH RESULTS
RESULTS FOR: +BLACK +ELECTRIC +STAPLER
SHOW PRODUCT DETAILS

5112 ADD TO ACTIVE CART GO

SEARCH RESULTS — LEGEND ?

PRODUCTS PER PAGE 20 — PRODUCTS FOUND — PAGE 1 OF 3

| WEIGHT | SUPPLIER | CATEGORY | CATALOG# | PRODUCT DESCRIPTION | UOM | PRODUCT SIZE | PRICE | QUANTITY | ADD TO CART | SELECT |
|---|---|---|---|---|---|---|---|---|---|---|
| 100 | STOCK-ROOM | STAPLERS | SWI21101 | ELECTRIC STAPLER, COMPACT, BLACK | 1/EA | | 14.40 USD IN STOCK | 1 | | ☐ |
| 100 | STOCK-ROOM | STAPLERS | SWI21101 112080 | COMPACT ELECTRIC/BATTERY STAPLER, BLACK | 1/EA | | 12.49 USD IN STOCK | 1 | | ☐ |
| 100 | PALACE OFFICE SUPPLIES $ | | 12-121212 | BLACK ELECTRIC STAPLER | | | 12.99 USD | 1 | | ☐ |
| 100 | OFFICE DEPOT | STAPLERS | 196156 | OFFICE DEPOT(R) BRAND HALF-STRIP ELECTRIC STAPLER, BLACK | 1/EA | | 9.99 USD | 1 | | ☐ |
| 100 | OFFICE DEPOT | STAPLERS | 163460 | STANLEY(R) BOSTITCH BBE ELECTRONIC STAPLER AND STAPLES, BLACK | 1/EA | | 9.99 USD | 1 | | ☐ |
| 100 | OFFICE DEPOT | STAPLERS | 193622 | SWINGLINE(R) PORTABLE ELECTRIC STAPLER, BLACK | 1/EA | | 9.99 USD | 1 | | ☐ |
| 100 | OFFICE DEPOT | STAPLERS | 220376 | SWINGLINE(R) CARTRIDGE ELECTRONIC STAPLER, BLACK | 1/EA | | 9.99 USD | 1 | | ☐ |
| 100 | OFFICE DEPOT | STAPLERS | 459628 | SWINGLINE(R) COMPACT ELECTRIC/ BATTERY STAPLER, BLACK | 1/EA | | 9.99 USD | 1 | | ☐ |
| 100 | OFFICE DEPOT | STAPLERS | 495515 | SWINGLINE(R) HIGH-CAPACITY HEAVY DUTY STAPLER, BLACK | 1/EA | | 9.99 USD | 1 | | ☐ |

```
     <?xml version="1.0" encoding="UTF-8"?>
     <!DOCTYPE WorkflowFolderMessage SYSTEM "https://
     trinity.sciquest.com/app_docs/dtd/workflow/WorkflowFolder.dtd">
     <WorkflowFolderMessage>
7502   <Folder name="Remit To Validation" folderType="shared">
         <WorkflowType>invoice</WorkflowType>
       </Folder>
7504   <Folder name="Non-PO Approvals" folderType="shared">
         <WorkflowType>invoice</WorkflowType>
       </Folder>
7506   <Folder name="Matching Exceptions" folderType="shared">
         <WorkflowType>invoice</WorkflowType>
       </Folder>
7508   <Folder name="Matching Exception" folderType="shared">
         <WorkflowType>invoice</WorkflowType>
       </Folder>
7510   <Folder name="Over Credits" folderType="shared">
         <WorkflowType>invoice</WorkflowType>
       </Folder>
7512   <Folder name="Auto-Matching" folderType="automated">
         <WorkflowType>invoice</WorkflowType>
         <FolderRobotId>506</FolderRobotId>
       </Folder>
7514   <Folder name="OK to Pay" folderType="automated">
         <WorkflowType>invoice</WorkflowType>
         <FolderRobotId>505</FolderRobotId>
       </Folder>
7516   <Folder name="Over Credit-Auto Reject" folderType="automated">
         <WorkflowType>invoice</WorkflowType>
         <FolderRobotId>504</FolderRobotId>
       </Folder>
7518   <Robot id="506"> AUTO MATCH
         <ProcessingTimeout>1800</ProcessingTimeout>
         <RetryInterval>300</RetryInterval>
         <RetryCount>0</RetryCount>
         <SocketTimeout>30</SocketTimeout>
       </Robot>
7520   <Robot id="505"> OKAY TO PAY
         <ProcessingTimeout>1800</ProcessingTimeout>
         <RetryInterval>300</RetryInterval>
         <RetryCount>0</RetryCount>
         <SocketTimeout>30</SocketTimeout>
       </Robot>
7522   <Robot id="504"> OVER CREDIT/INVOICE PROCESS
         <ProcessingTimeout>1800</ProcessingTimeout>
         <RetryInterval>300</RetryInterval>
         <RetryCount>0</RetryCount>
         <SocketTimeout>30</SocketTimeout>
       </Robot>
     </WorkflowFolderMessage>
```

ACTIVE FOLDERS | EDIT FOLDERS | UPDATED FAVORITES

LEGEND ?

UNCHECK ALL | DETAILS | ADD TO ACTIVE CART

| FOLDER NAME/ PRODUCT NICKNAME | SUPPLIER | CATALOG NO. | QTY. | PRICE ESTIMATE | SELECT |
|---|---|---|---|---|---|
| MY FAVORITES ADD NON-CATALOG ITEM... | | | | | ☐ |
| 2-FLUORO-3-(TRIFLUOROMETHYL) BENZYL ALCOHOL, 96%, 0.25g | LANCASTER SYNTHESIS | 12306-0.25g | 1 | 9.99 USD | ☐ |
| AA CONTRACT TEST-BUFFER ASL, LYSIS BUFFER FOR USE WITH QIAAMP DNA STOOL MINI KIT ( CAT NO. 51504), 560 mL | QIAGEN, INC. | 19082 | UNAVAILABLE | | |
| AA CONTRACT TEST-CONTRACTED PRODUCT... | VWR SCIENTIFIC PRODUCTS | 3384-0448 | 2 | 450.00 USD | ☐ |
| AA CONTRACT TEST- SECOND CONTRACTED ITEM... | VWR SCIENTIFIC PRODUCTS | CONTRACT-2 | 1 | 1,000.00 USD | ☐ |
| AIRPORE TAPE SHEETS, MICROPOROUS TAPE SHEETS FOR COVERING96-WELL BLOCKS: 25 SHEETS PER PACK, AIRPORE MICROPOROUS TAPE SHEETS ARE IDEAL FOR BACTERIAL CULTIVATION IN BLOCKS, AS THEY PROMOTE GAS EXCHANGE DURING CULTURING | FISHER SCIENTIFIC | NC9942890 CHECK AVAILABILITY... | 1 | 37.00 USD | ☐ |
| BENZYLQUISQUALIC ACID | A.G. SCIENTIFIC | B-1073 1mg | UNAVAILABLE | | |
| BOTTLE, DROP-DISPENSING, TEF30ML | VWR INTERNATIONAL | 16354-320 | 1 | 37.99 USD | ☐ |
| BUFFER ASL, LYSIS BUFFER FOR USE WITH QIAAMP DNA STOOL MINI KIT (CAT NO. 51504), 560 mL | INDUSTRIES | 19082 | UNAVAILABLE | | |
| CAD- HISPEED PLASMID MAXI KIT (25), FOR ULTRAFAST PURIFICATION OF UP TO 750μg PLASMID OR COSMID DNA | INDUSTRIES | 111 | 1 | 13.45 USD | ☐ |
| HISPEED PLASMID MAXI KIT (25). FOR ULTRAFAST PURIFICATIONOF UP TO 750μg PLASMID OR COSMID DNA | INDUSTRIES | 111 | 1 | 13.45 USD | ☐ |

PRIORITIZING ORDERS/RECEIPT OF ITEMS BETWEEN USERS

RELATED APPLICATIONS

This application is a continuation-in-part of U.S. patent application Ser. No. 12/007,815, "Procurement System and Method Over a Network Using a Single Instance Multi-Tenant Architecture," filed on Jan. 15, 2008, which is hereby incorporated entirely herein by reference.

This application claims the benefit and priority of U.S. Provisional Patent Application Ser. No. 61/130,028, filed on May 27, 2008, which is hereby incorporated entirely herein by reference.

This application is related to U.S. patent application Ser. No. 10/318,814, filed Dec. 13, 2002, now U.S. Pat. No. 6,944, 613 entitled "Method and System for Creating a Database and Searching the Database for Allowing Multiple Customized Views, issued on Sep. 13, 2005, which is hereby incorporated entirely herein by reference.

This application is related to U.S. patent application Ser. No. 12/283,276, "Taxonomy and Data Structure for an Electronic Procurement System" filed on the same date as this application, which is hereby incorporated entirely herein by reference.

This application is related to U.S. patent application Ser. No. 12/283,275, "Shopping Cart Management in an Electronic Procurement System" filed on the same date as this application, which is hereby incorporated entirely herein by reference.

This application is related to U.S. patent application Ser. No. 12/283,274, "Workflow and Material Management in an Electronic Procurement System" filed on the same date as this application, which is hereby incorporated entirely herein by reference.

This application is related to U.S. patent application Ser. No. 12/283,279, "Multi-Currency Normalization In An Electronic Procurement System" filed on the same date as this application, which is hereby incorporated entirely herein by reference.

This application is related to U.S. patent application Ser. No. 12/283,280, "Form Management In An Electronic Procurement System" filed on the same date as this application, which is hereby incorporated entirely herein by reference.

This application is related to U.S. patent application Ser. No. 12/283,277, "Identifying and Resolving Discrepancies Between Purchase Documents and Invoices" filed on the same date as this application, which is hereby incorporated entirely herein by reference.

This application is related to U.S. patent application Ser. No. 12/283,278, "Providing Substitute Items When An Ordered Item Is Unavailable" filed on the same date as this application, which is hereby incorporated entirely herein by reference.

Reference to this application removed.

This application is related to U.S. patent application Ser. No. 12/283,282, "Invoice Workflow" filed on the same date as this application, which is hereby incorporated entirely herein by reference.

FIELD OF INVENTION

The present invention relates generally to the field of procurement and, in particular, to a system and method for customized searching, procurement, data modeling, and order processing over a network using a single instance system that supports multi-tenants in a multi-business to multi-consumer type environment.

BACKGROUND OF INVENTION

Current e-commerce systems and methods provide consumers and businesses the ability to browse product lines and consummate sales transactions. However, current e-commerce systems do not allow for easy customization of the needed functionality to facilitate the transaction. While current systems can be customized for a specific business or customer, the customization is a time consuming and complicated task. These customizations must generally be hard coded into the application by the developers, thereby incurring increases in costs, delay in implementation, and loss of productivity. In the field of procurement, for example, an organization in need of a product or service generally has contractual relationships with multiple vendors to provide the desired product or service. The contractual relationship may define such terms as price, lot size, form of delivery, amount of discount, and other business rules. These rules may become complex as one term may influence other terms, such as different levels of discounts based on the number of items ordered.

Procurement systems also generally require order authorization from a procurement officer of the organization or someone in charge of reviewing the orders for compliance with internal policies of the organization, in addition to the contractual relationships with the vendors. These orders must be processed and tracked as the orders progress through the approval process such that the individuals placing orders are notified of whether the order was approved or denied, as well as for internal audit purposes. Therefore, there is a need for a system and method that can provide an efficient and simple procurement process that is easily customizable for multiple organizations and multiple vendors with simple and complex business terms, and can also provide a single point-of-access for both businesses and consumers to interface, interact, and implement and execute transactions, in accordance with existing or newly defined relationships, using a custom and configurable methodology for realizing their requirements.

SUMMARY OF THE INVENTION

Accordingly, the present invention is directed to a procurement system and method over a network using a single instance multi-tenant architecture that substantially obviates one or more problems due to limitations and disadvantages of the related art.

An object of the present invention is to provide a system and method that can provide an efficient and simple procurement process that is easily customizable for multiple organizations and multiple vendors with simple and complex business terms, and can also provide a single point-of-access for both businesses and consumers to interface, interact, and implement and execute transactions, in accordance with existing or newly defined relationships, using a custom and configurable methodology for realizing their requirements.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a single instance, multi-tenant procurement system includes an access module to provide access to a plurality of end users associated with an organization to their respective accounts, each account being customized by a super user of the organization, a search engine to execute searches for products offered by one or more suppliers, a transaction module to process and track one or more requisitions generated by the plurality of end users, a business rules module to apply business rules established between the organization and the one or more suppliers to process the requisitions, and a data repository to store data generated on the system.

In another aspect, a method includes the steps of accessing a single instance, multi-tenant procurement system through an access module, customizing one or more end user accounts of an organization through the access module by a super user of the organization, executing searches for products offered by one or more suppliers through a search engine, processing one or more requisitions generated on the one or more end user accounts by applying business rules established between the organization and the one or more suppliers to process the requisitions, and storing generated data in a data repository.

In yet another aspect, a computer program product including a computer readable medium having stored thereon computer executable instructions that, when executed on a computer, configures the computer to perform a method including the steps of accessing a single instance, multi-tenant procurement system through an access module, customizing one or more end user accounts of an organization through the access module by a super user of the organization, executing searches for products offered by one or more suppliers through a search engine, processing one or more requisitions generated on the one or more end user accounts by applying business rules established between the organization and the one or more suppliers to process the requisitions, and storing generated data in a data repository.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings:

FIGS. 5N-5O illustrate exemplary materials management tools in accordance with the present invention;

FIG. 41 illustrates an exemplary data structure 4100 for an inventory of an item, according to some embodiments.

FIG. 51 illustrates an exemplary screenshot of a search results menu, according to some embodiments.

FIG. 75 illustrates a listing of exemplary folders and robots, according to some embodiments.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of client-server compatible system containing any type of client, network, server, and database elements.

The terms module, engine, and application are used interchangeably herein.

Figure 1:
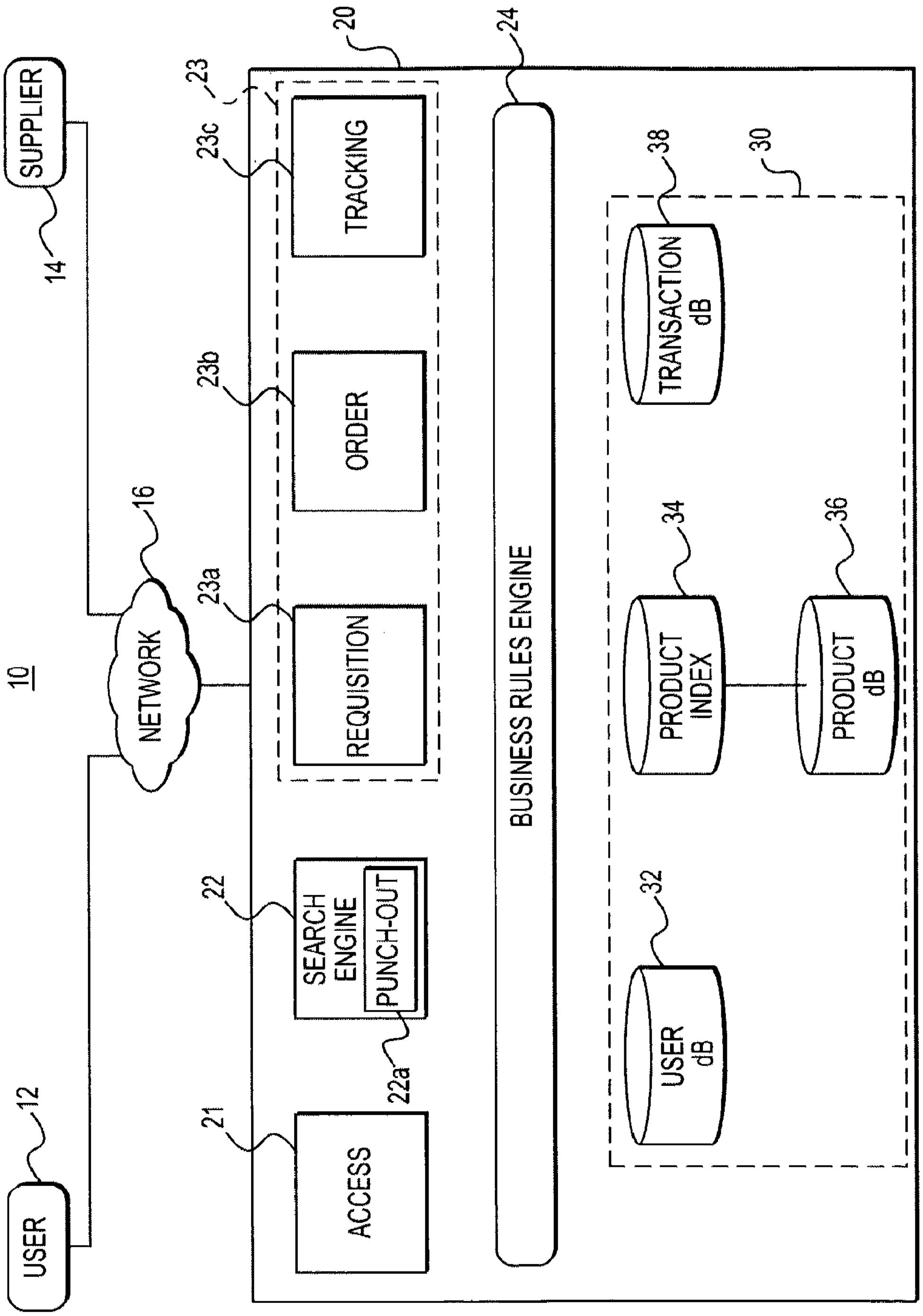
FIG. 1 is a block diagram illustrating an exemplary embodiment of an eProcurement system in accordance with the present invention.

FIG. 1 is a block diagram illustrating an exemplary embodiment of an eProcurement system in accordance with the present invention. The term "eProcurement architecture" used herein refers to a system and method that facilitates customized searching, data modeling, and order processing over an electronic network, using a client-server type architecture, where multi-tenants (e.g., end users/consumers, supplier users, etc.) can realize each of their specific business requirements with respect to the process of initiating and consummating transactions. In general, the eProcurement architecture of the present invention facilitates transactions between end users and suppliers. The end users may be individual users or members of an organization, such as a company or institution. For example, the end users may be any member of the organization authorized for performing procurement operations for the organization or the end user may be an individual of a sole proprietorship.

In a multi-person organization, procurement operations of the organization are setup in a multi-level structure with a group of individuals who make requests for requisitions and an authorizing entity (e.g., manager) who approve such requests based on the organization's procurement policies. There may be a plurality of individuals assigned as the authorizing entity, and the authorizing entity may itself include multiple levels of authority with each higher level having more control over the procurement operations. The procurement policies may define the levels of authority, such as who can order what, and include one or more contractual relationships between the organization and one or more suppliers. By way of example only, the procurement policy may define that the lowest level end user of a particular department can only order certain products or services while a higher level end user can order or authorize orders of broader categories of products and/or services. In another example, the procurement policy may require that certain products or services be ordered exclusively from a supplier with an exclusive contract with the organization. As another example, the procurement policy may require that a particular product be ordered in a predetermined lot size due to a contractual discount negotiated from a particular supplier. The eProcurement architecture of the present invention facilitates transactions between multiple end users of any level of any organization with multiple suppliers taking into account the procurement policies associated with each end user and supplier on a single platform (i.e., single instance, multi-tenant architecture).

As shown in FIG. 1, the eProcurement system 10 of the present invention includes end users 12, supplier users 14, and the procurement module 20 connected over a data communications network 16. The procurement module 20 includes access module 21, search engine 22, transaction module 23, business rules engine 24, and data repository 30. The data repository 30 may include one or more databases to store user data 32, hosted product index 34, product data 36, and transaction data 38.

The access module 21 allows the end users and suppliers to set up and gain access to their respective accounts in the eProcurement system 10. For example, the access module 21 may include registration/account setup procedures to create a new account on the eProcurement system 10. The access module 21 may also include authentication procedures (e.g., login ID and password) to determine the identity of the user and the user's profile (e.g., associated organization, level of access, etc.) before granting access to the procurement module 20. Once granted access, the user may configure the account for customized access. If the user is a "super user" (i.e., a user with higher levels of access, such as a procurement supervisor of an organization), the super user may set conditions for access of other users from his organization. If the user is a supplier, the supplier user may create or update the supplier account or provide/update product/service information (e.g., product catalog).

The search engine 22 allows the user to search through the hosted product index 34 to find a product and/or service provided by the one or more suppliers. In general, the search engine 22 searches through the hosted product index 34, which contains tokenized data of all the products from all the suppliers stored in the product database 36. The search results of the search are processed by the business rules engine 24 and displayed to the user based on the business rules set for the user and the user's organization. The search engine 22 includes a punch-out module 22*a* that allows the user to "punch-out" to an unhosted supplier catalog for products/services not available through the eProcurement system 10. The user can only access those punch-out suppliers configured for him/her according to the business rules engine 24.

The transaction module 23 includes one or more of requisition module 23*a*, order module 23*b*, and tracking module 23*c* to facilitate a transaction with one or more suppliers. The requisition module 23*a* processes items selected by the user from the search engine 22 and creates a requisition. If authorization is required, the requisition module 23*a* notifies the designated authorizing entity of the requisition to obtain authorization. If the requisition is denied, the requisition module 23*a* sends a notification back to the user of the decision. If the requisition is approved, the user is notified and the requisition either a) is sent to order module 23*b*, or b) is marked as "complete" based on the business rules engine 24 because not all requisitions are necessarily converted to orders. The order module 23*b* converts the requisition into a purchase order according to the business rules in the business rules engine 24. The order module 23*b* sends the purchase order to the appropriate supplier in the proper format(s) designated for that supplier. Once the purchase order has been sent, the tracking module 23 receives confirmation of the purchase orders from the suppliers and keeps track of the purchase orders through the fulfillment process.

In general, a user (i.e., end user, super user, supplier user, etc.) gains access to the procurement module 20 through the access module 21. The access module 21 may include security measures, such as authentication (e.g., providing user ID and password), to identify the user by accessing the user data stored in the user database 32. User accounts may also be created through the access module 21. For example, a user (generally a super user) creates an account on the eProcurement system 10 by registering through the access module 21. The account may also be created by a system administrator of the eProcurement system 10 off-line who gives access to the user via emailing a registration link to the access module 21. Once an account has been created, the user may access the eProcurement system 10 through the access module 21.

Figure 2:
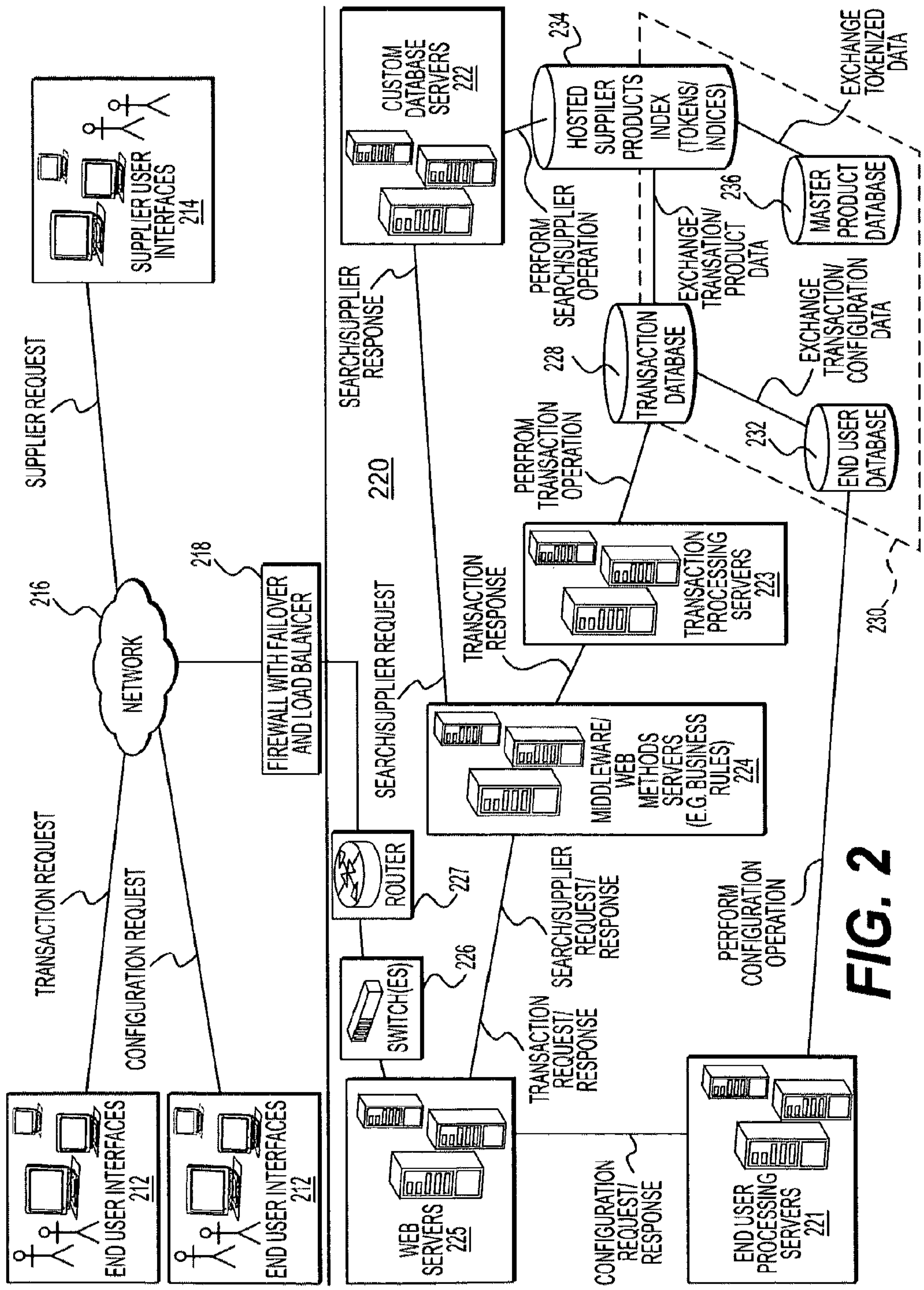
FIG. 2 illustrates an exemplary embodiment of an eProcurement architecture in accordance with the present invention.

FIG. 2 illustrates an exemplary embodiment of an eProcurement architecture in accordance with the present invention. As shown in FIG. 2, the eProcurement architecture of the present invention may include one or more end user/consumer interfaces 212 and supplier user interfaces 214, which may connect to one or more servers 220 over a wired or wireless network 216. These one or more servers 220 may be for user processing (e.g., end user processing servers 221), product database hosting (e.g., custom database servers 222), transaction processing (e.g., transaction processing servers 223), middleware/web methods (e.g., middleware/web methods servers (e.g., business rules) 224—e.g., for implementing business rules between end users and supplier users), and communication processing (e.g., web servers 225), such as streaming data/media, file hosting (e.g., FTP—File Transfer Protocol—server), web serving (e.g., HTTP/HTTPS, WWW, CGI—Common Gateway Interface, ASP—Active Server Pages, Servlets, JSP—Java Server Pages, etc.), facsimile transmission, proxy, telnet, chat, list, mail (e.g., SMTP—Simple Mail Transfer Protocol), news (e.g., NNTP—Network News Transfer Protocol), groupware, and other communication/data processing purposes. These one or more servers 220 may be hosted behind or outside a firewall 218 with or without failover and/or load balancers. These one or more servers 220 may be hosted over the Internet, within the same Intranet and/or subnet, on different Intranets and/or subnets, or in any other inter-networked configuration of network 216. The servers 220 may be implemented on Microsoft™ Windows NT/2000/XP™/XP Professional/Server™/Vista™ (e.g., Microsoft™ Internet Information Services (IIS)), Apache, Unix™, z/OS™, z/VM™, Linux™, VMS, Netscape Enterprise Server™, iPlanet™ Web Server, Sun Java System Web Server, Oracle™ Server, SQL Server™ (e.g., Microsoft™, Sybase™, MySQL™ etc.), Terradata server applications, or any other compatible server technology.

End user interfaces 212 and supplier user interfaces 214 may be implemented on Internet web browsers such as Microsoft Internet Explorer™, Netscape Navigator™, Mozilla™ Firefox™, Opera, Satori, Blazer, or any other Internet web browser capable of sending and receiving data using the Hypertext Transfer Protocol (HTTP). The data may be transferred over an encrypted and authenticated communication layer (i.e., using secure HTTP, or as more commonly known, HTTPS). End user interfaces 212 and supplier user interfaces 214 may be implemented using a combination of HTML (Hypertext Markup Language), Macromedia Flash™, XML (Extensible Markup Language), CGI (Client Gateway Interface), ASP (Active Server Pages), JSP™ (JavaServer Pages), PHP (Hypertext Preprocessor), Java, C/C++, Visual Basic™, Visual Basic Script, Perl™, Tcl/Tk, SQL (Structured Query Language), and any other relevant markup/programming/scripting/query language or development environment.

Communication from the end user interfaces 212 and supplier user interfaces 214 to the server or plurality of servers 220, via the firewall 218 with failover and load balancer, may be implemented over wired communication protocols through network 216. For example, at the Wide Area Network (WAN) level or at the Local Area Network (LAN) level, routed Internet Protocol (IP) packets may be transported using the IEEE 802.3 Ethernet standard, for example, on the data link network layer. However, any network standard may be used, whether for packet encapsulation, path determination and logical addressing, or physical addressing, at any layer of these layers without departing from the scope of the invention. Also, the packet data may be transported over interconnected hubs (not shown), switches 226, routers 227, and other network elements. At the WAN level, protocols such as Packet over Synchronous Optical Network (SONET) or Synchronous Digital Hierarchy (SDH), Asynchronous Transfer Mode (ATM) over SONET, Multi-protocol Label Switching (MPLS), packet over Frame Relay, or other analogous protocols may be used to deliver data over longer distances. Interconnect repeaters, multiplexers (e.g., add/drop), and cross connects may be used to facilitate and ensure accurate transmission over the long-haul from point-to-point.

Communication from the end user interface 212 and supplier user interfaces 214 to the server or plurality of servers 220, via the firewall 218 with failover and load balancer, may also be implemented over wireless communication protocols over network 216. For example, at the LAN level (i.e., WiFi), standards such as 802.11a, 802.11b, 802.11g, and 802.11n may be used to deliver data from point-to-point. Similarly, at the Metropolitan Area Network (MAN)/WAN level, standards such as 802.16e (i.e., WirelessMAN), WiMax, Universal Mobile Telecommunications System (UMTS) over Wideband Code Division Multiple Access (W-CDMA), GSM, GPRS, or EDGE may also be used to deliver data from point-to-point. As with the wired networks, other standards and protocols may be used without departing from the scope of the invention.

The eProcurement architecture of the present invention includes a data repository 230. The data repository 230 may be implemented using one or more databases to store end user data 232, hosted product index 234, master product data 236, and transaction data 238, in accordance with business rules (implemented via, for example, a business rules engine 24). The data repository 230 may be implemented using any type of data storage device without departing from the scope of the present invention. Moreover, the data repository 230 may be managed by any database platform (e.g., Oracle, Microsoft Access, IBM DB2, etc.) without departing from the scope of the present invention.

End user interfaces 212 and supplier user interfaces 214 may also allow an implemented feature that enables the setting of user configuration preferences. This feature allows a super user, with enhanced administrative capabilities, to have full access to the features of end user and supplier user interfaces. Some of these features may include: sending an email notification of a specific requisition order, and a corresponding link for accessing the same; full access to the features of the end user and supplier user interfaces; the capability to approve or reject a full order or a specific order item requested by an end user; the capability to take ownership and/or control of a specific requisition order, which may be organized according to a product or supplier category; the capability to expedite or accelerate an order through to specific steps along the ordering process, including the final review step; and, the capability to invoke and view a summary and history of each end user's latest order activity.

Moreover, a super user, for example, may design and/or otherwise configure and customize the style, type, layout, and level of data that is displayed on the respective end user interface 212 and supplier interface 214 for their respective organizations. A super user is also able to invoke a setup feature to choose which end users may have access to specific suppliers. Furthermore, a super user may also determine what information is required from the end users and supplier users of their respective organization, and determine the level of access at which an end user may access a specific supplier within the hosted supplier products catalog. This capability enables a super user to configure, for example, whether an end user can view specific products from specific suppliers, the currencies given for product/item pricing, and place orders. Moreover, the end user interface of the present invention allows for features of the present invention to be configured as permission driven. As such, certain features may be accessible to each end user, based on the end user's precedence within the organization, which likely affects his/her corresponding permission level. In addition, each feature is configurable to each end user based on a set of variable options. These variable options may include the ability to set a specific layout/view, a preferred number of search results, a preferred list of products, or a preferred list of suppliers. Also, each feature may include a help function that allows an end user to resolve inquiries or difficulties relating to the feature. The end user interface implementation is usually account login-based and, as described in further detail above, may encompass multiple server types (e.g., running a Linux OS), a redundant firewall and load balancer, and a priority-based software programming architecture (e.g., implemented in JAVA and JSP).

Figure 3:
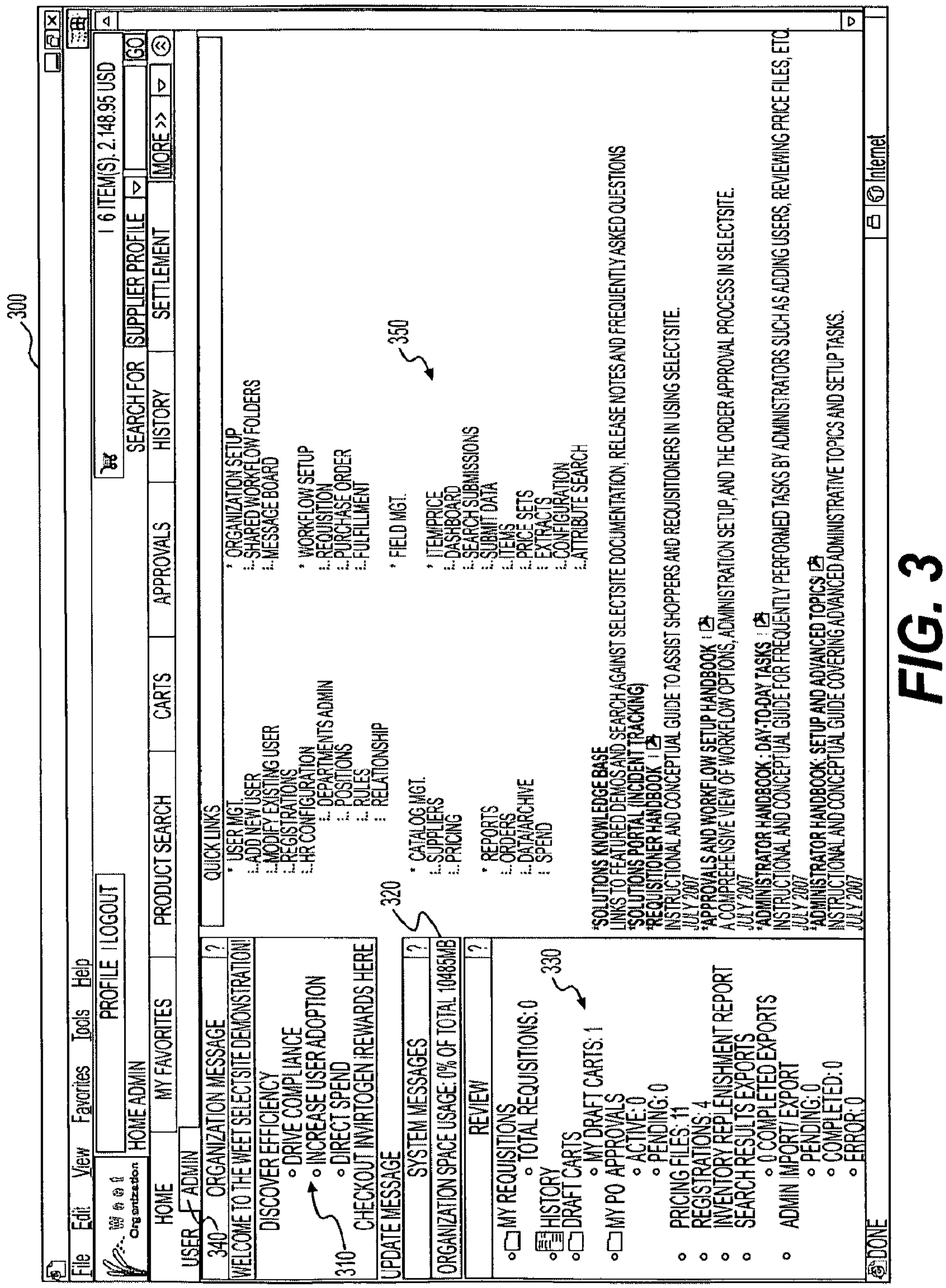
FIG. 3 illustrates an exemplary user interface in accordance with the present invention.

FIG. 3 illustrates an exemplary user interface in accordance with the present invention. For purposes of example only, an end user interface is used to describe various aspects of the present invention. As shown in FIG. 3, user interface 300 provides customized information for the user. For example, the user is a member of a fictitious group named Weet Organization. The user interface 300 includes one or more of an organizational message area 310, any system message area 320, and task items area 330. In the example shown, the user is a super user and therefore, the "Admin" tab 340 is active. Had the user been an end user, the "User" tab would be active and the "Admin" tab 340 either would not be displayed or would be inactive. All of these areas and information displayed therein may be customized through the access module 21. Any configuration definitions are then stored in the user database 32 and invoked upon access/login.

FIG. 3 illustrates an exemplary embodiment of the configuration tools available to a super user. In general, the eProcurement system 10 of the present invention provides a super user the tools needed to configure every aspect of the eProcurement process of an organization for complete customization, thereby effectuating a single instance multi-tenant architecture. That is, the eProcurement system 10 establishes a centralized system that is customizable for each user and/or organization, thereby providing a robust and yet an efficient eProcurement system. More specifically, configuration tool 350 allows a super user to customize the configuration of the eProcurement system 10 specifically for an organization and its users. While exemplary configuration tools are shown, other tools may be included without departing from the scope of the present invention.

Figure 4A:
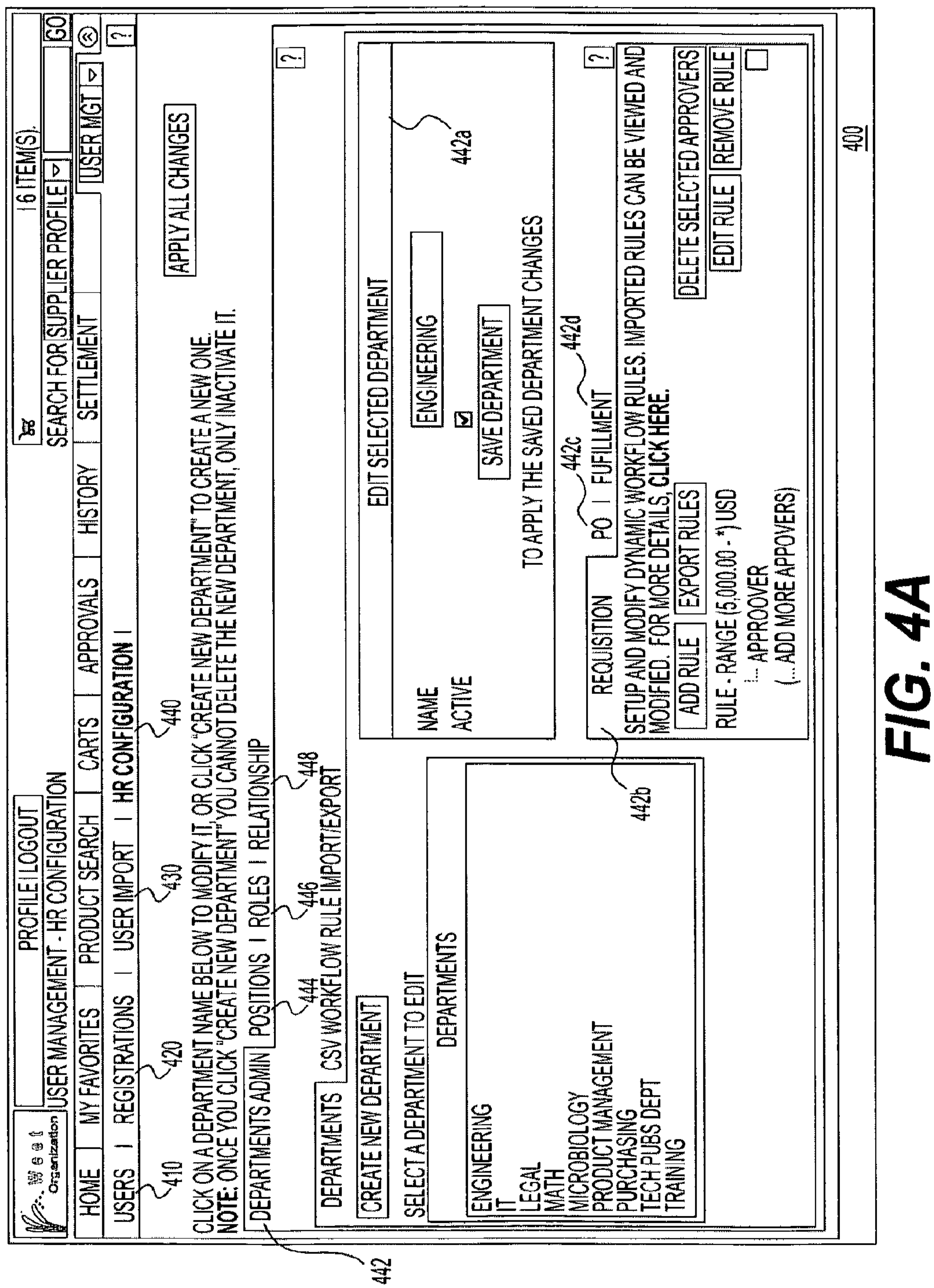
FIGS. 4A-4T illustrate exemplary user management tools in accordance with the present invention.
Figure 4B:
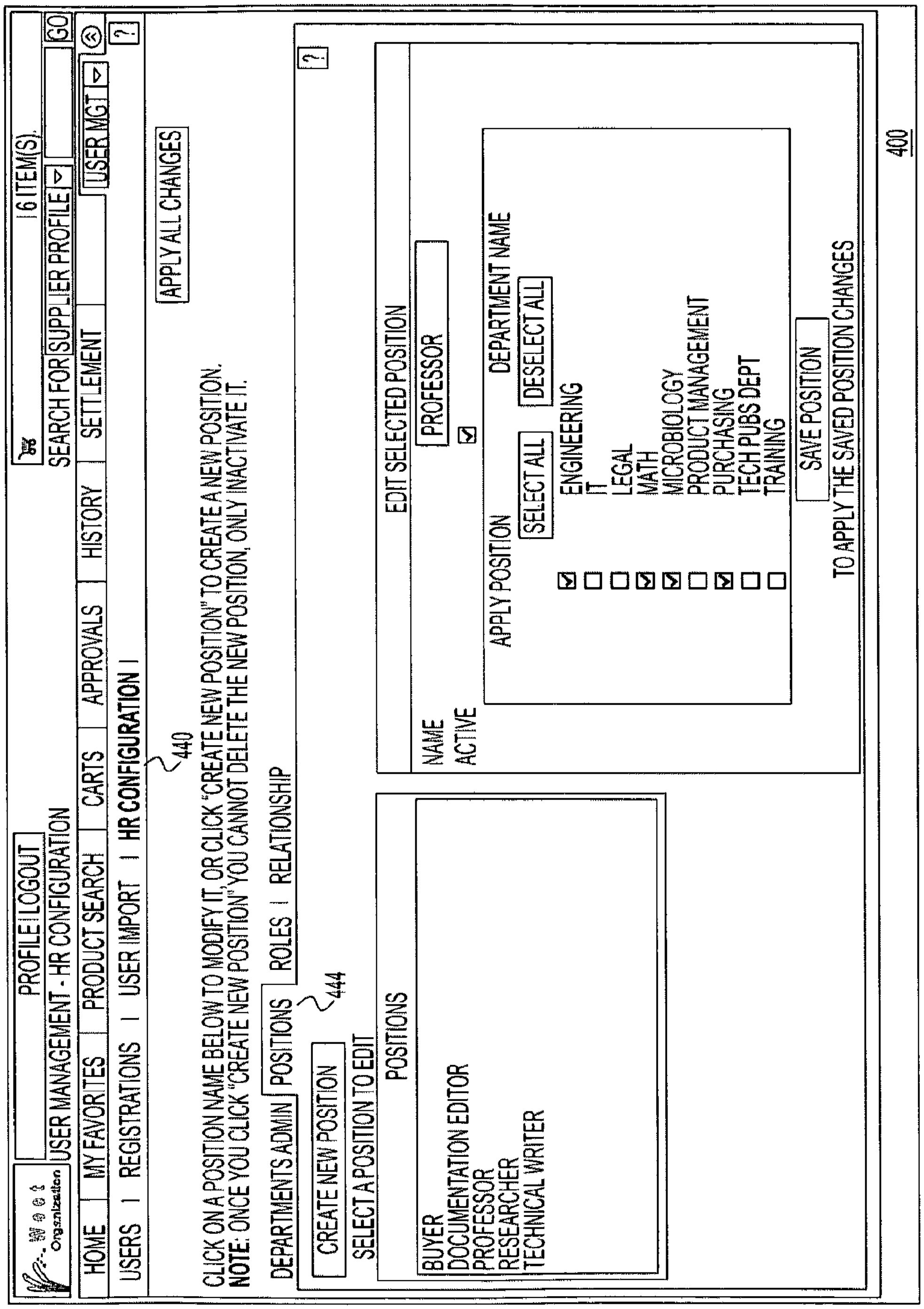
Figure 4C:
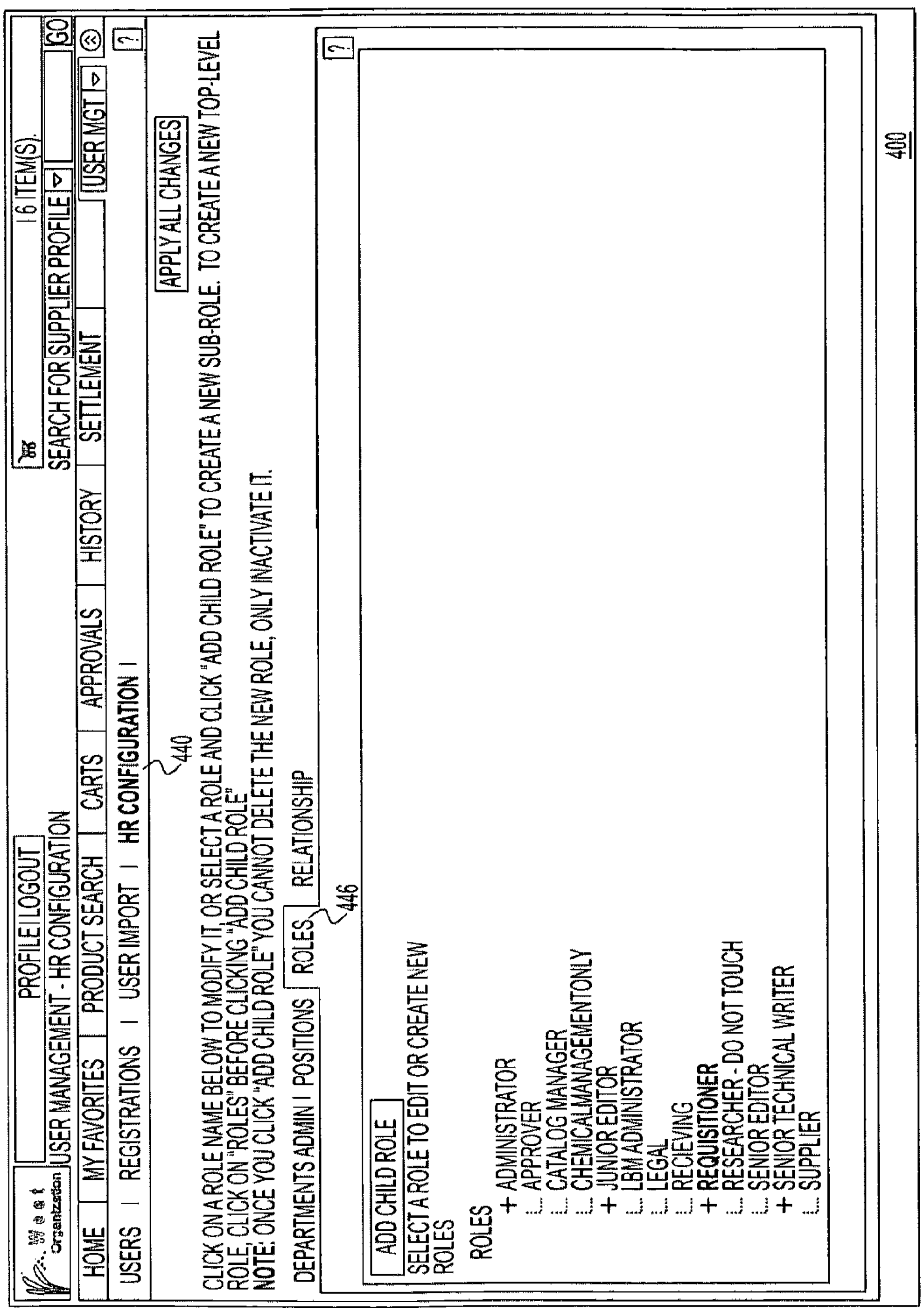
Figure 4D:
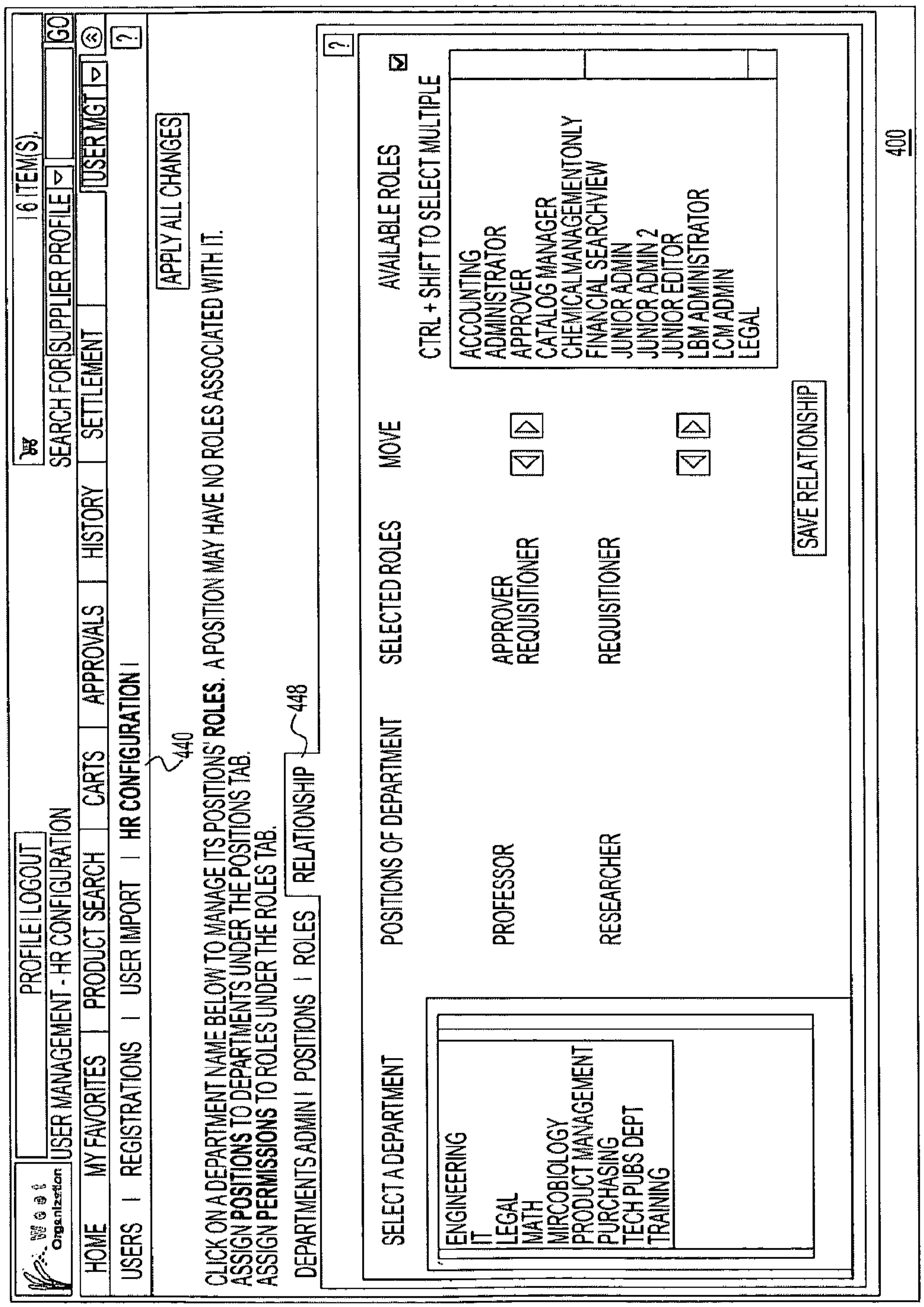

FIG. 4A illustrates an exemplary user management tool 400 to create or modify user access, manage user registration, and define the organizational structure. For example, FIG. 4A illustrates a user access human resources (HR) configuration tool 440. In particular, HR configuration tool 440 allows the super user to establish and describe the organization. For example, the HR configuration tool 440 may be used to define various departments of the organization (442), various positions of the organization (444), various roles of the users in the organization (446), and relationships between the roles, positions, and departments defined for the organization (448). As shown in FIG. 4A, the various departments of the organization that require procurement services may be "Engineering," "IT," "Legal," "Math," etc. As shown in FIG. 4B, there may be various positions within the organization, such as "Buyer," "Documentation Editor," "Professor, "Researcher," etc. As shown in FIG. 4C, the HR configuration tool 440 is used to define various roles of the users within the organization, such as "Administrator," "Approver," "Catalog Manager," etc. As shown in FIG. 4D, the HR configuration tool 440 is used to define the relationship between the department, position, and role of the users. For example, a "Professor" in "Engineering" may be designated as an "Approver" and "Requisitioner" for the organization while a "Researcher" of "Engineering" may only be a "Requisitioner." In this manner, the HR configuration tool 440 provides a simple yet efficient mechanism to define the organization for which the eProcurement system 10 is to be utilized.

Figure 4E:
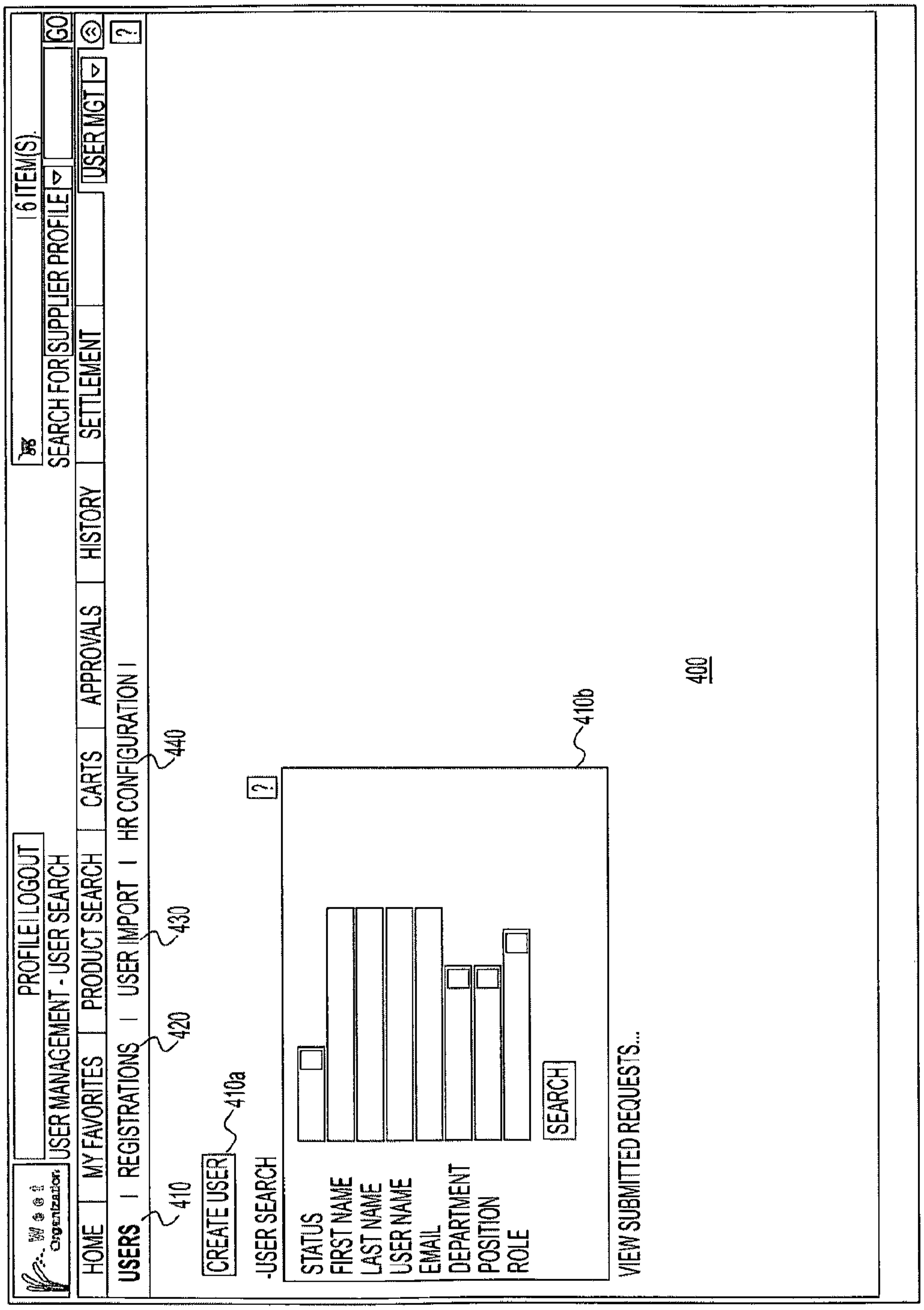
Figure 4F:
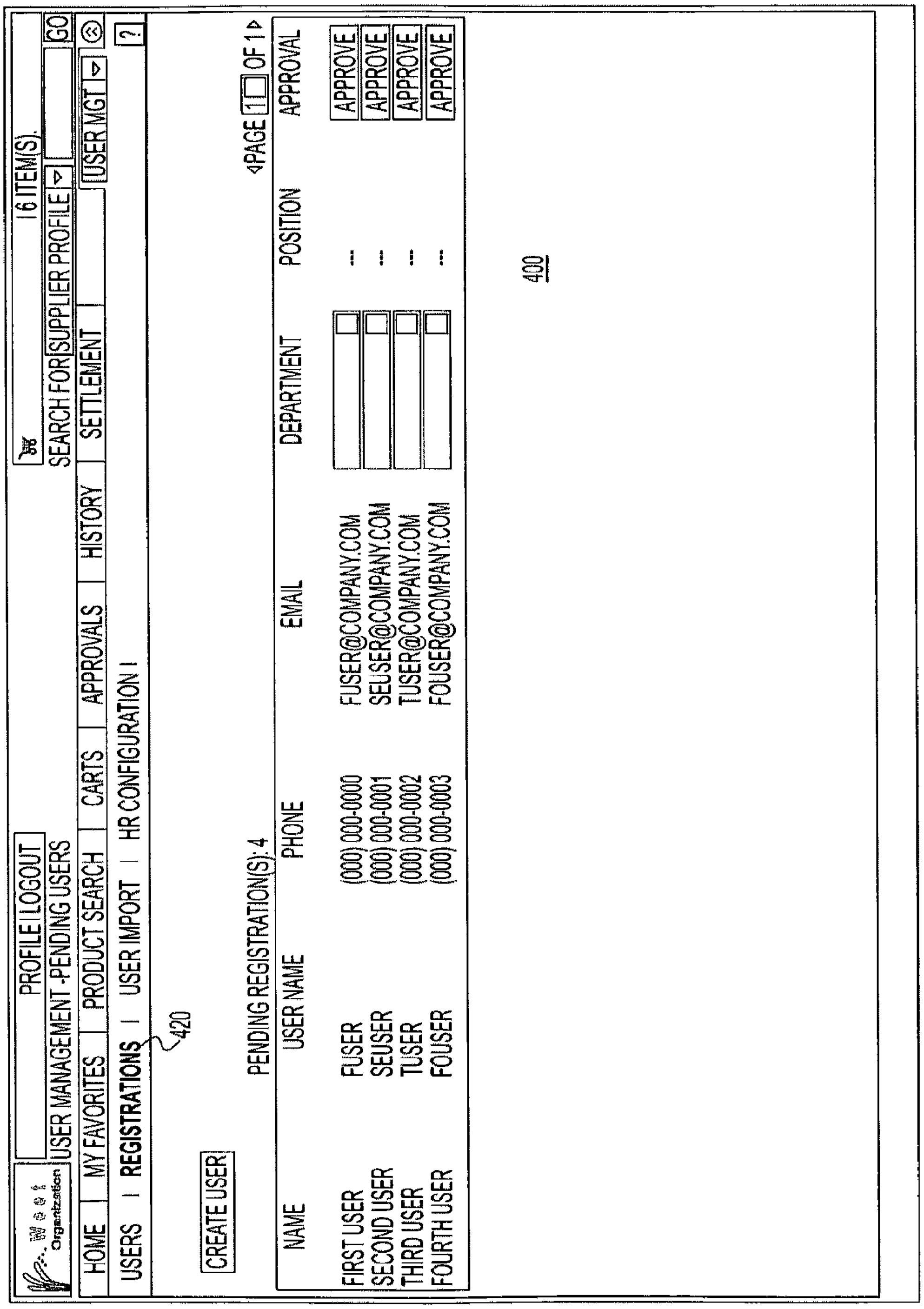

Once the organization has been defined through the HR configuration tool 440, user access tool 410 may be used to create or modify a user's access to the eProcurement system 10 for the user's organization. As shown in FIG. 4E, the user access tool 410 may be used to create a new user access account (410*a*) or the user database 32 may be searched (410*b*) for an existing user in the eProcurement system 10. To create a user access account, the user access tool 410 requires entry of the user's personal information (e.g., name, phone number(s), email address) and authentication information (e.g., login ID and password). In addition, the user's department and position information as created through the HR configuration tool 440 is also provided. In an exemplary embodiment, the department and position information created through the HR configuration tool 440 are shown in a drop-down menu for easy selection and entry. To simplify the creation of an account, existing user files may be imported into the user database through the user import 430. Once a user access account has been created, the newly created accounts are activated through the user registration monitor 420. As shown in FIG. 4F, a list of new user access requests is presented in the user registration monitor 420. A designated approver for the organization then reviews and approves the user access account to be activated for the user.

Figure 4G:
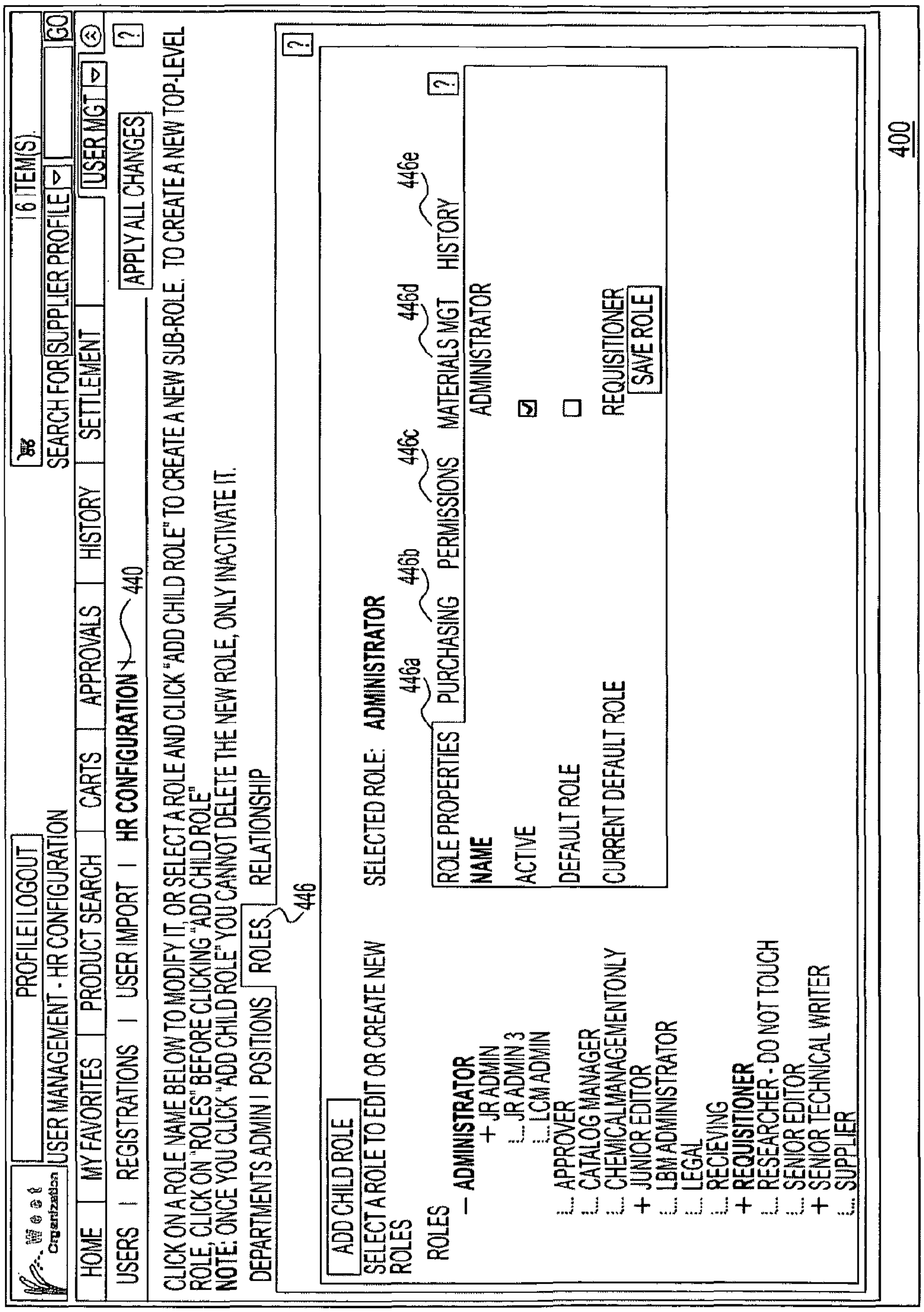

In accordance with an exemplary embodiment of the present invention, every aspect of the organization may be defined and customized in the eProcurement system 10. For example, as shown in FIG. 4A, once a "Department" has been created for an organization, the created department may be activated (442*a*). Moreover, each department may be defined with business rules related to the department's requisition (442*b*), purchase orders (442*c*), and fulfillment (442*d*). For example, FIG. 4A shows that the "Engineering" department has been designated as an active department with the "Requisition" and "Purchase Order" rules including a list of approvers for the Engineering department. As shown in FIG. 4B, a created position may be designated for a created department. For example, FIG. 4B shows that the organization has the "Professor" position for the "Engineering," "Math," "Microbiology," and "Purchasing" departments. FIG. 4G illustrates an exemplary embodiment of the HR configuration tool 440 for defining roles of the organization.

Figure 4H:
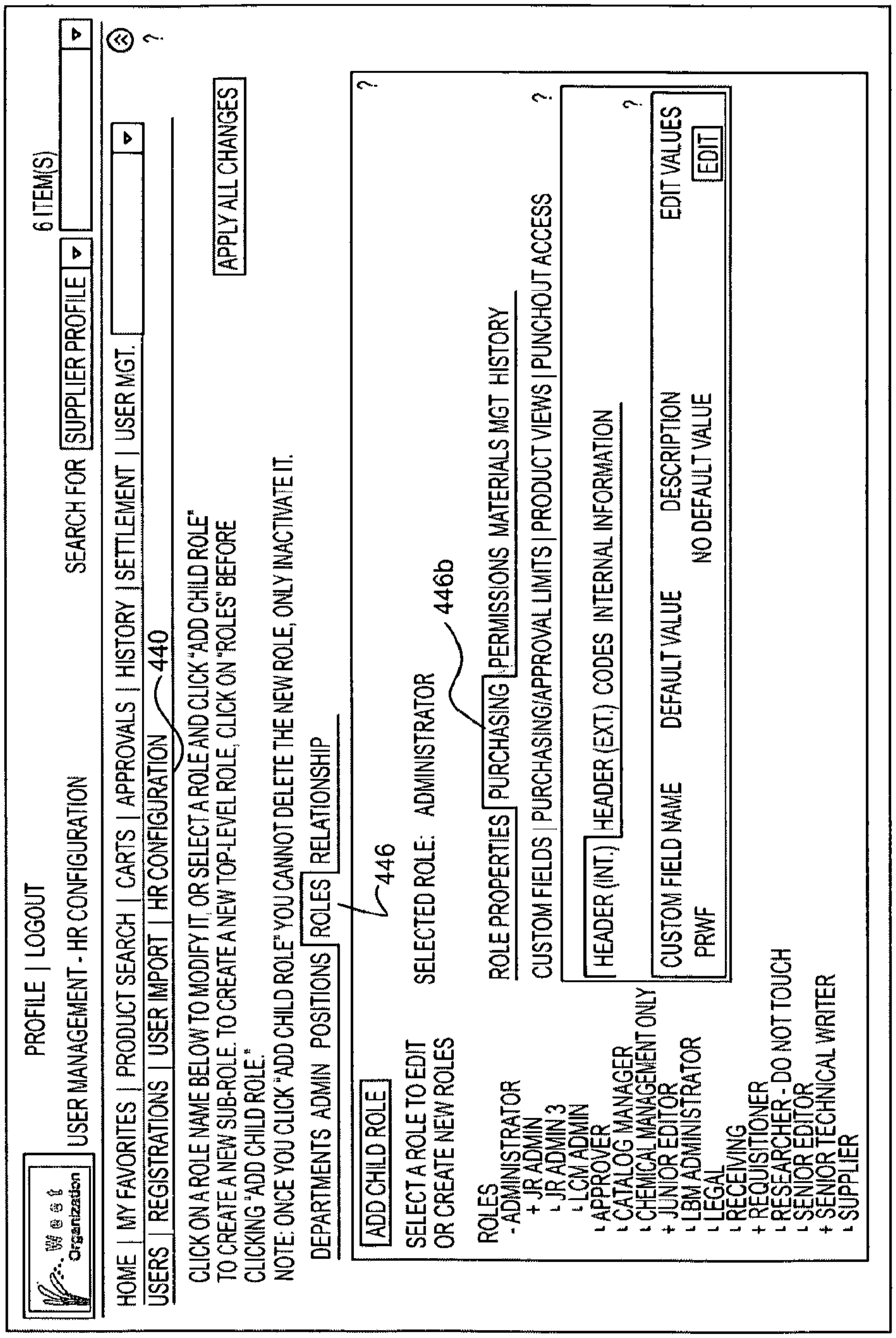
Figure 4I:
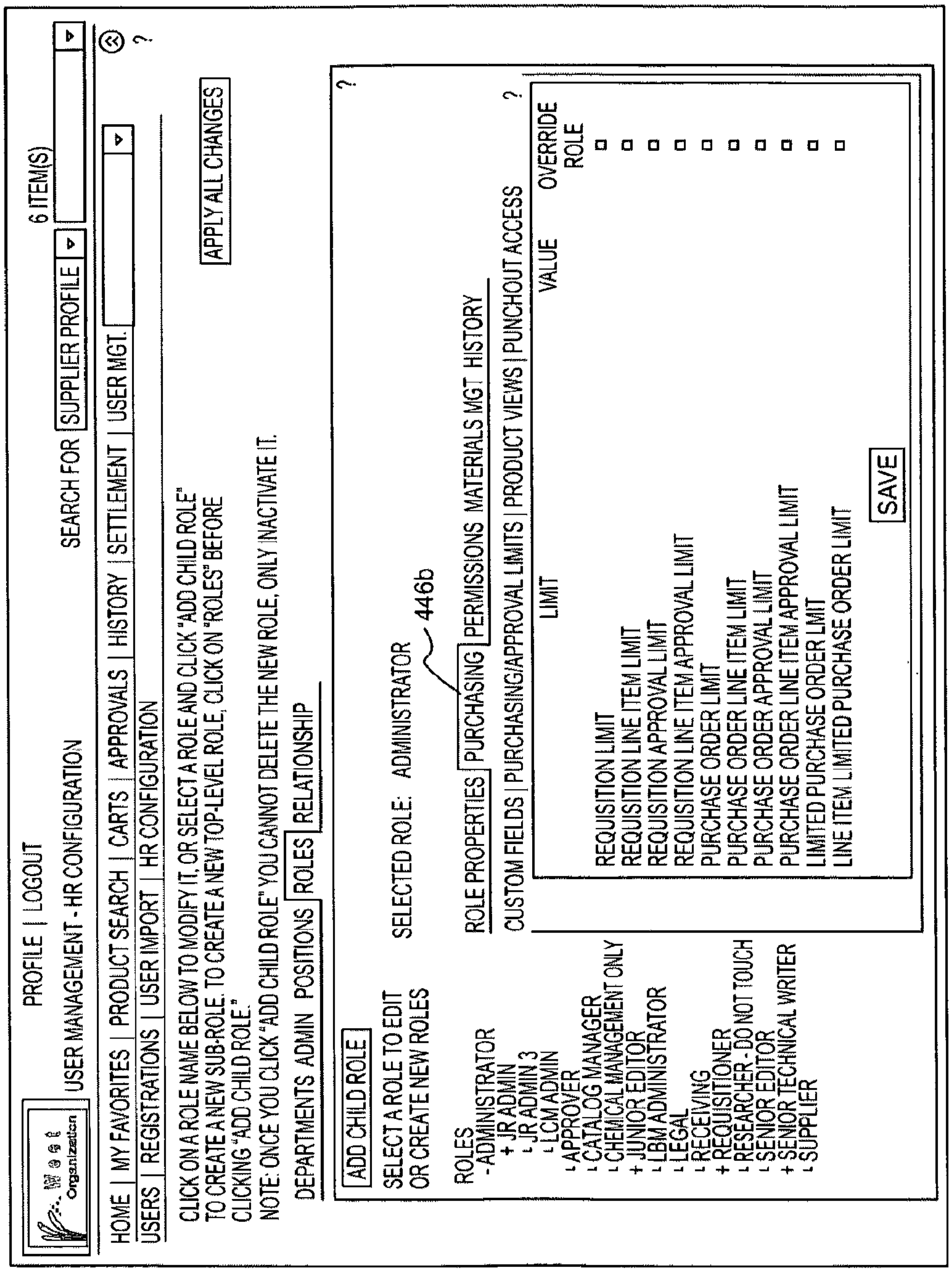
Figure 4J:
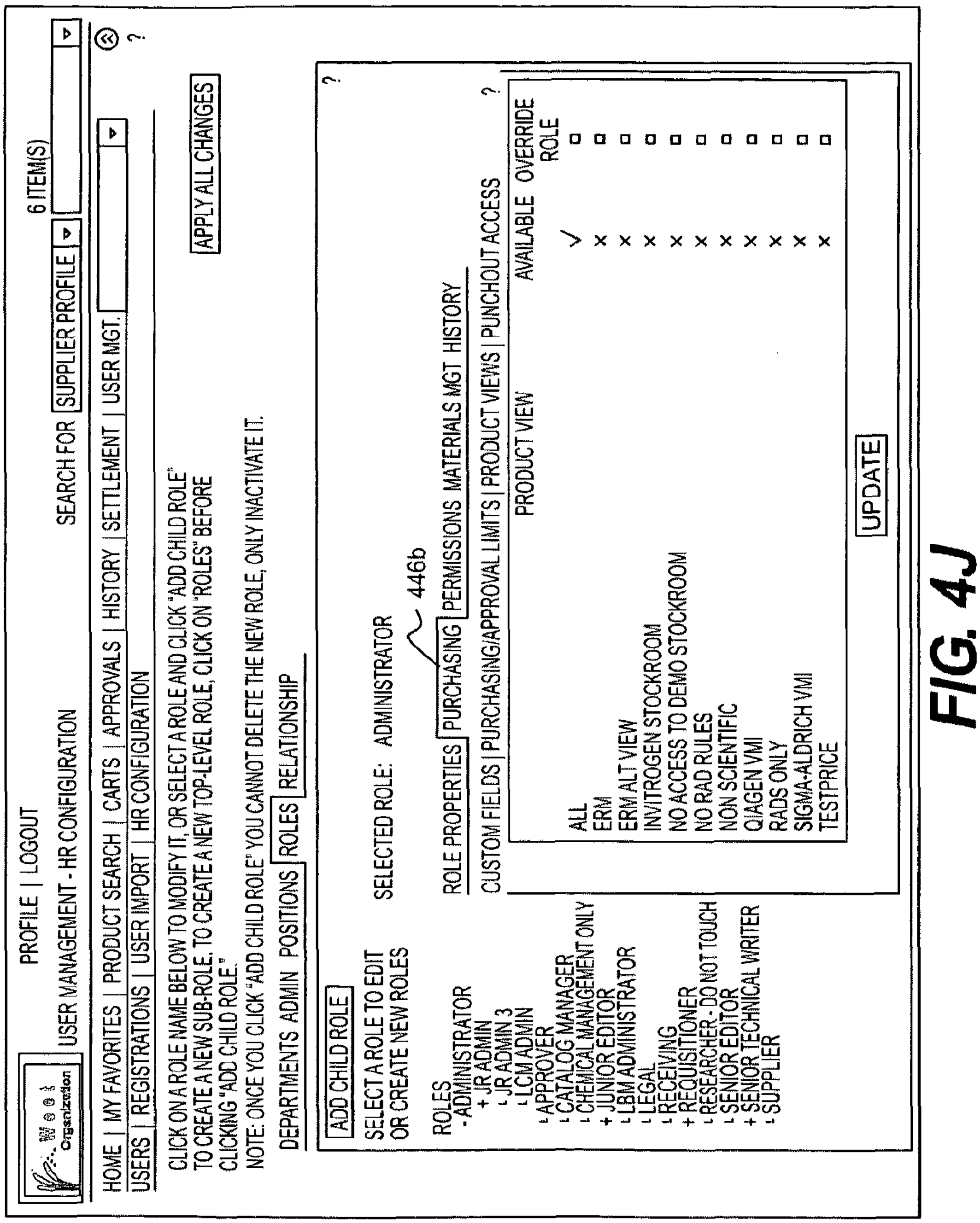
Figure 4K:
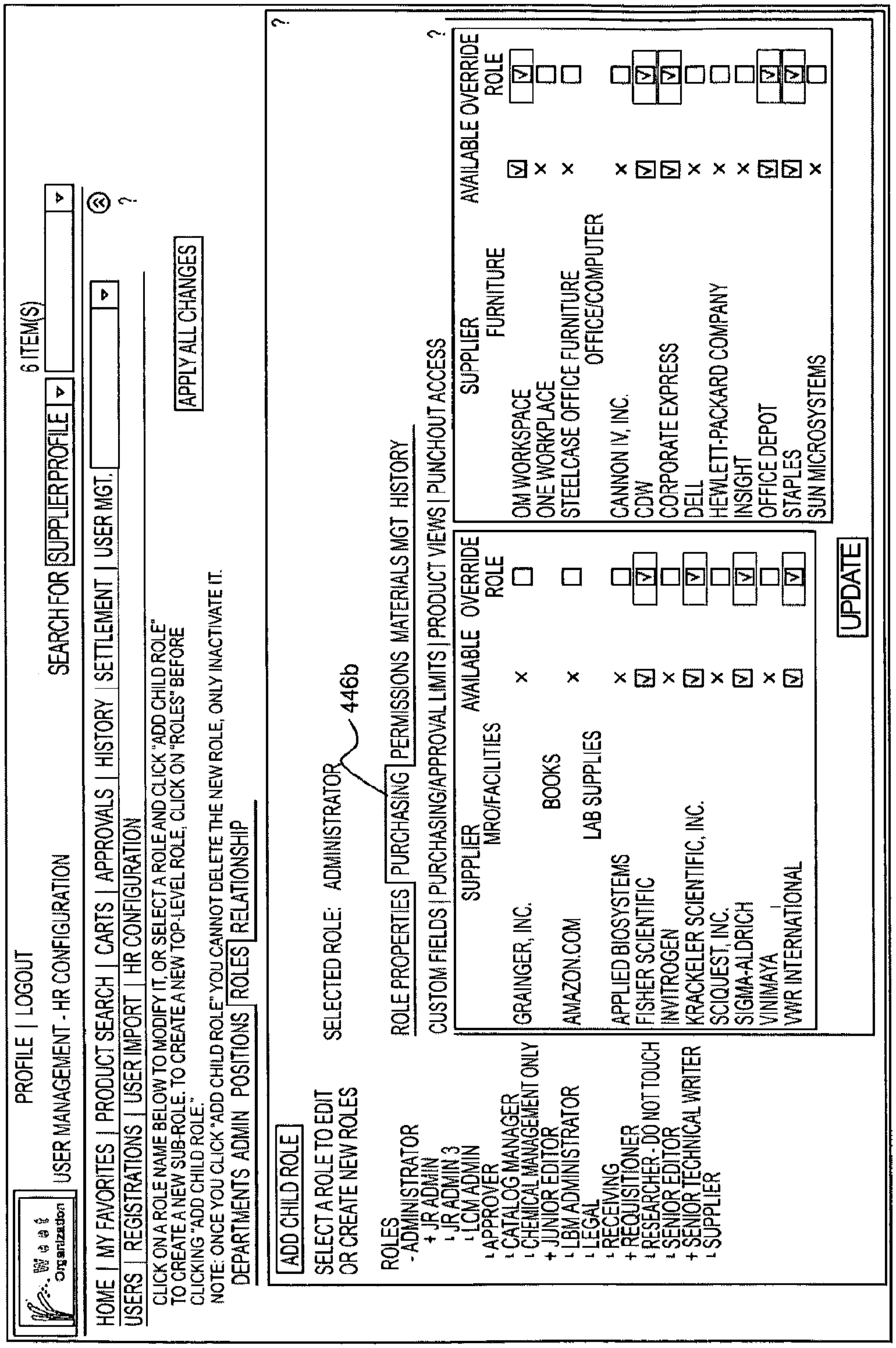
Figure 4L:
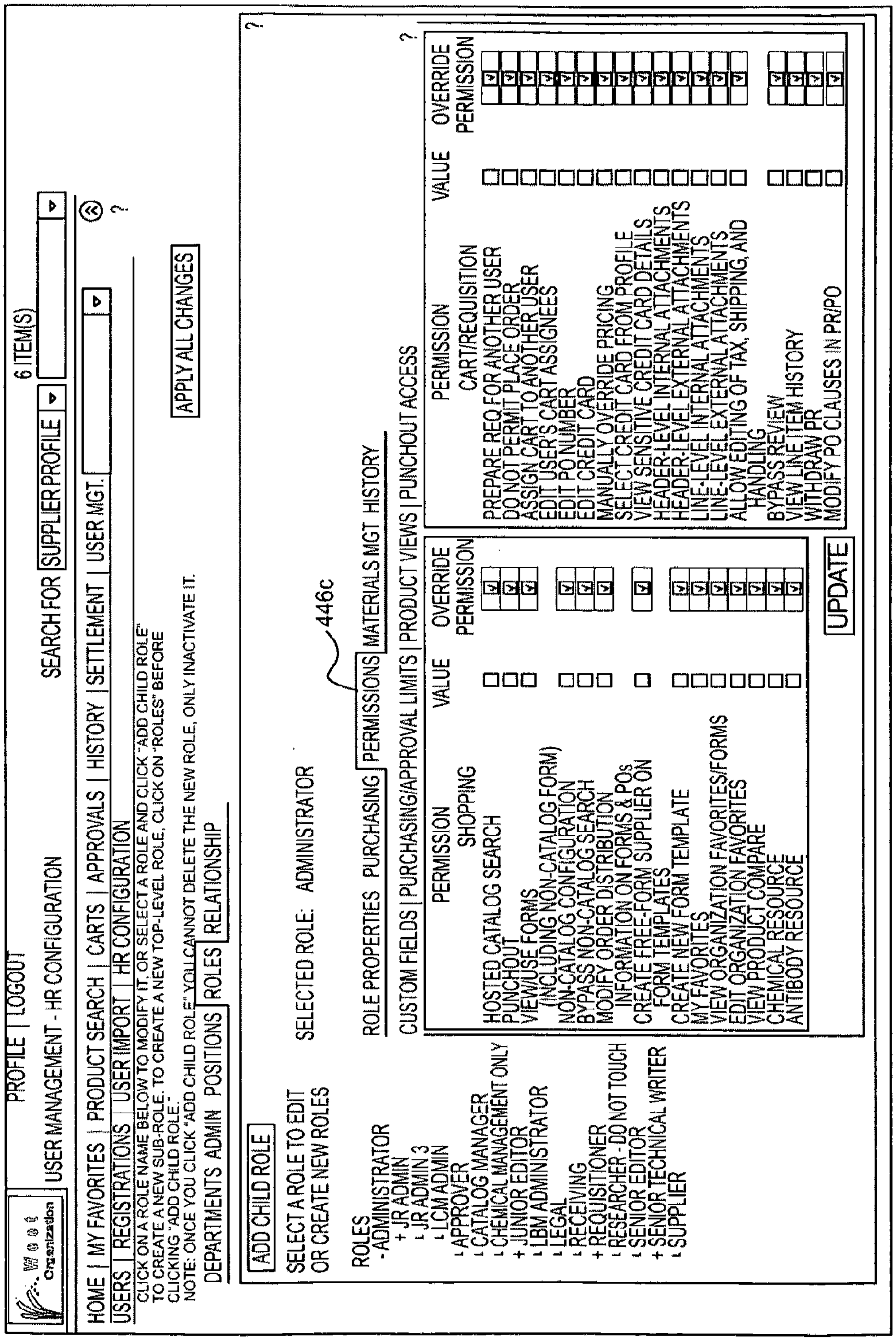
Figure 4M:
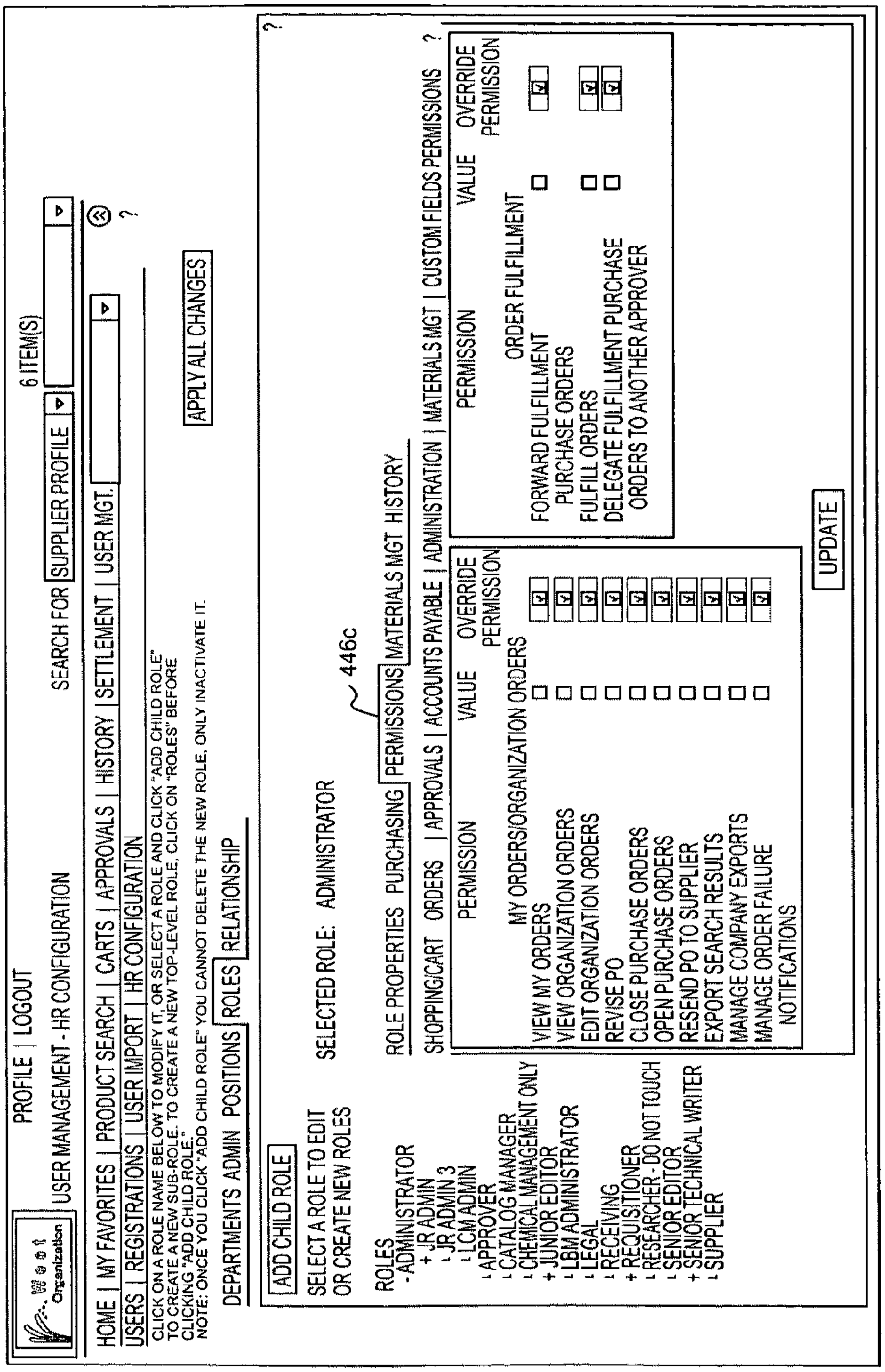
Figure 4N:
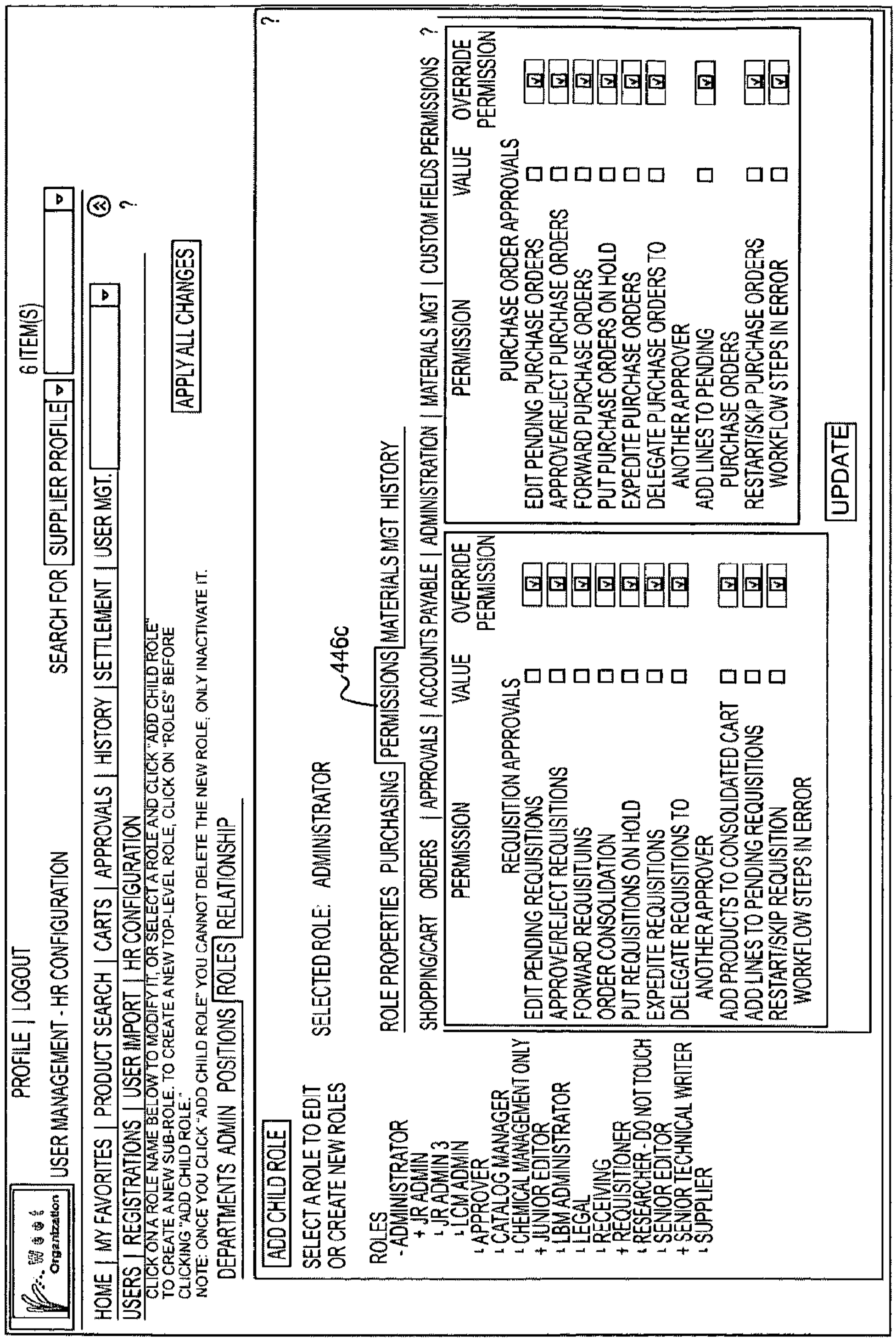
Figure 4P:
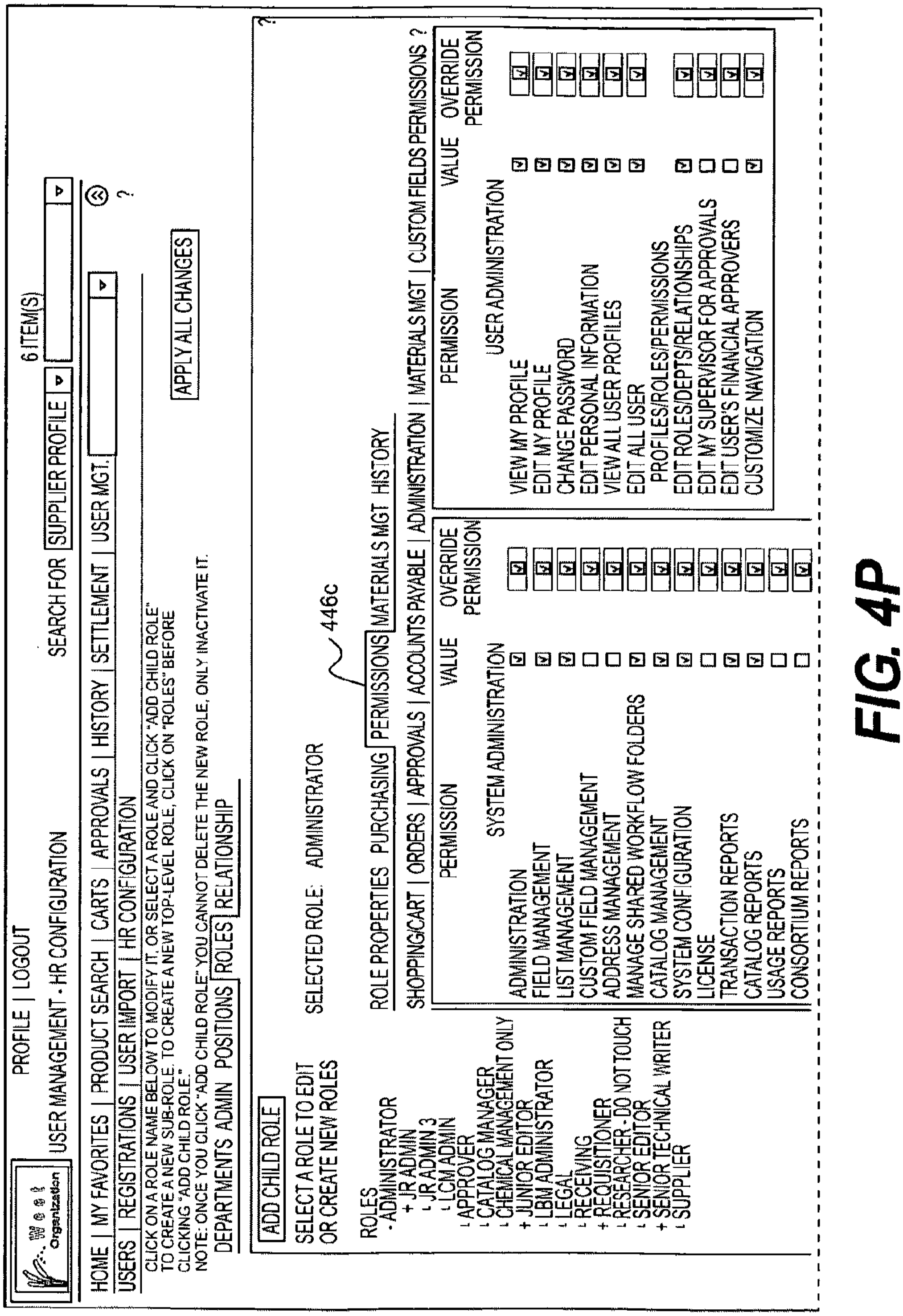
Figure 4P:
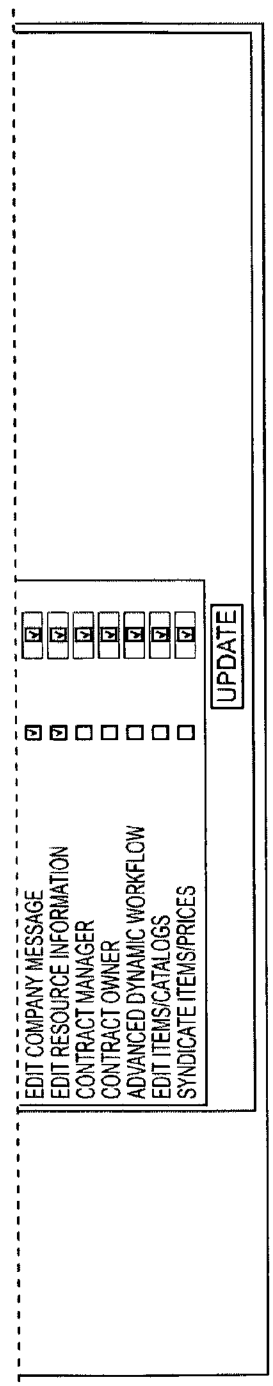
Figure 4Q:
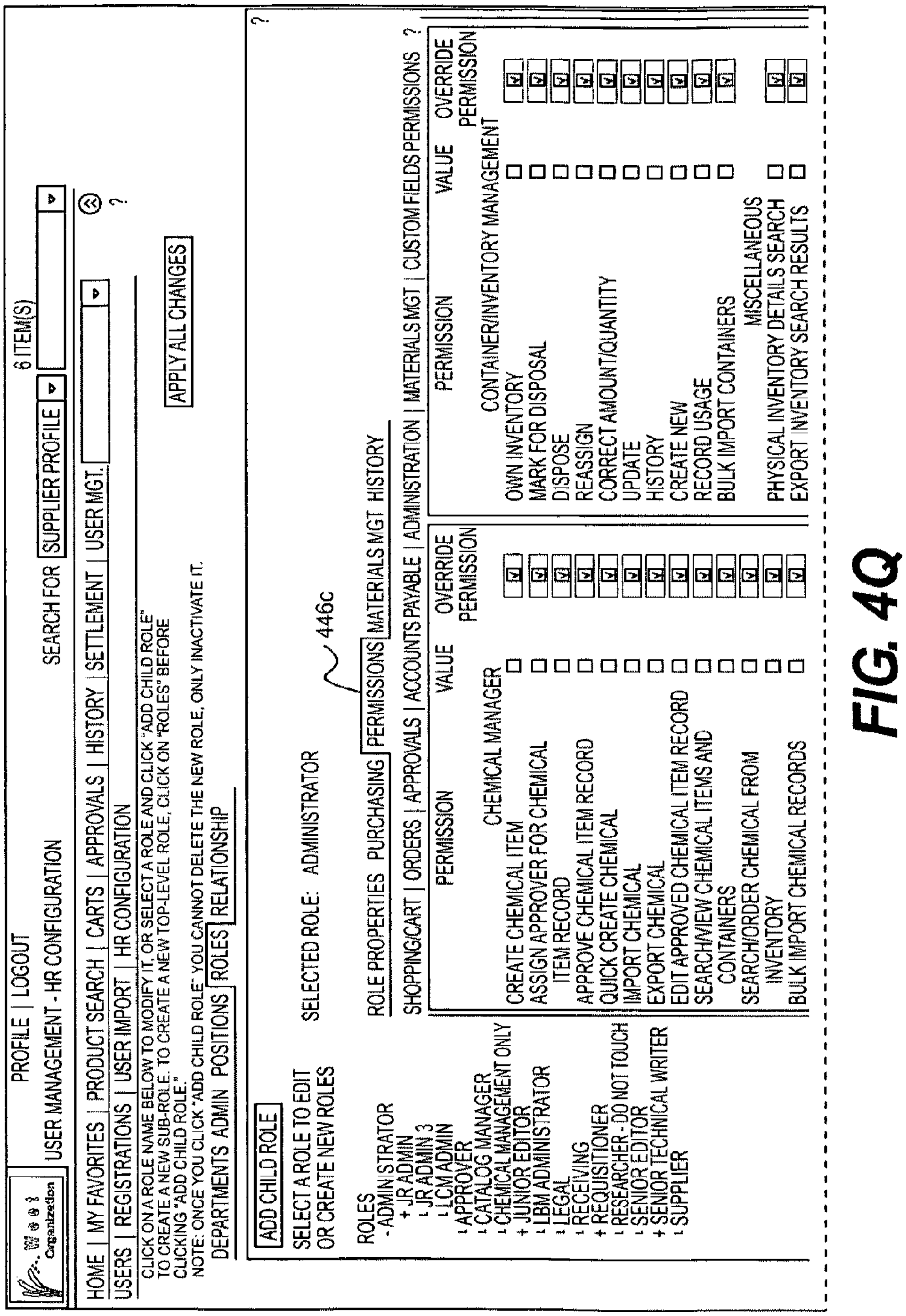
Figure 4Q:
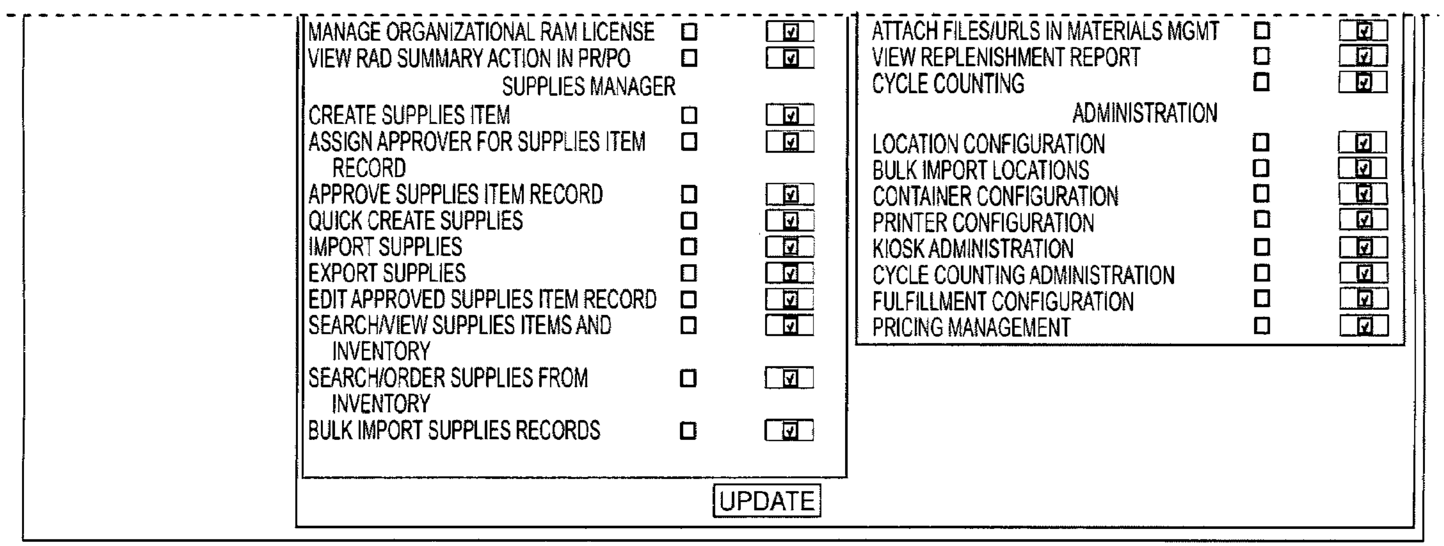
Figure 4R:
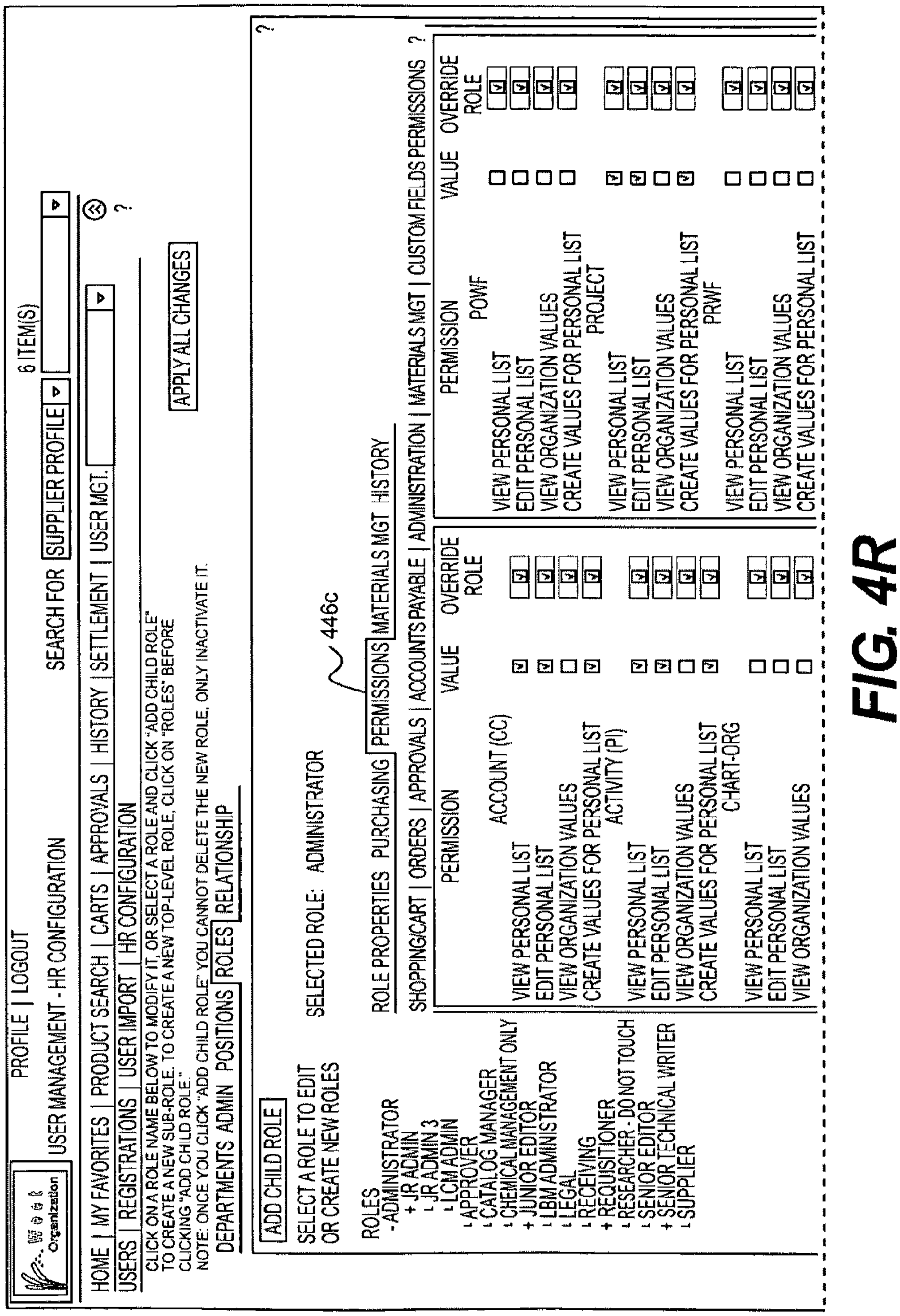
Figure 4R:
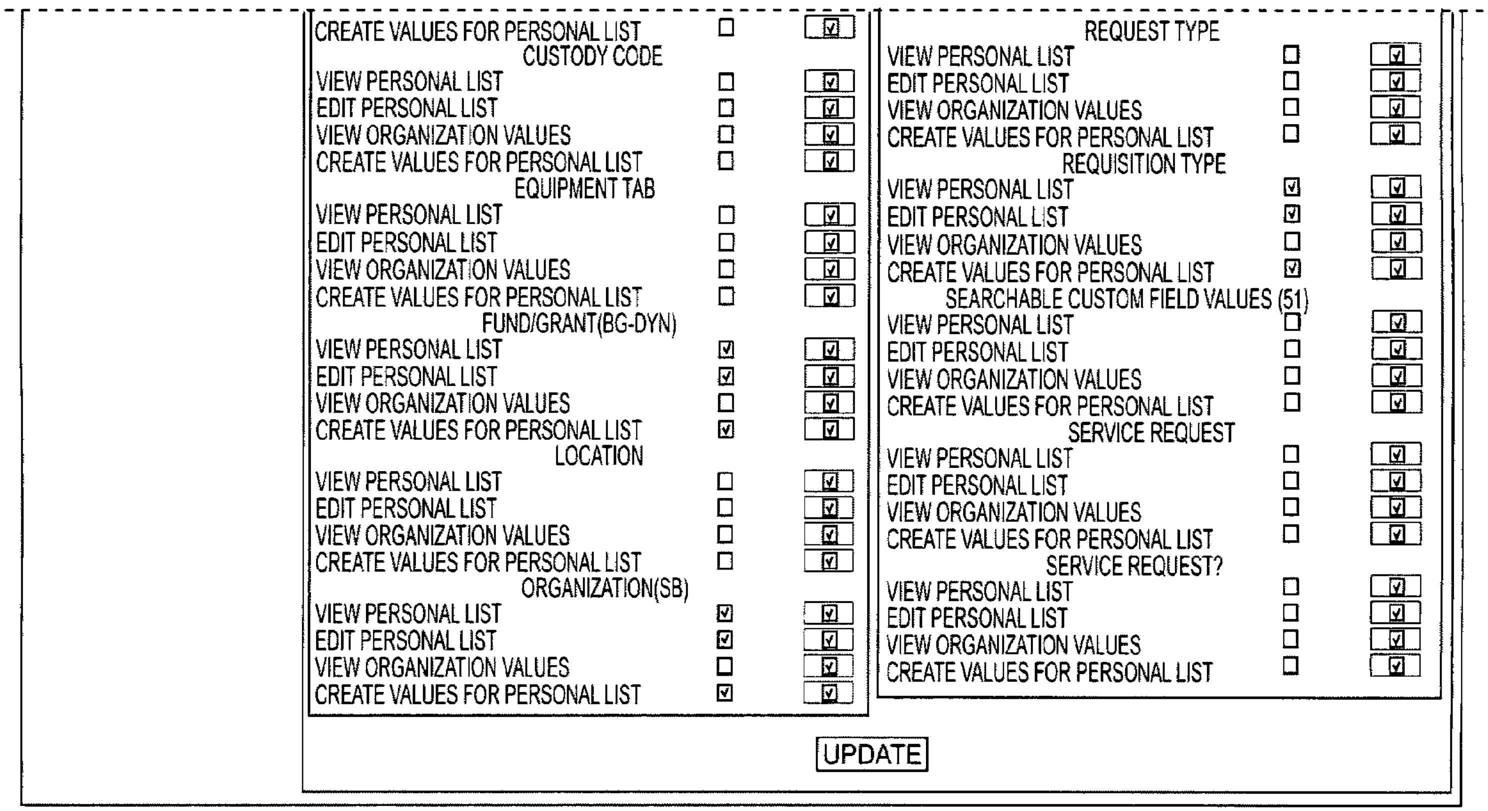
Figure 4S:
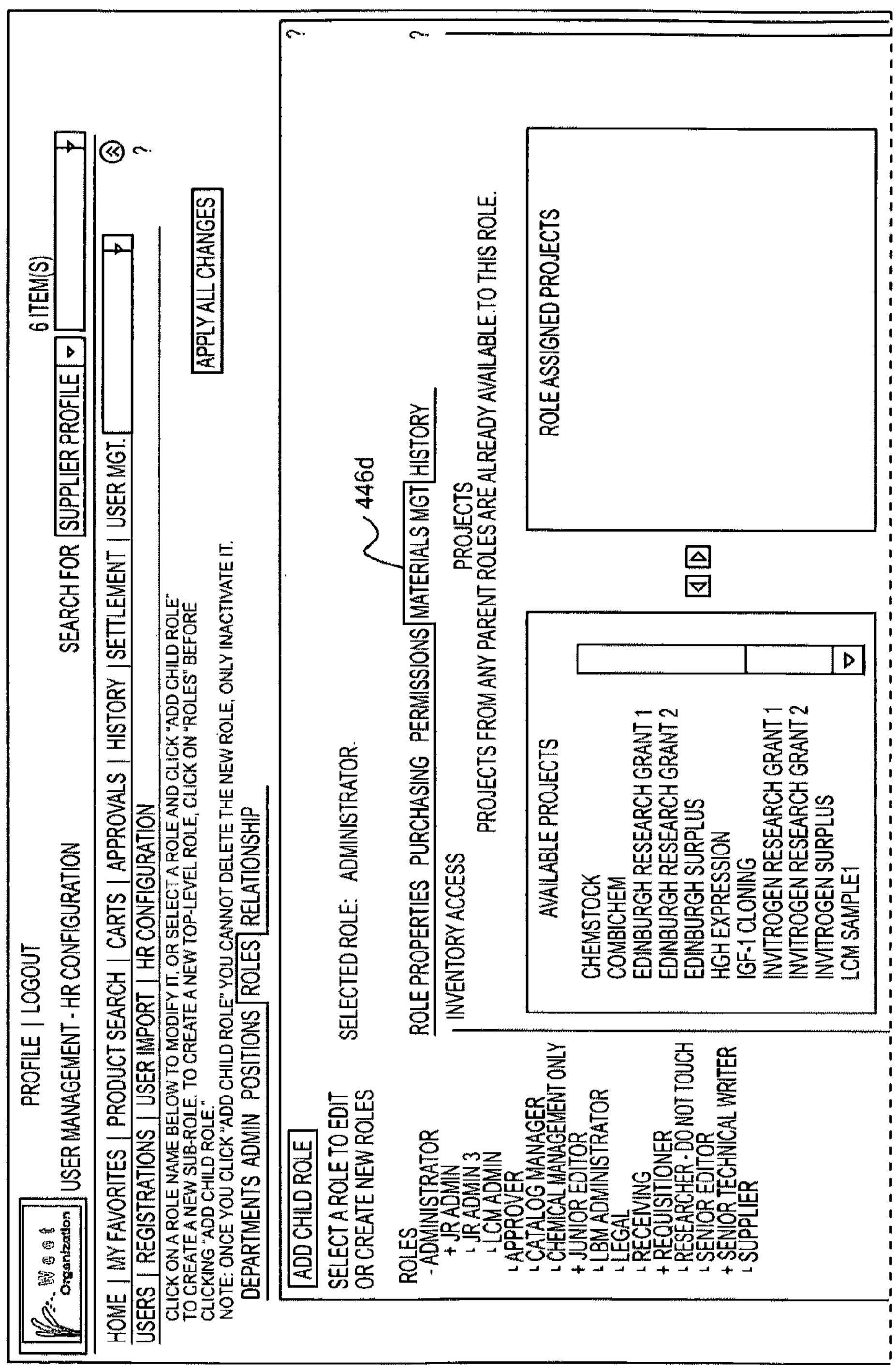
Figure 4S:
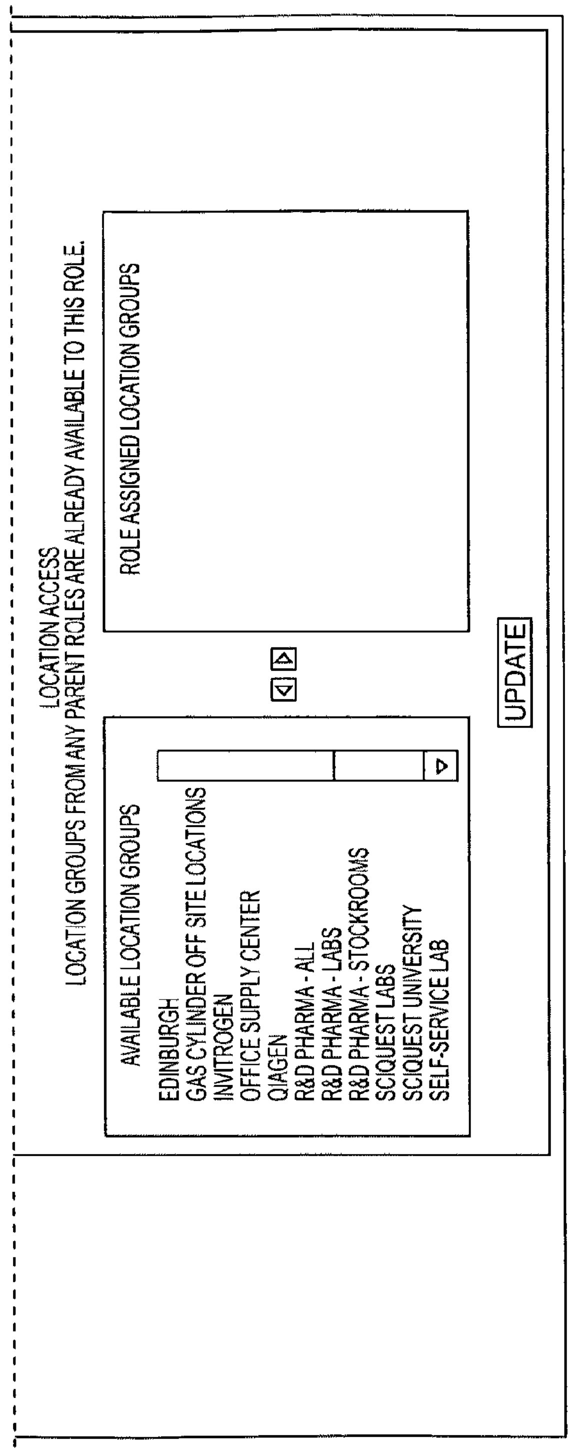
Figure 4T:
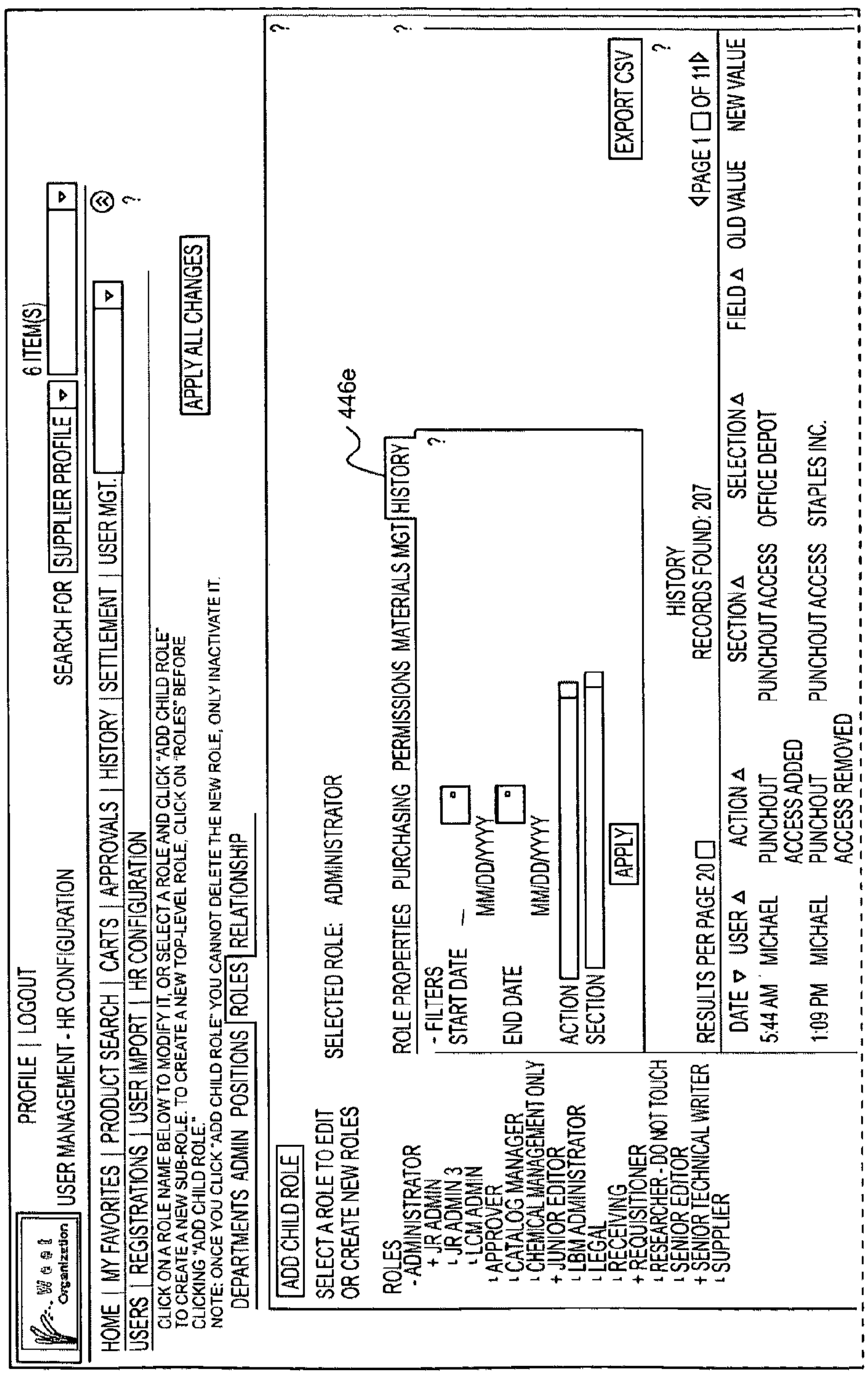

For each role, the roles configuration tool 446 is used to define the role properties (446*a*), purchasing properties (446*b*), access permissions (446*c*), materials management rules (446*d*), and history of modifications to these definitions (446*e*). For example, for the role of "Administrator," the role properties 446*a* (FIG. 4G) may include whether the designated role is active in the organization and the purchasing properties 446*b* may include definitions of any internal and external purchasing codes and information (e.g., "PRWF") (FIG. 4H), purchasing/approval limits (FIG. 4I), allowed product views (FIG. 4J), and allowed punch-out access (FIG. 4K). The access permissions 446*c* may be defined for the roles including shopping cart permissions (FIG. 4L), orders (FIG. 4M), approvals (FIG. 4N), accounts payable (FIG. 40), administration (FIG. 4P), management of materials (FIG. 4Q), and custom fields permissions (FIG. 4R). The materials management 446*d* defines the available projects and location of groups to the various roles (FIG. 4S). The history section 446*e* keeps track of a history of all the actions (e.g., modified, created, product view added, product view removed, punch-out access added, punch-out access removed, project added, project removed, location added, location removed, etc.) and the sections to which the actions were applied (e.g., role properties, product views, punch-out access, materials management, permissions, purchasing/approval limits, custom field permission definitions, etc.) including the old value of the parameter and the new value of the parameter (FIG. 4T).

Figure 5A:
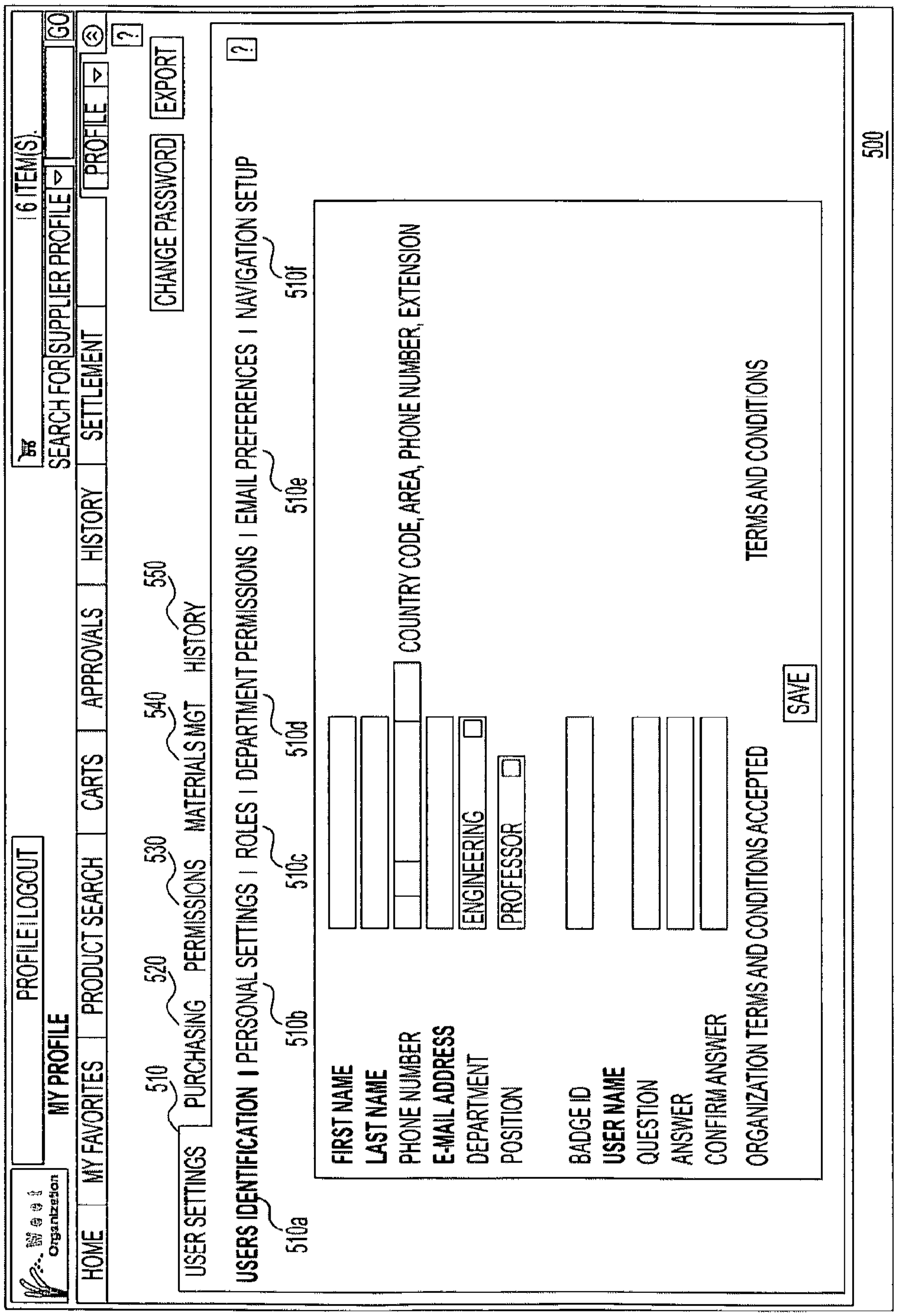
FIG. 5A illustrates an exemplary user setting tool in accordance with the present invention.

Once the internal organizational structure and descriptions of key positions of users in the organization have been defined using the user management tool 400, specific users and their level of access may be defined. As discussed above, the level of access of a user may be assigned globally based on their positions and/or roles in the organization. In addition, the eProcurement architecture of the present invention allows customization down to specific individuals all within the single instance, multi-tenant environment. For example, FIG. 5A illustrates an exemplary user profile tool 500 for defining a user's account in the eProcurement system of the present invention. As shown, the user profile tool 500 includes one or more of a user setting tool 510, user purchasing tool 520, user permissions tool 530, user materials management tool 540, and user setting history tool 550. These tools provide customization of the user's account for various levels of access to the eProcurement system of the present invention all within the single instance, multi-tenant environment.

Figure 5B:
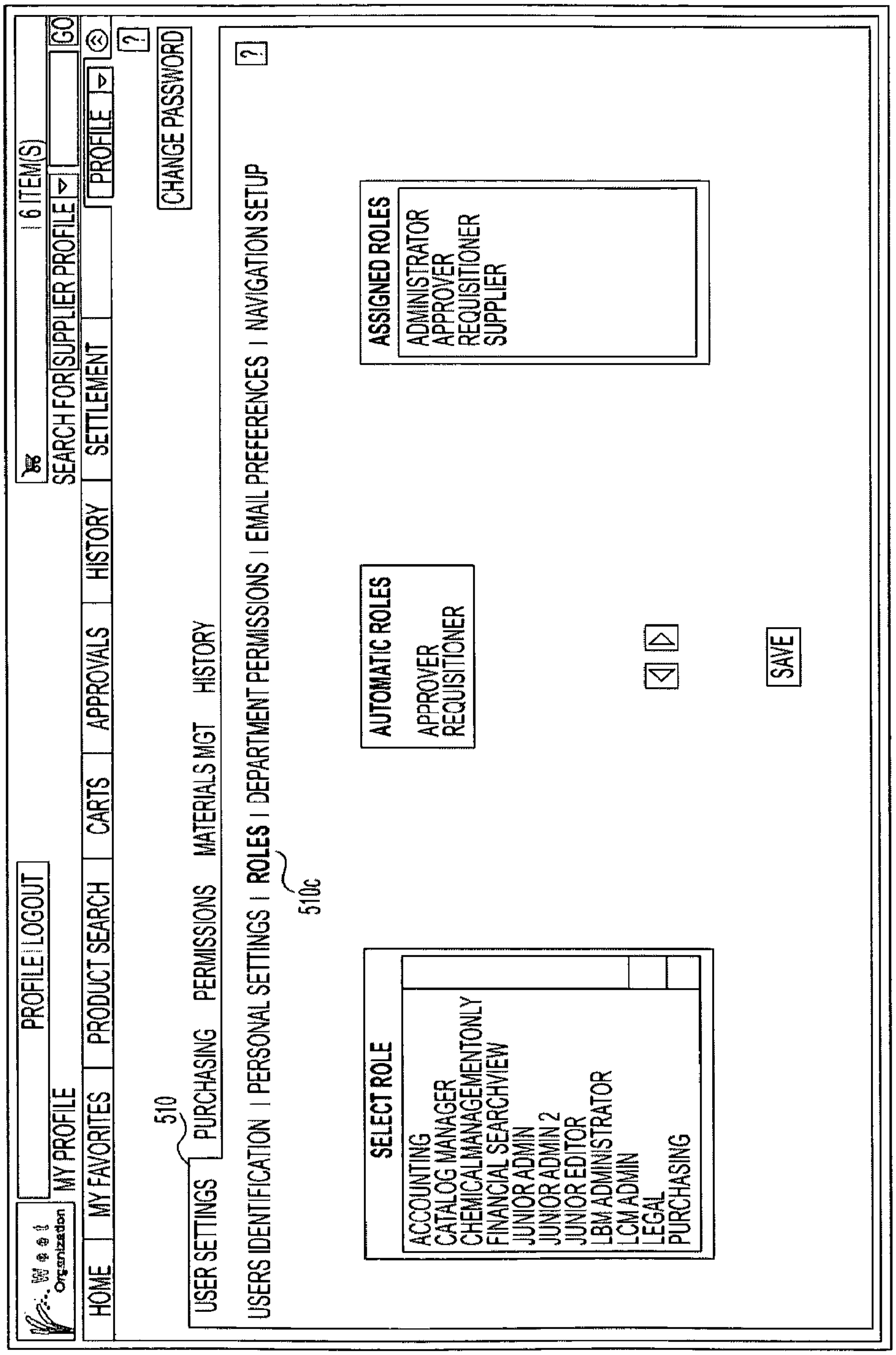
FIG. 5B illustrates an exemplary roles selection tool in accordance with the present invention.
Figure 5C:
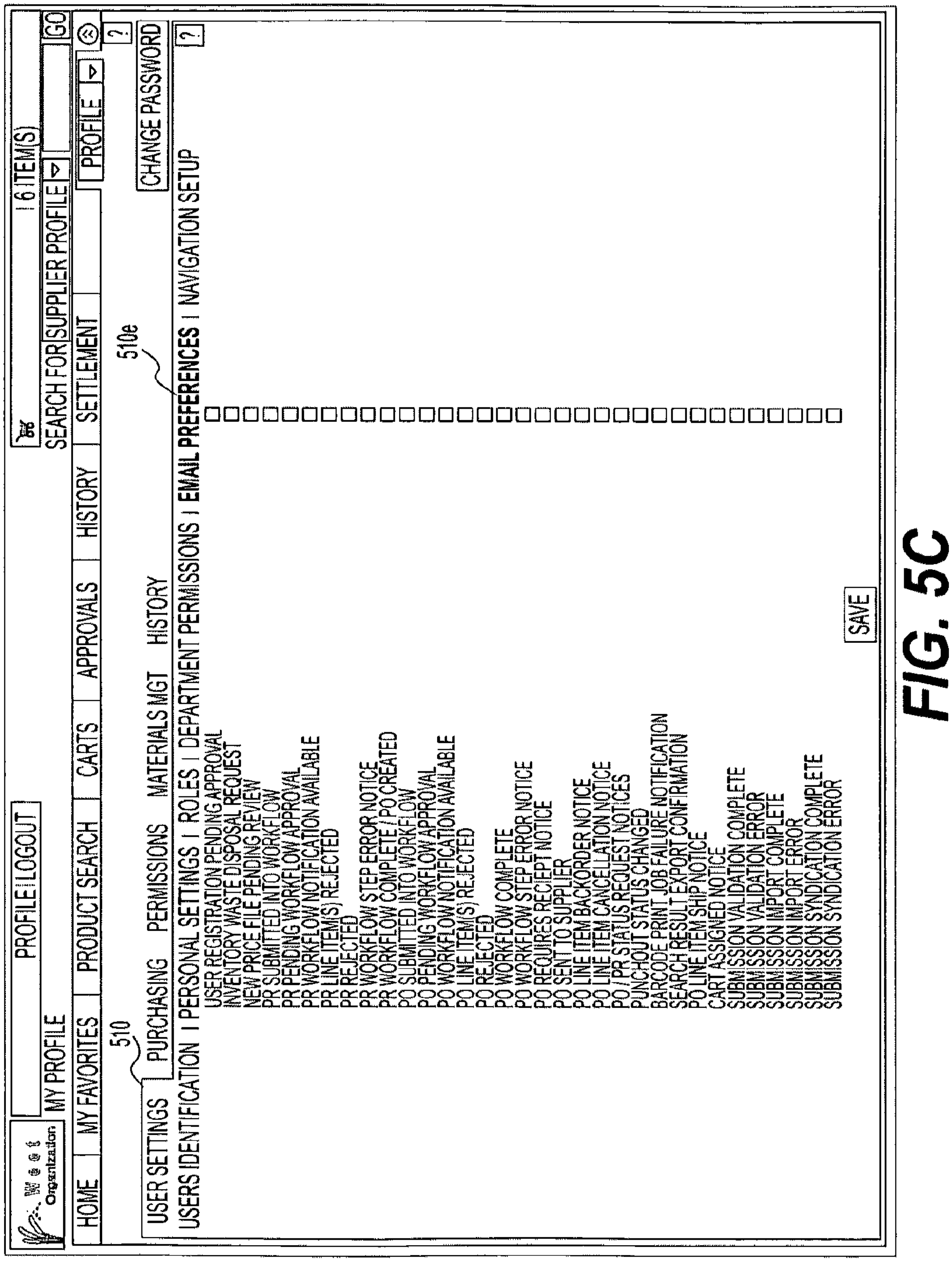
FIG. 5C illustrates an exemplary email preference tool in accordance with the present invention.
Figure 5D:
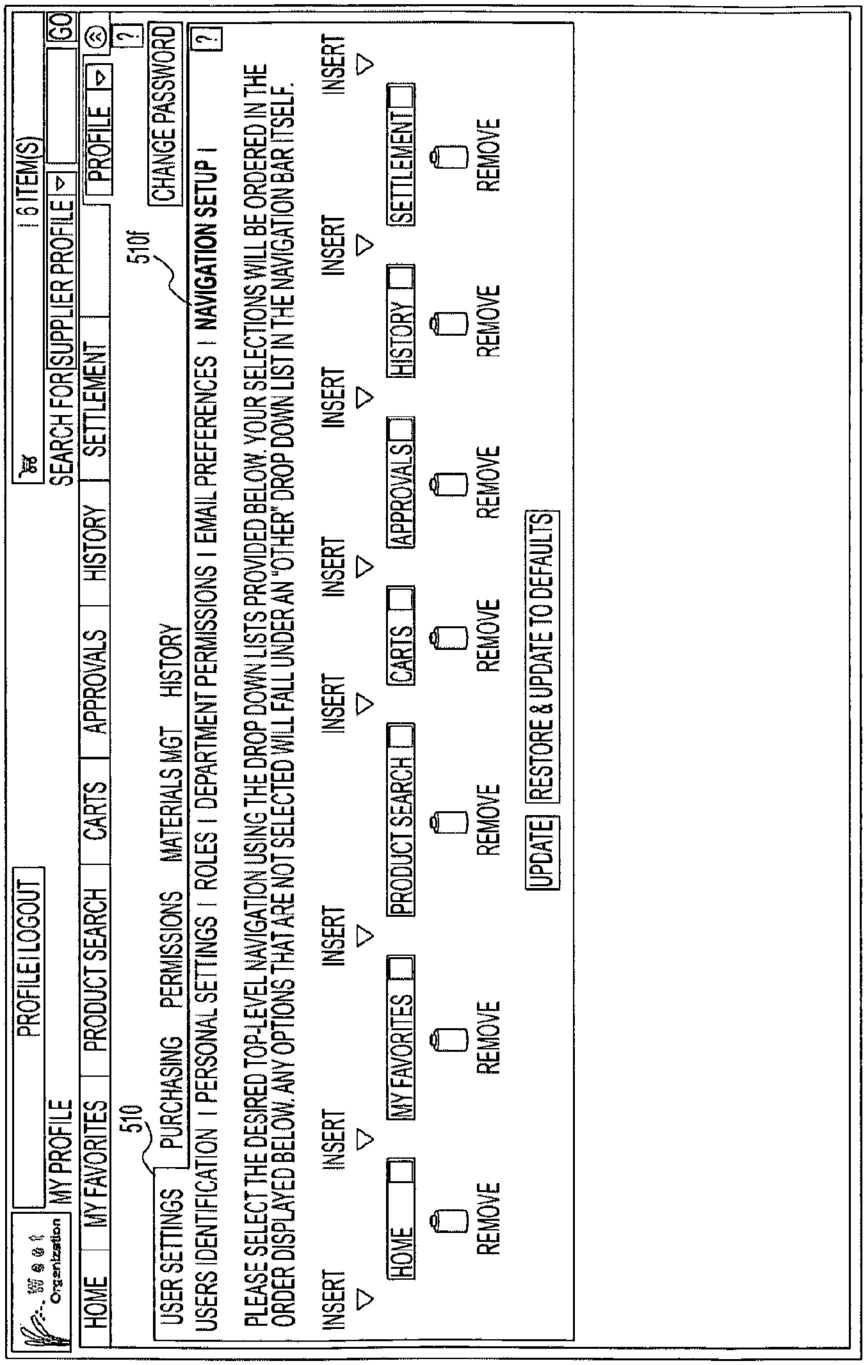
FIG. 5D illustrates an exemplary navigation setup tool in accordance with the present invention.

For example, as shown in FIG. 5A, an exemplary user setting tool 510 of the present invention shows that the user is a "Professor" in the "Engineering" department. As discussed above, users in this department and position have default levels of access defined by a super user using the user management tool 400. However, because a user may have additional roles assigned to the user that are beyond the normal scope of the user's position, the eProcurement system of the present invention allows a super user to modify the user's level of access on an individual level. For example, FIG. 5B illustrates an exemplary roles selection tool 510*c* to modify the roles assigned to the selected user. Through the roles selection tool 510*c*, a super user may be able to specifically tailor the roles of a user down to the individual level to provide customized access to the eProcurement system of the present invention. Similarly, the user's departmental permissions may be modified using the department permissions tool 510*d*. Various aspects of the user's account may also be customized, such as the user's personal settings 510*b*, email preferences 510*e*, and navigation setup 510*f*. As with the user management tool 400 and the roles/permissions tools 510*c* and 510*d*, all customizations may be performed by simply activating/deactivating a function available on the eProcurement system of the present invention. For example, FIG. 5C illustrates an exemplary email preference tool 510*e*, which lists all of the action notifications that may be received via email. A user only has to activate/deactivate a preference by selecting the notifications the user wishes to receive via email. Similarly, FIG. 5D illustrates an exemplary navigation setup tool 510*f*. As shown, a user simply selects the navigation tools to be displayed (or removed) from the top-level navigation bar.

Figure 5E:
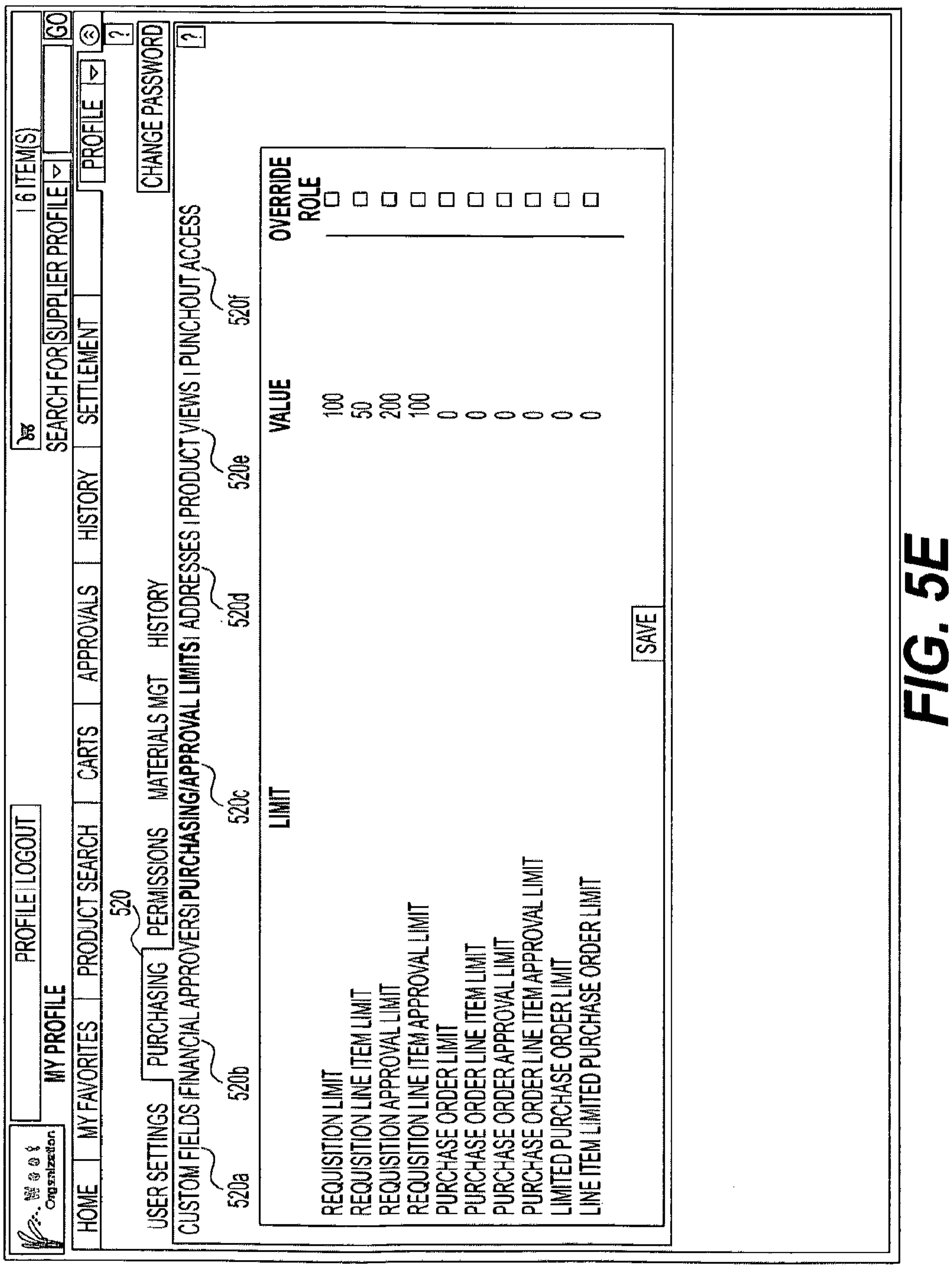
FIG. 5E illustrates an exemplary user purchasing tool in accordance with the present invention.
Figure 5F:
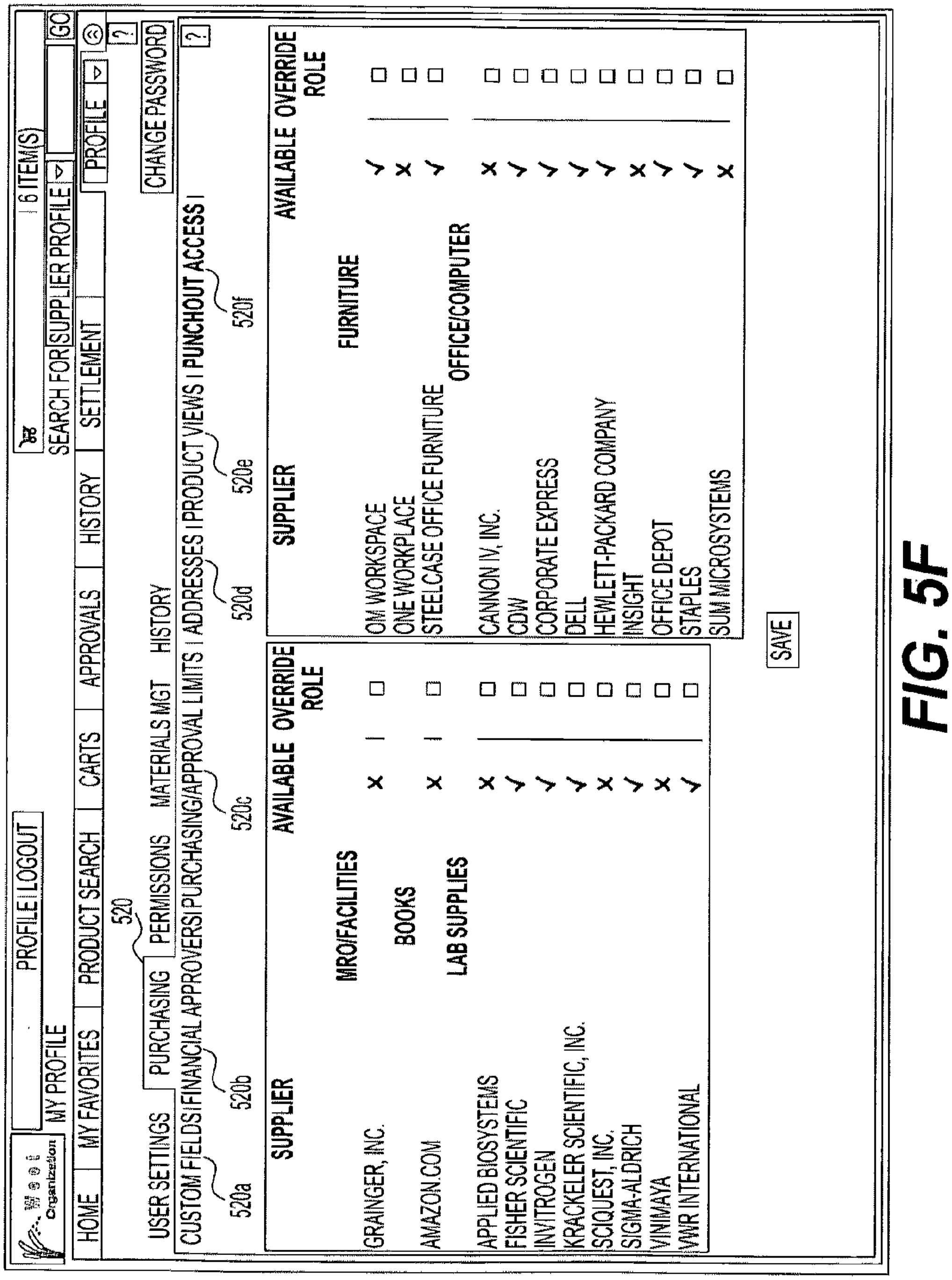
FIG. 5F illustrates an exemplary punch-out access tool in accordance with the present invention.

The user purchasing tool 520 shown in FIG. 5E allows a super user to define the purchasing activities of the user. For example, as shown in FIG. 5E, user purchasing tool 520 includes one or more of the custom fields tool 520*a*, financial approvers tool 520*b*, purchasing/approval limits tool 520*c*, shipping/billing address tool 520*d*, product views tool 520*e*, and punch-out access tool 520*f*. The custom fields tool 520*a* is similar to the purchasing properties tool 446*b* (FIG. 4H) to define the internal and external codes needed to make a purchase (e.g., product code). The financial approvers tool 520*b* designates purchase approvers for the user. Default, preferred, and additional approvers may be designated through the financial approvers tool 520*b* as well as removing approvers for the user. The purchasing/approval limits tool 520*c* designates the limits of purchases and/or approvals of purchases allowed for the user. FIG. 5E illustrates an exemplary view of the purchasing/approval limits tool 520*c*. As shown, the limit values of various activities related to purchases may be defined for the user. The shipping/billing address tool 520*d* designates the shipping/billing address associated with the user. The product views tool 520*e* designates the type of products the user is allowed to view. The punch-out access tool 520*f* designates the punch-out catalogs that are allowed to be accessed by the user. For example, FIG. 5F illustrates an exemplary punch-out access tool 520*f*. As discussed above, these settings may be designated as a default based on the department/position/role assigned to the user. However, these tools may be used to customize the default settings for the specific individual user in accordance with the present invention.

Figure 5G:
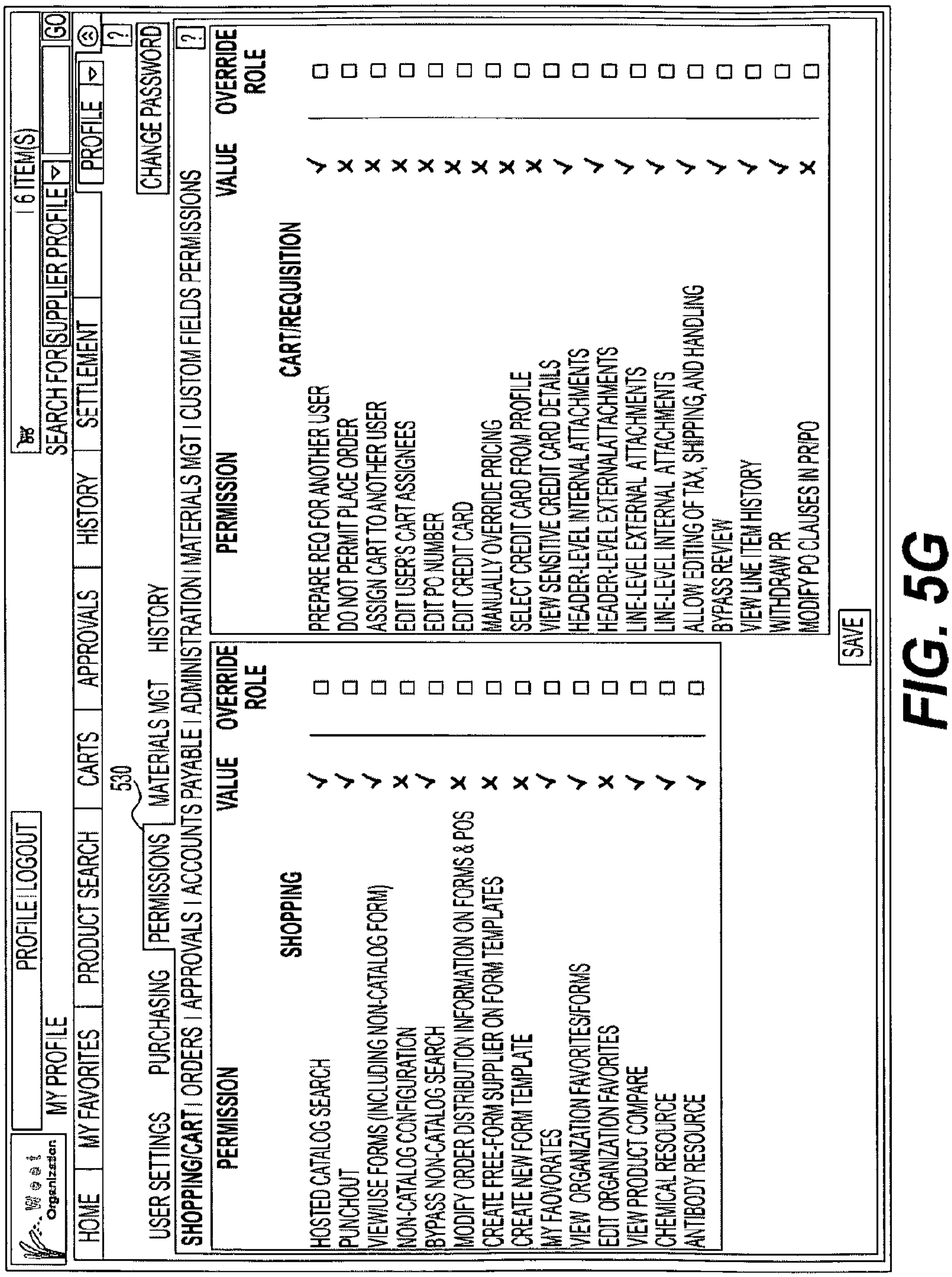
FIGS. 5G-5M illustrate exemplary user permission tools in accordance with the present invention.
Figure 5H:
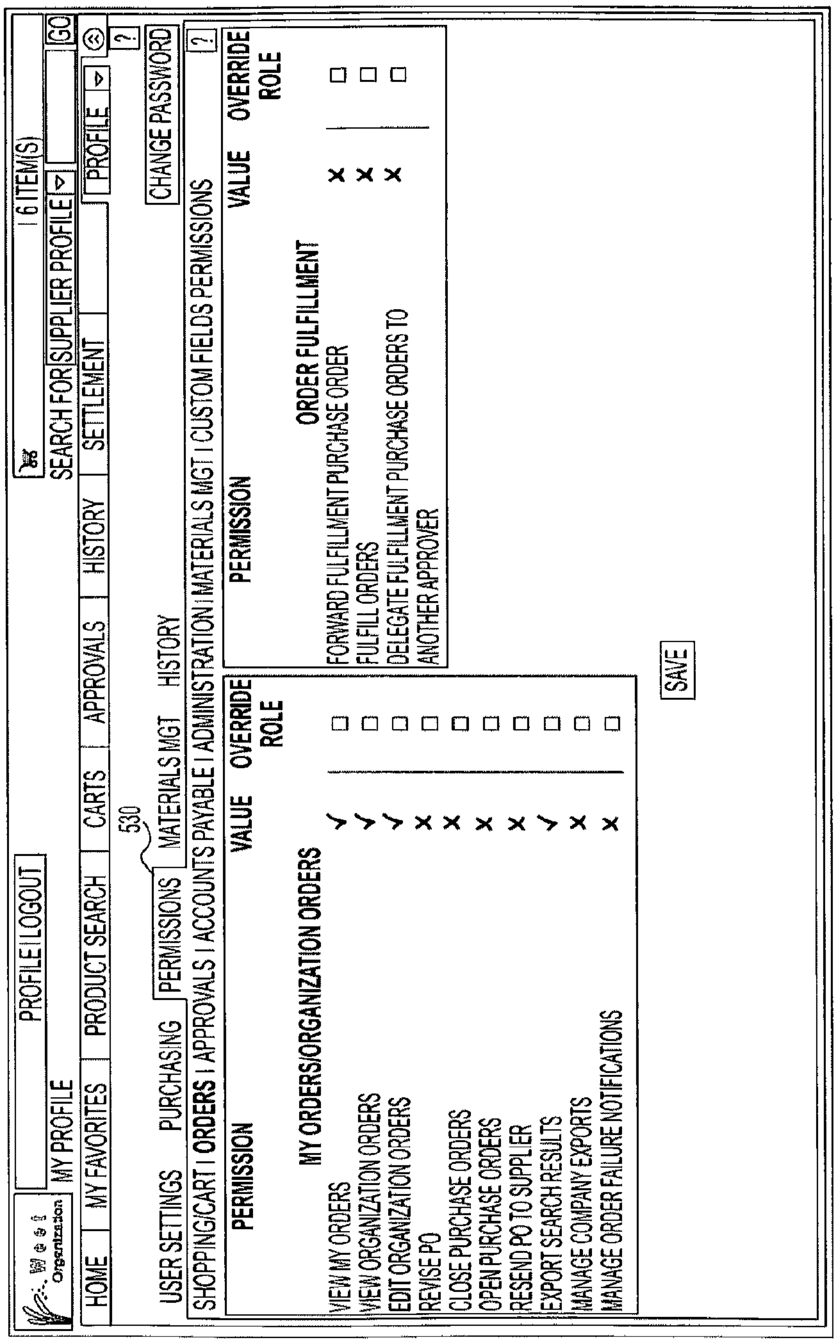
Figure 5I:
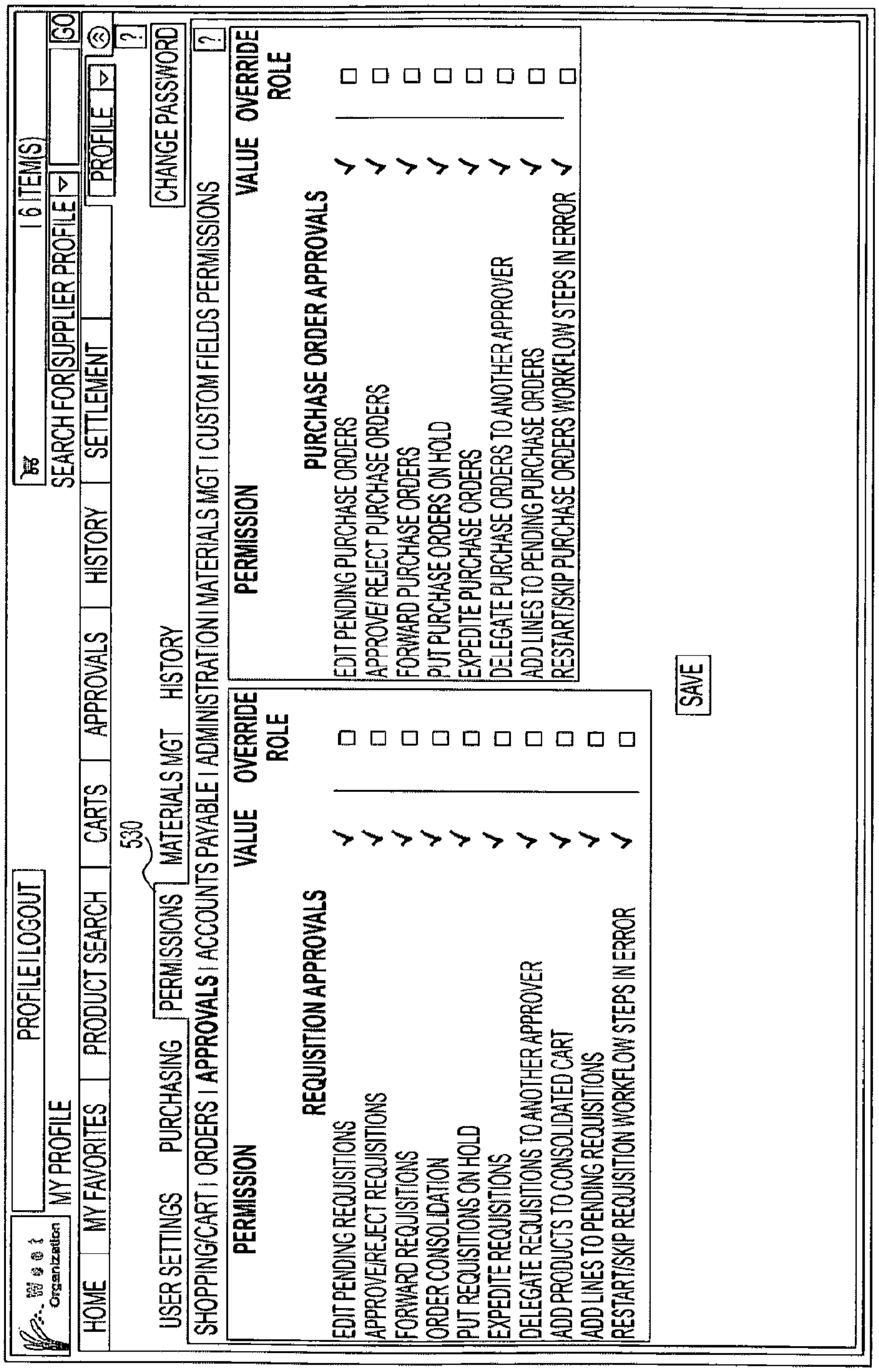
Figure 5J:
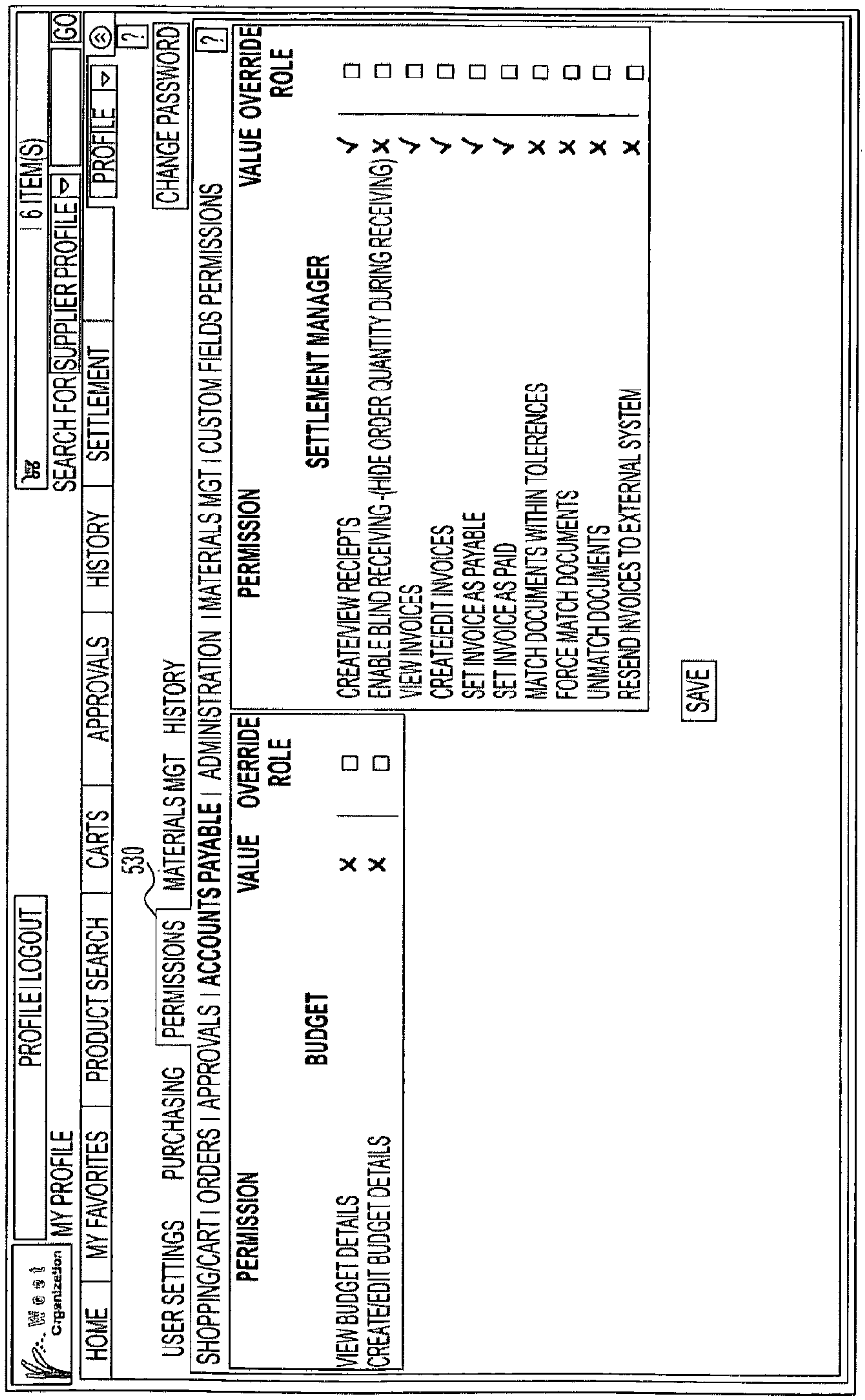
Figure 5K:
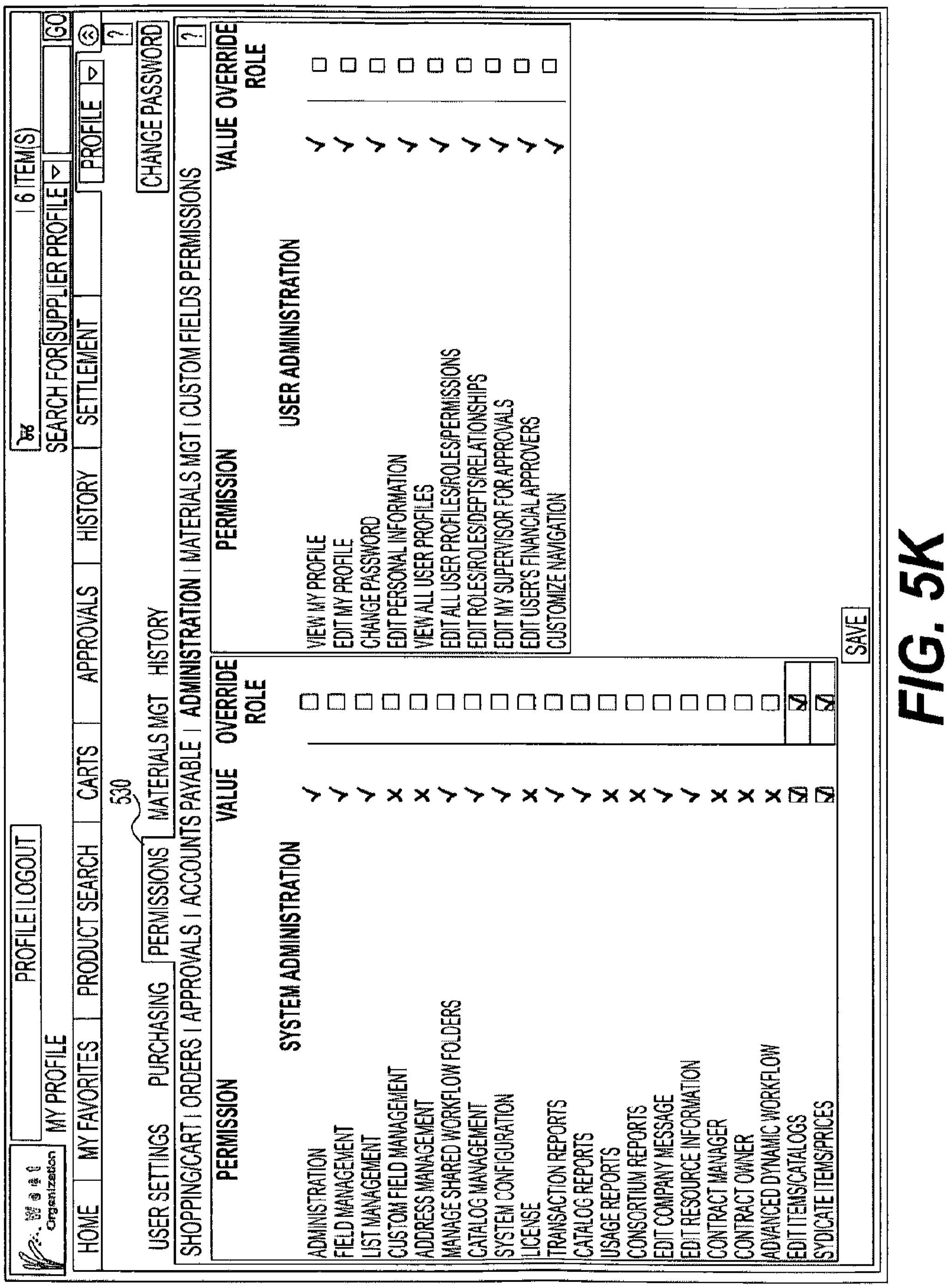
Figure 5L:
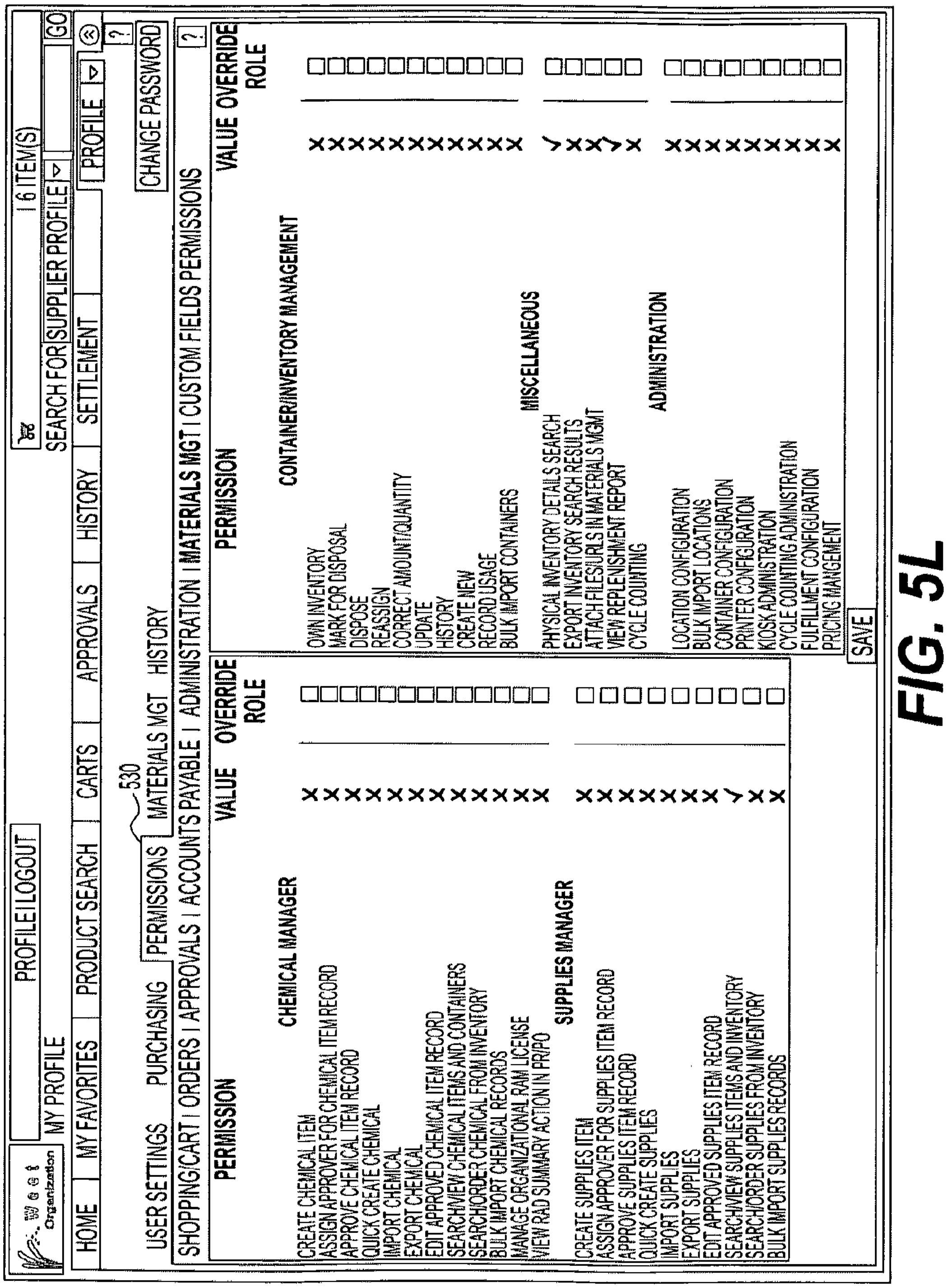
Figure 5M:
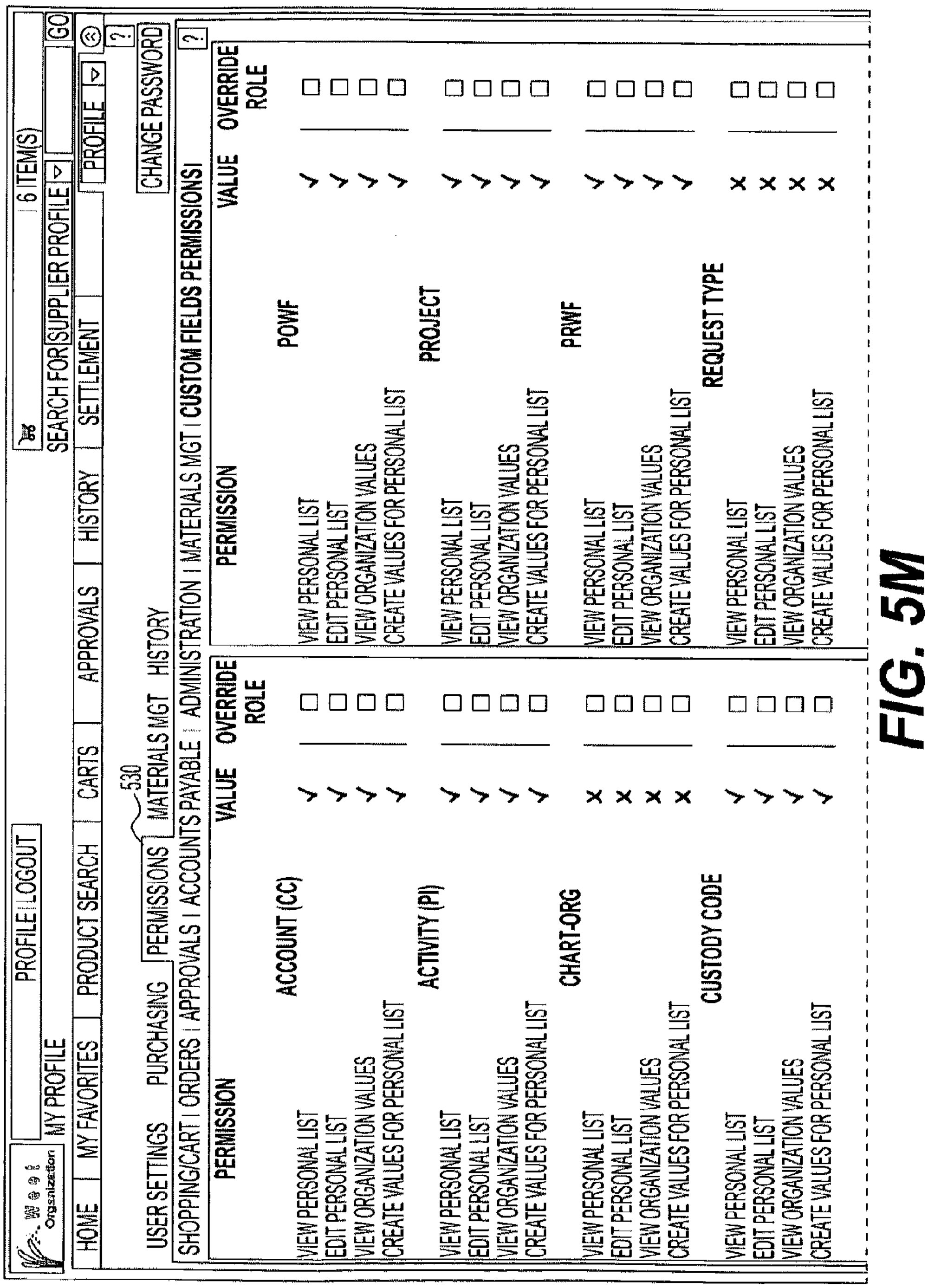
Figure 5M:
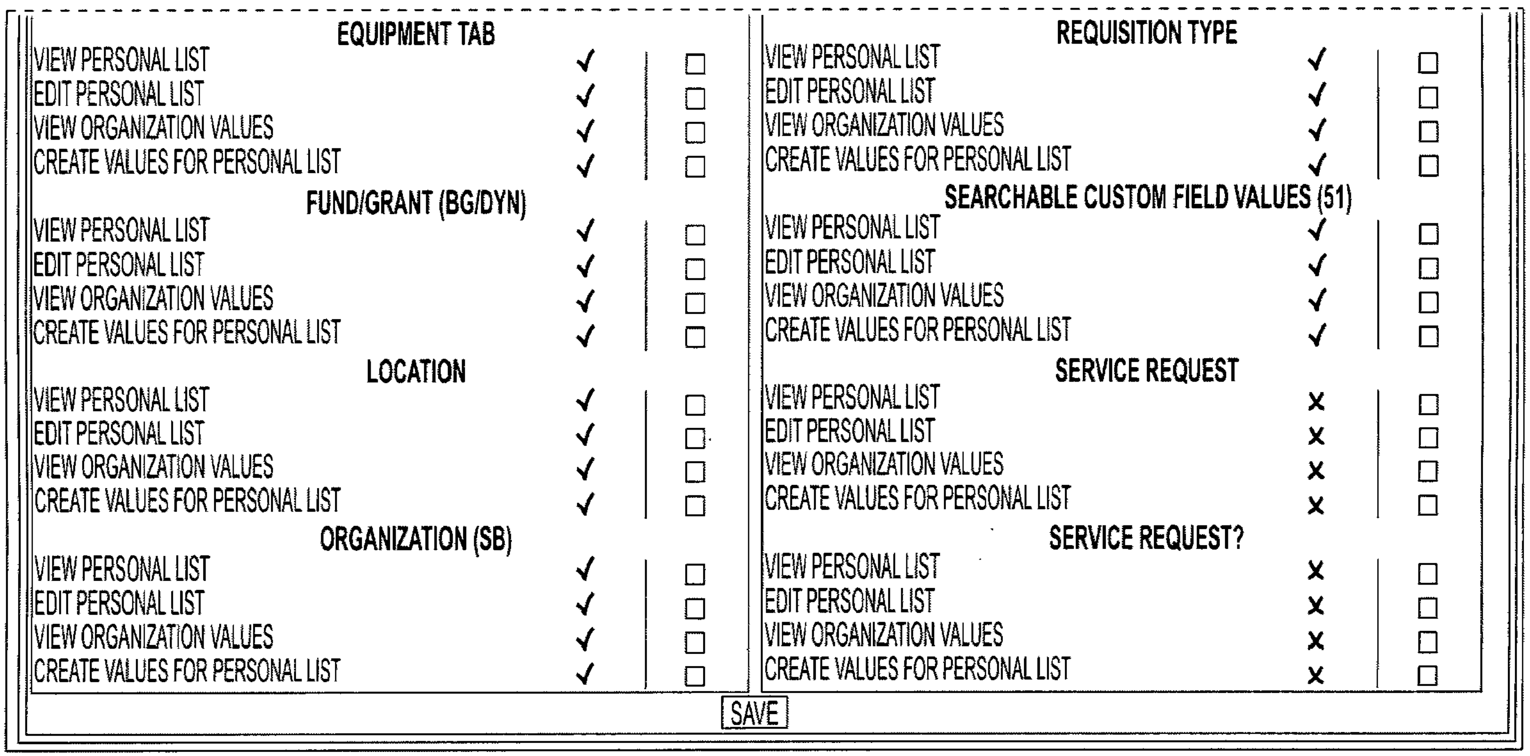
Figure 5N:
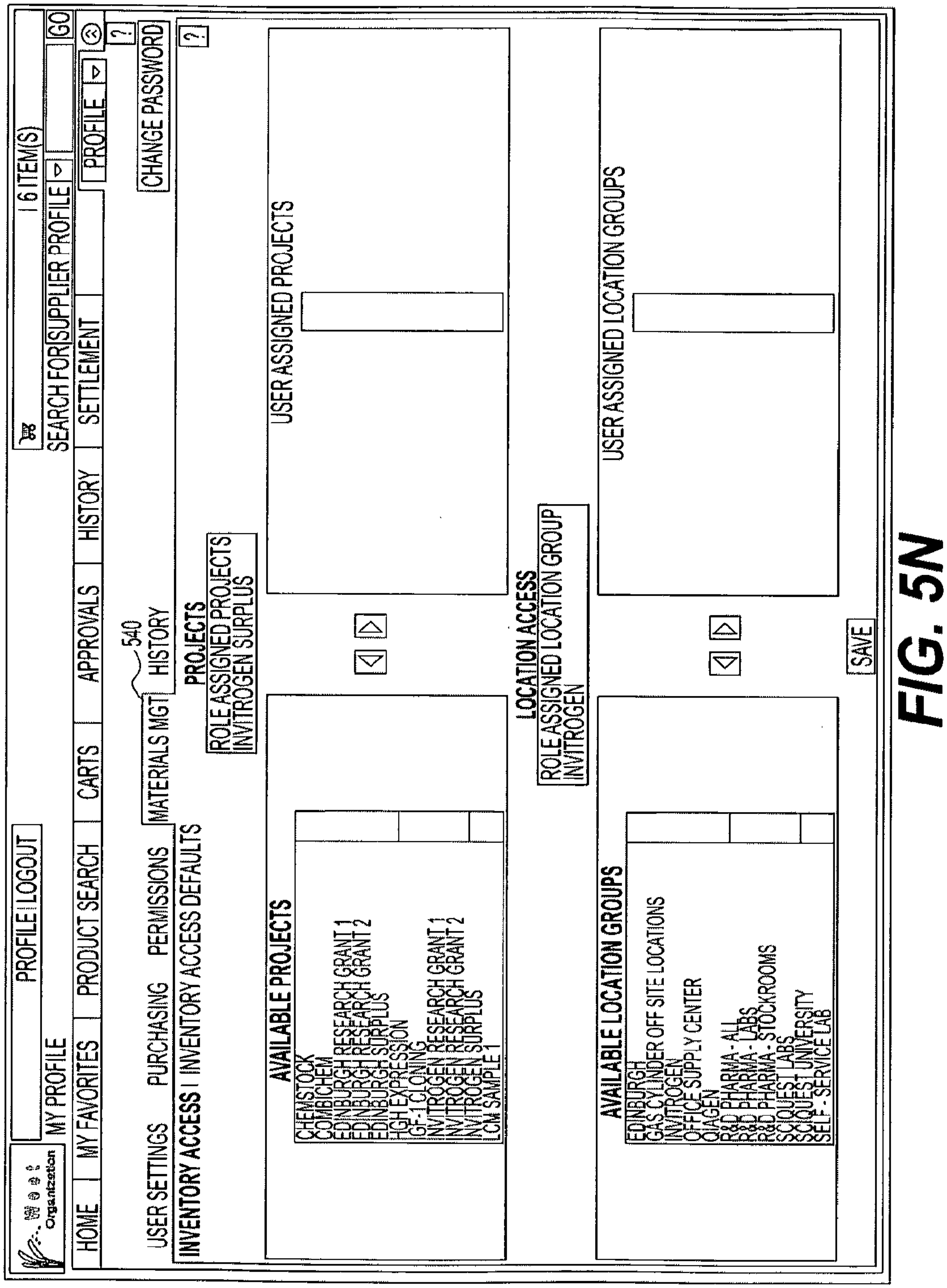

In a similar fashion, the user permissions tool 530 includes one or more of tools to customize the user's access to the shopping cart (FIG. 5G), order processing (FIG. 5H), approval processing (FIG. 5I), accounts payable processing (FIG. 5J), administration permissions (FIG. 5K), materials management (FIG. 5L), and custom fields permissions (FIG. 5M). The materials management tool 540 designates inventory locations based on projects and groups (FIG. 5N) as well as default/preferred access locations (FIG. 5O). As discussed above, the history tool 550 keeps track of all actions/changes made to the various parameters.

Figure 6A:
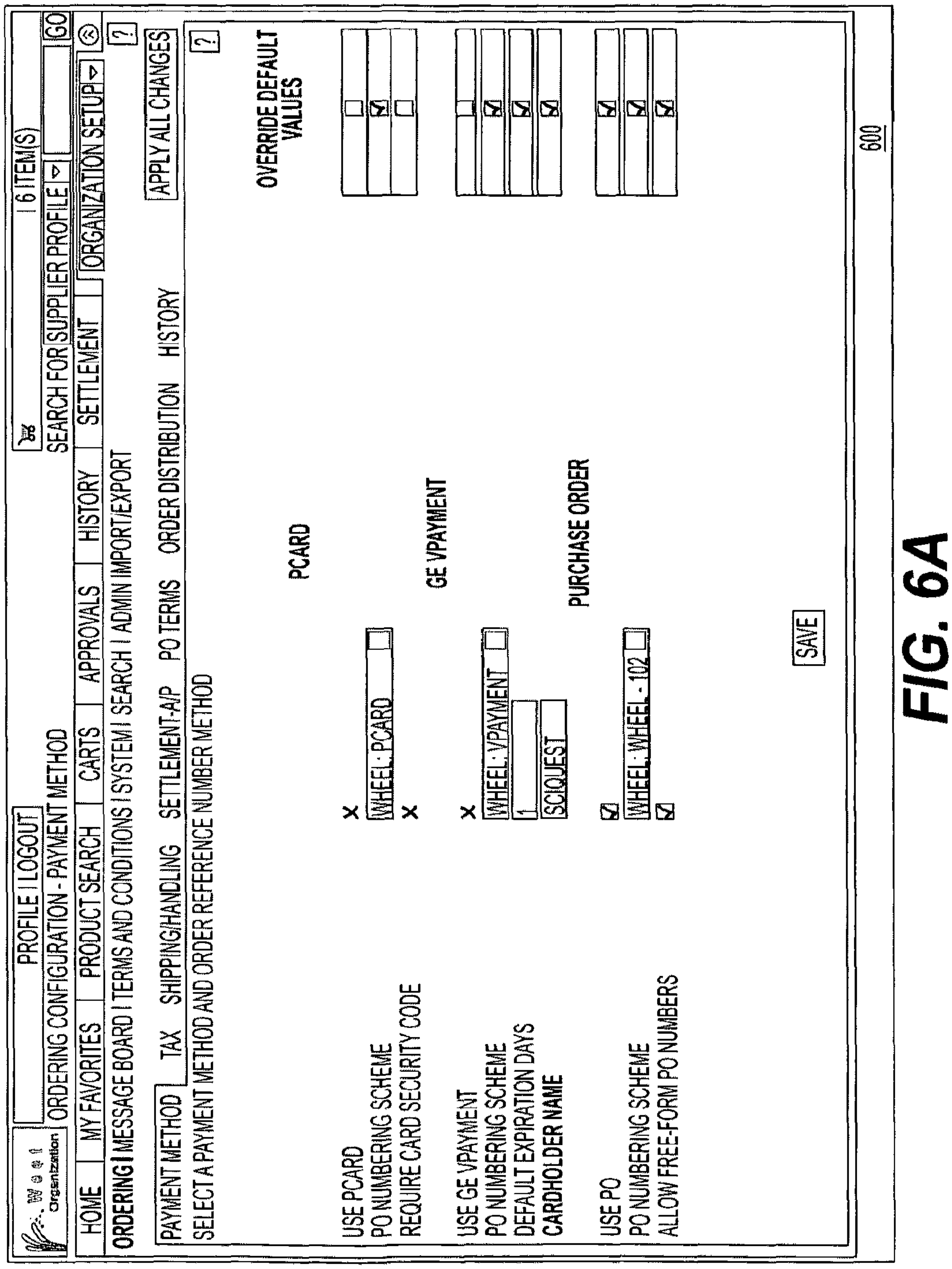
FIGS. 6A-6J illustrate exemplary organization setup tools in accordance with the present invention.
Figure 6B:
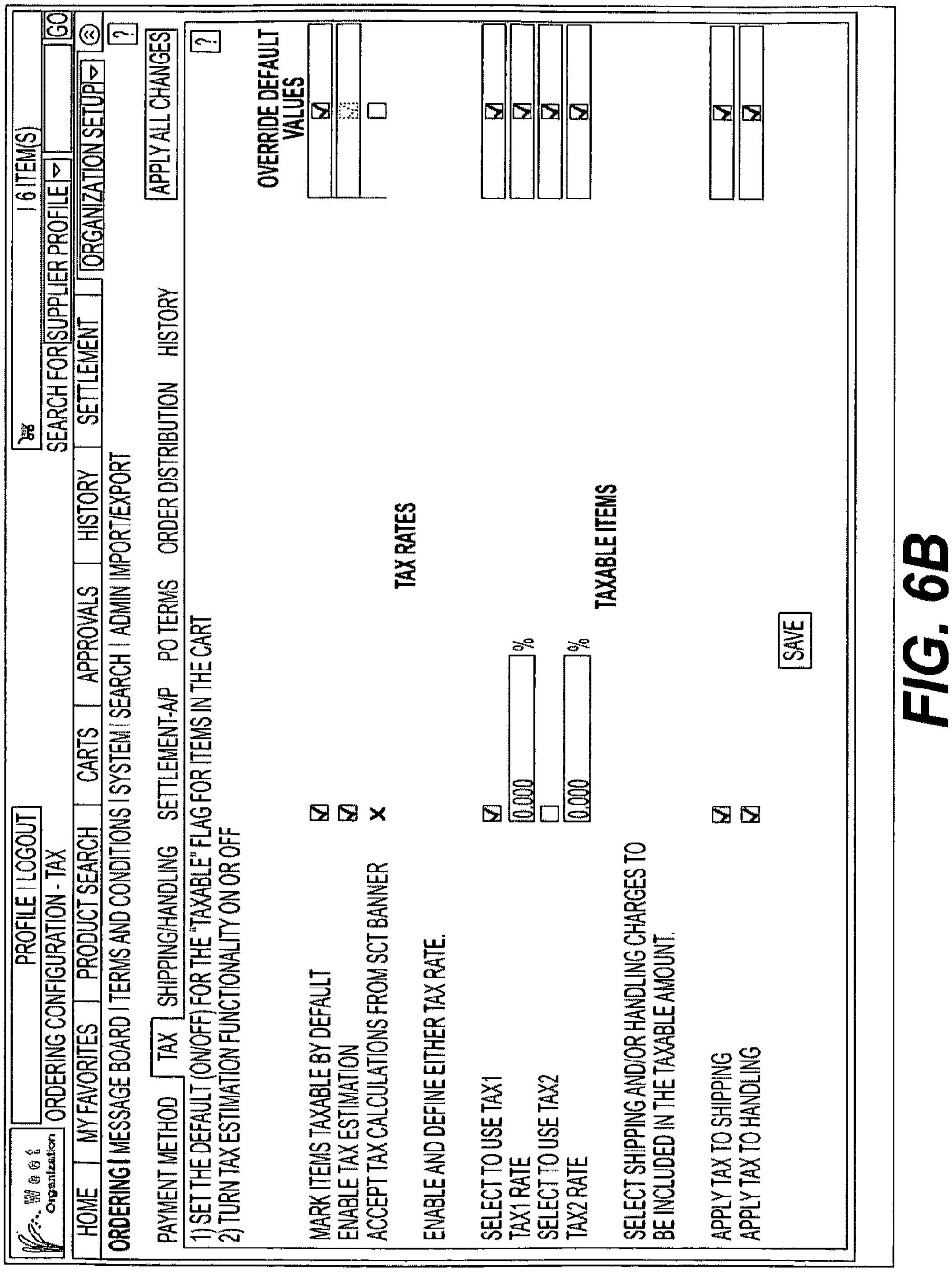
Figure 6C:
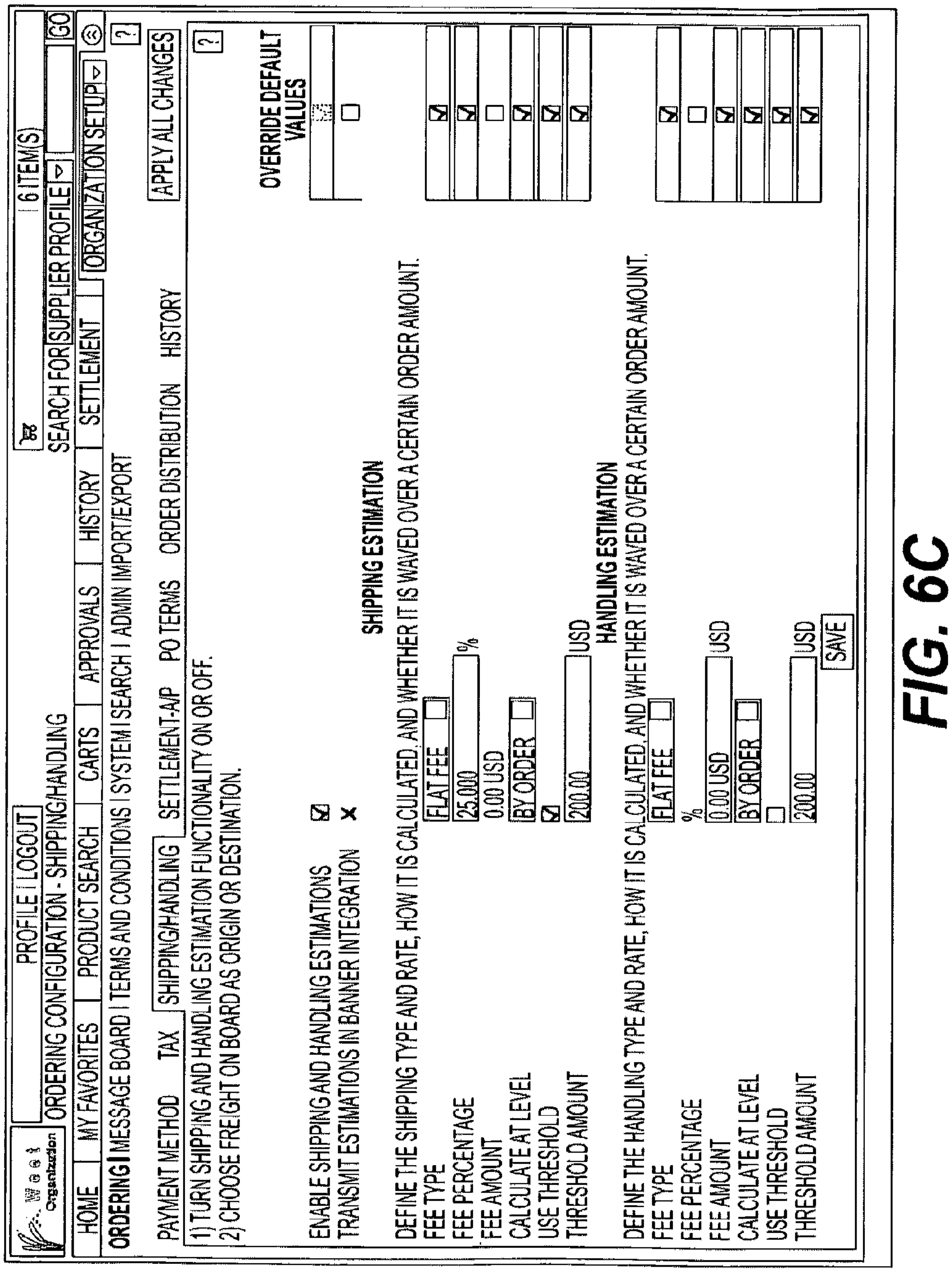
Figure 6D:
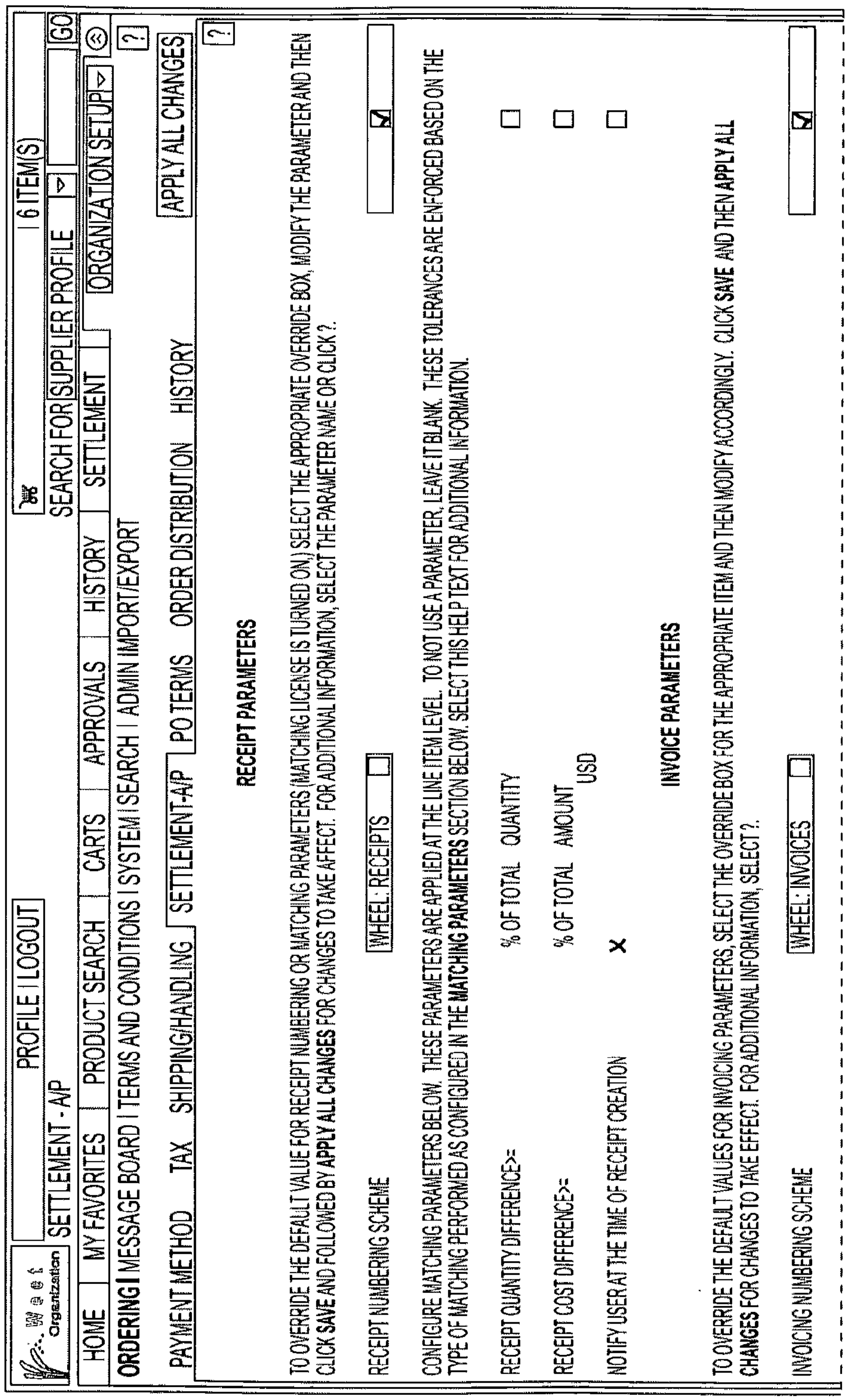
Figure 6D:
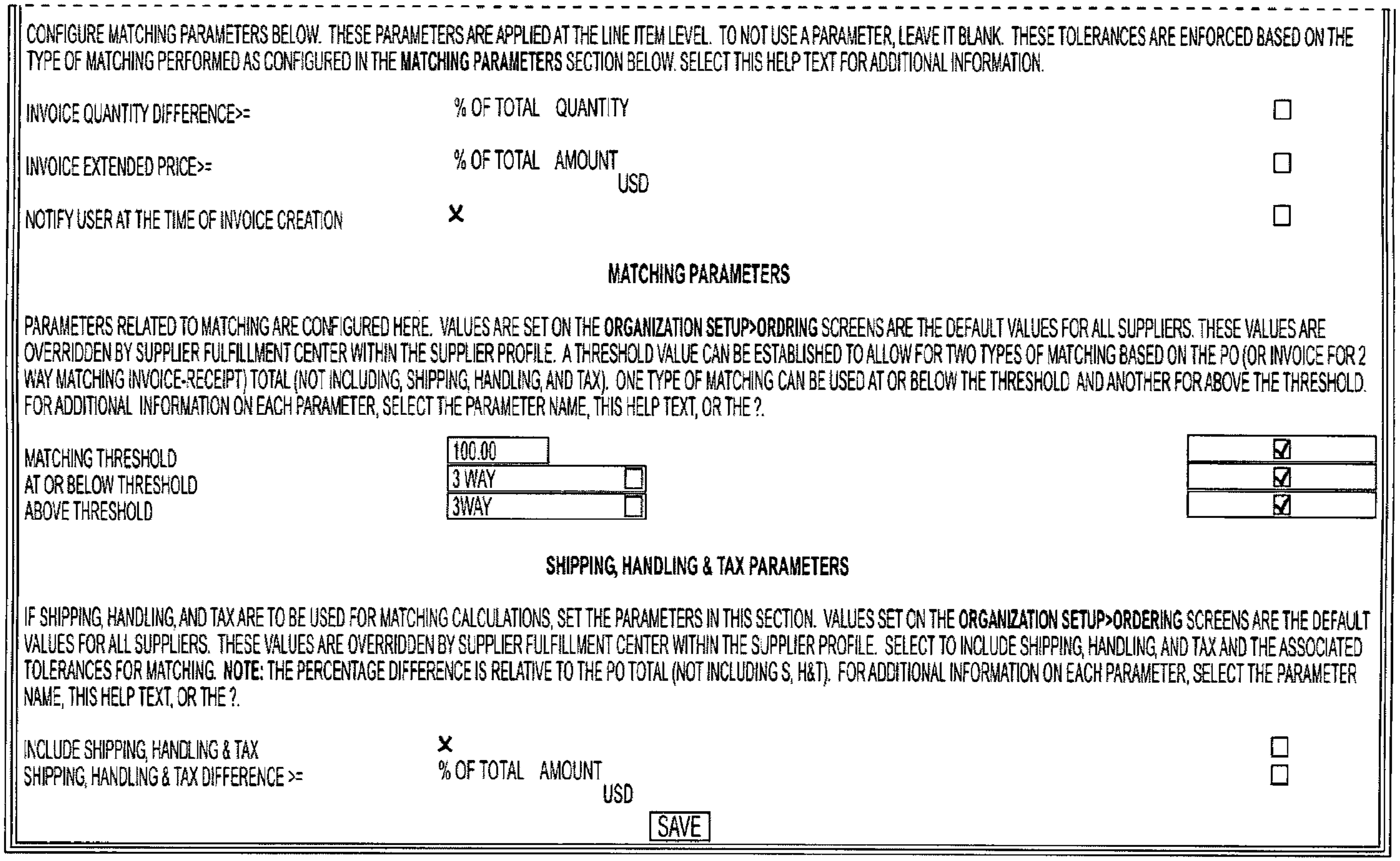
Figure 6E:
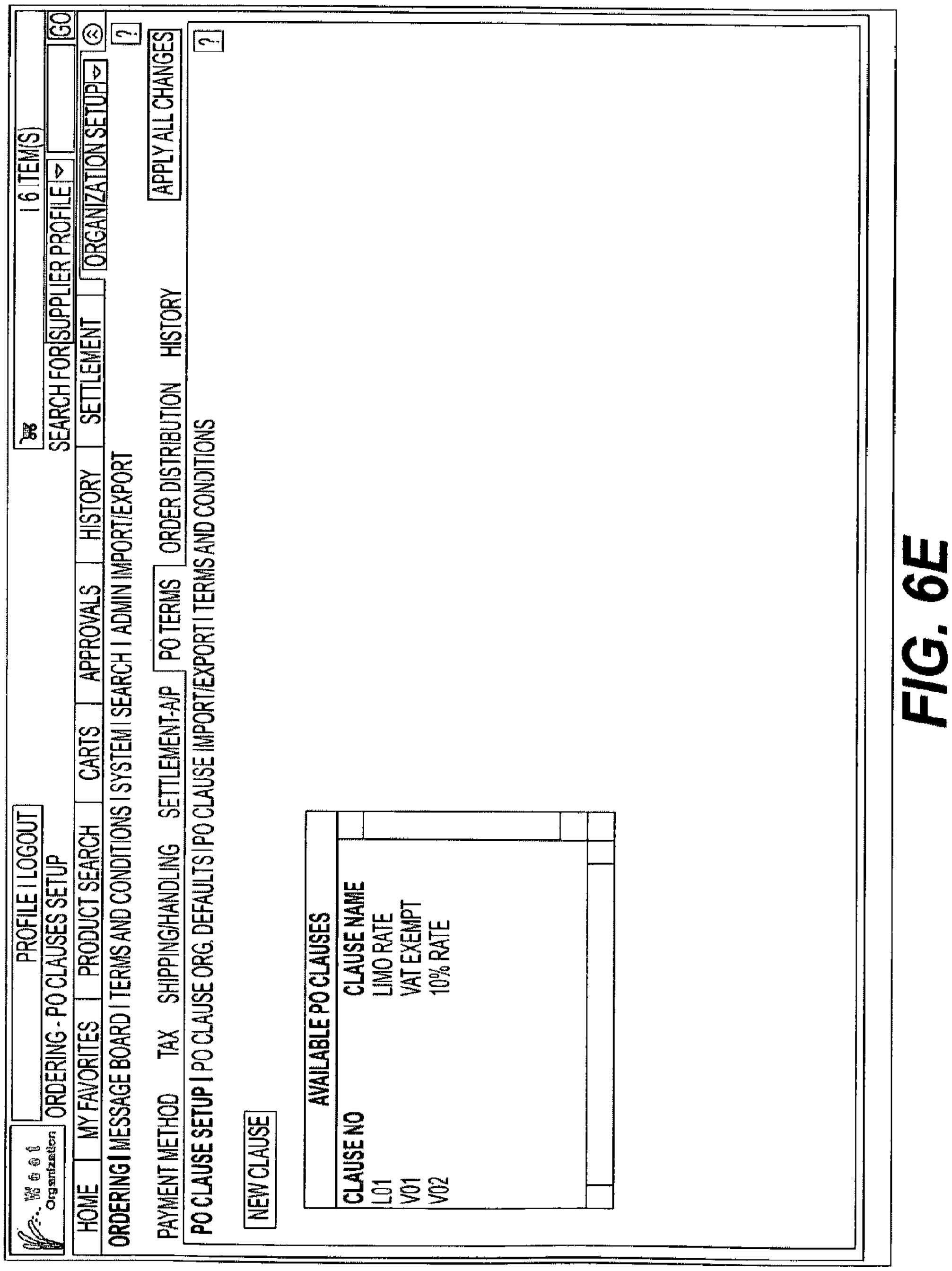
Figure 6F:
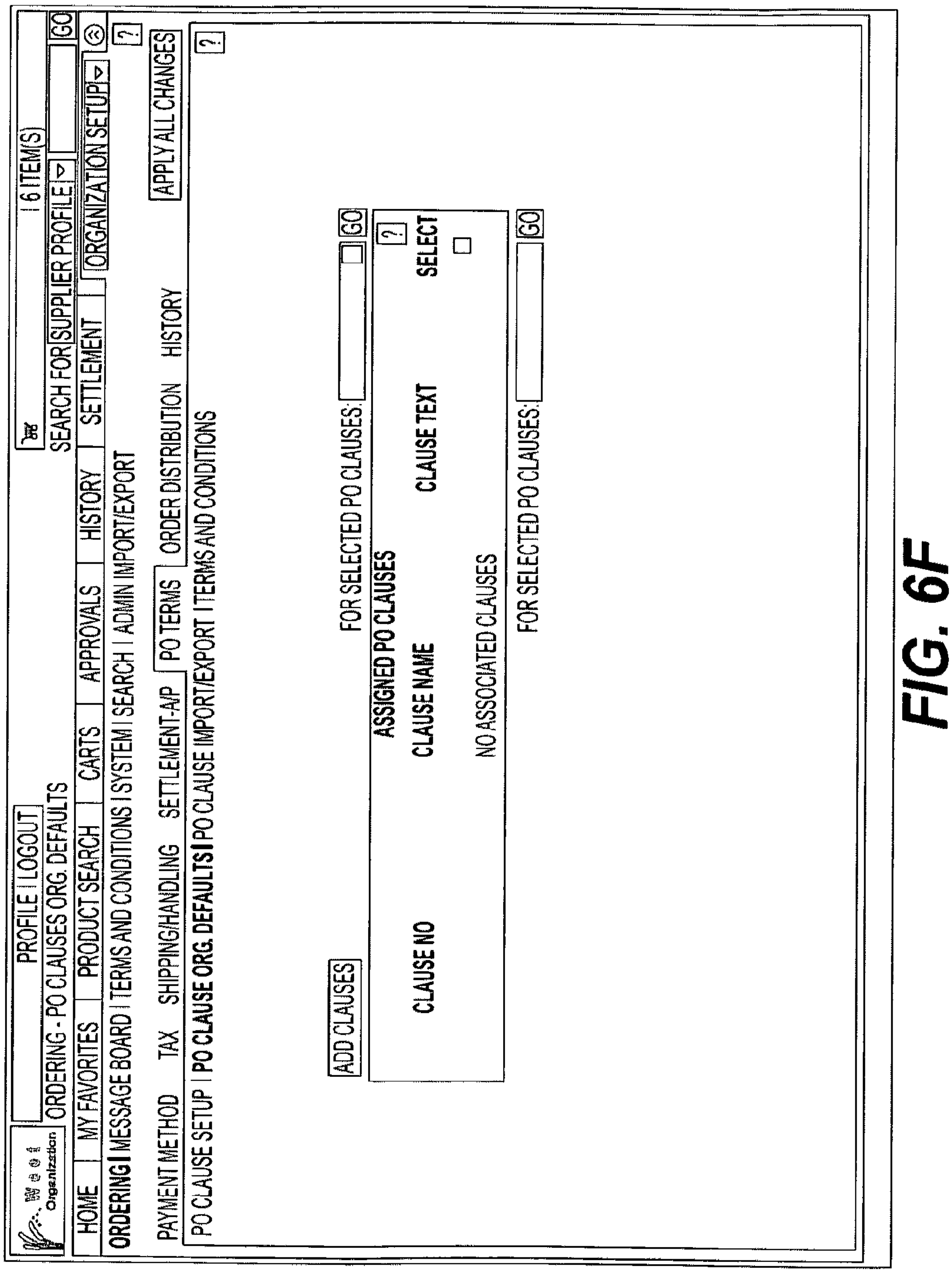
Figure 6G:
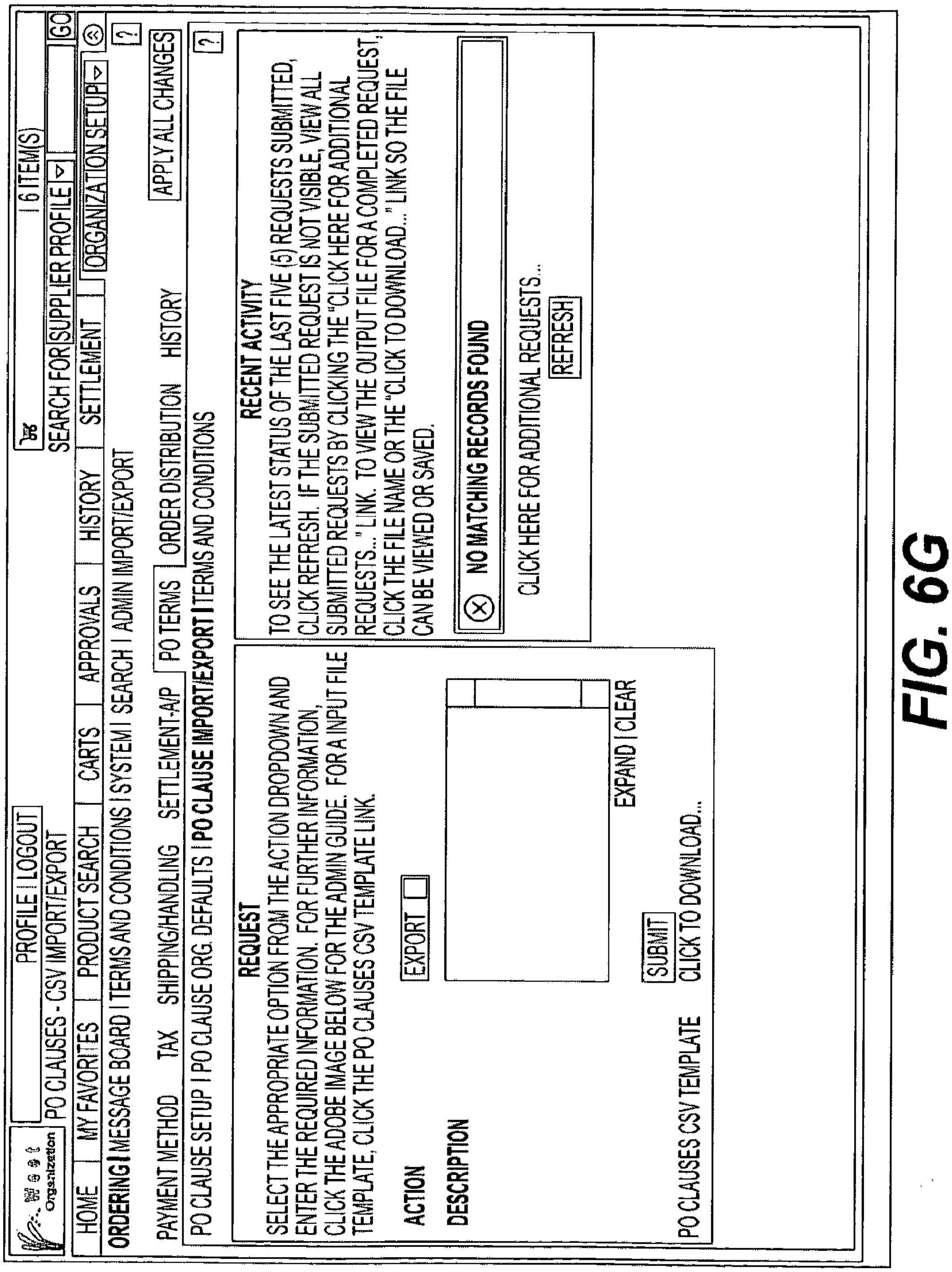
Figure 6H:
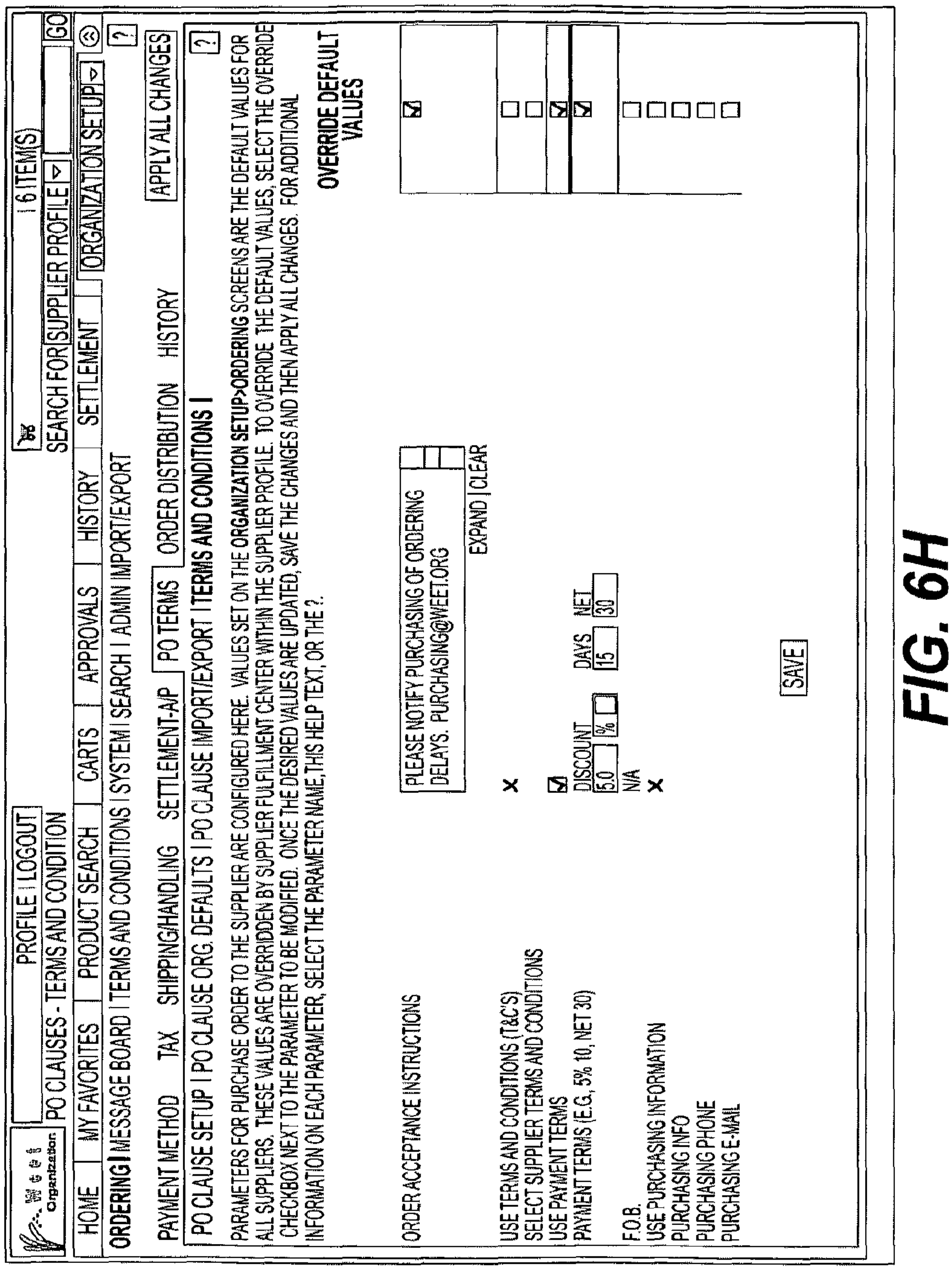
Figure 6I:
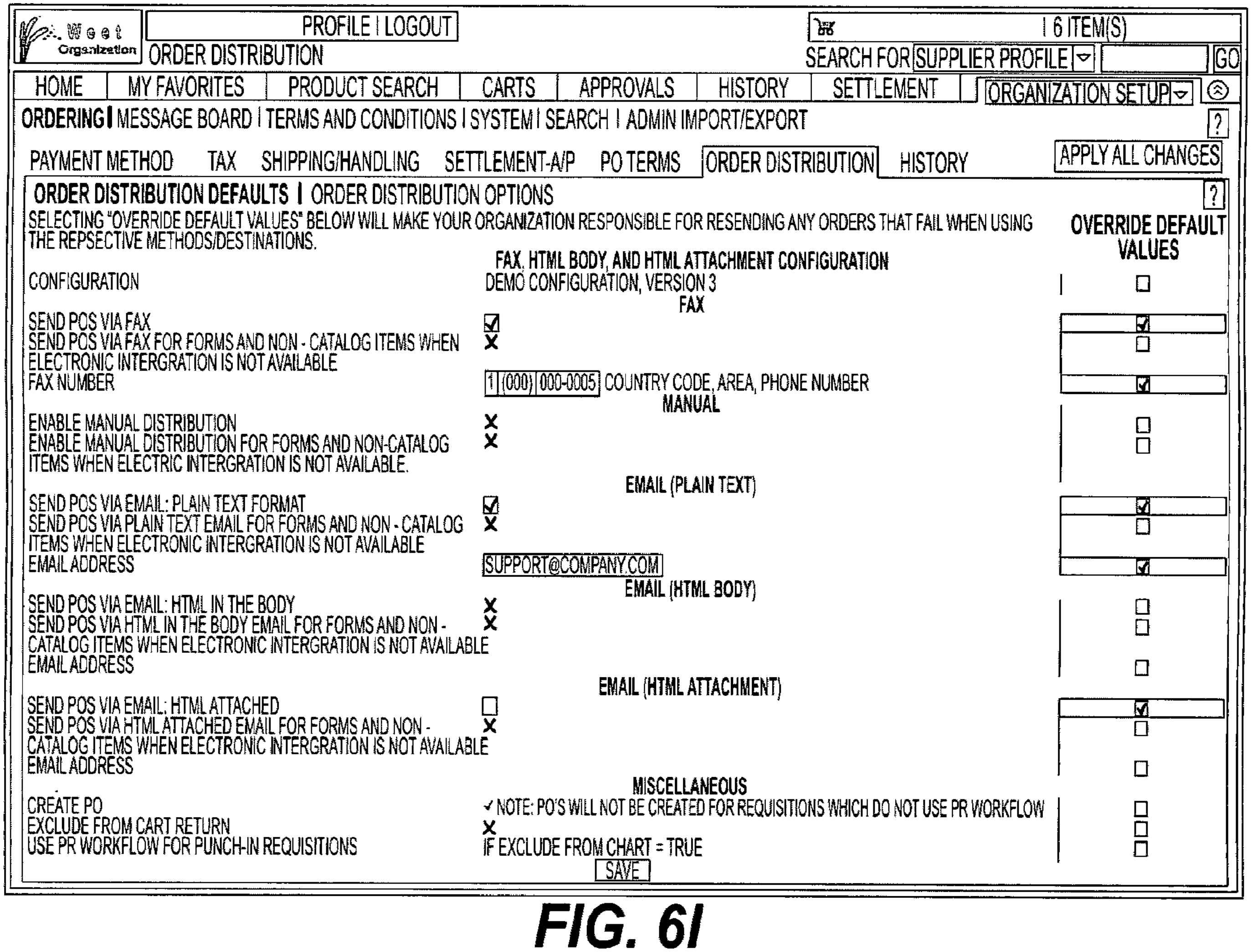
Figure 6J:
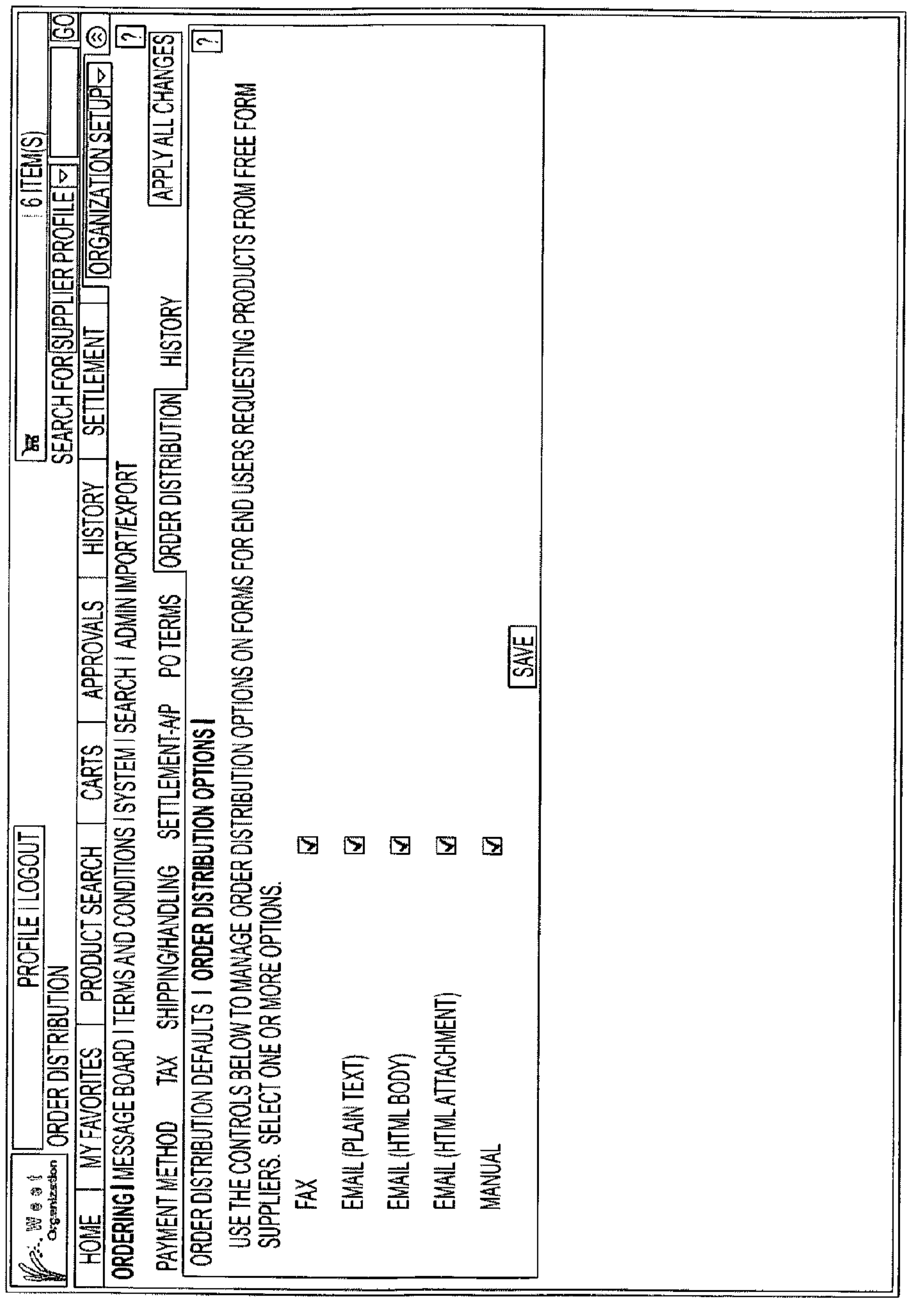

FIG. 6A illustrates an exemplary organization setup tool 600 for designating business rules such as method of payment (FIG. 6A), tax (FIG. 6B), shipping/handling (FIG. 6C), settlement (FIG. 6D), purchase order terms (FIGS. 6E-G), order distribution process (FIGS. 6I-J), and history of all actions effectuated through the organization setup tool. By organizing all of the terms and conditions of an order for each organization in a single instance, multi-tenant architecture, each requisition effectuated on the eProcurement system of the present invention is processed efficiently.

Figure 7:
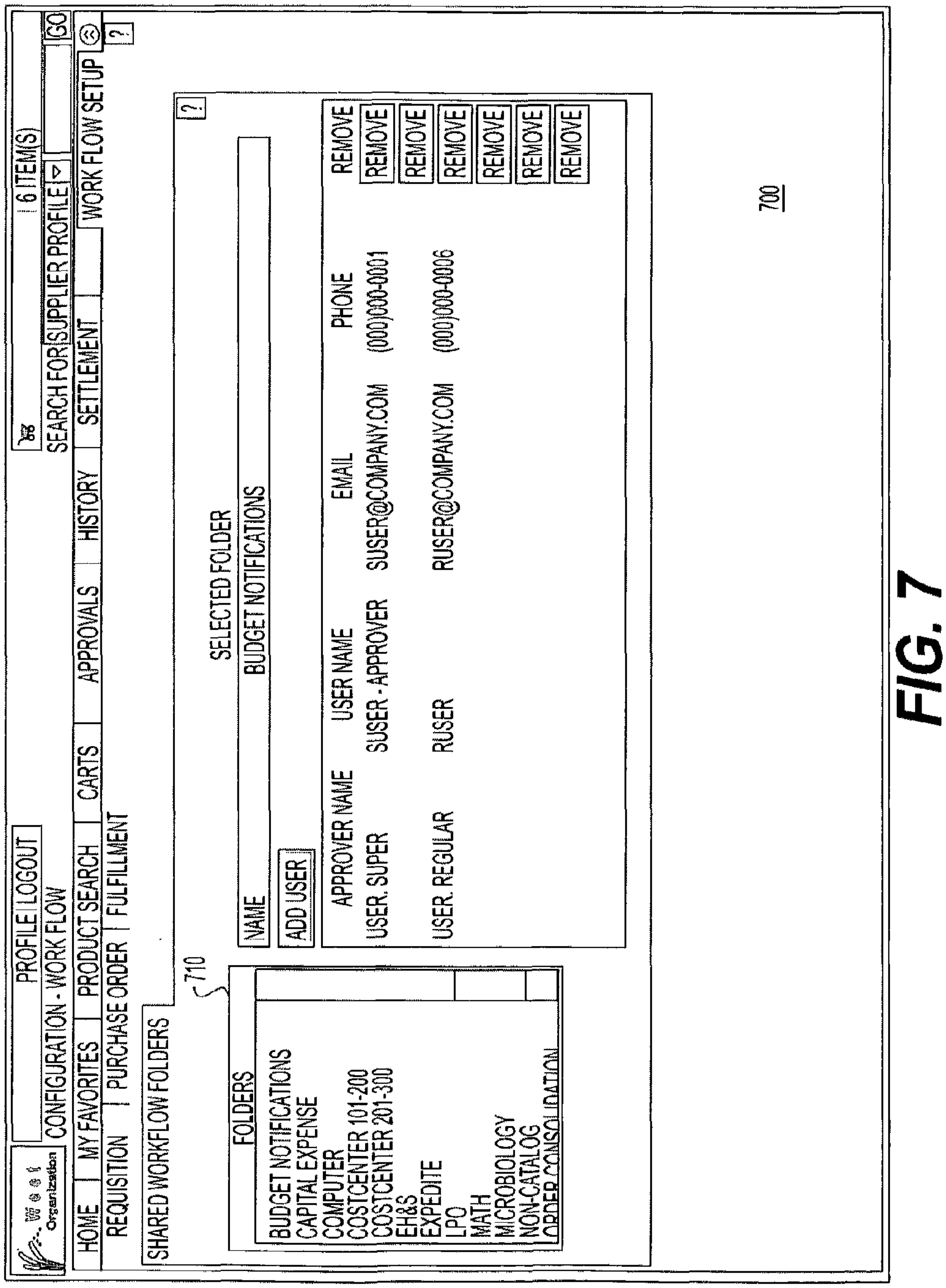
FIG. 7 illustrates an exemplary workflow setup tool in accordance with the present invention.

FIG. 7 illustrates an exemplary workflow setup tool 700 to define the workflow process of a requisition, purchase order, and fulfillment. As shown in FIG. 7, the workflow setup tool 700 in accordance with the present invention creates a shared workflow space 710 and allows for the assignment of users (e.g., individual users, or users of various user roles) to be included in the workflow process.

Other configuration tools include document setup tool (FIG. 78, document setup interface) to organize documents related to requisitions, purchase orders, and sales orders for access by the user. The document setup tool keeps track of the name of the document creator, version number, and any deployment dates, as well as other data related to the document. Moreover, the eProcurement system in accordance with the present invention includes a field management tool (FIG. 76, exemplary field management interface) that allows super users to create, modify, and manage every field/parameter related to the procurement process used on the system. Accordingly, the eProcurement system of the present invention may be custom tailored for each organization/user role/user while maintaining its single instance, multi-tenant environment.

As shown in FIG. 2, end user interfaces 212 and supplier user interfaces 214 according to the present invention provide access to the plurality of modules of the eProcurement system 10 (FIG. 1). As described above, the end user interface 212 is configurable by both end user and super users. Moreover, the end user interface 212 includes one or more features, for example, such as searching and viewing a hosted supplier products catalog, invoking purchase/requisition orders, consummating sales transactions, invoking status queries and viewing the response, and setting end user configuration preferences as described further below. For example, the search and view feature allows for searching via product description, supplier name, manufacturer name, catalog no. (SKU), a filtering capability, and by browsing: catalog/non-catalog items, suppliers, or contracts. A user may invoke any of these search inputs alone or in combination with others. Also, Boolean and fuzzy logic functionality is available for searching and allows a user to devise targeted search strategies that may return more accurate search results. Once a user has invoked a search using any of the inputs described, the user may then view the returned results. The returned results can be filtered by a user based on category or supplier. Also, a user may choose to organize the returned results such that similar results are listed in proximity of one another. For example, a user may organize returned results by weight, supplier, category, catalog number, product description, UOM, product size, price, quantity, and/or currency.

The catalog may be implemented as single instance but multi-tenant (or, as multiple instance, single-tenant), and may further include custom views of items as set by each internal end user and/or organization. An end user may specify favorites within the catalog. Such favorites are available for later viewing or purchasing by the end user. Any updates made to an end user favorite within the catalog will be automatically propagated to the end user's favorite(s) view as well (FIG. 77, an exemplary update favorite(s) process flow). The catalog may allow for supplier classifications and multiple products may be linked to a single supplier. Also, the catalog can be activated or deactivated through a simple click on the end user interface, and specific product categories can be globally manipulated and applied to affect all end users. Each catalog may contain information regarding one or more suppliers, and a master product database is primarily tasked with populating each hosted supplier products catalog. This master product database is a relatively large database with a plurality of attributes related to one or more specific products.

In addition to the hosted supplier products catalog, punch-out catalogs may also be implemented as an alternative and supplement to the hosted supplier products catalog, and are made available, for example, when the hosted supplier products catalog does not yield sufficient or satisfactory results. The punch-out catalogs link to outside/third-party catalogs, are not hosted, and may also contain end user organization-specific prices. Processing modules executed on the custom database servers invoke each punch-out instance. Multiple punch-out catalogs may be accessible by a single end user. An end user can return from a punch-out catalog to the hosted supplier products catalog, and the remainder of the features of the eProcurement architecture, via a submit feature, which will then return to the processing module that initially invoked the punch-out instance. Punch-out catalogs may be configured to display relevant catalogs to an end user, based on the end user organization. An end user can browse punch-out catalogs to search for more accurate results and may, subsequently, invoke a requisition order via the third-party web site and order processing methods. Also, one or more purchase orders can be sent from one or more punch-out catalogs, but each punch-out order session may generate a single purchase order that may ultimately include orders from non-punch-out or hosted catalogs.

Further, with respect to the hosted supplier products catalog, there may be a feature implemented to allow both its searching and viewing. The search/view catalog feature is invoked via a processing module that executes on the custom database servers. Upon the execution of such a search by an end user, search results can be displayed via the end user interface. The catalog search results can be displayed, for example, using a static or dynamic interactive list or table, attachment, graphic, or link. An end user may also have the option of choosing the appropriate supplier(s) from which to place an order. Upon an end user's selection of a particular supplier, the relevant supplier data is then forwarded to the transaction processing feature. The end user may later invoke a status query, via a processing module executed on the custom database servers, on a preexisting order and, subsequently, receive status notifications regarding the order.

The search feature may be implemented using several sub-features such as, for example, customized annotations (with icons) of preferred/contract suppliers, a product/supplier filter, and a product size filter. The search feature is invoked by a processing module that is executed on the custom database servers. The customized annotations (with icons) of preferred/contract suppliers allows certain products to be highlighted within search results. Furthermore, the product/supplier filter of the search feature allows certain products to be displayed, while others are hidden, depending on specific filter criteria chosen by the end user/organization. Such criteria may include, for example, price thresholds, hazard level, approximate delivery date, product size, supplier, and/or currency.

The search architecture is based upon an indexed, tokenized-type implementation. This search architecture may include a search engine and a tokenization feature, both of which are invoked via processing modules executed on the custom database servers. Product elements such as the product name, industry, price, currency, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is executed against "verticals." A vertical is designed similar to a drill-down menu architecture that consists of root nodes and leaf nodes, which are children of their respective roots. Through the use of tokenization and verticals, a layer of abstraction is added that is unique in comparison to typical text-based searching of a large database, like the master product database. This added layer of abstraction allows for better organization of the underlying data. As a consequence, the use of tokens to search verticals, which organize supplier product data and search the hosted supplier products catalog, enables an efficient and methodical search strategy to be executed. Search results returned from searching the hosted supplier products catalog are forwarded back to the search engine and may appear via the end user or supplier user interfaces. For an end user, designated preferred suppliers usually appear first in the search results.

Further contained within the search architecture, a feature to allow the invocation of status queries and viewing of the response may be implemented. This feature allows a plurality of end users to send queries/requests via middleware/web methods, or direct Internet posting techniques, to the product catalog. The feature is itself invoked by a processing module that executes on the custom database servers. Such queries/requests may be intended for finding, buying, or managing products. Such products may be those of preferred contractors that are matched to the end user based on a plurality of criteria like permission, product type, industry, price, quality control metrics, delivery date, warranty types, currency, and/or locale. Each product catalog may contain information regarding one or more specific products. A master product database populates the hosted supplier products catalog with various types of information relating to one or more specific products. The various types of information may include a "stock keeping unit" (SKU) identifier, supplier information, and product category/description/attribute information.

Further also to the search architecture, an in-stock query feature may be implemented to allow an end user, through the middleware/web methods, or direct Internet posting techniques, to determine whether any supplier might have a particular product in-stock, and/or the warehouse/location where that stock is maintained. The feature is itself invoked by a processing module that executes on the custom database servers. Once the in-stock query feature is invoked, relevant suppliers are sent individual queries. Subsequently, each supplier response to an in-stock query is processed and the appropriate end user is notified after the in-stock query receives the supplier response(s), but before returning to the processing module.

Moreover, a quick order feature may also be implemented to enable several other sub-features such as, for example, searching by product category, SKU identifier, currency, or host product category number/supplier part number. The feature is itself invoked by a processing module that executes on the custom database servers. Subsequently, the order feature is initially invoked by an end user that has completed a quick order search. Thus, the quick order feature enables an end user that may have knowledge of specific product attributes to perform an expedited search, retrieve search results, and proceed to ordering.

The search results of a product search exhibit other features of the invention such as those related to the presentation of results. For example, suppliers and categories contained within search results can be displayed using different customizable icons, which may be used to highlight specific suppliers and product categories. Such results can also be ranked according to priority based on whether they are supplied from preferred or contracted suppliers, a preferred category of products from suppliers, or a preferred currency. Non-preferred or non-contracted supplier or currency results may also presented to end users. Moreover, a product comparison chart can be invoked to highlight the differences and similarities among two or more products. The chart can contain static or dynamic presentation attributes based in part on supplier-provided data. For example, the in-stock attribute, a dynamic presentation attribute, can be used to identify whether specific products are actually available in a supplier's inventory, and their corresponding prices and/or currencies. A search result list can be organized by category and/or vendor based on end user preferences. Also, icons can be used to further display and highlight relevant information regarding products such as, for example, whether products are hazardous, toxic, poisonous, or are considered to be controlled substances. A proprietary taxonomy can also be implemented against modeling product categories to enable more efficient searching and, ultimately, user-friendly, organized search results.

Figure 8A:
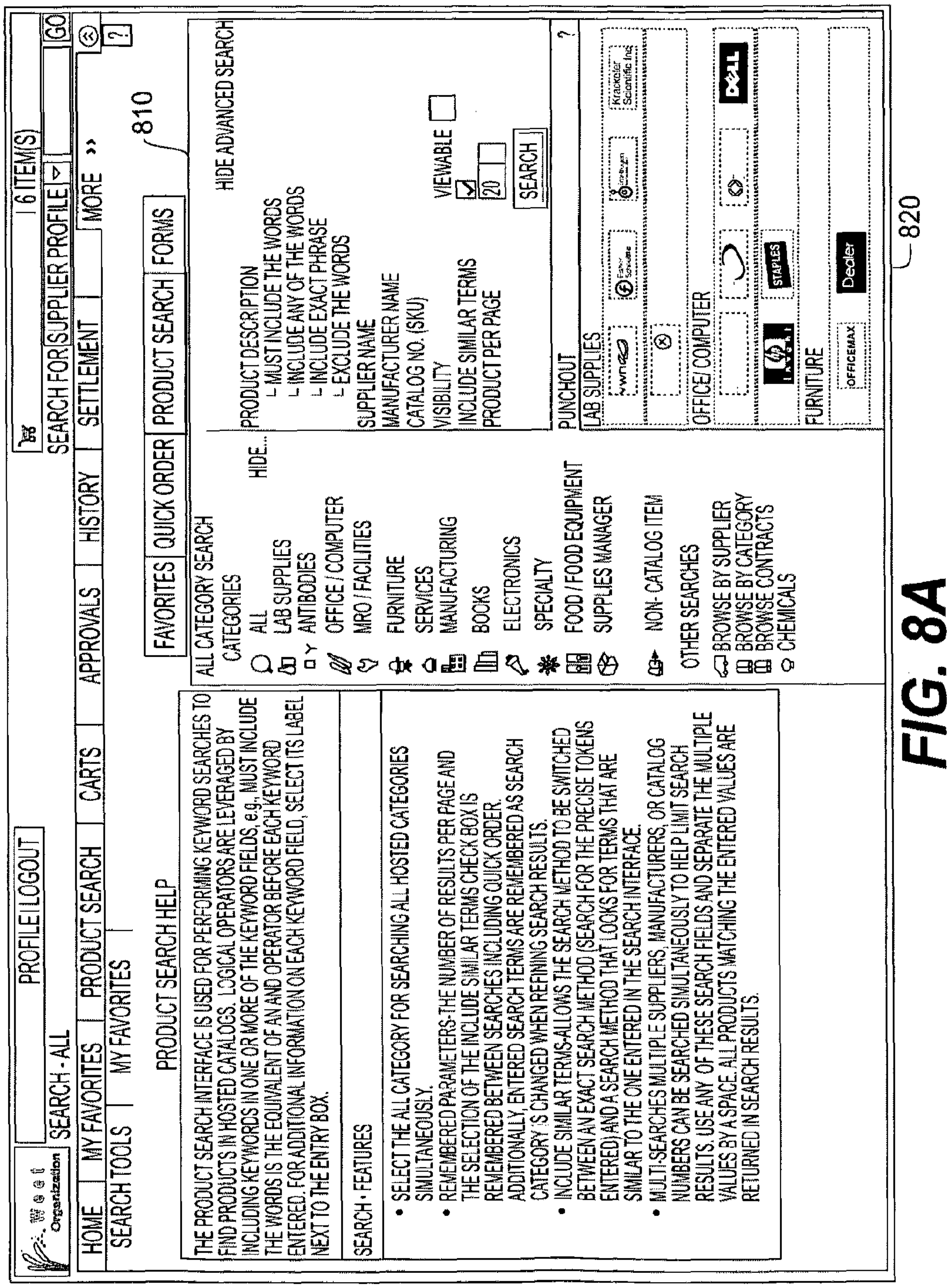
FIGS. 8A-8D illustrate exemplary search engines in accordance with the present invention.
Figure 8B:
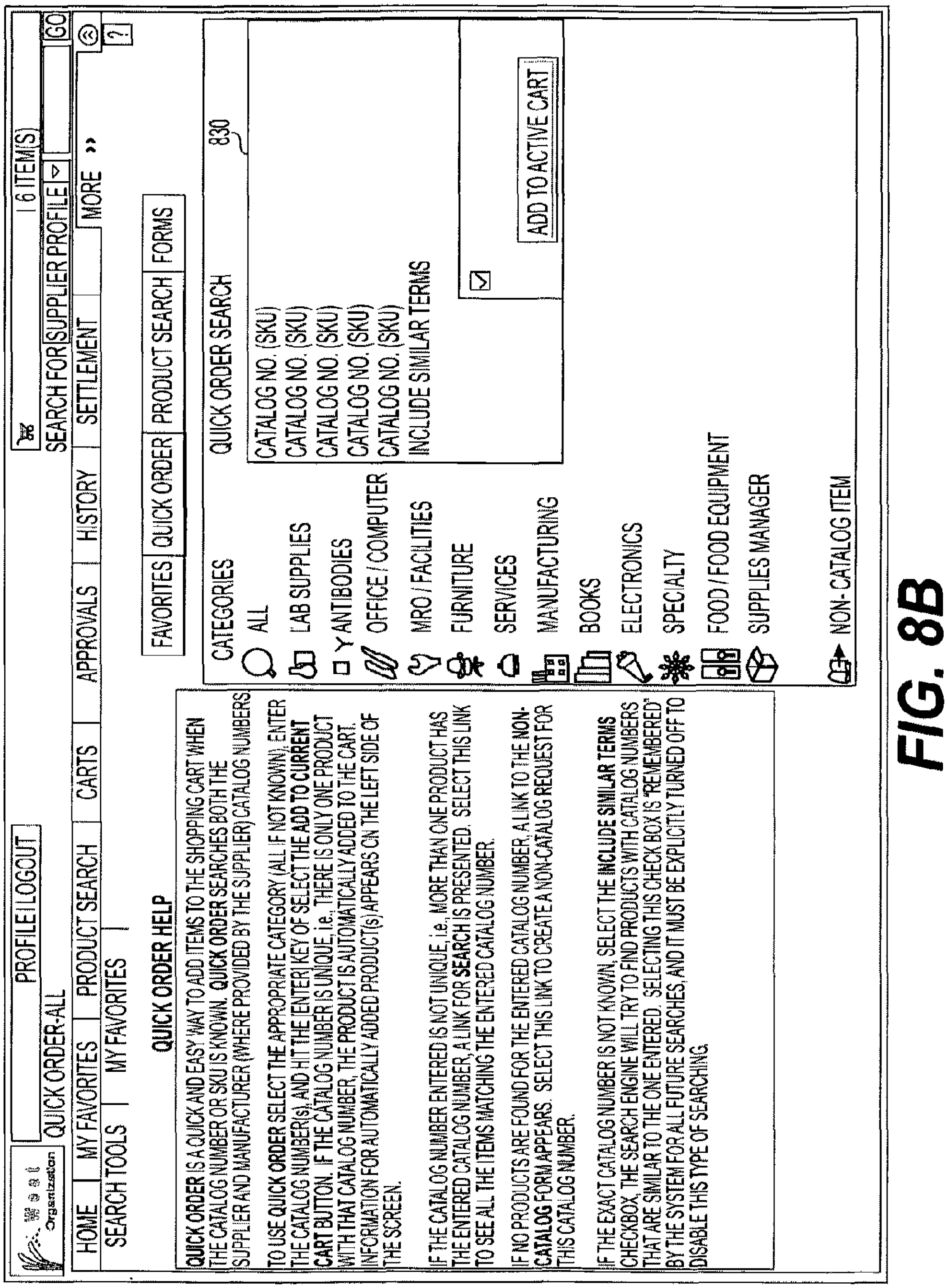
Figure 8C:
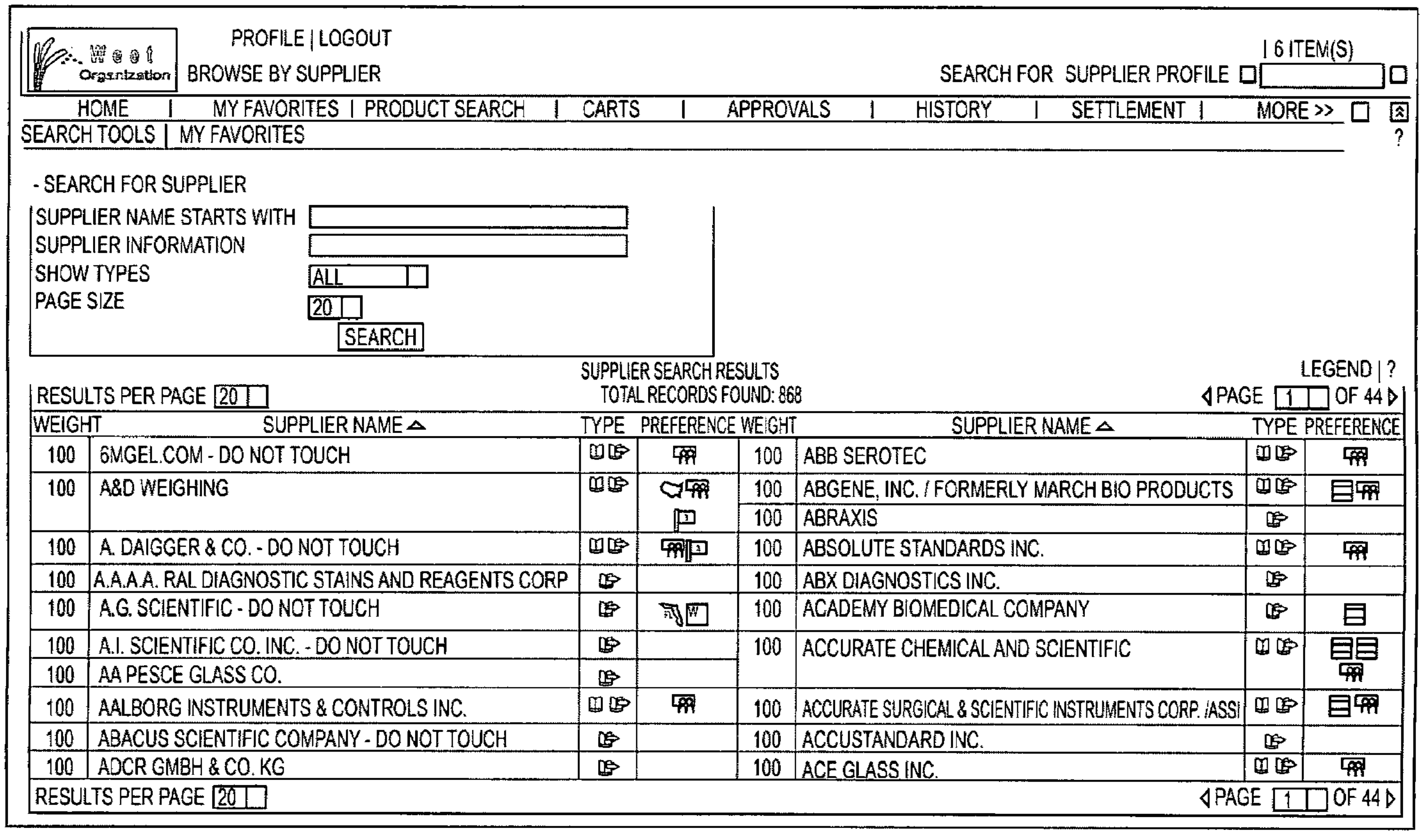
Figure 8D:
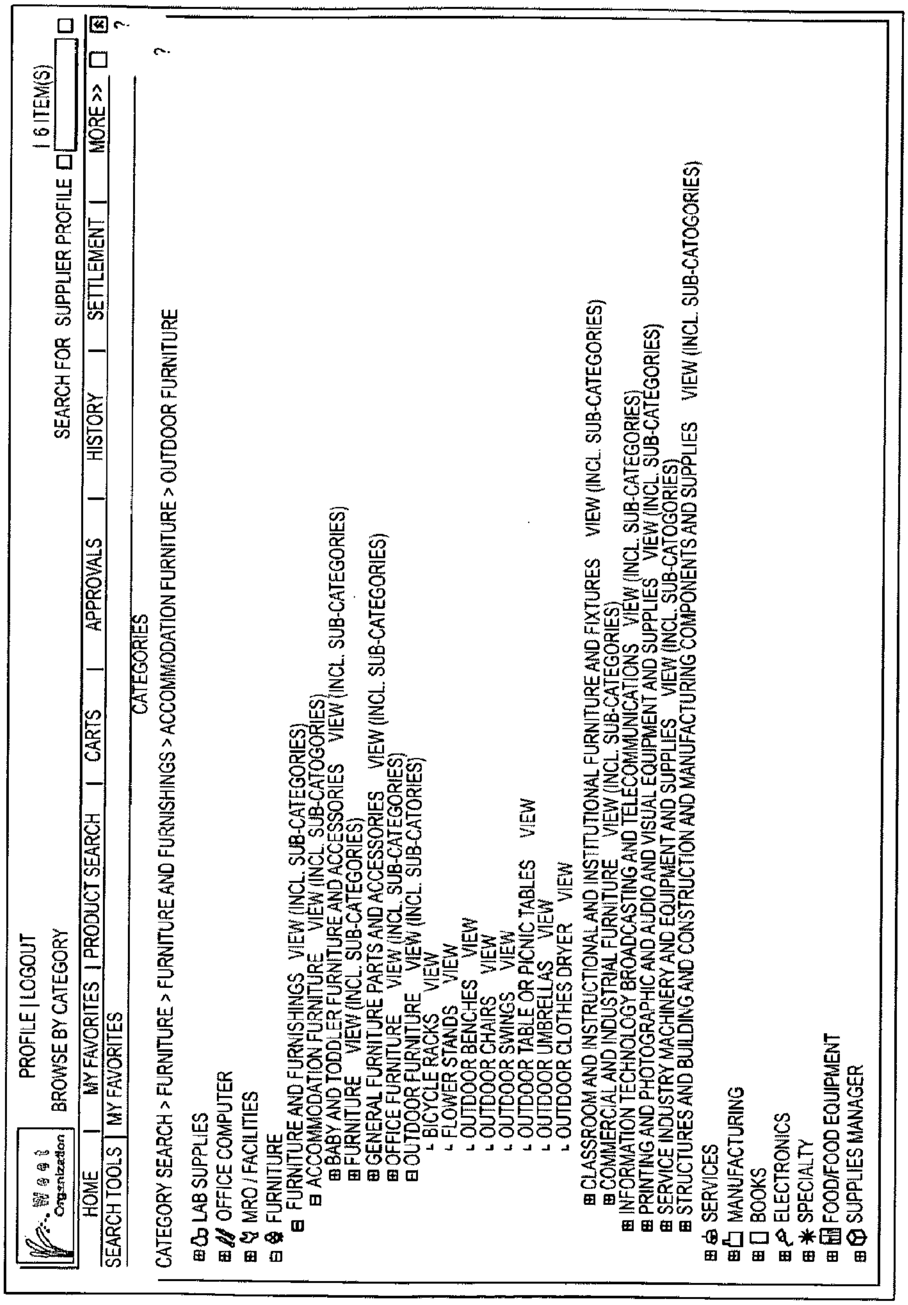

FIGS. 8A-8D illustrate exemplary search engines in accordance with the present invention. For example, FIG. 8A illustrates an exemplary parametric search engine 810 and punch-out catalogs 820. FIG. 8B illustrates an exemplary quick order search engine 830. FIG. 8C illustrates an exemplary browsing engine based on suppliers. FIG. 8D illustrates an exemplary browsing engine based on categories of the products and/or services. Other search engines may be used without departing from the scope of the present invention. Therefore, an eProcurement system in accordance with the present invention couples the configuration tools described above for customizing access to specified suppliers and/or specified types of products based on department, position, roles, and/or permissions of the user for each organization with various search engines in a single instance, multi-tenant architecture.

As shown in FIG. 2, the supplier user interface 214 in accordance with the present invention and further described below is configurable by supplier users and super users, and includes one or more features, for example, such as accessing a supplier hosted products catalog, viewing and responding to purchase orders, consummating sales transactions, viewing and responding to status queries, and setting supplier user configuration preferences. Each individual end user and supplier user may have a different interface from another end user and supplier user, respectively. Furthermore, the supplier end user interface of the present invention may allow a plurality of supplier users to send queries/requests via middleware/web methods server 224 to custom database servers 222, and to a hosted supplier products catalog 234 that is multi-tenant managed. A remote supplier user query/request is sent via the supplier end user interface 214 over the Internet, or other networked connection, and is first received by the web servers 225 after passing through the firewall 218. Then, the web server 225 passes the query/request to the middleware/web methods server 224, where business rules may be enforced. Subsequently, depending on whether the query/request is related to a transaction or a user search, it is either forwarded to the transaction processing servers 223 or custom database servers 222, respectively. For either type of query/request, the hosted supplier products catalog 234 is then readily accessible via processing modules for exchanging transaction/product data, or performing a search/supplier operation. The hosted supplier products catalog 234 can serve as a quasi-link between the end user interface and the supplier interface because it is accessible by both interfaces. Supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by a super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

As described above, to support the product search function, the eProcurement system of the present invention includes a master catalog database of all the products from all the suppliers hosted on the system to implement a single instance, multi-tenant environment. Accordingly, the eProcurement system of the present invention includes a catalog management tool 900. The catalog management tool 900 includes one or more of supplier tool 910, categories tool 920, supplier classification tool 930, category classification tool 940, product views tool 950, pricing tool 960, map attributes tool 970, and consortium management tool 980.

Figure 9A:
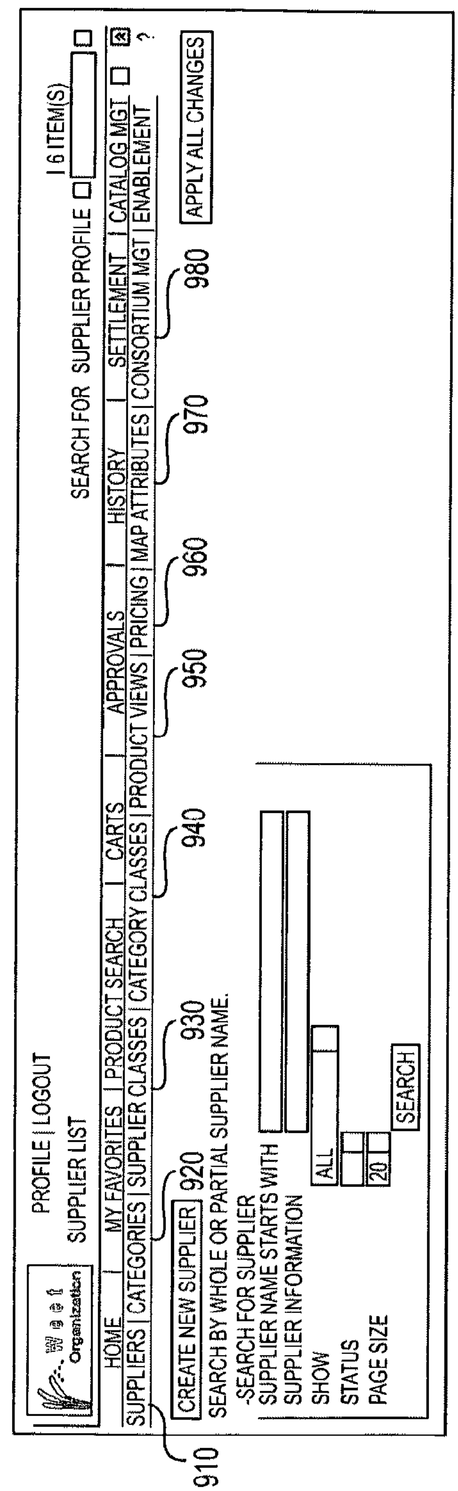
FIGS. 9A-9F illustrate exemplary catalog management tools in accordance with the present invention.
Figure 9B:
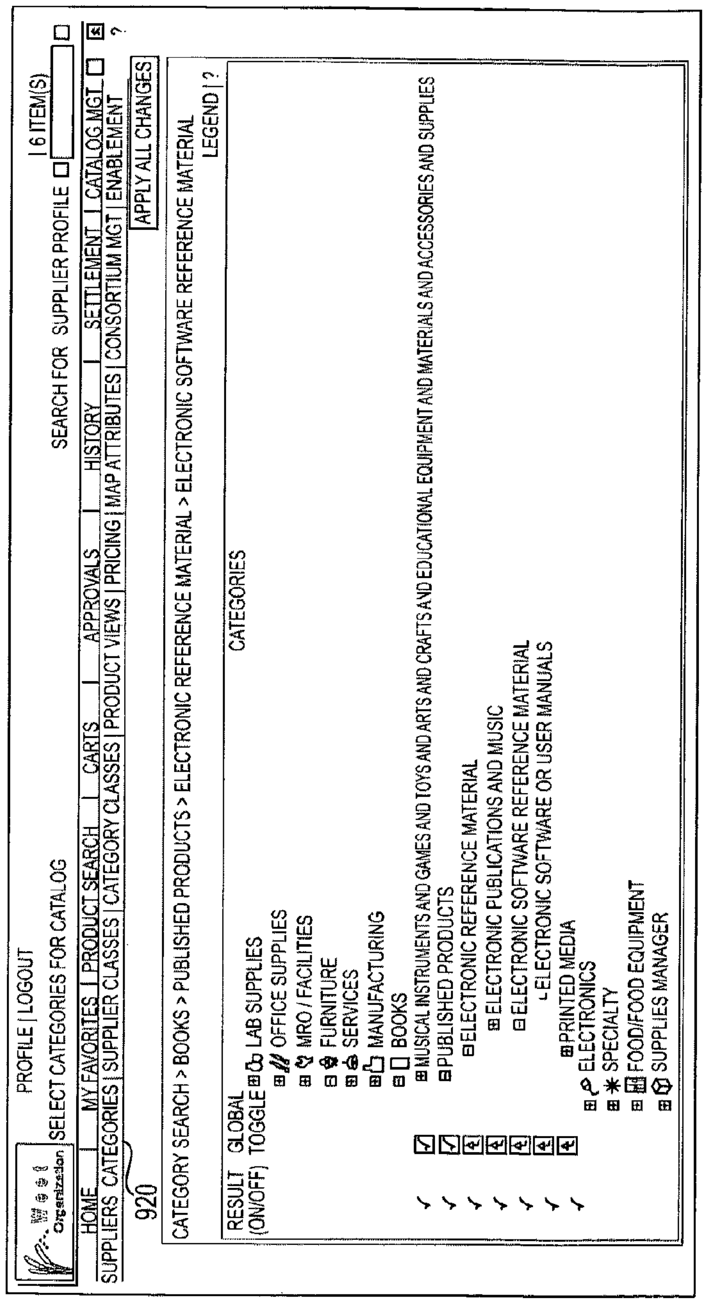
Figure 9C:
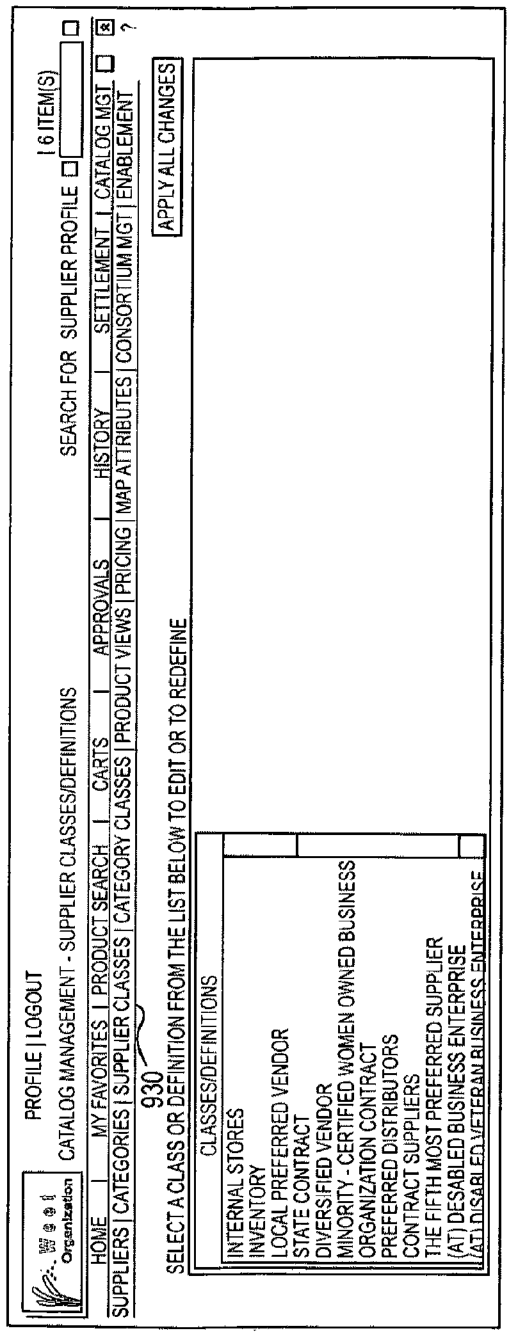
Figure 9D:
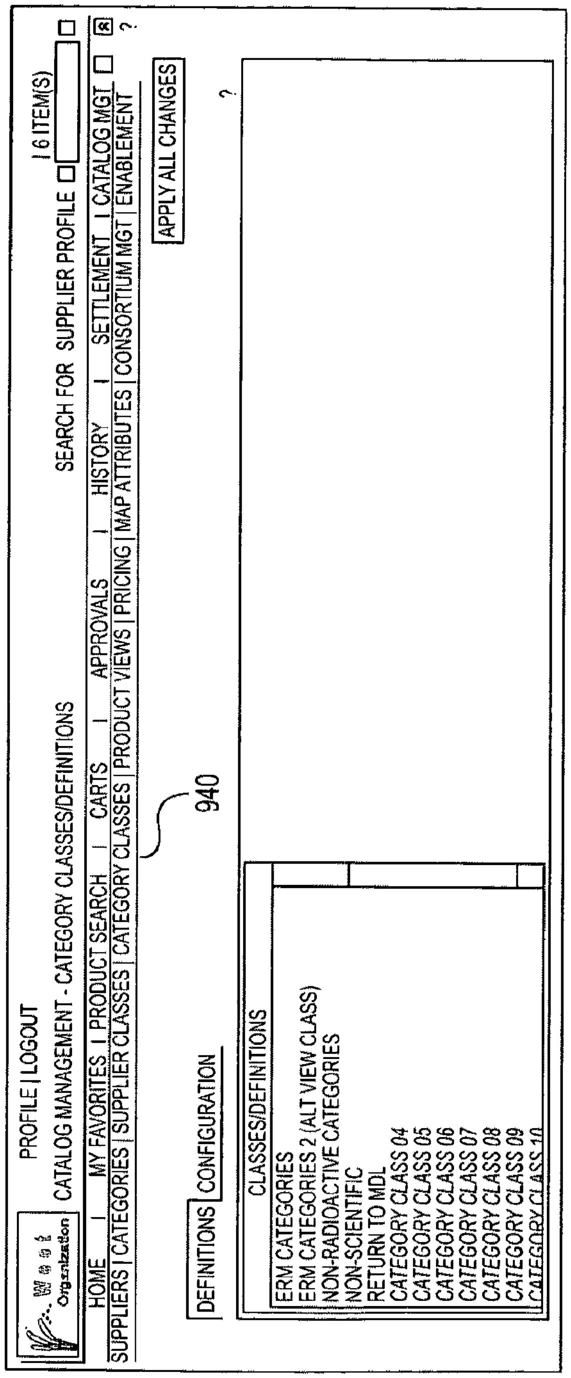
Figure 9E:
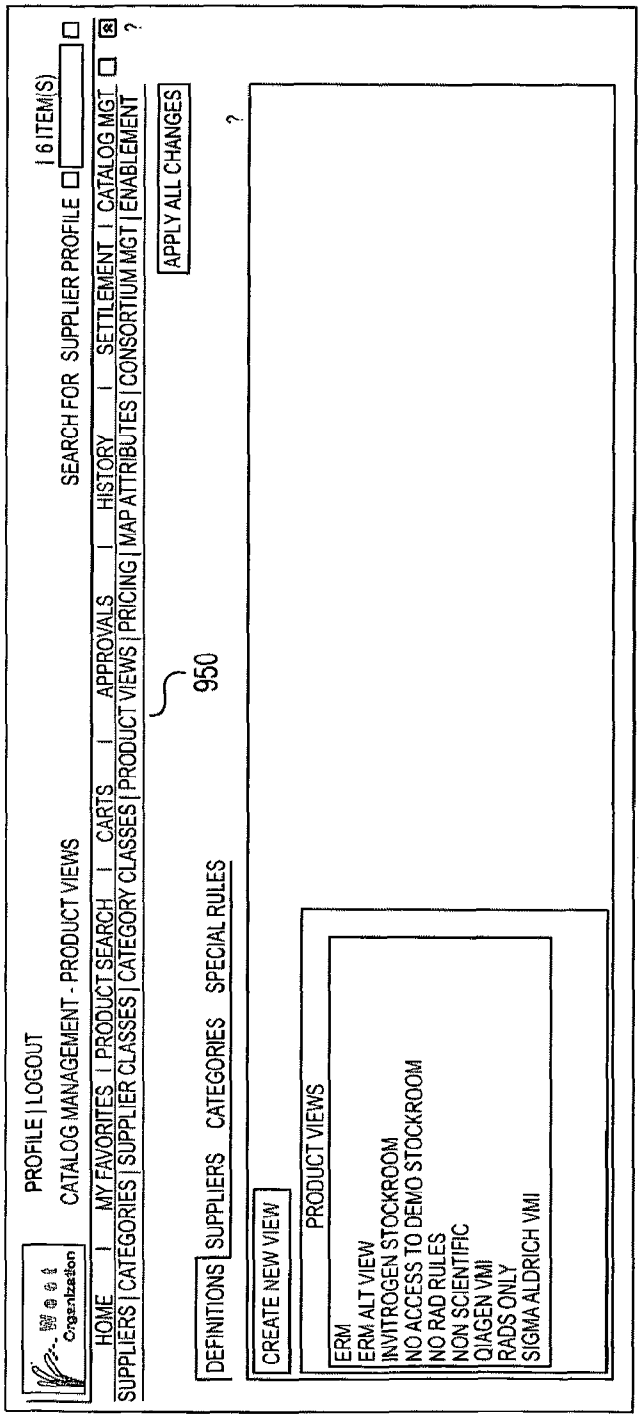

FIG. 9A illustrates an exemplary catalog management tool 900 with an exemplary supplier tool 910 invoked. The supplier tool 910 includes a search engine that searches for existing suppliers hosted in the eProcurement system of the present invention. Furthermore, the supplier tool 910 adds new suppliers not yet hosted in the system. FIG. 9B illustrates an exemplary categories tool 920 that configures all the products offered from the hosted suppliers into defined categories. Classifications for suppliers and product categories within the system of the present invention are defined and managed by the supplier classification tool 930 (FIG. 9C) and category classification tool 940 (FIG. 9D). In particular, new classes of suppliers and product categories may be created, defined, and configured as needed through the supplier classification tool 930 and category classification tool 940. In addition, existing classifications of suppliers and product categories may be modified. The product views tool 950 manages the views of products based on the defined supplier and product categories (FIG. 9E).

Figure 9F:
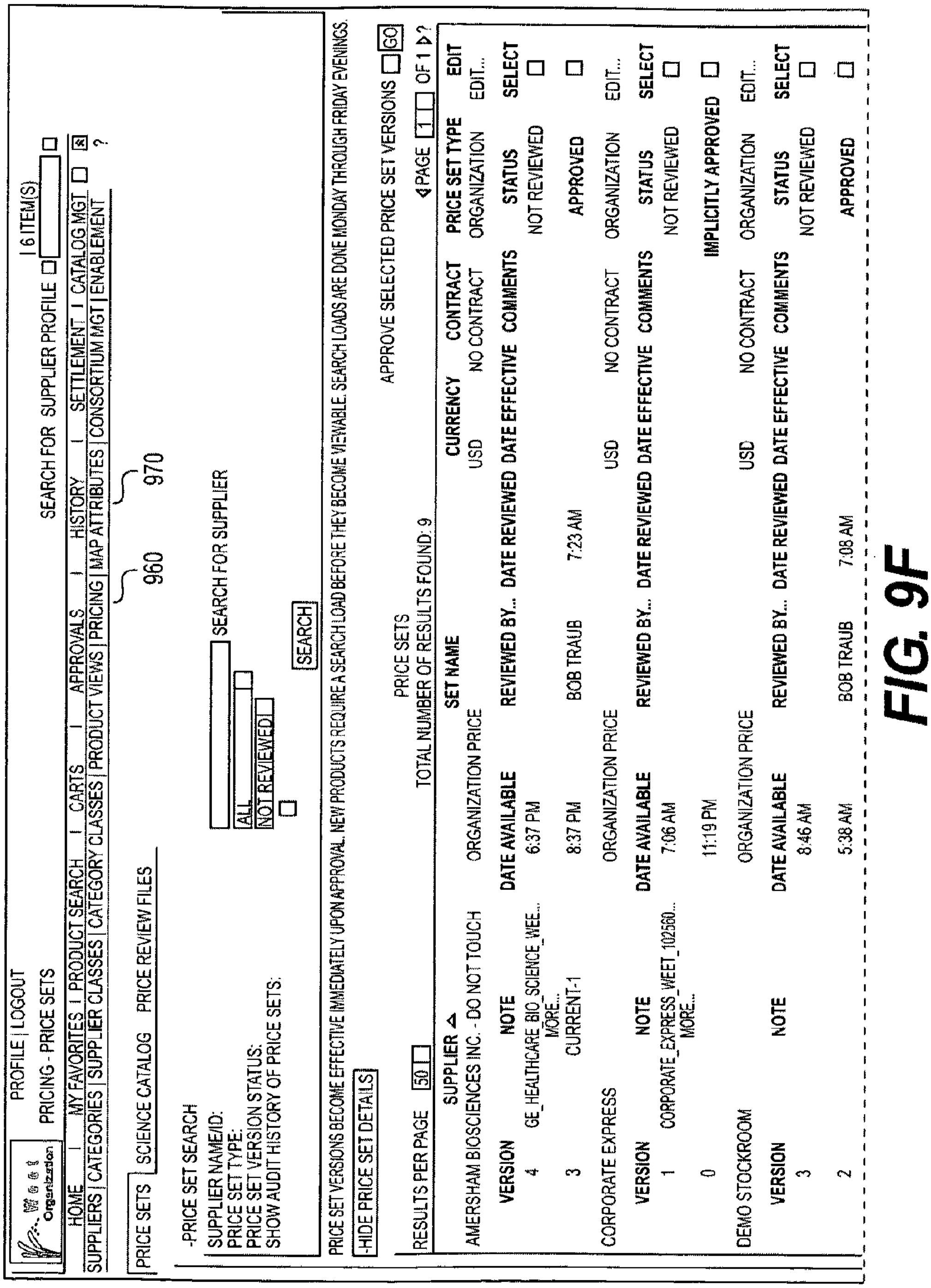

FIG. 9F illustrates an exemplary pricing tool in accordance with the present invention. As shown, pricing tool 960 manages various pricing sets of each hosted supplier for the hosted products (or, the tool 960 may also be applied to non-catalog items, forms, or other non-hosted suppliers or products/items). The pricing set types may include organizational prices, contract prices, list prices, and consortium prices. Other pricing sets may be used without departing from the scope of the invention. The pricing tool 960 tracks versions of each type of pricing sets, status of the pricing sets (e.g., implicitly approved, not reviewed, rejected, approved, etc.), as well as the audit history of each pricing set. Accordingly, the appropriate pricing set may be tracked, managed, and invoked for each organization for each type of product.

Other types of catalog management tool 900 include the map attribute tool 970 and consortium tool 980. The map attribute tool 970 manages various parameters of the procurement activity, such as product codes, parameter format, and unit of measure (UOM). For example, commodity code configuration parameters may be set through the map attribute tool 970 to determine if and how the category taxonomy is to be mapped to, for example, an organization's set of category/commodity values. The commodity codes may be modified as categories, sub-categories, and on down to the product level. The list of values may be set manually or imported/exported from/to an already existing file. As another example, universal product codes (e.g., UN/SPSC) and UOM may also be configured to be mapped to an internal organization codes for automatic conversion when searching, viewing, and ordering products. Further, UOM may be mapped from standard UOM to organization specific UOM. The consortium tool 980 defines various consortiums that an organization may be a member of and offer consortium pricing by designating a supplier as a consortium supplier. Hence, all organizations that are members of the consortium will be offered the consortium pricing set when ordering from the designated supplier.

As shown in FIG. 2, the server technology of the present invention includes a middleware/web methods server 224 that hosts a variety of features related to administrative services management, content management, and application management described above. The middleware/web methods server 224 may, for example, manage business rules (i.e., the relationships) between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to generate customized purchase orders in accordance with contractual or default business rules. Such purchase orders are created by the invoke requisition/purchase orders feature, which is invoked via processing modules that are executed on the custom database servers 222. Middleware/web methods server 224 may apply default ordering, sales, delivery, and other terms in the instance where an end user and supplier user do not have existing contractual terms or other arrangements.

Figure 10:
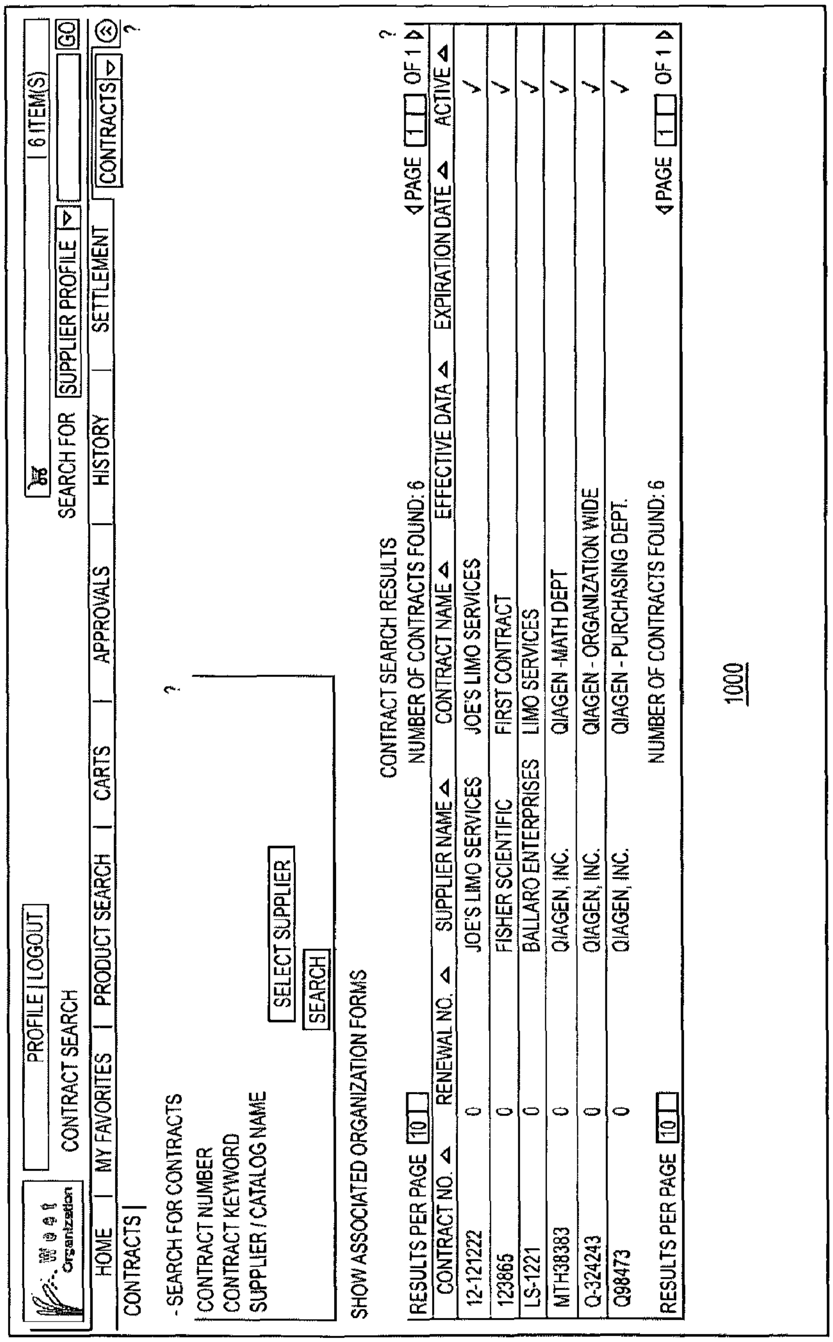
FIG. 10 illustrates an exemplary contracts management tool in accordance with the present invention.

The middleware/web methods server 224, as well as the transaction processing server 223, implements the price and file management feature to access existing contracts between end users and suppliers. The feature is usually implemented as a component of the middleware/web methods server 224, but may also be invoked via transaction processing modules that are executed on the transaction processing servers. Contract management algorithms may also be implemented as a sub-feature of the price and file management feature. For example, the algorithms are usually responsible for accessing, retrieving, and processing data from each respective end user and supplier that might have negotiated a contract. FIG. 10 illustrates an exemplary contracts management tool 1000 that may be used to manage the contracts between an organization and a supplier. The contract data is accessible by the transaction processing servers 223 and transaction database 238. Suppliers are able to submit product prices and other product related data via the price and file management feature. Furthermore, multiple pricing/currency schemes can be created by suppliers for end user organizations and may be based on contractual terms negotiated between end user organizations and suppliers. Individual end users within the same organization, for example, may be assigned different price/currency schemes that may be based on different contractual terms with an individual supplier. A designated end user (e.g., a "contract manager"), akin to a super user, can be assigned the responsibility for managing and choosing the pricing schemes displayed to each individual end user within the organization. The designated end user may also be tasked with ranking the spending thresholds for triggering a new price tier. Individual end users are capable of accessing pricing schemes for supplier products where the end users have been granted access by the designated end user or super user. By default, the lowest supplier pricing scheme available is first displayed to the end user, although other pricing schemes may also be available and accessible.

The following algorithm, for example, may be implemented to determine which pricing scheme should be displayed to an individual end user. First, all pricing schemes for a specific product may be denoted as accessible. A filter-type method may then be used to exclude pricing schemes denoted as inaccessible to the end user organization and, thus, allowing only accessible pricing schemes. Another filter-type method may be used to determine which accessible pricing schemes, if any, are related to contracts negotiated between the end user organization and accessible suppliers. If no pricing schemes are related to any contracts, then a default/general pricing scheme is displayed to the end user. Finally, if at least one pricing scheme is related to any related contracts, then a filter-type method excludes those pricing schemes related to contracts deemed inaccessible to this end user, and permits the accessible pricing schemes to be displayed. The displayed accessible pricing schemes would, however, be subject to the end user spending thresholds, which may be set by a super user. When an end user invokes the generation of a purchase/requisition order, the appropriate pricing scheme is referenced and can be based upon available contractual terms with the appropriate supplier.

An end user organization can manage pricing schemes such that distinct contracts are assigned to specific end users or super users. The feature to manage pricing schemes is invoked via transaction processing modules executed on the transaction processing servers 223. The specific end users or super users have the ability to approve or reject contracts, and set extended dates. Moreover, supplier users have the ability to create multiple pricing/currency schemes that may be based on contractual terms with end user organizations. Whether an individual end user/organization is a constituent of a trade group, department, or other organization, may influence the pricing/currency scheme determination. Supplier users can also have the ability to load single or multiple pricing/currency schemes for end users within the same data sink (e.g., hosted supplier products catalog), which may later be processed by the price and file management feature and assigned to each respective end user. Moreover, end users can designate specific products from supplier pricing/currency schemes as favorites. End user favorites can be dynamically updated with the lowest available supplier pricing scheme.

The transaction processing servers 223 of the present invention may execute transaction processing modules that query, update, and/or create data model instances within the transaction database 238. Moreover, end users can also approve, request to modify, or reject supplier products within hosted catalogs, and can also assign and route specific supplier products to other appropriate end users for review, dependent upon end user specific attributes like title within the organization. For example, certain end users may be able to access hazardous and/or expensive supplier products, while other end users may not be able to do so based on their precedence/role within the end user organization. Similarly, certain end users may also have the ability to make high-volume orders, while others may not. The hosted supplier products catalog 234 may be routinely updated by each supplier user at his/her discretion, or on a monthly, quarterly, or annual basis, and may contain data from suppliers such as, for example, custom product lists and end user organization-specific prices/currencies.

Figure 11A:
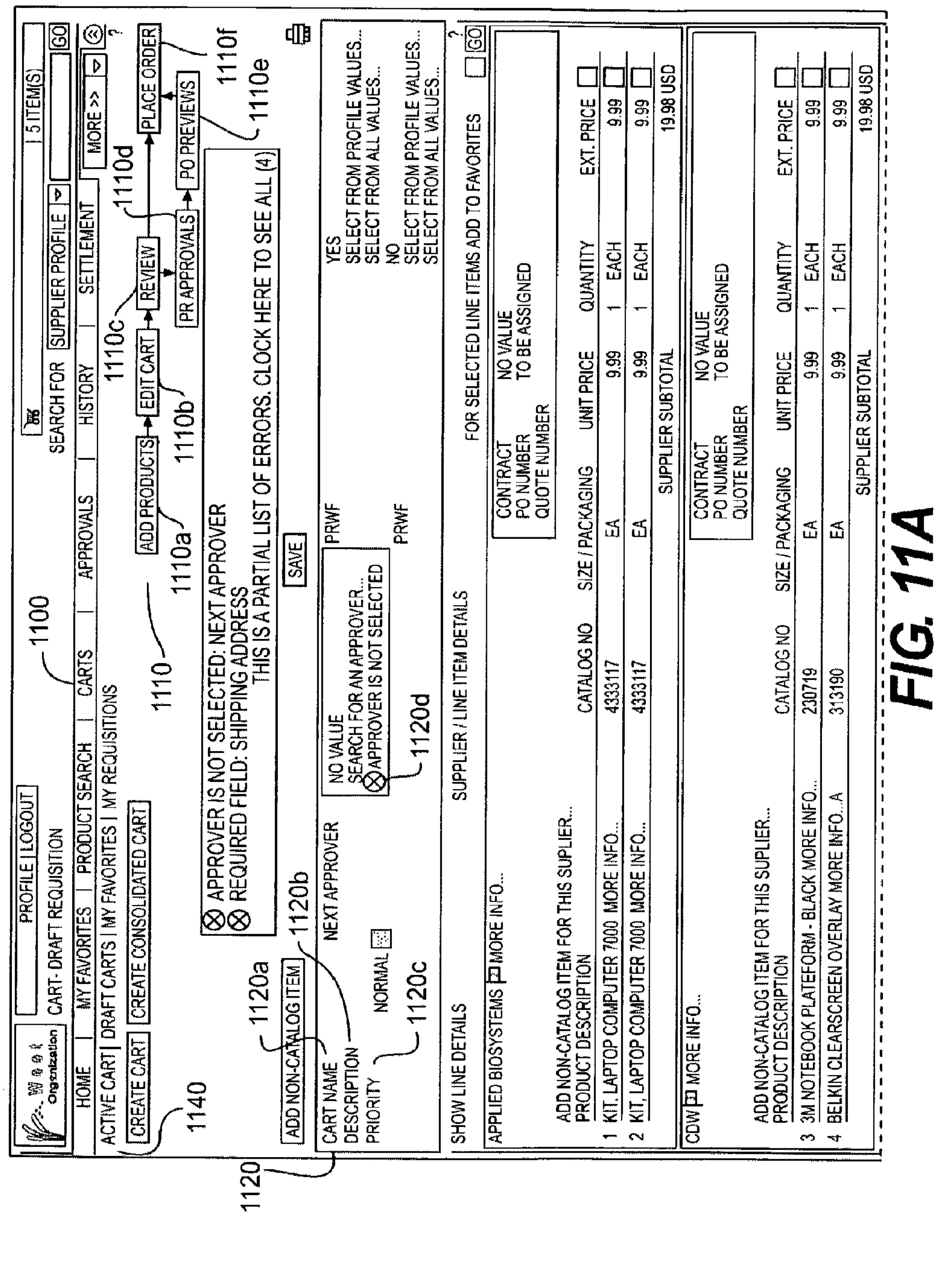
FIGS. 11A-D illustrates an exemplary cart and requisition tool in accordance with the present invention.
Figure 11A:
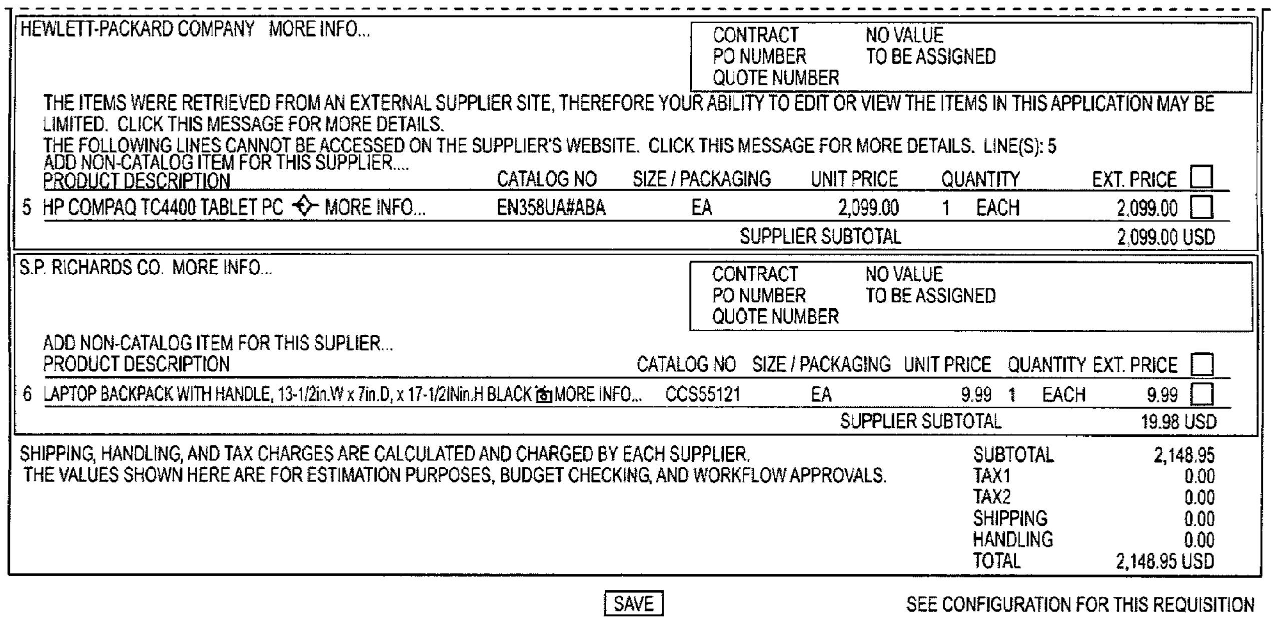

FIG. 11A illustrates an exemplary cart and requisition tool 1100 in accordance with the present invention. As shown in FIG. 11A, the cart and requisition tool 1100 includes an active cart 1140 for tracking the items designated for purchase from the search results described above. In an exemplary embodiment illustrated in FIG. 11A, the active cart 1140 includes requisition workflow tool 1110 that displays a live view of the requisition process for the items in the cart. For example, the requisition workflow tool 1110 displays the status of the requisition from the point at which a product is added 1110*a*, the cart is edited 1110*b*, the requisition is reviewed 1110*c*, and the order is placed 1110*f*. The requisition workflow tool 1110 further displays a purchase requisition approval step 1110*d* as well as a purchase order preview step 1110*e*. Each of the status boxes 1110*a*-1110*f* of the requisition workflow tool 1110 may be invoked to activate the tool that manages the corresponding status. For example, invoking the "Add Products" box 1110*a* (e.g., clicking on the box) activates the search engine to search for additional products to be added to the cart 1140. Invoking the "Edit Cart" box 1110*b* activates the active cart 1140 for editing the products in the cart. Invoking the "Review" box 1110*c* activates a summary of the products included in the requisition, including, for example, accounting codes, billing and shipping addresses, and other customizable data elements that may be configured by the user's organization. Invoking the "PR Approvals" box 1110*d* displays the set of workflow/approval steps an invoked requisition will be processed through prior to order creation. Invoking the "PO Preview" box 1110*e* activates a list of purchase orders that are generated if the invoked requisition is approved. Invoking the "Place Order" box 1110*f* submits the invoked requisition to the steps of the workflow/approval process.

Cart information 1120 such as cart name 1120*a*, description 1120*b*, priority 1120*c*, and assigned approver 1120*d* are also displayed and may be edited. The cart information 1120 further includes supplier and line item details organized alphabetically, for example, according to each supplier's name, and lists each chosen product description, catalog number, size and/or packaging data, unit price, quantity ordered, price, and currency. For each supplier there is also a corresponding supplier subtotal that is calculated according to the total of products chosen by the user.

Figure 11B:
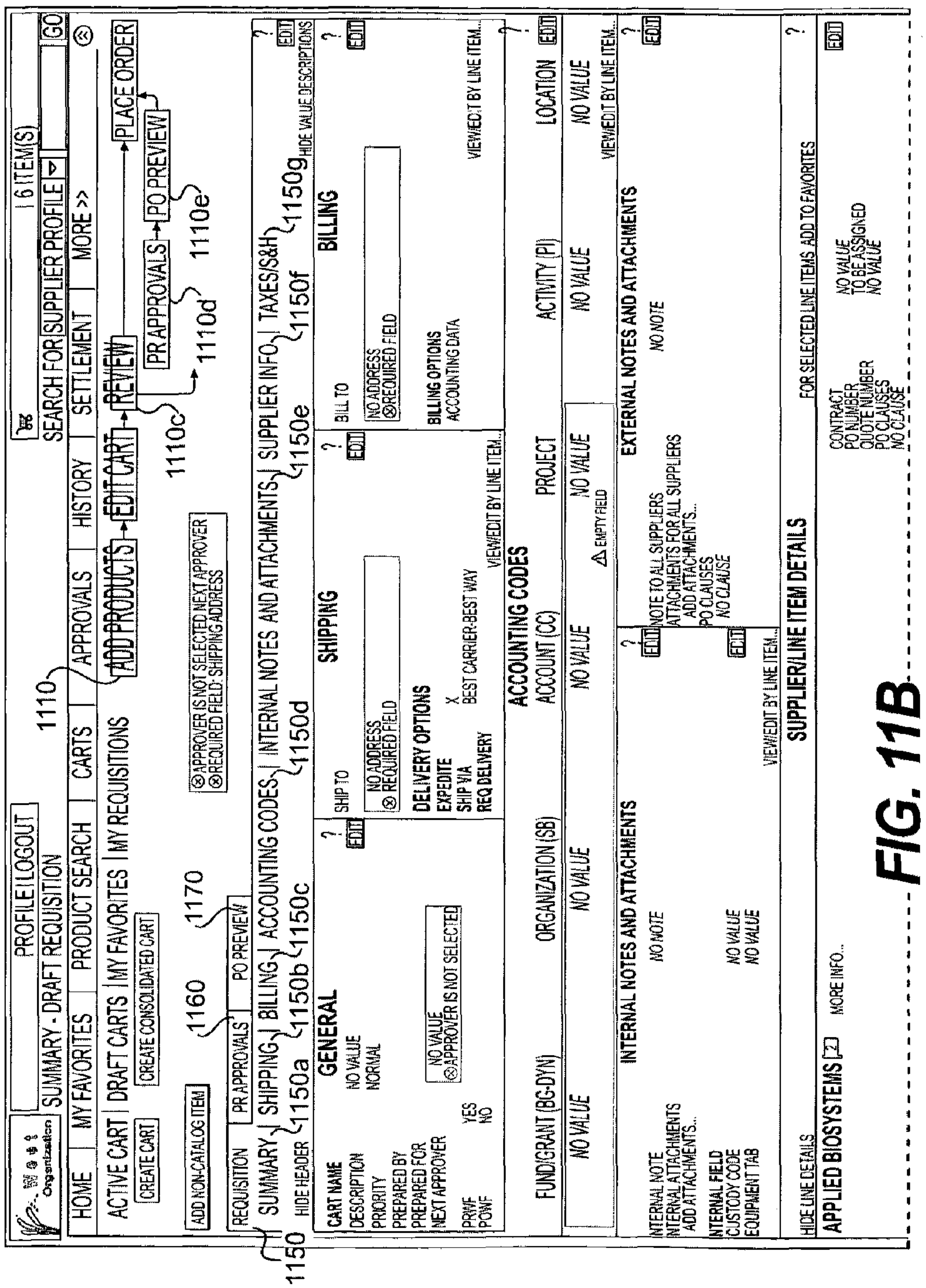
Figure 11B:
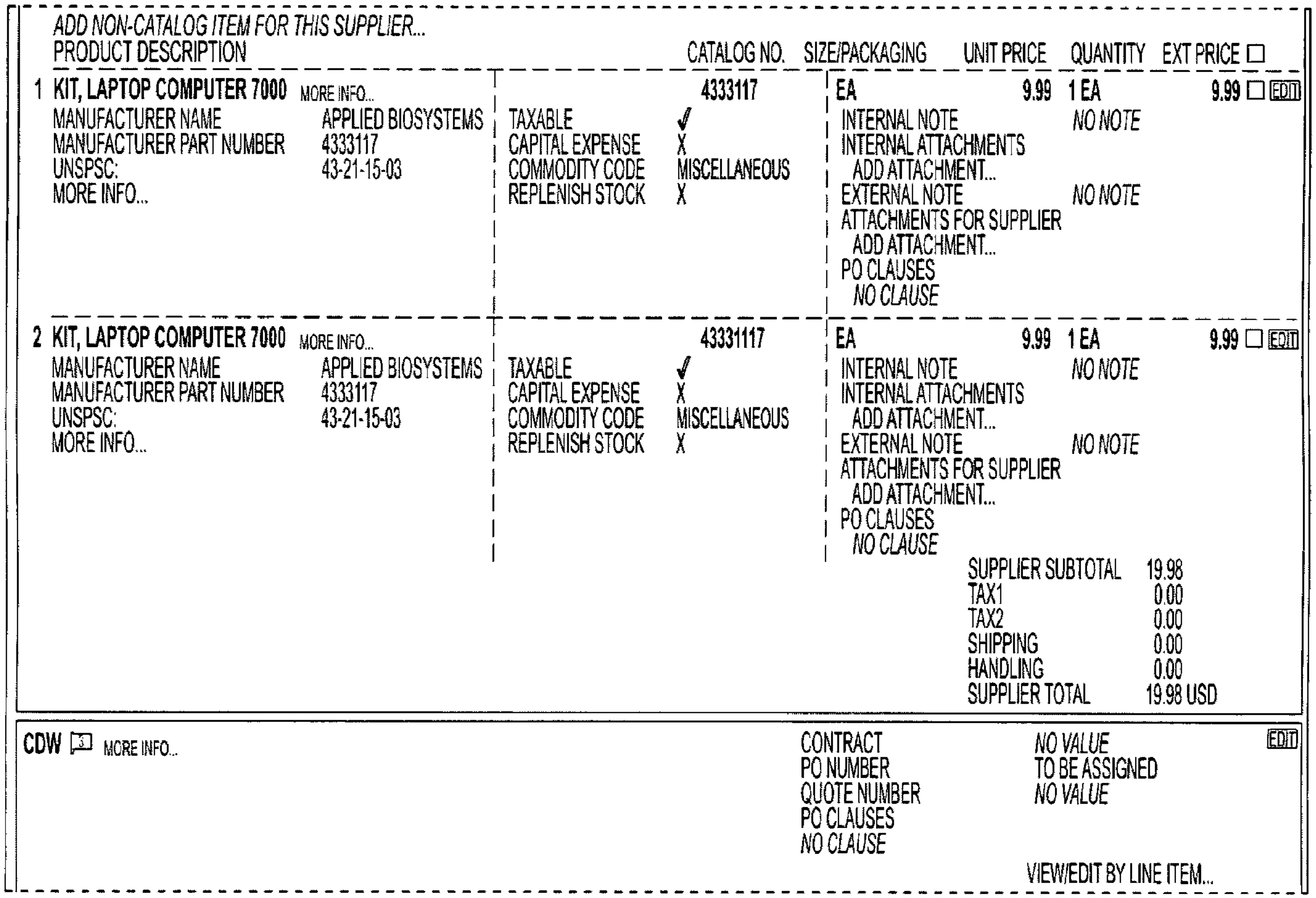
Figure 11B:
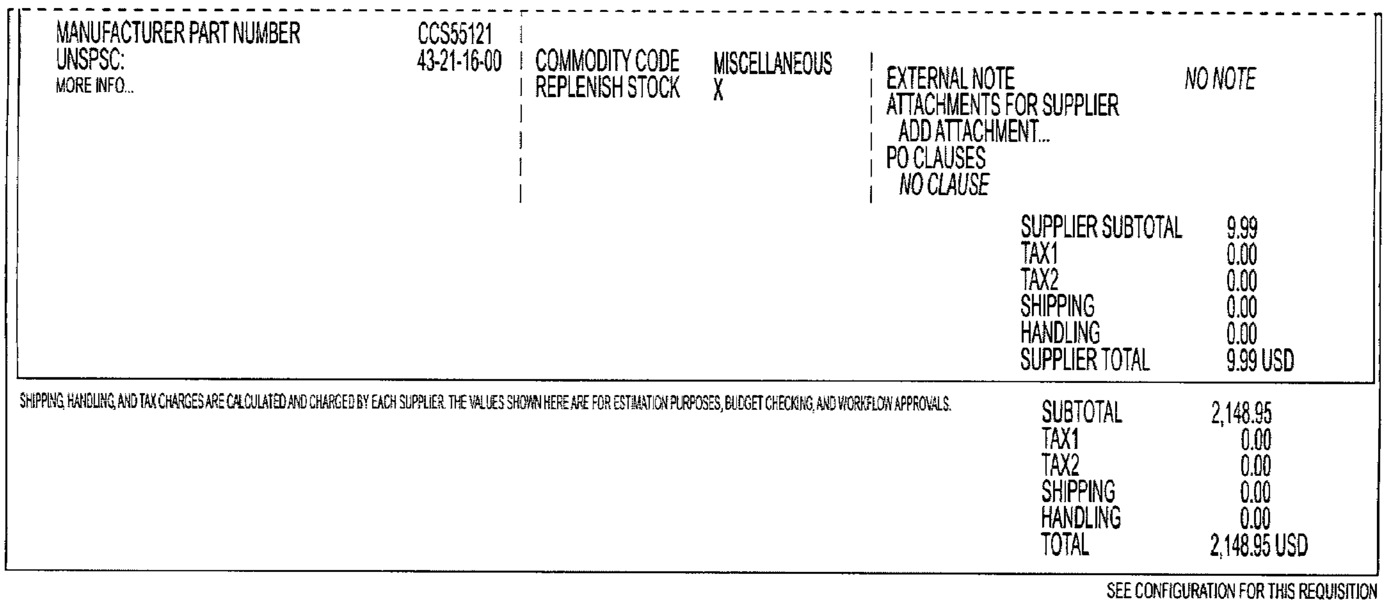

FIG. 11B illustrates further details of the exemplary cart and requisition tool 1100 in accordance with the present invention. As shown, the cart and requisition tool 1100 includes a requisition review tool 1150, purchase request approval tool 1160, and purchase order preview tool 1170. As described above, the various status boxes (e.g., 1110*c*-1110*e*) in the requisition workflow tool 1110 activate the corresponding tool 1150-1170. As shown in FIG. 11B, the requisition review tool 1150 displays information about the requisition being built. For example, as shown, the requisition review tool 1150 includes a summary page 1150*a* that displays all the information regarding the requisition being reviewed, such as the general information, shipping information, billing information, accounting codes, internal/external notes and attachments, as well as supplier/line item details of the products in the cart 1140. All of the information shown in the requisition summary page 1150*a* may be edited by invoking the corresponding tool, such as the shipping/handling tool 1150*b*, billing tool 1150*c*, accounting code tool 1150*d*, notes and attachment tool 1150*e*, supplier information tool 1150*f*, and taxes/S&H pricing tool 1150*g*.

For instance, the shipping/handling tool 1150*b* may be used to set the shipping address of the products in the purchase order as well as designate delivery options, such as "expedite," "shipping method," and "requested delivery date." The billing tool 1150*c* may be used to set the billing address and billing options, such as accounting dates. The accounting tool 1150*d* may be used to designate the accounting information of the requisition, such as any fund/grant contacts, organization information, account numbers, product codes, activity summaries, and location. The notes and attachments tool 1150*e* may be used to designate any internal codes associated with the products in the purchase order, such as custody codes and equipment codes used in the organization. The supplier information tool 1150*f* may be used to assign or modify supplier information for the products in the order, such as contract information with the supplier, purchase order number, quote number, and purchase order clauses. The taxes/S&H tool 1150*g* may be used to define the tax/S&H information related to purchases from a particular supplier, such as tax percentage and/or S&H cost from total purchase price (e.g., 0% tax, free shipping if over $200 purchase, etc.).

Figure 11C:
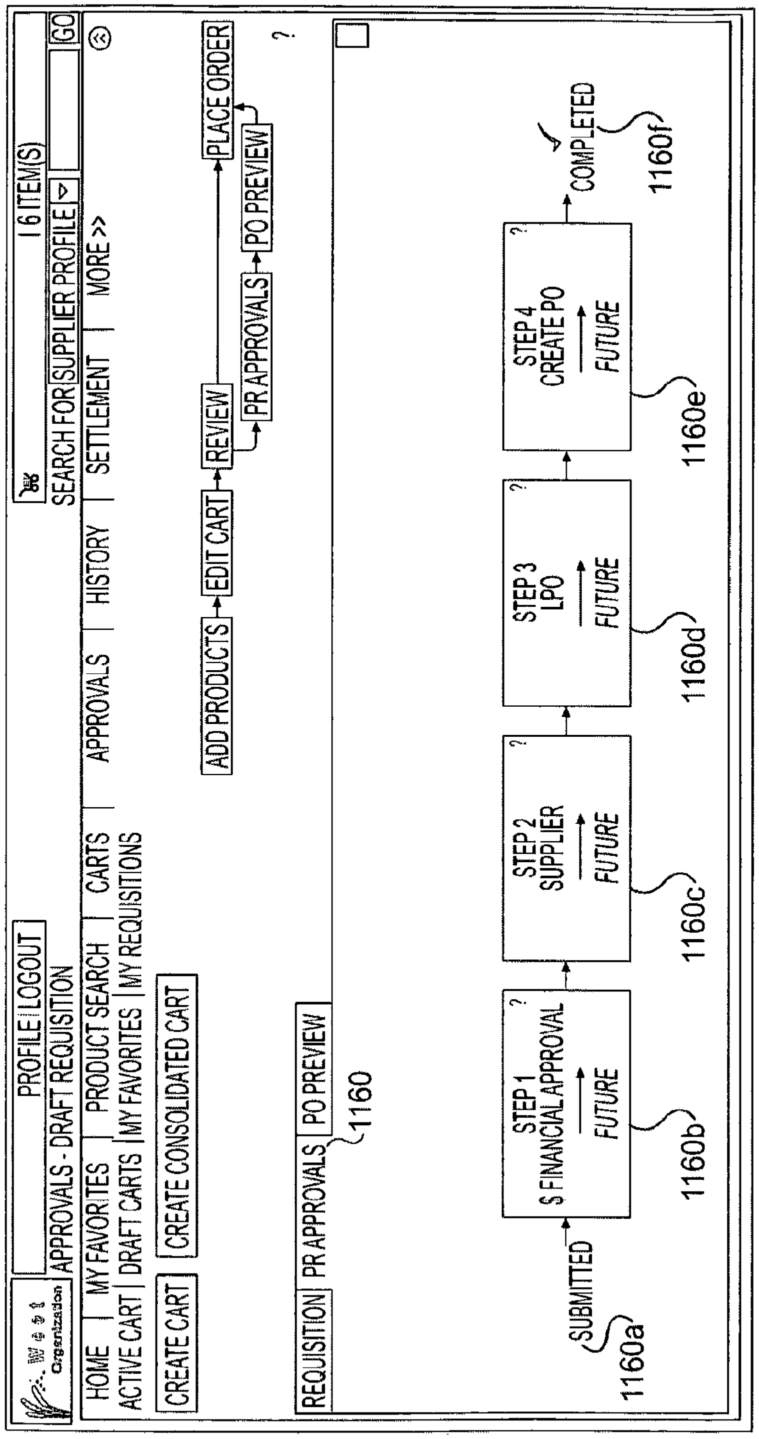

FIG. 11C illustrates an exemplary purchase request approval tool 1160 that corresponds to the purchase requisition approval step 1110*d* in accordance with the present invention. The exemplary purchase request approval tool 1160 graphically portrays the status of the requisition being reviewed (e.g., submission of the purchase requisition 1160*a*, financial approval 1160*b*, supplier approval/processing 1160*c*, LPO 1160*d*, purchase order creation 1160*e*, and completion 1160*f*). As with the requisition workflow tool 1110 (FIG. 11B), each workflow/approval step status box may be invoked to activate a tool, corresponding to each workflow/approval step, to view the reason(s) underlying the workflow engine's invocation of that step. Other intervening or superseding steps may also be portrayed without departing from the scope of the present invention.

Figure 11D:
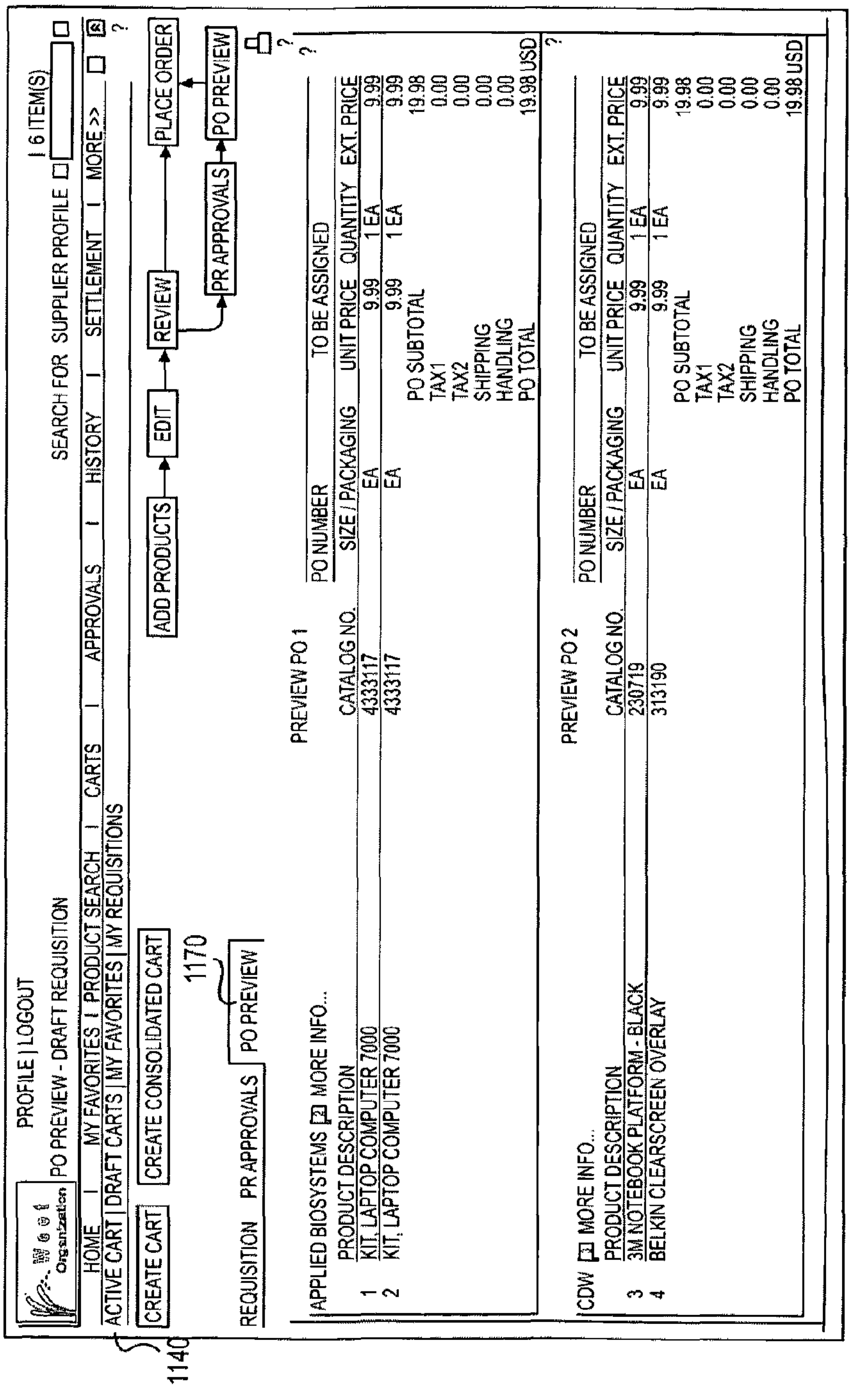

FIG. 11D illustrates an exemplary purchase order preview tool 1170 that corresponds to the purchase order preview step 1110*e* in accordance with the present invention. The purchase order preview tool 1170 permits the user to preview the purchase orders that will be generated from the current active cart 1140. The active cart 1140 corresponding to that user is queried and the preview purchase orders are displayed, as shown, in alphabetical order according to supplier name. Other methods of ordering or retrieving the purchase orders corresponding to the user may also be used without departing from the scope of the present invention.

With reference to FIG. 2, the feature to invoke purchase/requisition orders may be hosted on the middleware/web methods servers 224 and managed by the eProcurement architecture of the present invention such that it is executed consistently with end user and supplier user business rules as described above. From a high-level point-of-view, this feature is implemented based on whether the order information sought to be processed by an end user is internal to the organization or supplier related. If the information is internal, it is processed accordingly via the end user 212, the middleware/web methods servers 224, through to the custom database servers 222, and then to the hosted supplier products catalog 234; otherwise, the information is processed similarly except that the appropriate supplier related databases (e.g., the master product database 236, and the transaction database 238) may also be invoked.

An auto purchase order feature is available via the middleware/web methods servers 224 and is invoked via transaction processing modules executed on the transaction processing server 223, and can populate entries of a purchase order in accordance with applicable end user and supplier contractual terms. The auto purchase order feature allows for the generation of distribution, and payment, rule-based purchase orders based on the customizations effectuated by a super user of the organization in the manner described above. For example, the feature can automatically insert legal terms (e.g., the right to cure product defects, what constitutes rejection and/or revocation of an order, what may constitute a material defect, the seller's return policy, the buyer's acceptance policy, etc.), as well as other non-legal terms and conditions (e.g., preferred delivery dates, shipping and handling instructions, appropriate contact/authorized personnel, payment and receipt of payment instructions, etc.), based on a contract that may be in place between an end user organization and a supplier. If no contract is in place, then the auto purchase order feature may prompt the user or automatically insert default terms and conditions, whether legal or non-legal. The feature may create receipts for each end user initiated transaction/purchase order and add multiple transactions/purchase orders to a single receipt. For capable suppliers, automated responses can be accepted for display to the end user. Such automated responses may include, for example, order acknowledgement and advanced shipping notice. Also, a document search sub-feature allows searching any existing transactions/purchase orders. The auto purchase order feature also supports supplier pricing schemes modeled using the U.S. Dollar as well as all other currency types (e.g., Euro, Yen, Pound, Peso, etc.).

Figure 12:
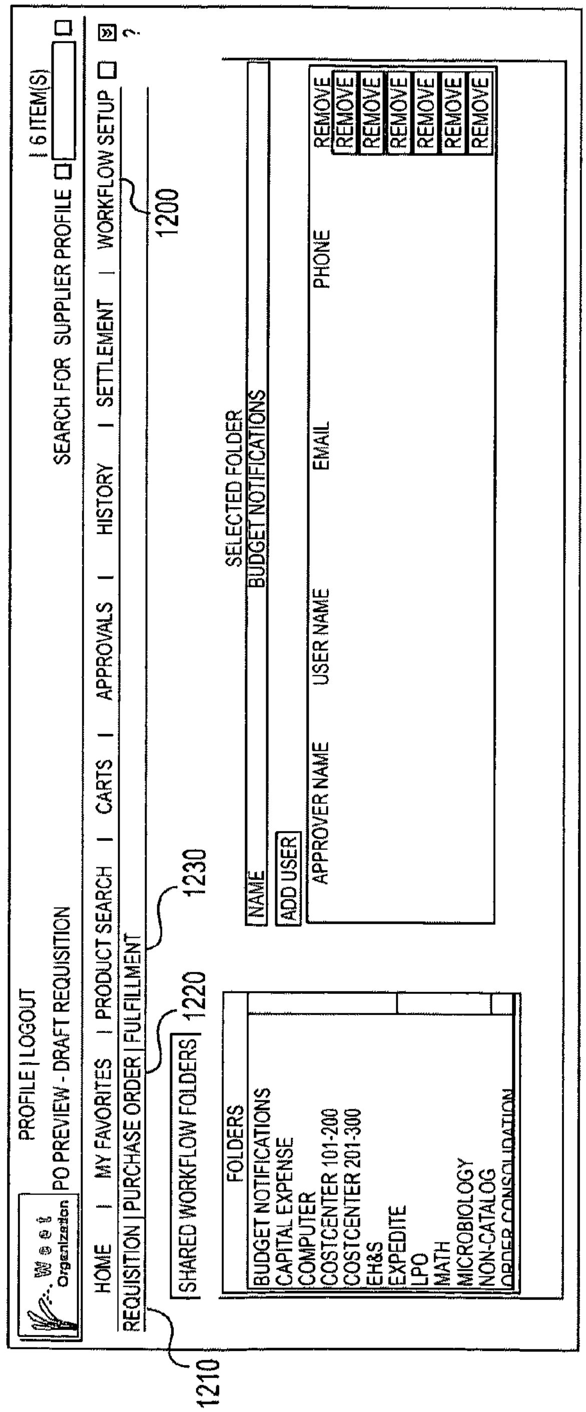
FIG. 12 illustrates an exemplary workflow setup tool in accordance with the present invention.

FIG. 12 illustrates an exemplary workflow setup tool in accordance with the present invention. As shown, the workflow setup tool 1200 includes requisition workflow tool 1210, purchase order setup tool 1220, and fulfillment setup tool 1230. These tools are used to setup various aspects of the workflow process as described above. For example, as shown in FIG. 12, the purchase order setup tool 1220 may be used to designate the names of approvers to review and approve purchase orders for a particular organization. As shown, the approver list may be customized for different departments (e.g., Math), types of products (e.g., non-catalog item), and even for specific users. Similarly, the requisition setup tool 1210 and fulfillment setup tool 1230 may be used to designate approvers for requests and fulfillment processes, respectively. Other workflow parameters may be further defined without departing from the scope of the present invention.

Figure 13:
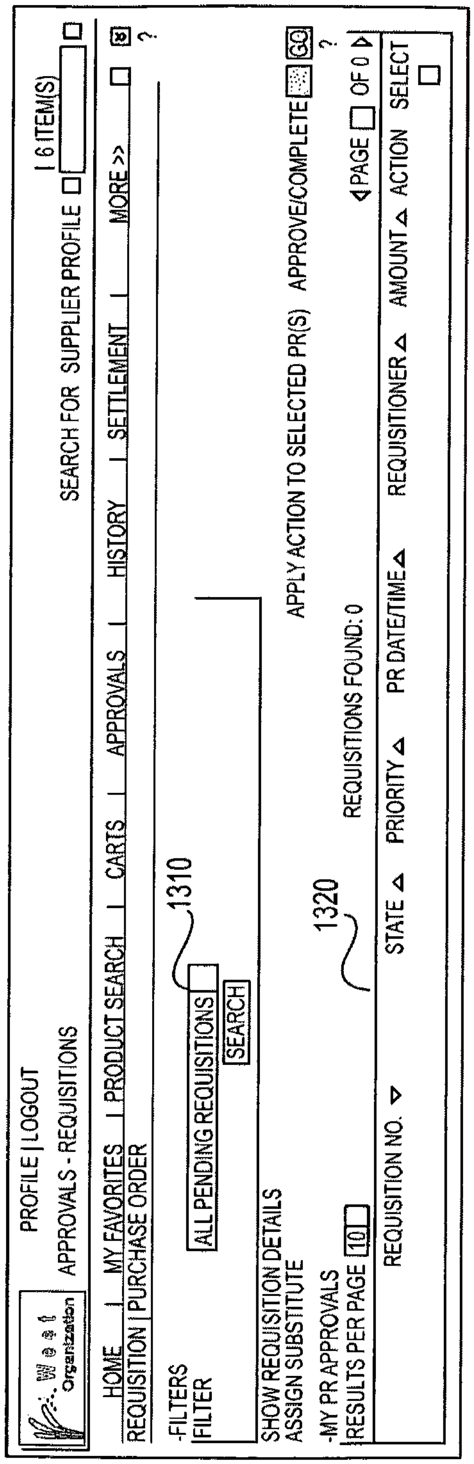
FIG. 13 illustrates an exemplary purchase order approval tool in accordance with the present invention.

FIG. 13 illustrates an exemplary purchase order approval tool in accordance with the present invention. As shown, purchase order search engine 1310 searches through all of the purchase orders generated by the eProcurement system of the present invention for each of the hosted organizations. The results of the search may be filtered based on display criteria such as "Approver" (e.g., user responsible for approving the document), "Approval Queues," "All Pending Requisitions," "Urgent Approvals," "Unassigned Approvals," "Future Approvals," and "Manual Filter" options. The result list of the purchase orders are displayed in the display portion 1320 with such information as P.O. number, status of the P.O., priority level of the P.O., the date/time of the submission for approval, the name of the requester, the designated supplier, the amount, and selectable options. Using the purchase order approval tool, the approvers as well as the requisitioners may monitor the status of the requests and ascertain where the request is in the workflow process. Using the tools described above, the user may drill down to the lowest level of the request to determine what needs to be done to move the request along if it becomes bottlenecked in the process, for example.

At the conclusion of the ordering process, an approval/rejection of orders feature may be implemented also through the middleware/web methods server 224, as well as the transaction processing server 223. The approve/reject order feature is invoked via a transaction processing module that is executed on the transaction processing servers 223. This feature can be managed by the middleware/web methods server 224 such that it is executed consistently with end user and supplier user business rules. For example, one advantage of this feature is its ability to provide notice of an approved or rejected order to an end user or super user.

Figure 14:
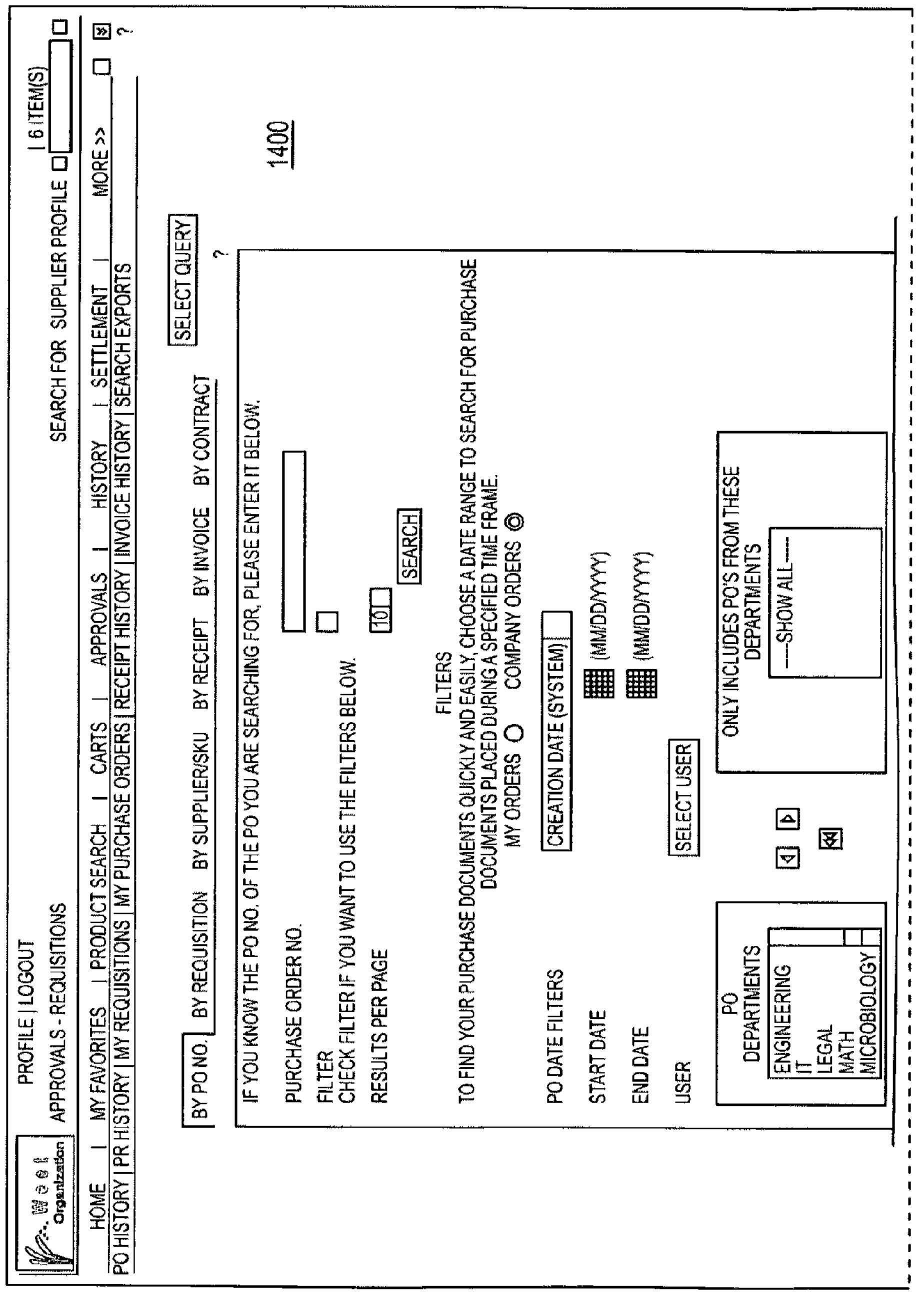
FIG. 14 illustrates an exemplary history tool in accordance with the present invention.
Figure 14:
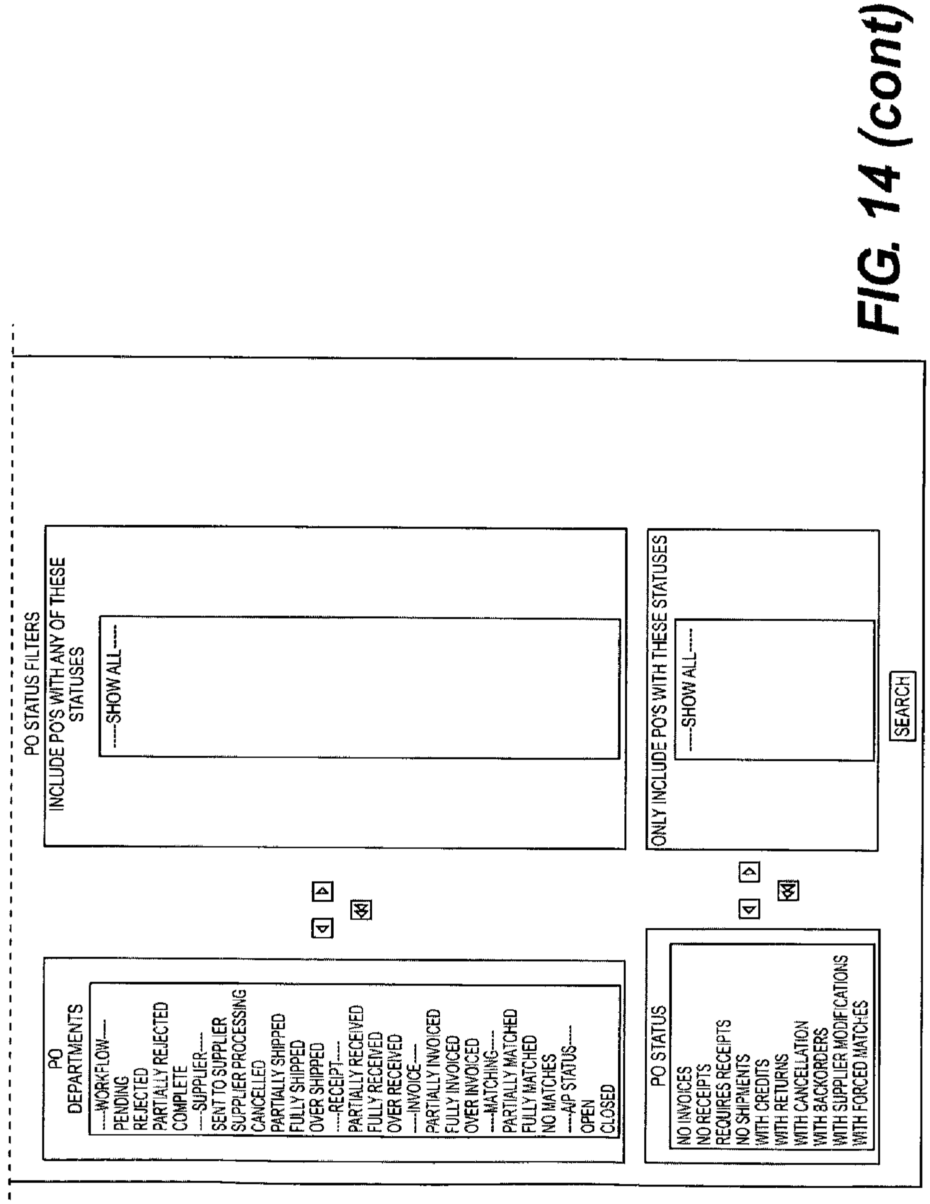

FIG. 14 illustrates an exemplary history tool in accordance with the present invention. The eProcurement system in accordance with the present invention keeps a history of all requests, purchase orders, receipts, invoices, and actions (e.g., edits to parameters) made in the system that may be searched and reviewed. History tool 1400, for example, includes a tool to search for purchase order histories, purchase request histories, receipt histories, and invoice histories. The searches may be made by purchase order number, by requisition, by supplier/SKU numbers, by receipts, by invoices, and by contracts. These parameters may be filtered by dates, users, as well as other specifics of the history being sought.

Finally, a supplier configuration feature may be implemented. This feature allows for the capability to have a supplier master that hosts multiple fulfillment centers. Also, this feature allows for an order processing feature with multiple payment/currency methods for each fulfillment center, the execution of shipping and handling rules, and order distribution features. The order distribution features can include such features as facsimile or email confirmation, as well as other delivery methods, organized hierarchically to ensure purchase order delivery.

Figure 15:
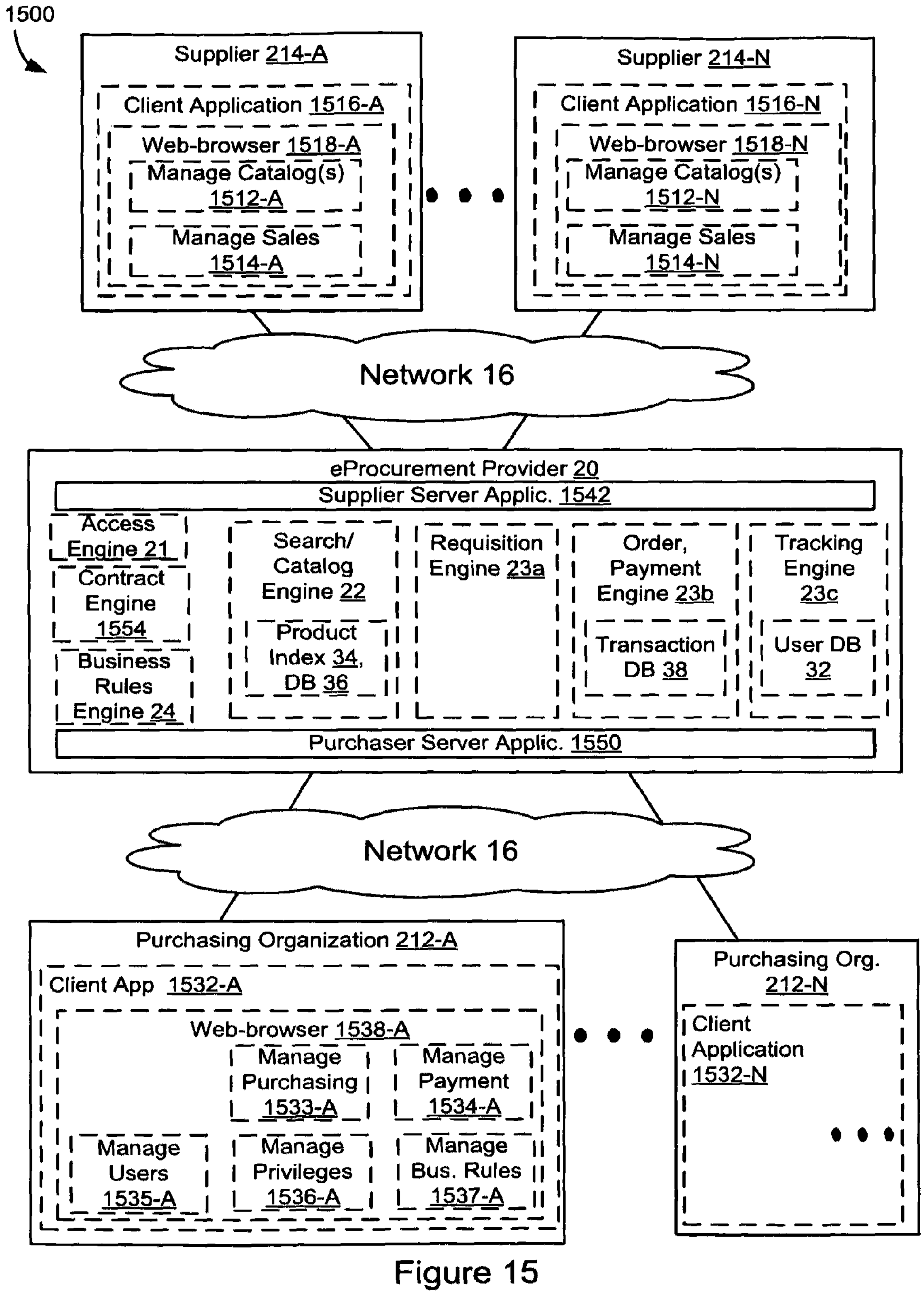
FIG. 15 illustrates the electronic procurement system communicating over a network with suppliers and purchasing organizations.

FIG. 15 is a block diagram of the electronic procurement system 20 communicating over a network 16 with suppliers 214-A (to 214-N) and purchasing organizations 212-A (to 212-N). The electronic procurement system 20 generally includes a supplier server application 1542 and purchaser server application 1550, which may interface with the access engine 21, contract engine 1554, search/catalog engine 22, requisition engine 23*a*, order/payment engine 23*b*, tracking engine 23*c*, and business rules engine 24.

As described, business rules describe and control the relationships between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to be able to generate customized purchase orders, in accordance with contractual or default business rules.

Non-limiting examples of business rules include:

If the extended price of any line item exceeds the limit set in a users profile, route to the users financial approver.

If the total value of the requisition exceeds the limit set in a users profile, route to the users financial approver.

If a requisition sent to a user for financial approval exceeds the users approval authority set in the users profile, route the requisition to the users financial approver.

If the requisition contains suppliers classified by a users organization as "IT Vendors," send the requisition to the CIO.

Requisitions for the Math Department over $10,000 are routed to the Vice Chancellor of Liberal Arts.

If any item on the PO is radioactive, route the PO to the environmental health and safety (EH&S) Department for review and approval.

If any item on the PO is classified as hazardous, notify the EH&S Department. No approval is required.

If the account code for a line item on the requisition has a budget, and the requisition will exceed the budget, route the requisition to the Budget Manager.

If the user adds a non-catalog item to their requisition, route it to the Purchasing Department to validate the information entered.

If a requisition is marked for expediting, skip all rules and route directly to the Purchasing Department.

All the above examples of business rules are exemplary and not intended as limiting.

The supplier server application 1542 and purchaser server application 1550 may also interface with the transaction engine 23, which may include the requisition module 23*a*, order/payment engine 23*b*, and the tracking engine 23*c*. Moreover, the supplier server application 1542 and purchaser server application 1550 may send and receive data from the data repository 30, which includes the user database 32, the product index database 34, the product database 36, and the transaction database 38. The engines may communicate via function/method calls, file libraries, and database queries. The contract engine 1554 executes the necessary functions for implementing the contract management feature, which manages and links new or existing procurement contracts, formed between buyer organizations and supplier organization, with a group. For example, a new or existing contract is initially stored in the contracts database 3200 (as described in FIG. 32) and may routinely be updated in accordance with amendments (e.g., extensions, additions of agreed upon terms, assignments, or the like) or other contractual events (e.g., the expenditure of quantity/time/spending limits (i.e., tiers), price fluctuations—e.g., rebates or price reductions, item changes or additions, etc.); at such time intervals as determined by the contract engine 1554, the group is updated accordingly. The group includes, for example, buyer users, supplier users, the business rules engine 24, items, forms, purchase requisitions/orders, sales orders/invoices, and buyer invoices. Furthermore, the contract engine 1554 also supports contract searching (as described in FIG. 10) based on specific user-specified criteria like, for example, contract number, contract keyword, or supplier/catalog name.

The supplier server application 1542 communicates with a supplier 214-A (to (214-N) over network 16 and the purchaser server application 1550 communicates with a buyer 212-A (also referred to herein as a purchasing organization) over network 16. A supplier user would use a client application 1516-A (to 1516-N) to communicate with, generally, the electronic procurement provider 20 and, specifically, the supplier server application 1542. The client application 1516-A (to 1516-N) may be a web-browser 1518-A (to 1518-N) for the supplier user to use, or may be a standalone application. The web-browser 1518-A or standalone application may display features to manage catalog(s) 1512-A (to 1512-N) and manage sales 1514-A (to 1514-N), which may be communicated via the supplier server application 1542 and displayed to the supplier user. A buyer user would use a client application 1532-A (to 1532-N) to communicate with, generally, the electronic procurement provider 20 and, specifically, the purchaser server application 1550. The client application 1532-A (to 1532-N) may contain a web-browser 1538-A (to 1538-N) for the buyer user to use, or may be a standalone application. The web-browser 1538-A or standalone application may display features to manage purchasing 1533-A (to 1533-N), manage payment 1534-A (to 1534-N), manage users 1535-A (to 1535-N), manage privileges 1536-A (to 1536-N), and/or manage business rules 1537-A (to 1537-N), which may be communicated via the purchaser server application 1550 and displayed to a buyer user. For example, a user that sends a request to the system 20 that is outside the scope of that user's privileges would receive an appropriate denial response from the system 20 and, more specifically, for example, from the manage privileges 1536-A feature.

Figure 16:
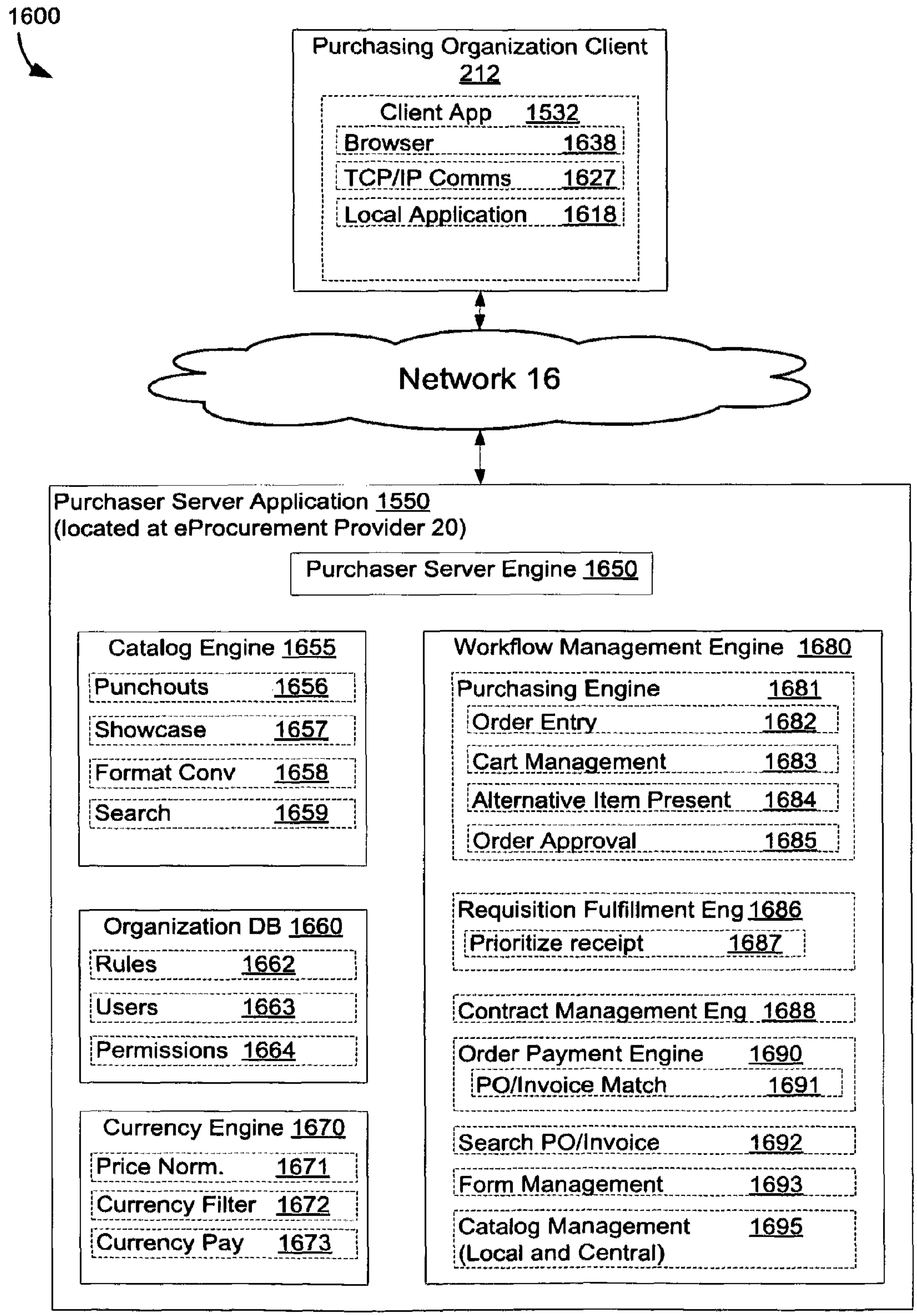
FIG. 16 illustrates the purchasing organization client communicating over a network with the purchaser server application to access the engines of the purchaser server application.

FIG. 16 is a block diagram of the buyer 212 communicating with the purchaser server application 1550, located at the electronic procurement provider 20, over a network 16. The purchaser server engine 1650 may interface with or include the following modules, or a subset thereof:

- a catalog engine 1655 for managing each supplier catalog by implementing features for uploading catalog data, linking to the proper punch-out catalog(s) (1656) via the punch-out module 22*a* and back to the buyer, managing supplier showcase promotions and overlays (1657), converting supplier catalog data into a common data format (1658), and interfacing with the search engine 22 for searching the master product database or other accessible database of the electronic procurement system 20;
- an organization database 1660 for storing organization specific information like, for example, business rules (1662), user-related data (1663), or permissions (1664);
- a currency engine 1670 for implementing multi-currency features like, for example, normalizing a plurality of currency data (1671) into a default or preferred currency, interfacing with the search engine 22 to return item search results to a buyer user who sent a request to organize/filter the search results (1672) according to a specific currency, or determining the default or preferred currency with which a supplier requests or requires payment; or
- a workflow management engine 1680 for managing the flow of purchase requisitions to the appropriate approver (via the requisition fulfillment engine 1686) (which may be prioritized via the prioritize receipt feature 1687 based on user hierarchy, privileges, or business rules), sending the approved requisition back to the appropriate buyer user (via the requisition fulfillment engine 1686), interfacing with the search engine 22 to locate an appropriate requisition and/or purchase order (via the search PO/Invoice feature 1692), forwarding a purchase order to the appropriate supplier (via the requisition fulfillment engine 1686), forwarding a sales order and/or invoice from the supplier to the appropriate buyer user (via the order payment engine 1690 and using the PO/Invoice match feature 1691 for linking a purchase order on the buyer user side with an incoming invoice from the supplier), or sending event updates to the contract engine 1554 (via the contract management engine 1688).

Moreover, the workflow management engine 1680 may also interface with a purchasing engine 1681 that receives orders (via an order entry feature 1682), manage the items a buyer user places in a cart or moves/assigns to a new cart (via a cart management feature 1683), present alternative items to a buyer in lieu of items chosen for requisitioning that are not available according to privileges, inventory or a contractual agreement (via an alternative item present feature 1684), or approve an order if approved by the appropriate approver user (via an order approval feature 1685). In addition, the workflow management engine 1680 may also interface with a form management engine 1693 for receiving requisitions and orders via user-created custom forms stored in a forms database 2300. Once received, the requisitions and orders are then routed to approvers and suppliers, respectively, according to workflow business rules. And, the workflow management engine 1680 also interfaces with the catalog management feature 1695 for retrieving item data related to the items present in the requisitions, orders, or invoices being processed by the workflow management engine 1680.

Figure 17:
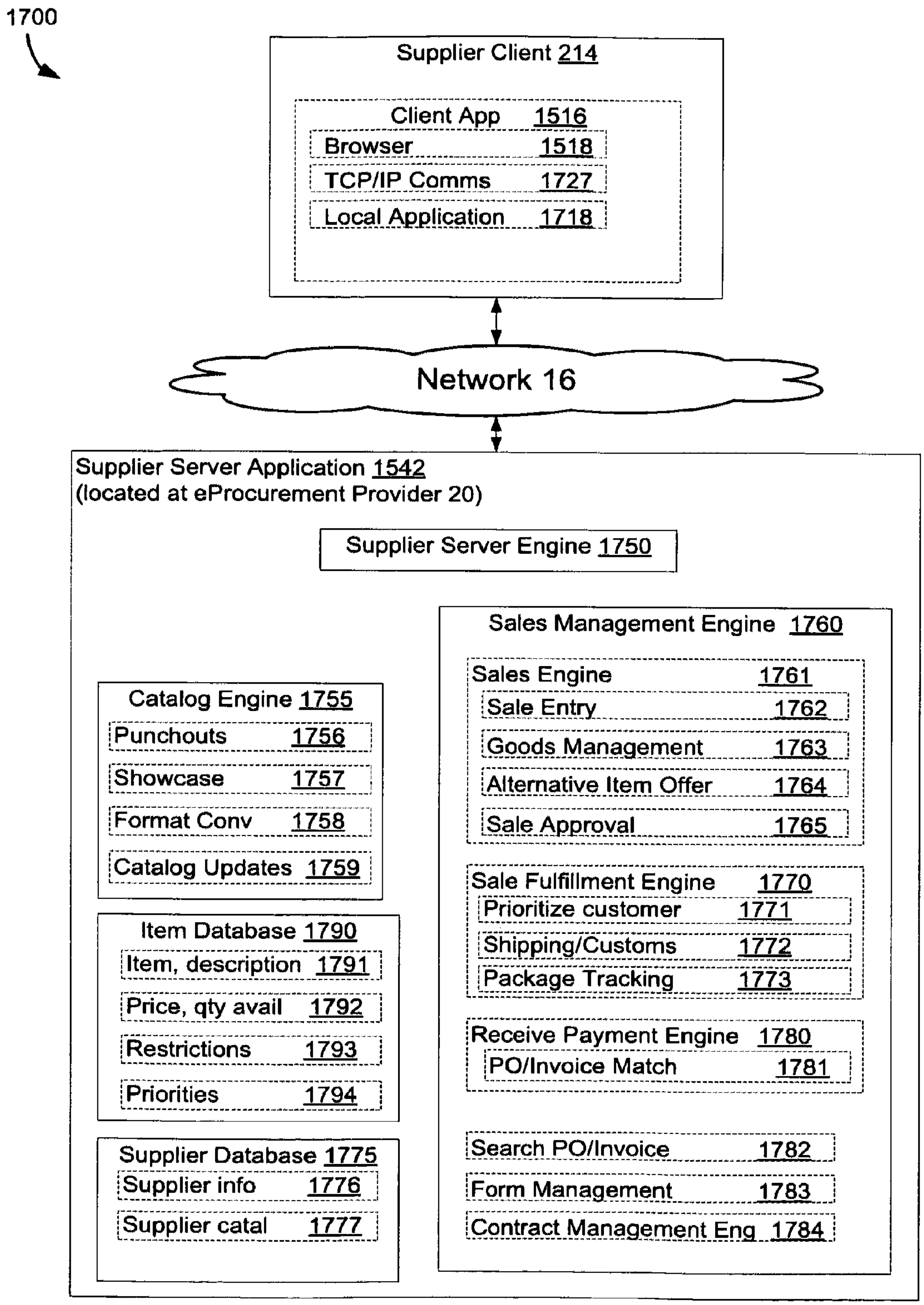
FIG. 17 illustrates the supplier client communicating over a network with the supplier server application to access the engines of the supplier server application.

FIG. 17 is a block diagram of the supplier 214 communicating with the supplier server application 1542, located at the electronic procurement provider 20, over a network 16. The supplier server engine 1750 may interface with or include the following modules, or a subset thereof:

- a catalog engine 1755 for managing each supplier catalog by implementing features for uploading catalog data, linking to the proper punch-out catalog(s) (1756) via the punch-out module 22*a* and back to the buyer, managing supplier showcase promotions and overlays (1757), converting supplier catalog data into a common data format (1758), and interfacing (1759) with the catalog management feature 1695 for updating the master product database or other accessible supplier-related database of the electronic procurement system 20;
- an item database 1790 for storing item specific information like, for example, item description (1791), price and quantity available (1792), restrictions (1793), or priorities (1794);
- a supplier database 1775 for storing supplier specific information like, for example, detailed supplier data (1776), or supplier catalog data (1777); or
- a sales management engine 1760 for managing the flow of sales orders and sales invoices from the appropriate buyer to the appropriate supplier (via the sale fulfillment engine 1770) (which may be prioritized (via the prioritize customer feature 1771) based on buyer/user hierarchy, privileges, or business rules), shipping (1772) and tracking (1773) the ordered item(s) to the appropriate buyer, interfacing with the search engine 22 to locate an appropriate purchase order and/or invoice (via the search PO/Invoice feature 1782), forwarding an invoice to the appropriate buyer (via the sale fulfillment engine 1770), receiving payment on an invoice from a buyer to the appropriate supplier (via the receive payment engine 1780 and using the PO/Invoice match feature 1781 for linking a sales order on the supplier user side with an outgoing invoice from the supplier), or sending event updates to the contract engine 1554 (via the contract management engine 1784).

Moreover, the sales management engine 1760 may also interface with a sales engine 1761 that receives sales orders (via an sale entry feature 1762), manage the items (e.g., goods and/or services) a buyer user requested via the sales order (via a goods management feature 1763), present alternative items to a buyer in lieu of items chosen for ordering that are not available according to inventory or business rules like a contractual agreement (via an alternative item present feature 1764), or approve a sales order if the item(s) is available and complies with business rules (via a sale approval feature 1765). In addition, the workflow management engine 1680 may also interface with a form management engine 1783 for receiving sales orders via user-created custom forms stored in a forms database 2300. Once received, the sales orders are then routed to the appropriate supplier user(s), respectively, according to workflow business rules.

Then, the process of fulfilling the order is initiated and managed by the sales fulfillment engine 1770.

Figure 18:
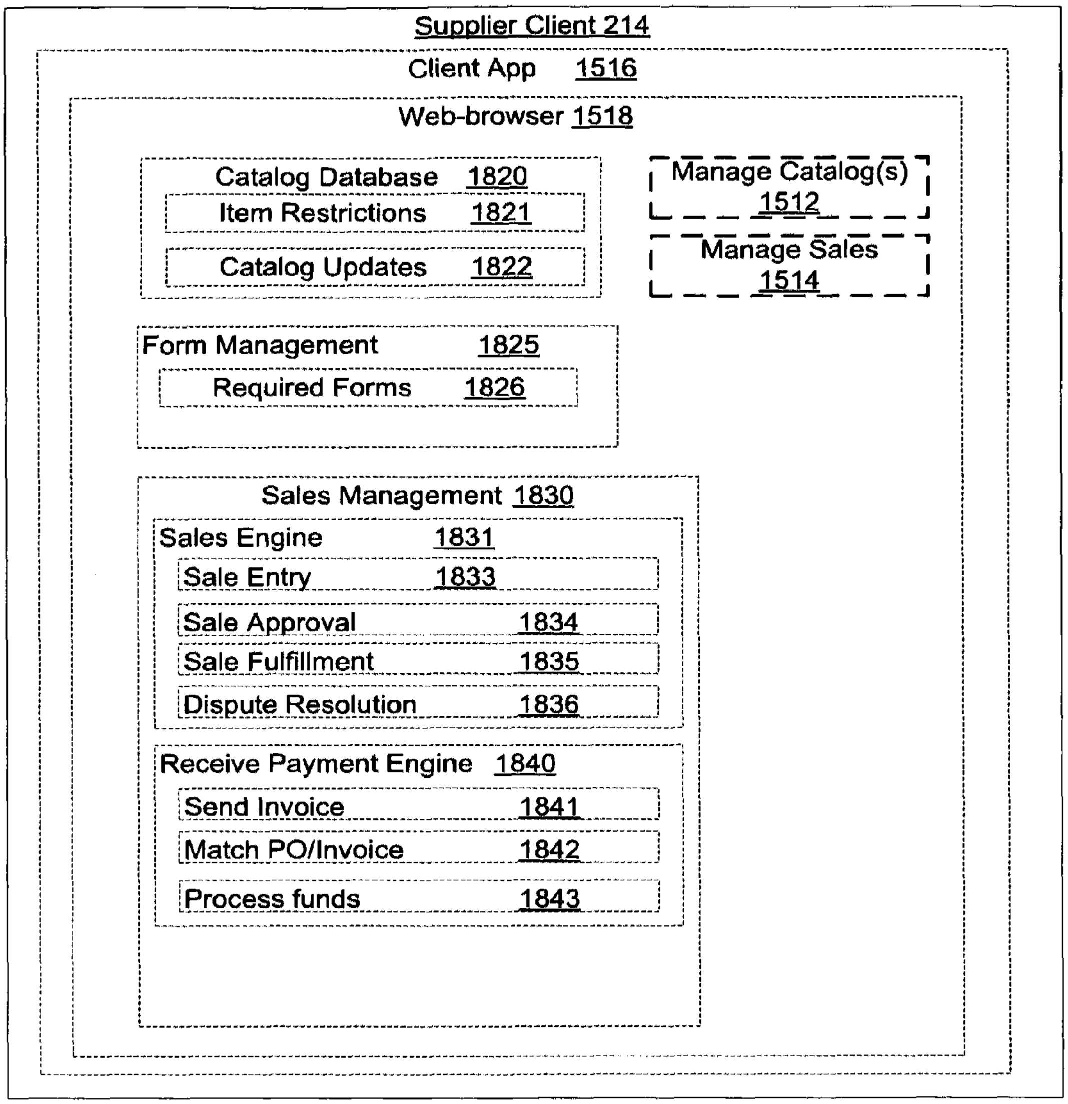
FIG. 18 illustrates the features and database accessible via the supplier client.

FIG. 18 is a block diagram of a supplier client 214. The client application 1516 may be a web-browser 1518 for the supplier user to use, or may be a standalone application. The web-browser 1518 or standalone application may display features for:

- managing catalog(s) 1512;
- managing sales 1514;
- interfacing with the catalog database 1820 to, for example, input or view item restrictions 1821, or to make catalog updates 1822;
- managing forms 1825 by, for example, customizing required forms 1826;
- managing sales 1830 by, for example, entering sales data 1833, approving sales 1834, fulfilling sales orders 1835, and addressing disputes that may arise 1836; or
- processing invoices and payments 1840 by, for example, sending invoices 1841, matching purchase orders to invoices 1842, or processing funds 1843.

Figure 19:
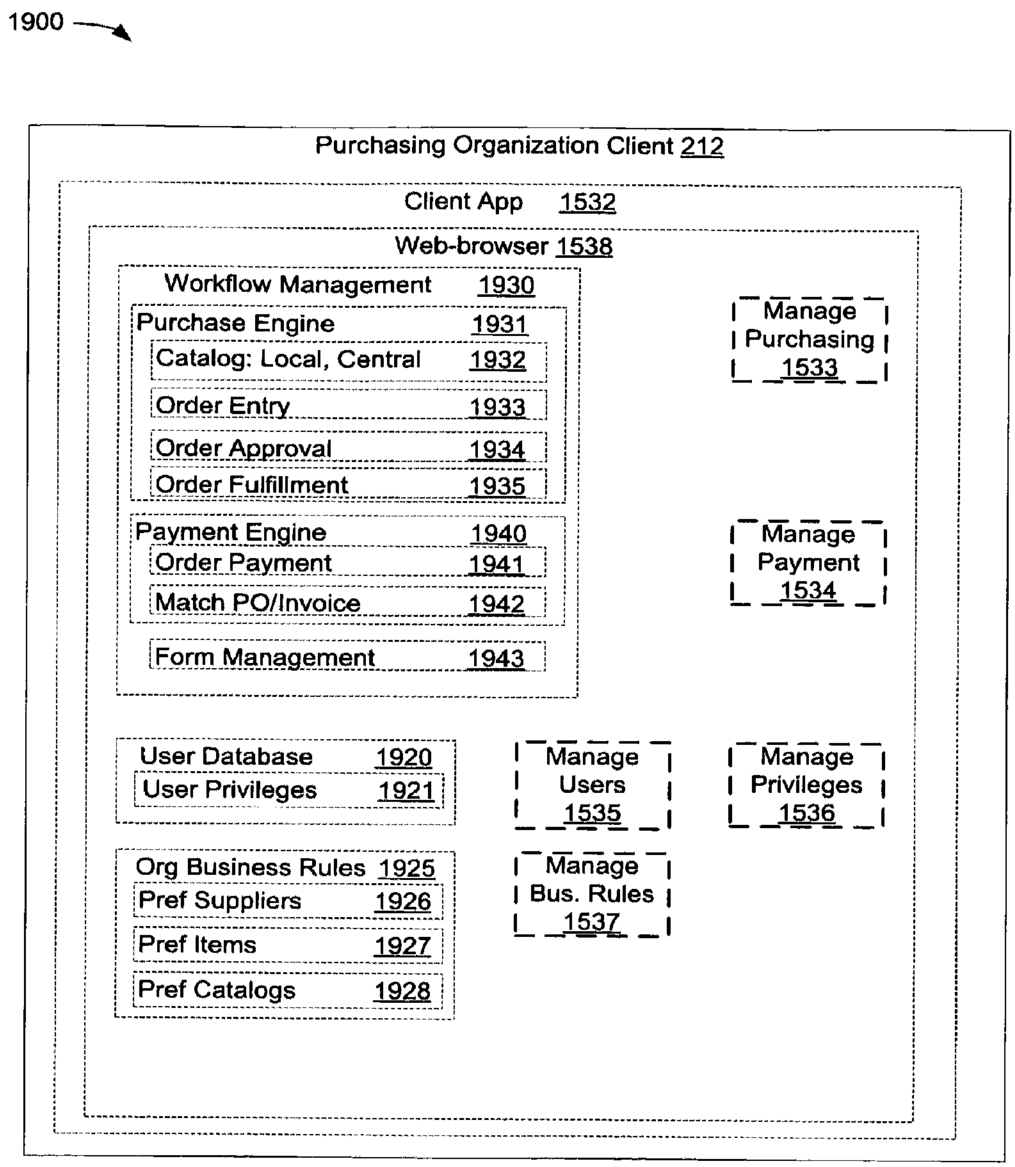
FIG. 19 illustrates the features and database accessible via the purchasing organization client.

FIG. 19 is a block diagram of a purchasing organization client 212. The client application 1532 may be a web-browser 1538 for the buyer user to use, or may be a standalone application. The web-browser 1538 or standalone application may display features to manage purchasing 1533, manage payment 1534, manage users 1535, manage privileges 1536, or manage business rules 1537. In addition, the web-browser 1538 or standalone application may also display features for:

- interfacing with the user database 1920 to, for example, access or define user privileges 1921;
- managing a buyer organization's business rules 1925 to, for example, define preferred suppliers 1926, items 1927, or catalogs 1928;
- managing workflows 1930 like, for example:
  - the flow of purchase requisitions within the buyer organization,
  - access to catalogs 1932 as may be necessary (via a purchase engine 1931) for forwarding a purchase requisition or order appropriately for approval,
  - order entry 1933, order approval 1934, order fulfillment 1935 (all via a purchase engine 1931), or
  - forwarding a sales order and/or invoice from the supplier to the appropriate buyer user (via the payment engine 1940 and using the PO/Invoice match feature 1942 for linking a purchase order on the buyer user side with an incoming invoice from the supplier), processing payment on the order's invoice 1941 (via the payment engine 1940), or forwarding of a user-customized form in accordance with business rules.

Figure 20:
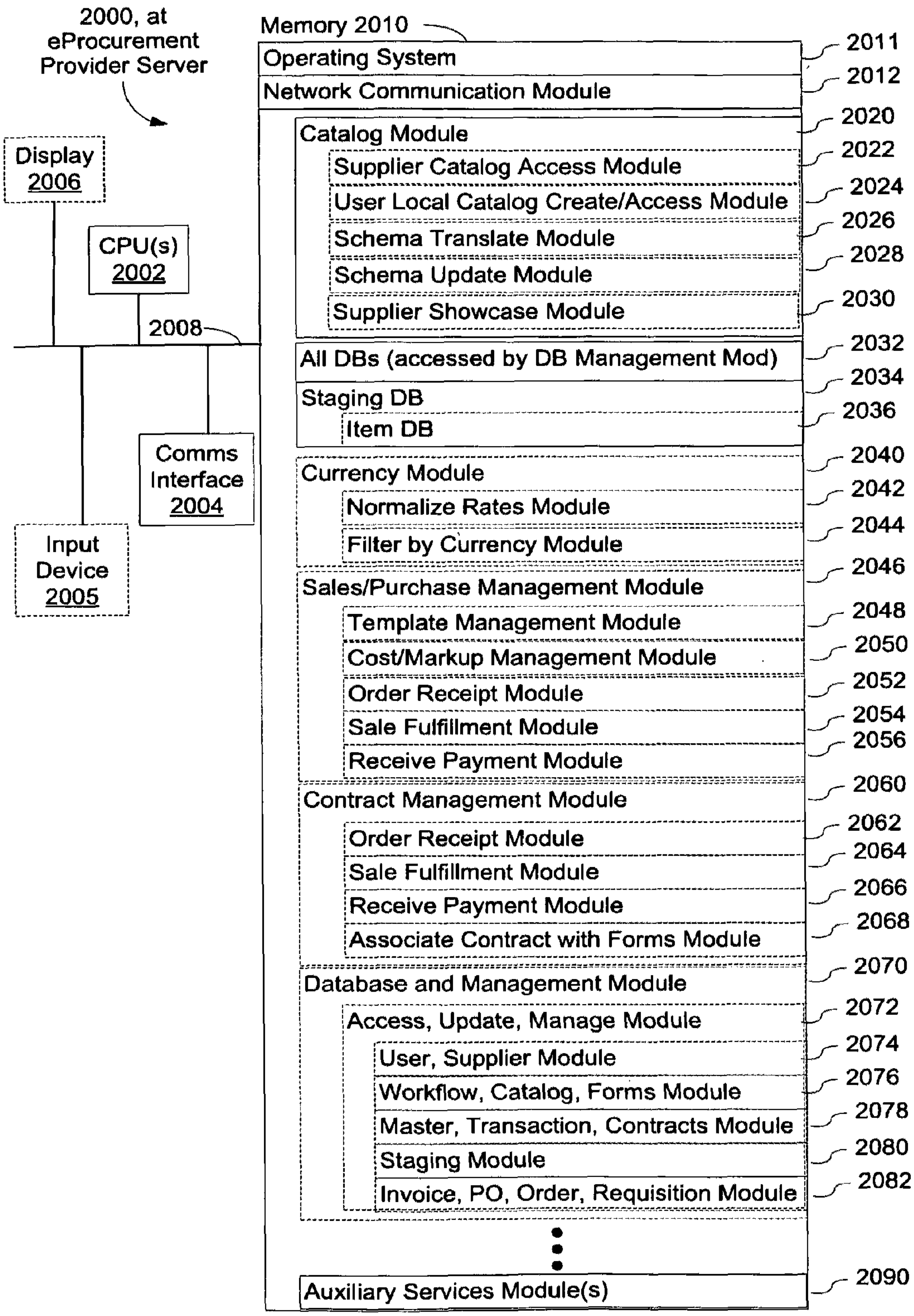
FIG. 20 illustrates a server system hosting an electronic procurement system running on the server.

FIG. 20 is a block diagram of a server system 2000. The server system 2000 generally includes one or more processing units (CPU's) 2002, one or more network or other communications interfaces 2004, memory 2010, and one or more communication buses 2008 for interconnecting these components. The communication buses 2008 may include circuitry (sometimes called a chipset) that interconnects and controls communications between system components. The server system 2000 may optionally include a user interface, for instance a display 2006 and an input device 2005. Memory 2010 may include high speed random access memory and may also include non-volatile memory, such as one or more magnetic disk storage devices. Memory 2010 may include mass storage that is remotely located from the central processing unit(s) 2002. Memory 2010 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, memory 2010 stores the following programs, modules and data structures, or a subset thereof:

- an operating system 2011 that includes procedures for handling various basic system services and for performing hardware dependent tasks;
- a network communication module 2012 that is used for connecting the server system 2000 to other computers via the one or more communication network interfaces 2004 (wired or wireless) and one or more communication networks, such as the Internet, other wide area networks, local area networks, metropolitan area networks, and so on;
- a catalog module 2020 that provides information and prices about products in hosted supplier product catalogs;
- databases 2032;
- a staging database 2034;
- a currency module 2040;
- a sales/purchase management module 2046;
- a contract management module 2060;
- a database and management module 2070; and
- auxiliary services modules 2090.

The catalog module 2020 may include the following modules, or a subset thereof:

- supplier catalog access module 2022 for providing suppliers with access to their respective hosted supplier product catalogs;
- a user local catalog create/access module 2024 for providing users (purchasing organizations) with local catalogs, in one embodiment generated by the respective users, from which the users can order products from suppliers who are not associated with hosted supplier product catalogs. In one embodiment, a supplier in the local catalogs is a local service provider (e.g. catering or a limousine service) from which a user wants to order products and services using the electronic procurement system;
- a schema translate module 2026 for translating catalog data provided by suppliers or purchasing data provided by users into a common format associated with the electronic procurement system;
- a schema update module 2028 for updating data in the common format associated with the electronic procurement system in response to changes in the respective catalog data or purchasing data; and
- a supplier showcase module 2030 for promoting certain suppliers to users of a purchasing organization, which in an embodiment may be performed according to business rules.

The databases 2032 may include all databases used by the system. These databases may in one embodiment be stored as logical partitions in a memory. These databases may in another embodiment be stored as tables in a larger database. These databases may in yet another embodiment be stored in separate memory or storage devices.

The staging database 2034 may comprise a catalog development environment (i.e., a staging area) for catalogs associated with suppliers. The data in the staging area may include complete catalogs, incomplete catalogs in development, partially uploaded catalogs, etc. A supplier can choose to make any or all portions of their respective catalog(s) in the staging database 'live' by syndicating the respective portions. A live catalog is one from which a user or purchasing organization may order items. The item database 2036, which may be a subset of the staging database 2034, contains descriptions, characteristics, price, pictures and other pertinent information for items listed in the catalogs.

The currency module 2040 may include the following modules, or a subset thereof:

- a normalize rates module 2042 for normalizing currency rates visible by a purchaser of goods and/or services, purchasing from suppliers using different currencies to that of the purchaser, or by a supplier of goods and services selling to purchasers using different currencies to the supplier; and
- a filter by currency module for allowing purchasers to filter suppliers according to currencies they do business in, or allowing suppliers to filter purchasers similarly.

The sales/purchase management module 2046 may include the following modules, or a subset thereof:

- a template management module 2048, for managing templates used by suppliers or purchasers of the system in placing orders for goods or services;
- a cost/markup management module 2050 for determining characteristics (e.g., average cost) of inventory and managing the inventory based on the characteristics and a markup rate;
- order receipt module 2052 for determining that an order has been received, and preparing to fulfill the order;
- sale fulfillment module 2054 for fulfilling the order, including invoicing and shipping goods to the purchaser; and
- a receive payment module 2056 for receiving payment associated with an order (both for fulfilled and unfulfilled orders).

The contract management module 2060 may include the following modules, or a subset thereof:

- order receipt module for 2062 for determining that an order has been received and matching the order to a contract;
- sale fulfillment module 2064 for associating fulfillment of an order with a contract and verifying that the received order complies with the contract;
- receive payment module 2066 for associating payments with a contract and verifying that appropriate discounts and terms of the contract are reflected in the payment;
- associate contract with forms module 2068 for associating the contract with forms used by a supplier or purchaser, such that terms of the contract apply to the form.

The database and management module 2070 may include the following modules, or a subset thereof:

- Access, update and manage database module 2072 for accessing, updating and managing databases in the system, including:
  - user (purchaser) and supplier module 2074, for managing user database 32 as described, which is accessed by a buyer user 12 or supplier user 14 through access module 21 as described;
  - workflow, catalog and forms module 2076, for managing workflow database 3000, catalog database 2400, and forms database 2300 as described;
  - master, transaction and contracts module 2078, for managing master database 236, transaction database 238 ad contracts database 3200 as described;
  - staging module 2080, for managing staging database 3100 as described;
  - invoice, purchase order, order, and requisition module 2082, for managing invoice databases 3300 and 3400, order database 2900 and 2500, requisition database 2700 as described.

The auxiliary services module may include additional features or services related to operation, management, security, authentication, maintenance or other aspects of the electronic procurement system.

Figure 21:
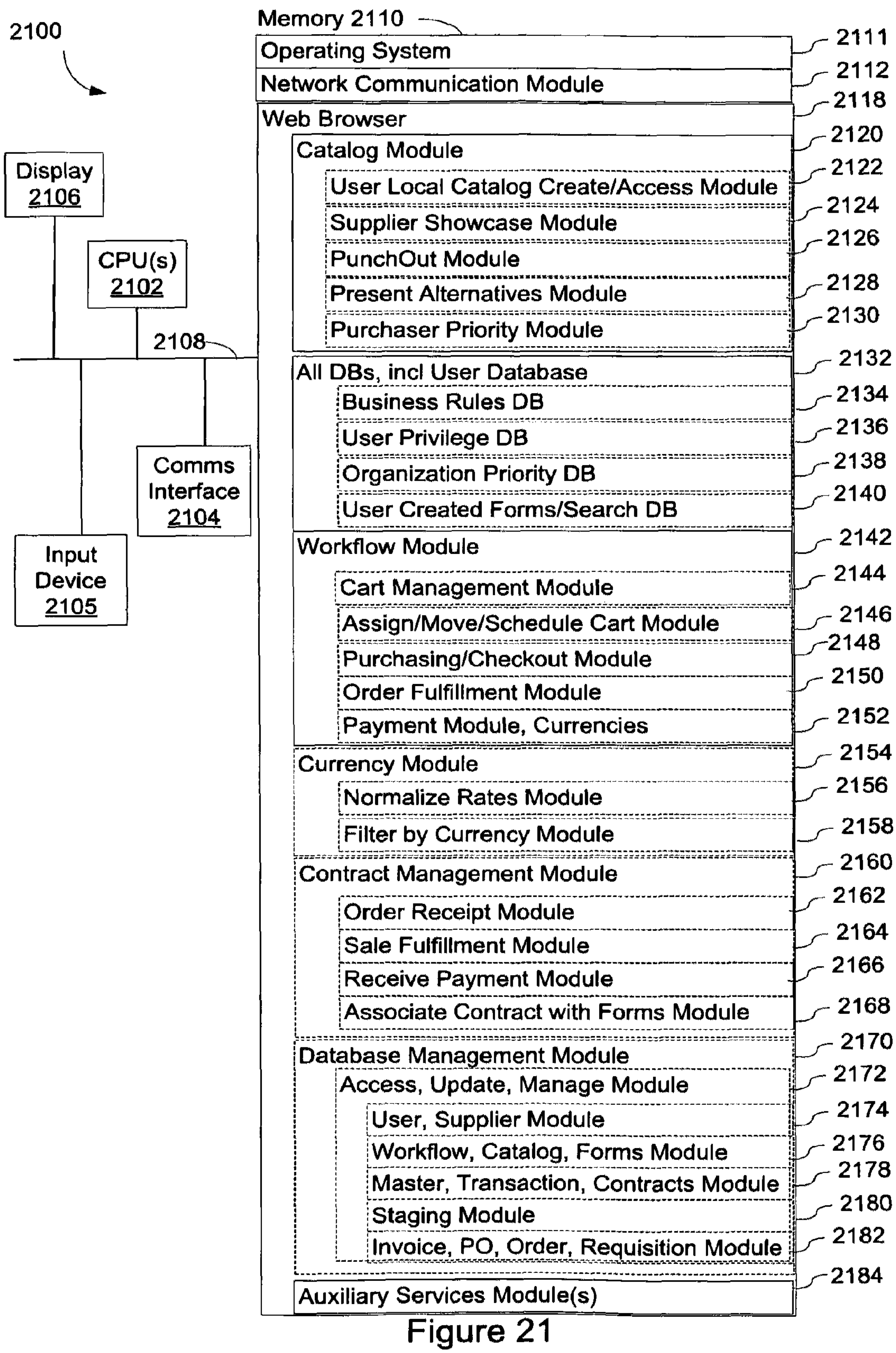
FIG. 21 illustrates a client system providing access to an electronic procurement system running on a server.

FIG. 21 is a block diagram of a server system 2100. The server system 2100 generally includes one or more processing units (CPU's) 2102, one or more network or other communications interfaces 2104, memory 2110, and one or more communication buses 2108 for interconnecting these components. The communication buses 2108 may include circuitry (sometimes called a chipset) that interconnects and controls communications between system components. The system 2100 may optionally include a user interface, for instance a display 2106 and an input device 2105. Memory 2110 may include high speed random access memory and may also include non-volatile memory, such as one or more magnetic, optical, or solid state disk storage devices. Memory 2110 may include mass storage that is remotely located from the central processing unit(s) 2102. Memory 2110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, memory 2110 stores the following programs, modules and data structures, or a subset thereof:

- an operating system 2111 that includes procedures for handling various basic system services and for performing hardware dependent tasks;
- a network communication module 2112 that is used for connecting the server 2000 to other computers via the one or more communication network interfaces 2004 (wired or wireless) and one or more communication networks, such as the Internet, other wide area networks, local area networks, metropolitan area networks, and so on;
- a web browser 2118 or other tool for providing client access and visibility to the electronic procurement system, where in some embodiments some or all of the operations of the electronic procurement system are performed at a server, and in some embodiments some of the operations of the electronic procurement system are performed at the client;
- a catalog module 2120 that provides information and prices about products in hosted supplier product catalogs;
- databases 2132;
- a workflow module 2142;
- a currency module 2154;
- a contract management module 2160;
- a database management module 2170; and
- auxiliary services modules 2184.

The catalog module 2120 may include the following modules, or a subset thereof:

- a user local catalog create/access module 2122, in some embodiments similar to module 2024, for providing users (purchasing organizations) with local catalogs, in one embodiment generated by the respective users, from which the users can order products from suppliers who are not associated with hosted supplier product catalogs. In one embodiment, a supplier in the local catalogs is a local service provider (e.g. catering) from which a user wants to order products and services using the electronic procurement system;
- a supplier showcase module 2124, in some embodiments similar to module 2030, for promoting certain suppliers to users of a purchasing organization, which in an embodiment may be performed according to business rules;

a Punch Out module 2126 for providing access to a catalog or website separate from the hosted supplier product catalogs, and allowing a purchaser to purchase an item from that catalog or website, and process the purchase through the electronic purchasing system;

a present alternatives module 2128, for presenting alternative items to a prospective purchaser upon determining that an item requested by the purchaser cannot be fulfilled or that a better item might be available; and a purchaser priority module 2130 for prioritizing purchasers or purchaser orders associated with a user or purchasing organization.

The databases 2132 may include all databases used by the system, both on the server side and client side. These databases may in one embodiment be stored as logical partitions in a memory. These databases may in another embodiment be stored as tables in a larger database. These databases may in yet another embodiment be stored in separate memory or storage devices. The databases may include the following databases or modules, or a subset thereof:

business rules database 2134 for storing business rules associated with a user, purchasing organization or supplier, wherein in some embodiments the business rules may be set by a super-user or administrator associated with an organization;

user privilege database 2136 for storing privileges associated with users, such as purchasing privileges, approval privileges, etc.;

organization priority database 2138 for storing priority information associated with users or purchasing organizations in the electronic procurement system; and user created forms/search database 2140 for storing forms, search queries, etc associated with a user or purchasing organization, or associated with a supplier.

The workflow module 2142 may include the following modules, or a subset thereof:

cart management module 2144 for allowing a user or organization to manage a shopping cart associated with the purchase of items;

assign/move/schedule cart module 2146 for allowing a user or organization to assign a cart to another user, to move items from one cart to another (including a new) cart, and to schedule a cart for purchasing;

purchasing/checkout module 2148 for allowing a user to checkout one or more carts and purchase the items in the one or more carts;

order fulfillment module 2150 for verifying that an order has been received and processed for fulfillment, wherein in some embodiments this may be similar to sale fulfillment module 2054 for fulfilling the order; and payment module/currencies 2152 for processing payment for an order, including converting currencies if necessary.

The currency module 2154 may include the following modules, or a subset thereof:

a normalize rates module 2156 (in some embodiments similar to module 2042) for normalizing currency rates visible by a purchaser of goods and/or services, purchasing from suppliers using different currencies to that of the purchaser, or by a supplier of goods and services selling to purchasers using different currencies to the supplier; and a filter by currency module 2158 (in some embodiments similar to module 2044) for allowing a purchasers to filter suppliers according to currencies they do business in, or allowing suppliers to filter purchasers similarly.

The contract management module 2160 may include the following modules, or a subset thereof:

an order receipt module 2162 (in some embodiments similar to module 2062) for determining that an order has been received and matching the order to a contract;

a sale fulfillment module 2164 (in some embodiments similar to module 2064) for associating fulfillment of an order with a contract and verifying that the received order complies with the contract;

a receive payment module 2166 (in some embodiments similar to module 2066) for associating payments with a contract and verifying that appropriate discounts and terms of the contract are reflected in the payment; and an associate contract with forms module 2168 (in some embodiments similar to module 2068) for associating the contract with forms used by a supplier or purchaser, such that terms of the contract apply to the form.

The database management module 2170 may include the following modules, or a subset thereof:

Access, update and manage database module 2172 (in some embodiments similar to module 2072) for accessing, updating and managing databases in the system, including:

user (purchaser) and supplier module 2174 for managing user database 32 as described, which is accessed by a buyer user 12 or supplier user 14 through access module 21 as described;

workflow, catalog and forms module 2176 for managing workflow database 3000, catalog database 2400, and forms database 2300 as described;

master, transaction and contracts module 2178 for managing master database 236, transaction database 238 ad contracts database 3200 as described;

staging module 2080 for managing staging database 3100 as described; and an invoice, purchase order, order, requisition module 2182 for managing invoice databases 3300 and 3400, order database 2900 and 2500, requisition database 2700 as described.

The auxiliary services modules 2184 (in some embodiments similar to module 2090) may include additional features or services related to operation, management, security, authentication, maintenance or other aspects of the electronic procurement system.

Figure 22:
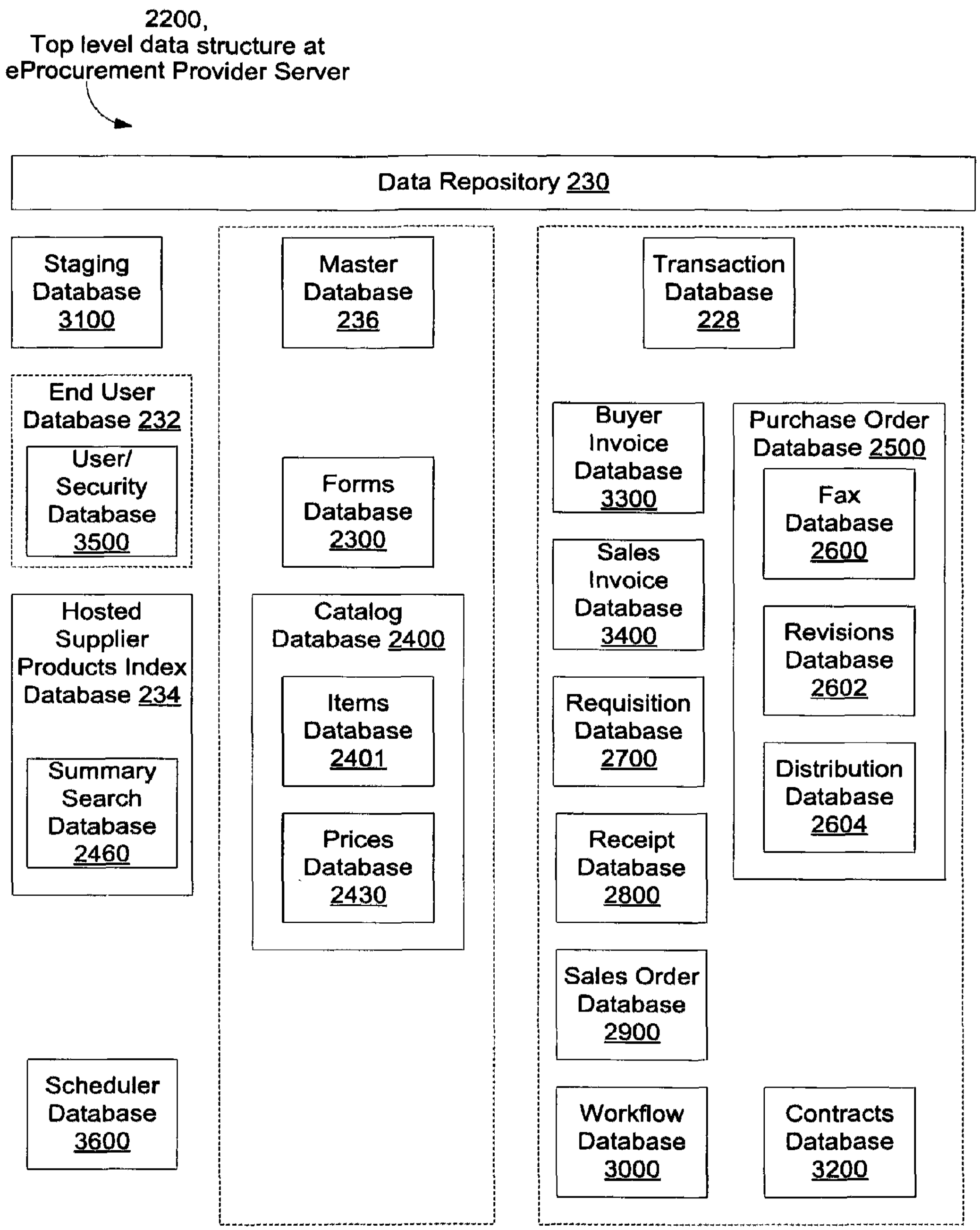
FIG. 22 illustrates a top-level data structure for electronic procurement system.

FIG. 22 shows a top level data structure 2200 at an electronic procurement provider server. The data structure includes data repository 230, end user database 232, hosted supplier product index 234, master product database 236, and transaction database 238. The end user database 232 may in an embodiment include user/security database 3500. The hosted product index 234 may in an embodiment include summary search database 2460. The data structure further includes staging database 3100, and scheduler database 3600.

The master database is associated with (and may in some embodiments include one or more of) a forms database 2300 and a catalog database 2400, which in an embodiment includes items database 2401 and prices database 2430.

The transaction database is associated with (and may in some embodiments include one or more of) buyer invoice database 3300, sales invoice database 3400, requisition database 2700, receipt database 2800, sales order database 2900, workflow database 3000, contracts database 3200, and purchase order database 2500. The purchase order database 2500 may in an embodiment include the fax database 2600, revisions database 2602, and distribution database 2604.

Figure 23:
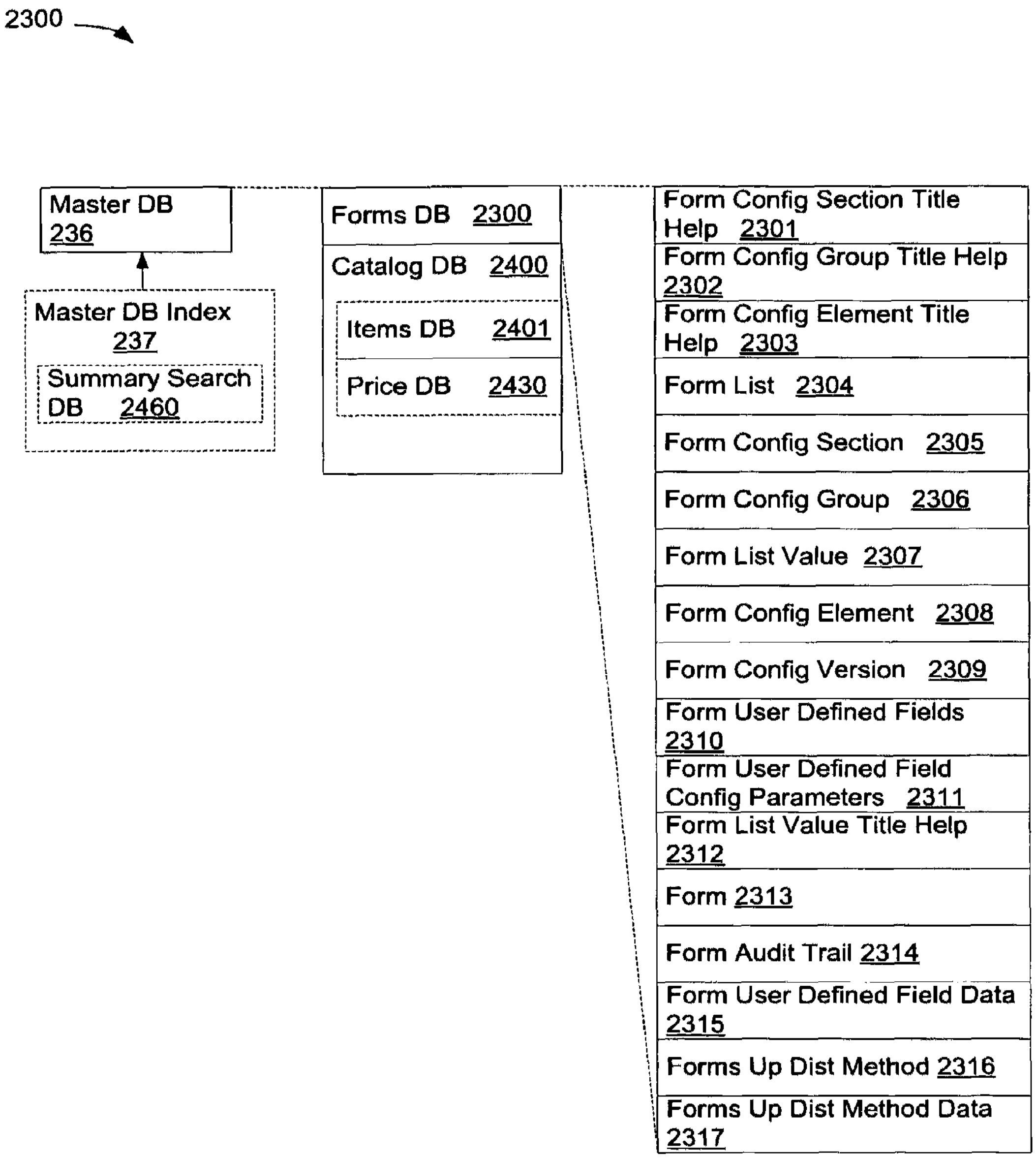
FIG. 23 illustrates a data structure for a master database, showing contents of a forms database.

FIG. 23 shows a database diagram 2300 including the master database 236, with master database index 237 indexing into the master database. Master database index 237 includes summary search database 2460.

In an embodiment, forms database 2300 includes one or more of:

- Form Config Section Title Help 2301, in some embodiments help information for configuring a form section title;
- Form Config Group Title Help 2302, in some embodiments help information for configuring a form group title;
- Form Config Element Title Help 2303, in some embodiments help information for configuring a form element;
- Form List 2304, in some embodiments a list of forms;
- Form Config Section 2305, in some embodiments configuration of a form section;
- Form Config Group 2306, in some embodiments configuration of a form group;
- Form List Value 2307;
- Form Config Element 2308, in some embodiments configuration of a form element;
- Form Config Version 2309, in some embodiments configuration of a form version;
- Form User Defined Fields 2310, in some embodiments user defined fields in a form;
- Form User Defined Field Config Parameters 2311, in some embodiments parameters for configuring user defined fields in a form;
- Form List Value Title Help 2312;
- Form 2313;
- Form Audit Trail 2314, in some embodiments a list of changes to a form for auditing purposes;
- Forms User Defined Field Data 2315;
- Forms Up Dist Method 2316, in some embodiments forms update distribution method details; and
- Forms Up Dist Method Data 2317, in some embodiments forms update distribution method data.

Figure 24:
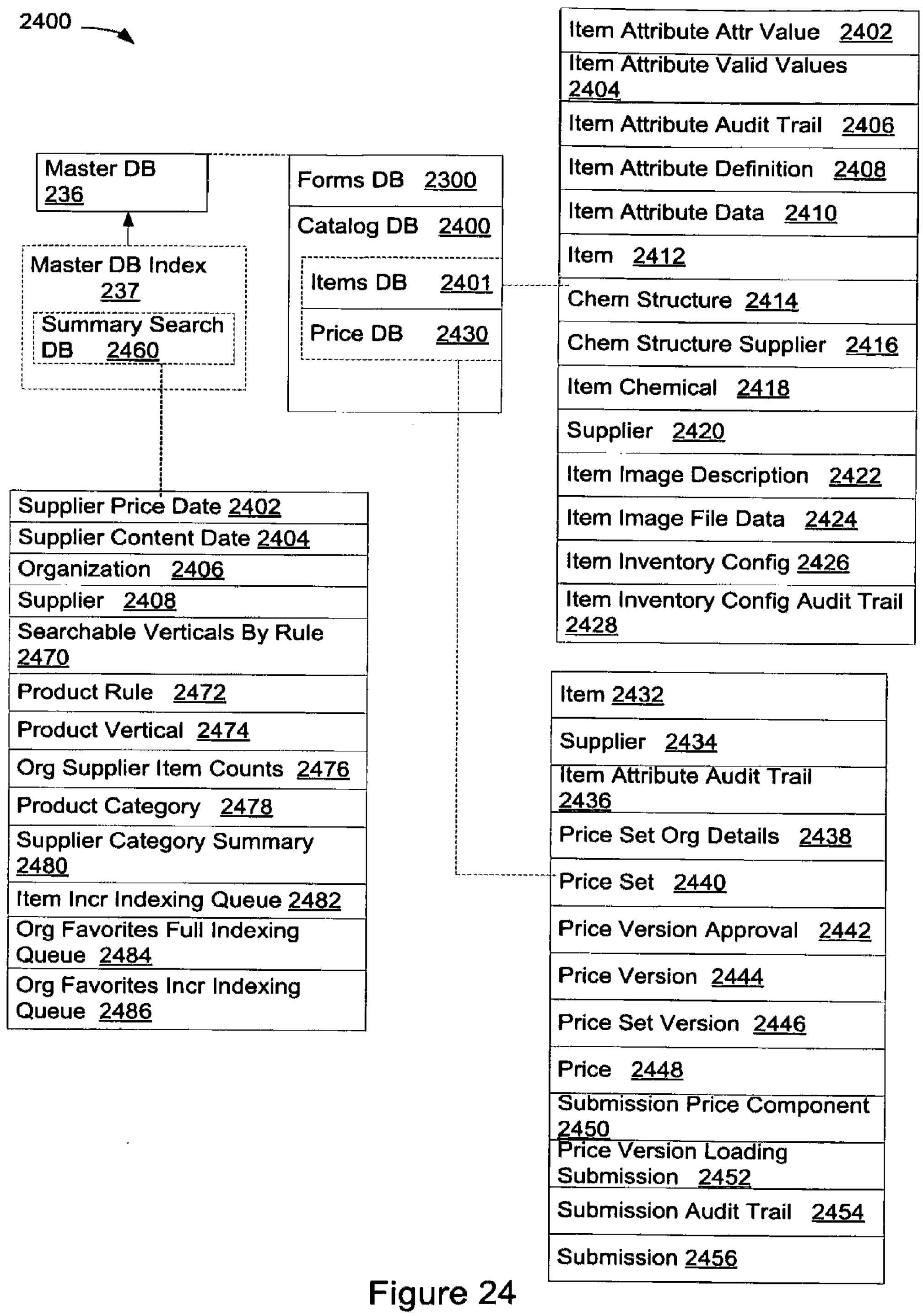
FIG. 24 illustrates a data structure for a master database, showing contents of a catalog database and search database for indexing the master database.

FIG. 24 shows a database diagram 2400 including the master database 236, with master database index 237 indexing into the master database. Master database index 237 includes summary search database 2460.

As described, the search architecture is based upon an indexed, tokenized-type implementation. This search architecture may include a search engine and a tokenization feature, both of which are invoked via processing modules executed on the custom database servers. Product elements such as the product name, industry, price, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is actually executed against what are termed as "verticals." A vertical is designed similar to a drill-down menu architecture that consists of root nodes and leaf nodes, which are children of their respective roots.

The forms database 2300, and catalog database 2400 are associated with the master database. The catalog database includes items database 2401 and price database 2430.

In an embodiment, items database 2401 includes one or more of the following:

- Item Attribute Attr Value 2402, in some embodiments a value for an item attribute;
- Item Attribute Valid Values 2404, in some embodiments valid values value for an item attribute;
- Item Attribute Audit Trail 2406, in some embodiments a list of changes to an item attribute for auditing purposes;
- Item Attribute Definition 2408;
- Item Attribute Data 2410;
- Item 2412;
- Chem Structure 2414, in some embodiments a description of a chemical structure that may be ordered through the procurement system;
- Chem Structure Supplier 2416, in some embodiments a supplier of a chemical structure;
- Item Chemical 2418, in some embodiments a commercial item of a chemical structure, e.g., a container of a certain chemical structure.
- Supplier 2420;
- Item Image Description 2422, in some embodiments a description of an image or picture associated with an item;
- Item Image File Data 2424, in some embodiments an image data file (e.g., a JPEG image or GIF image, as commonly used in web applications);
- Item Inventory Config 2426, in some embodiments data for configuring inventory of an item; and
- Item Inventory Config Audit Trail 2428, in some embodiments a list of changes to data for configuring inventory of an item.

In an embodiment price database 2430 includes one or more of the following:

- Item 2432, in some embodiments an item for which a price is stored in the price database;
- Supplier 2434, in some embodiments a supplier associated with the item;
- Item Attribute Audit Trail 2436, in some embodiments a list of changes to an attribute associated with an item, for which a price is stored in the price database;
- Price Set Org Details 2438, in some embodiments details of an organization price;
- Price Set 2440, in some embodiments a price for the item;
- Price Version Approval 2442, in some embodiments approval for a version of a price associated with the item;
- Price Version 2444, in some embodiments a version of a price associated with the item;
- Price Set Version 2446;
- Price 2448, in some embodiments a price for the item;
- Submission Price Component 2450;
- Price Version Loading Submission 2452;
- Submission Audit Trail 2454, in some embodiments for auditing submissions; and
- Submission 2456.

In an embodiment summary search database 2460 includes one or more of the following:

- Supplier Price Date 2402, in some embodiments a date associated with a supplier price;
- Supplier Content Date 2404, in some embodiments a date associated with supplier content (e.g., description);
- Organization 2406;
- Supplier 2408, in some embodiments a supplier of an item;
- Searchable Verticals By Rule 2470, in some embodiments supporting rule-based searching;
- Product Rule 2472, in some embodiments a rule related to a product;
- Product Vertical 2474, in some embodiments supporting product-based searching;
- Org Supplier Item Counts 2476, in some embodiments a count of items stored at an organization supplier;

Product Category 2478, in some embodiments a category related to a product;

Supplier Category Summary 2480, in some embodiments a summary of a supplier category;

Item Incr Indexing Queue 2482, in some embodiments a queue for incrementally indexing items;

Org Favorites Full Indexing Queue 2484, in some embodiments a full-indexing queue for organizational favorites; and Org Favorites Incr Indexing Queue 2486, in some embodiments an incremental-indexing queue for organizational favorites.

Figure 25:
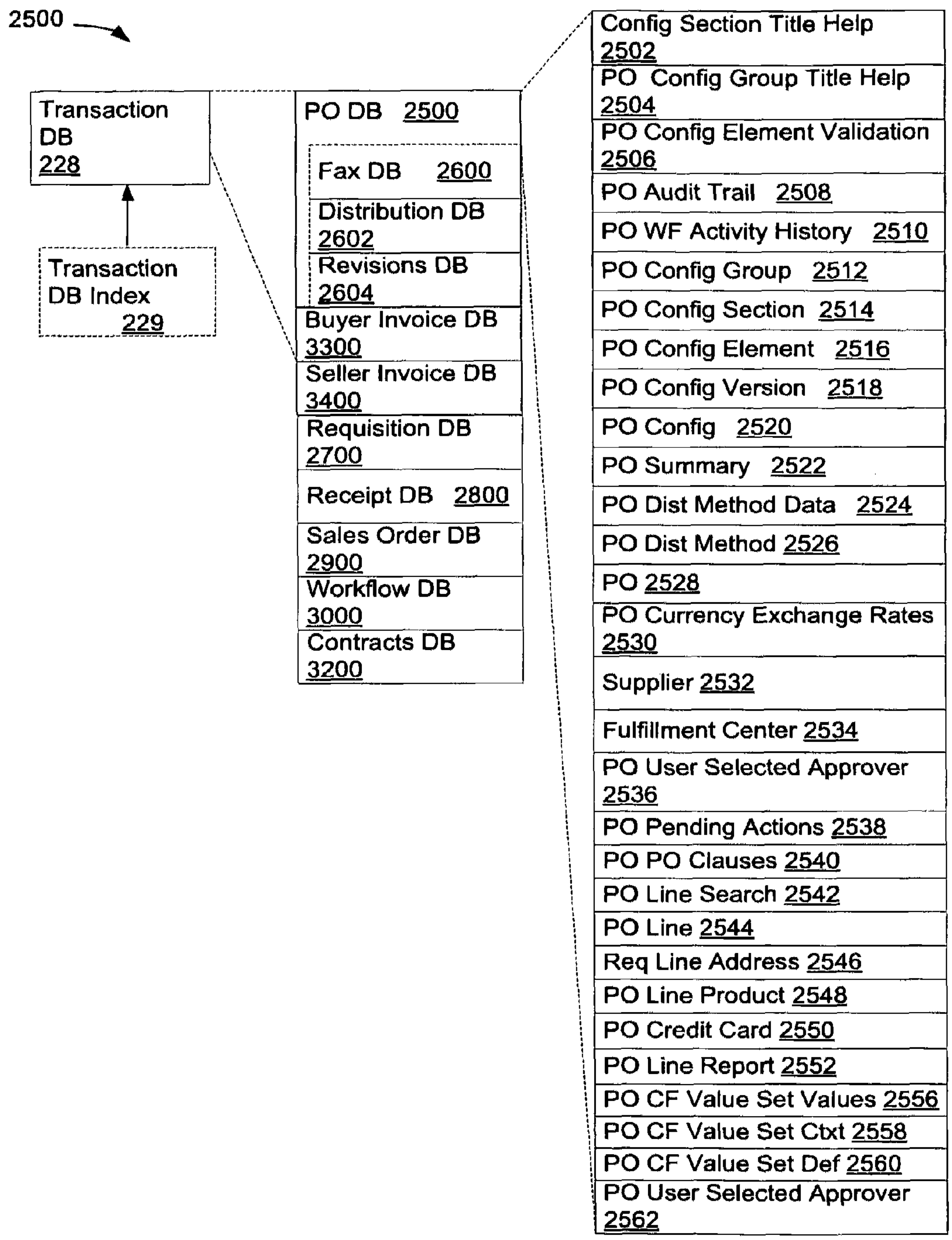
FIG. 25 illustrates a data structure for a transaction database, showing contents of a purchase order database.

FIG. 25 shows a database diagram 2500 including the transaction database 228, with transaction database index 229 indexing into the transaction database 228. Transaction database 228 is associated with (and in some embodiments includes one or more of) the following databases:

Purchase Order (PO) DB 2500, in some embodiments a database of purchase orders;

Fax DB 2600, in some embodiments a database of faxes;

Distribution DB 2602, in some embodiments for storing order distributions, where the order distribution features can include such features as facsimile or email confirmation, as well as other delivery methods, organized hierarchically to ensure purchase order delivery, as described;

Revisions DB 2604, in some embodiments for storing revisions to sales or purchase documents;

Buyer Invoice DB 3300, in some embodiments for storing buyer invoices;

Seller Invoice DB 3400, in some embodiments for storing seller invoices;

Requisition DB 2700, in some embodiments for storing purchase requisitions;

Receipt DB 2800, in some embodiments for storing receipts;

Sales Order DB 2900, in some embodiments for storing sales orders;

Workflow DB 3000, in some embodiments for storing workflow data relating to sales, purchases and transactions, etc.; and Contracts DB 3200, in some embodiments for storing contracts.

In an embodiment, Purchase Order (PO) DB 2500 includes one or more of:

Config Section Title Help 2502, in some embodiments help information for configuring a section title;

PO Config Group Title Help 2504, in some embodiments help information for configuring a purchase order group title;

PO Config Element Validation 2506, in some embodiments validation information for configuring a purchase order element;

PO Audit Trail 2508, in some embodiments a purchase order audit trail;

PO WF Activity History 2510, in some embodiments a purchase order workflow activity history;

PO Config Group 2512, in some embodiments configuration of a purchase order group;

PO Config Section 2514, in some embodiments configuration of a purchase order section;

PO Config Element 2516, in some embodiments configuration of a purchase order element;

PO Config Version 2518, in some embodiments configuration of a purchase order version;

PO Config 2520, in some embodiments configuration of a purchase order;

PO Summary 2522, in some embodiments a purchase order summary;

PO Dist Method Data 2524, in some embodiments data for a purchase order distribution method;

PO Dist Method 2526, in some embodiments a purchase order distribution method;

PO 2528, in some embodiments a purchase order;

PO Currency Exchange Rates 2530;

Supplier 2532;

Fulfillment Center 2534;

PO User Selected Approver 2536, in some embodiments a user-selected approver for a purchase order;

PO Pending Actions 2538, in some embodiments pending actions relating to a purchase order;

PO PO Clauses 2540, in some embodiments clauses relating to a purchase order;

PO Line Search 2542, in some embodiments line search details relating to a purchase order;

PO Line 2544, in some embodiments a line of a purchase order;

Req Line Address 2546, in some embodiments an address line relating to a purchase requisition;

PO Line Product 2548, in some embodiments a product line relating to a purchase order;

PO Credit Card 2550, in some embodiments a credit card associated with a purchase order;

PO Line Report 2552, in some embodiments a report line relating to a purchase order;

PO CF Value Set Values 2556, in some embodiments to set the value of a custom field value in a purchase order;

PO CF Value Set Ctxt 2558, in some embodiments to set the context of a custom field value in a purchase order;

PO CF Value Set Def 2560, in some embodiments to set the definition of a custom field value in a purchase order; and PO User Selected Approver 2562, in some embodiments a user-selected approver of the purchase order.

Figure 26:
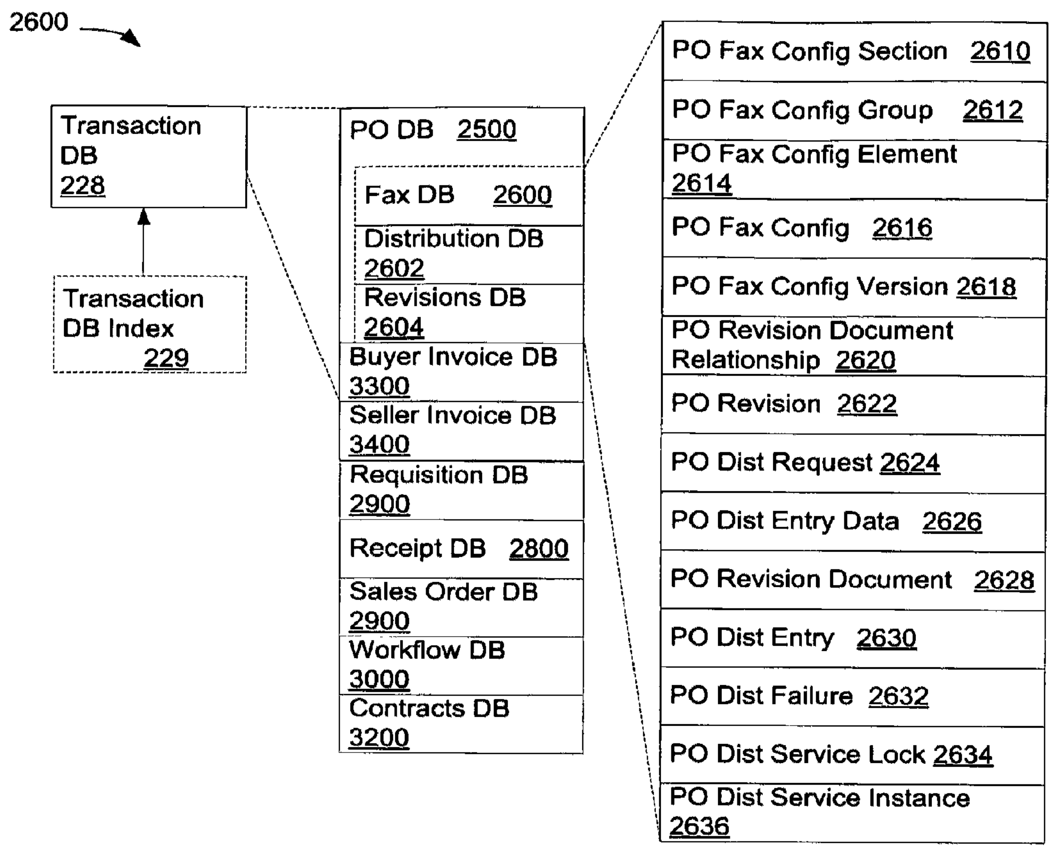
FIG. 26 illustrates a data structure for a transaction database, showing contents of a fax, distribution and revisions databases.

FIG. 26 shows a database diagram 2600 including the transaction database 228, with transaction database index 229 indexing into the transaction database. The fax database 2600, distribution database 2602 and revisions database 2604 are associated with the transactions database 228.

In an embodiment, the fax database 2600, distribution database 2602 and revisions database 2604 include one or more of:

PO Fax Config Section 2610, in some embodiments configuration of a purchase order fax section;

PO Fax Config Group 2612, in some embodiments configuration of a purchase order fax group;

PO Fax Config Element 2614, in some embodiments configuration of a purchase order fax element;

PO Fax Config 2616, in some embodiments configuration of a purchase order fax;

PO Fax Config Version 2618, in some embodiments configuration version of a purchase order fax;

PO Revision Document Relationship 2620, in some embodiments a document relationship of a purchase order revision PO Revision 2622, in some embodiments a purchase order revision;

PO Dist Request 2624, in some embodiments a purchase order distribution request;

PO Dist Entry Data 2626, in some embodiments purchase order entry data;

PO Revision Document 2628, in some embodiments a purchase order document revision;

PO Dist Entry 2630, in some embodiments entry of a purchase order distribution;

PO Dist Failure 2632, in some embodiments failure of a purchase order distribution;

PO Dist Service Lock 2634, in some embodiments locking of a purchase order distribution service; and PO Dist Service Instance 2636, in some embodiments an instance of a purchase order distribution service.

Figure 27:
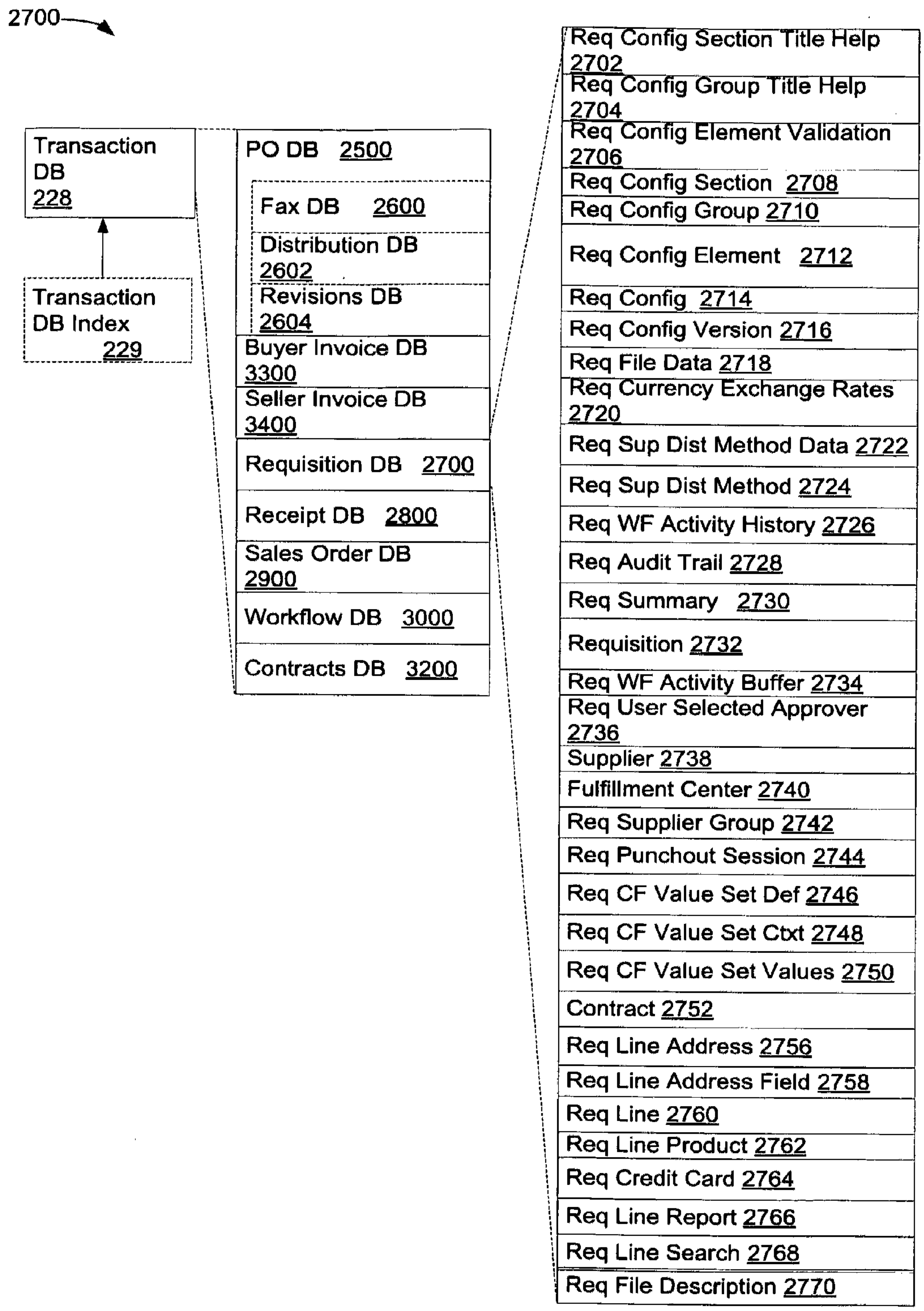
FIG. 27 illustrates a data structure for a transaction database, showing contents of a requisition database.

FIG. 27 shows a database diagram 2700 including the transaction database 228, and requisition database 2700 associated with the transaction database.

In an embodiment, requisition database 2700 includes one or more of:

Req Config Section Title Help 2702, in some embodiments help information for configuring a purchase requisition section title;

Req Config Group Title Help 2704, in some embodiments help information for configuring a purchase requisition group title;

Req Config Element Validation 2706, in some embodiments help information for configuring a purchase requisition element validation;

Req Config Section 2708, in some embodiments configuration of a purchase requisition section;

Req Config Group 2710, in some embodiments configuration of a purchase requisition group;

Req Config Element 2712, in some embodiments configuration of a purchase requisition section element;

Req Config 2714, in some embodiments configuration of a purchase requisition;

Req Config Version 2716, in some embodiments configuration of a purchase requisition version;

Req File Data 2718, in some embodiments purchase requisition file data;

Req Currency Exchange Rates 2720, in some embodiments purchase requisition currency exchange rates;

Req Sup Dist Method Data 2722, in some embodiments data for a purchase requisition distribution method;

Req Sup Dist Method 2724, in some embodiments a purchase requisition distribution method;

Req WF Activity History 2726, in some embodiments purchase requisition workflow activity history;

Req Audit Trail 2728, in some embodiments changes to a purchase requisition for auditing purposes;

Req Summary 2730, in some embodiments a summary of a purchase requisition;

Requisition 2732;

Req WF Activity Buffer 2734, in some embodiments a purchase requisition workflow activity buffer;

Req User Selected Approver 2736, in some embodiments a purchase requisition user-selected approver;

Supplier 2738;

Fulfillment Center 2740, in some embodiments a fulfillment center for a purchase requisition;

Req Supplier Group 2742, in some embodiments a supplier group for a purchase requisition;

Req Punchout Session 2744, in some embodiments a punchout session for a purchase requisition;

Req CF Value Set Def 2746, in some embodiments for setting a definition of a purchase requisition custom field value;

Req CF Value Set Ctxt 2748, in some embodiments for setting a context of a purchase requisition custom field value;

Req CF Value Set Values 2750, in some embodiments for setting a value of a purchase requisition custom field value;

Contract 2752;

Req Line Address 2756, in some embodiments an address line for a purchase requisition;

Req Line Address Field 2758, in some embodiments an address field line for a purchase requisition;

Req Line 2760, in some embodiments a line for a purchase requisition;

Req Line Product 2762, in some embodiments a product line for a purchase requisition;

Req Credit Card 2764, in some embodiments a credit card for a purchase requisition;

Req Line Report 2766, in some embodiments a report line for a purchase requisition;

Req Line Search 2768; in some embodiments a search line for a purchase requisition; and Req File Description 2770, in some embodiments a file description for a purchase requisition.

Figure 28:
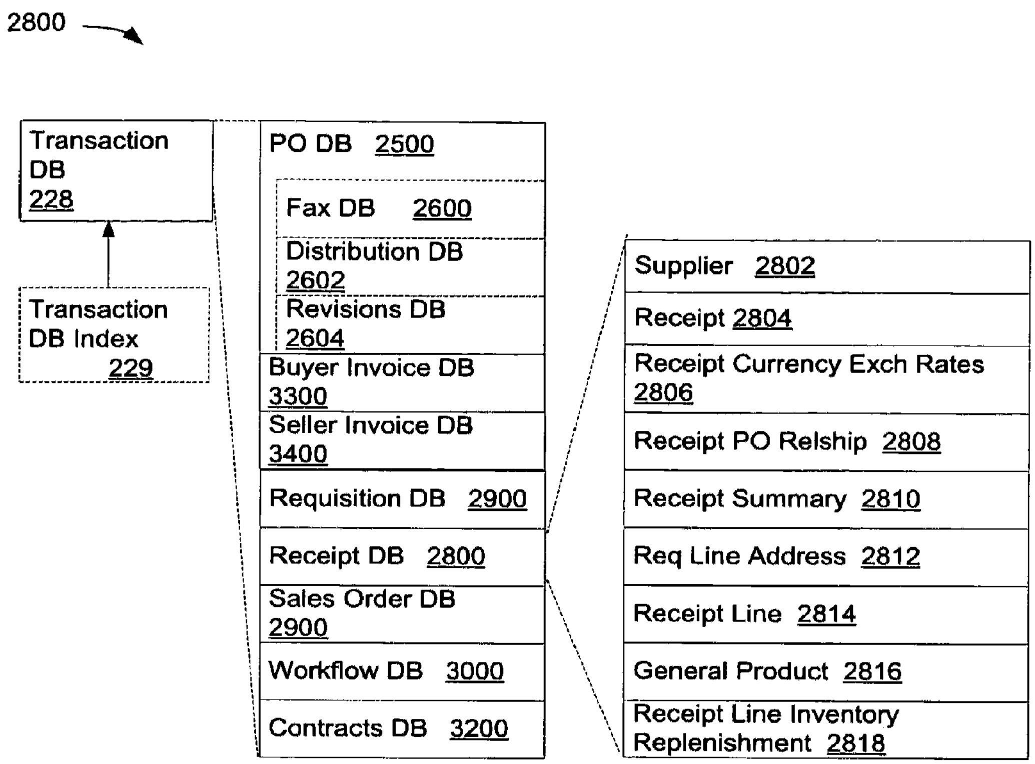
FIG. 28 illustrates a data structure for a transaction database, showing contents of a receipt database.

FIG. 28 shows a database diagram 2800 including the transaction database 228, and receipt database 2800 associated with the transaction database.

In an embodiment, receipt database 2800 includes one or more of:

Supplier 2802, in some embodiments a supplier for a receipt;

Receipt 2804;

Receipt Currency Exch Rates 2806, in some embodiments currency exchange rates associated with a receipt;

Receipt PO Relship 2808, in some embodiments a relationship between a purchase order and a receipt;

Receipt Summary 2810, in some embodiments a summary of a receipt;

Req Line Address 2812, in some embodiments an address line for a purchase requisition;

Receipt Line 2814;

General Product 2816; and

Receipt Line Inventory Replenishment 2818, in some embodiments an inventory replenishment line for a receipt.

Figure 29:
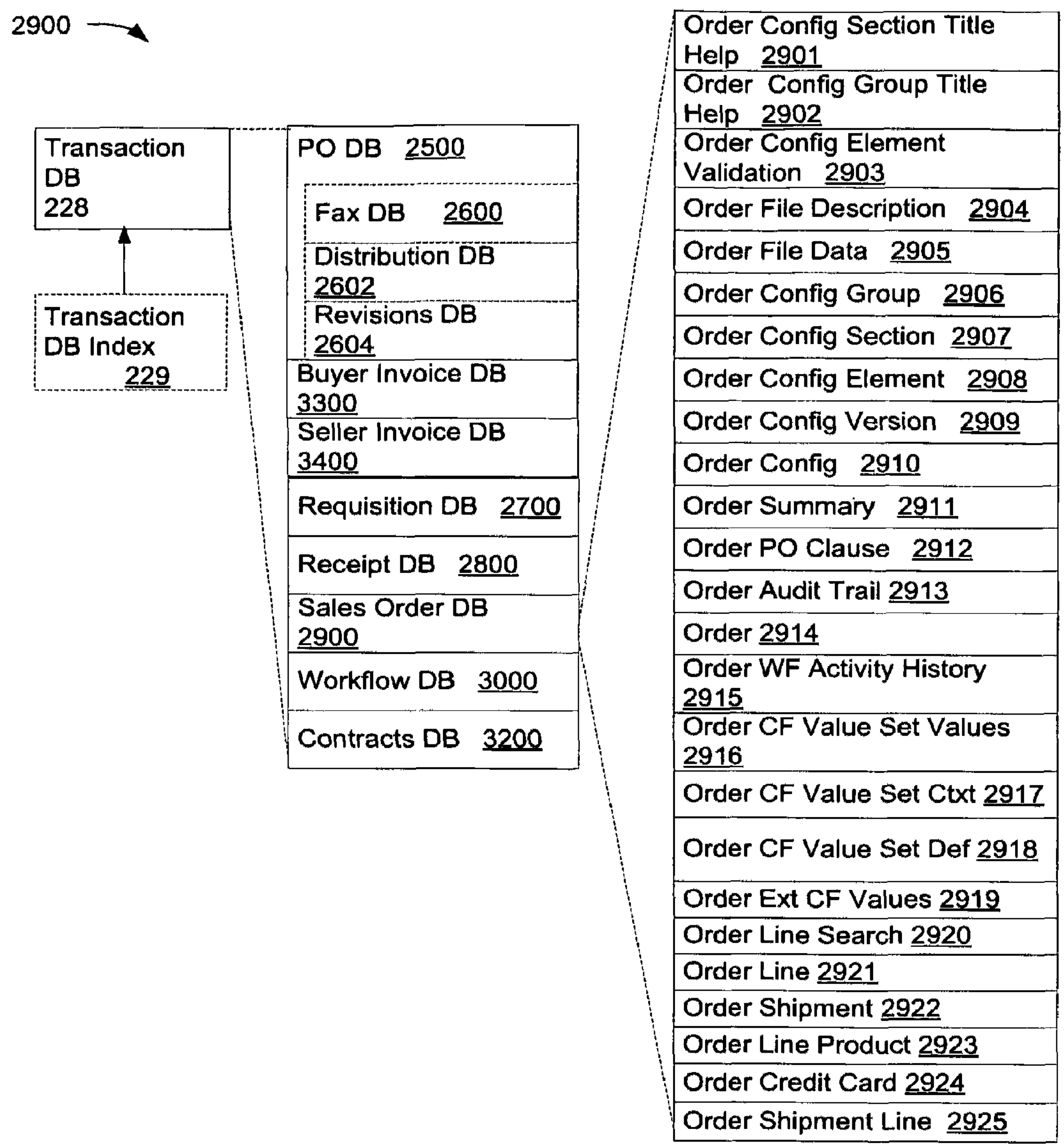
FIG. 29 illustrates a data structure for a transaction database, showing contents of a sales order database.

FIG. 29 shows a database diagram 2900 including the transaction database 228, and sales order database 2900 associated with the transaction database.

In some embodiments, the transaction database 228 and sales order database 2900 are accessed by transaction processing servers 223 and middleware/web methods servers 224.

In an embodiment, sales order database 2900 includes one or more of:

Order Config Section Title Help 2901, in some embodiments help information for configuring a sales order section title;

Order Config Group Title Help 2902, in some embodiments help information for configuring a sales order group title;

Order Config Element Validation 2903, in some embodiments validation for configuring a sales order element;

Order File Description 2904;

Order File Data 2905;

Order Config Group 2906, in some embodiments configuration of a sales order group;

Order Config Section 2907, in some embodiments configuration of a sales order section;

Order Config Element 2908, in some embodiments configuration of a sales order element;

Order Config Version 2909, in some embodiments configuration of a sales order version;

Order Config 2910;

Order Summary 2911;

Order PO Clause 2912, in some embodiments a purchase order clause;

Order Audit Trail 2913, in some embodiments changes for auditing a sales order;

Order 2914;

Order WF Activity History 2915, in some workflow activity history for a sales order;

Order CF Value Set Values 2916, in some embodiments values for a sales order custom field;

Order CF Value Set Ctxt 2917, in some embodiments context for a sales order custom field;

Order CF Value Set Def 2918, in some embodiments definition for a sales order custom field;

Order Ext CF Values 2919;

Order Line Search 2920, in some embodiments a search line for a sales order;

Order Line 2921;

Order Shipment 2922, in some embodiments a shipment for a sales order;

Order Line Product 2923, in some embodiments a product for a sales order;

Order Credit Card 2924, in some embodiments a credit card for a sales order; and Order Shipment Line 2925, in some embodiments a shipment line for a sales order.

Figure 30:
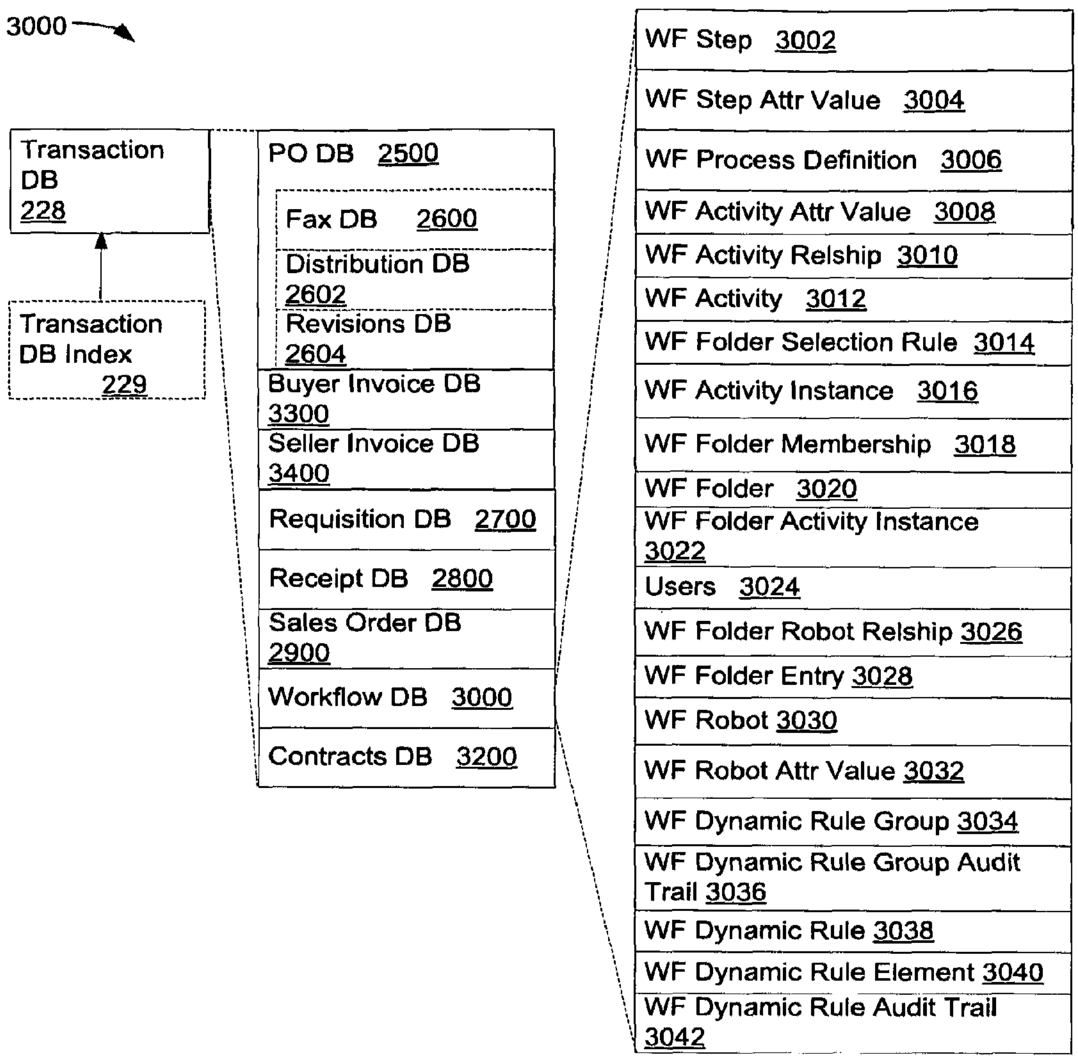
FIG. 30 illustrates a data structure for a transaction database, showing contents of a workflow database.

FIG. 30 shows a database diagram 3000 including the transaction database 228, and workflow database 3000 associated with the transaction database. In some embodiments, the transaction database 228 and workflow database 3000 are accessed by transaction processing servers 223 and middleware/web methods servers 224.

As described, supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by the super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

In an embodiment, workflow database 3000 includes one or more of:

Workflow Step 3002;

Workflow Step Attr Value 3004, in some embodiments an attribute value for a workflow step;

Workflow Process Definition 3006;

Workflow Activity Attr Value 3008, in some embodiments an attribute value for a workflow activity;

Workflow Activity Relship 3010, in some embodiments an relationship for a workflow activity;

Workflow Activity 3012;

Workflow Folder Selection Rule 3014, in some embodiments a selection rule for a workflow folder;

Workflow Activity Instance 3016, in some embodiments an instance of workflow activity;

Workflow Folder Membership 3018, in some embodiments membership of a workflow folder;

Workflow Folder 3020;

Workflow Folder Activity Instance 3022, in some embodiments an activity instance for a workflow folder;

Users 3024;

Workflow Folder Robot Relship 3026;

Workflow Folder Entry 3028;

Workflow Robot 3030;

Workflow Robot Attr Value 3032;

Workflow Dynamic Rule Group 3034, in some embodiments an dynamic rule group associated with the workflow;

Workflow Dynamic Rule Group Audit Trail 3036, in some embodiments an audit trail for a dynamic rule group associated with the workflow;

Workflow Dynamic Rule 3038;

Workflow Dynamic Rule Element 3040, in some embodiments an element of a dynamic rule associated with the workflow; and Workflow Dynamic Rule Audit Trail 3042, in some embodiments an audit trail for a dynamic rule associated with the workflow.

Figure 31:
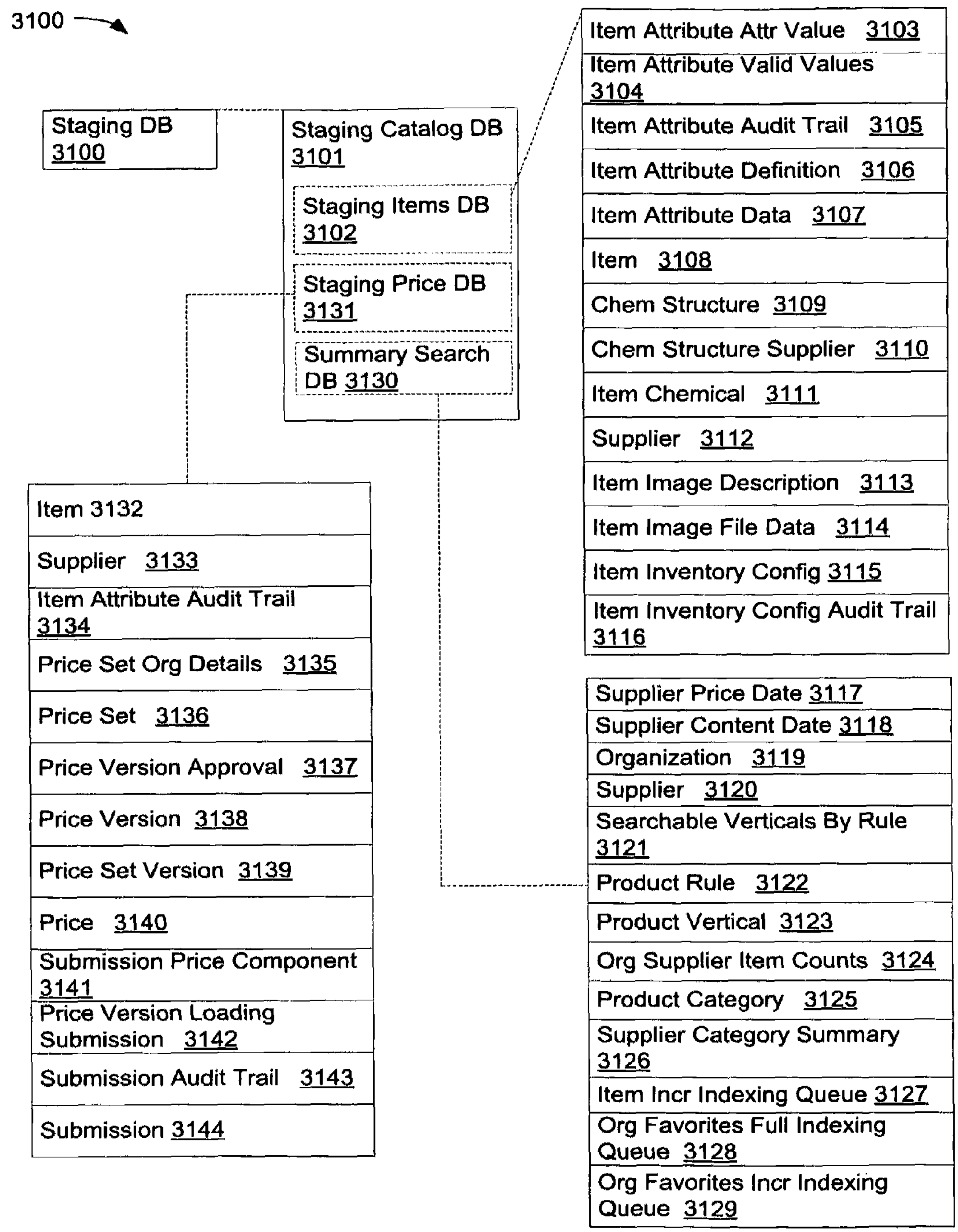
FIG. 31 illustrates a data structure for a staging database, showing contents of a staging catalog database.

FIG. 31 shows a database diagram 3100 including the staging database 3100, and staging catalog database 3101, associated with the staging database 3100.

In an embodiment, the staging catalog database 3101 includes one or more of a staging items database 3102, a staging price database 3131, and a summary search database 3130.

In an embodiment, staging items database 3102 includes one or more of:

Item Attribute Attr Value 3103, in some embodiments a value for an item attribute;

Item Attribute Valid Values 3104, in some embodiments a set of valid values for an item attribute;

Item Attribute Audit Trail 3105, in some embodiments an audit trail for an item attribute;

Item Attribute Definition 3106, in some embodiments a definition for an item attribute;

Item Attribute Data 3107, in some embodiments data for an item attribute;

Item 3108;

Chem Structure 3109, in some embodiments a description of a chemical structure that may be ordered through the procurement system;

Chem Structure Supplier 3110, in some embodiments a supplier of a chemical structure;

Item Chemical 3111 in some embodiments a commercial item of a chemical structure e.g., a container of a certain chemical structure;

Supplier 3112;

Item Image Description 3113, in some embodiments a description of an image or picture associated with an item;

Item Image File Data 3114, in some embodiments an image data file (e.g., a JPEG image or GIF image, as commonly used in web applications);

Item Inventory Config 3115, in some embodiments data for configuring inventory of an item; and Item Inventory Config Audi Trail 3116, in some embodiments a list of changes to data or an audit trail for configuring inventory of an item.

In an embodiment, staging price database 3131 includes one or more of:

Items 3132;

Supplier 3133;

Item Attribute Audit Trail 3134, in some embodiments a list of changes to data or an audit trail for an item attribute;

Price Set Org Details 3135, in some embodiments details of a price setting organization;

Price Set 3136, in some embodiments a set price;

Price Version Approval 3137, in some embodiments approval for a price version;

Price Version 3138;

Price Set Version 3139;

Price 3140;

Submission Price Component 3141;

Price Version Loading Submission 3142;

Submission Audit Trail 3143, in some embodiments a list of changes to data or an audit trail for a submission; and Submission 3144.

In an embodiment, summary search database 3130 includes one or more of:

Supplier Price Date 3117, in some embodiments a data associated with a supplier price;

Supplier Content Date 3118;

Organization 3119;

Supplier 3120;

Searchable Verticals by Rule 3121, in some embodiments supporting rule-based searching;

Product Rule 3122, in some embodiments a rule related to a product;

Product Vertical 3123, in some embodiments supporting product-based searching;

Org Supplier Item Counts 3124, in some embodiments a count of items stored at an organization supplier;

Product Category 3125, in some embodiments a category related to a product;

Supplier Category Summary 3126, in some embodiments a summary of a supplier category;

Item Incr Indexing Queue 3127, in some embodiments a queue for incrementally indexing items;

Org Favorites Full Indexing Queue 3128, in some embodiments a full-indexing queue for organizational favorites; and Org Favorites Incr Indexing Queue 3129, in some embodiments an incremental-indexing queue for organizational favorites.

Figure 32:
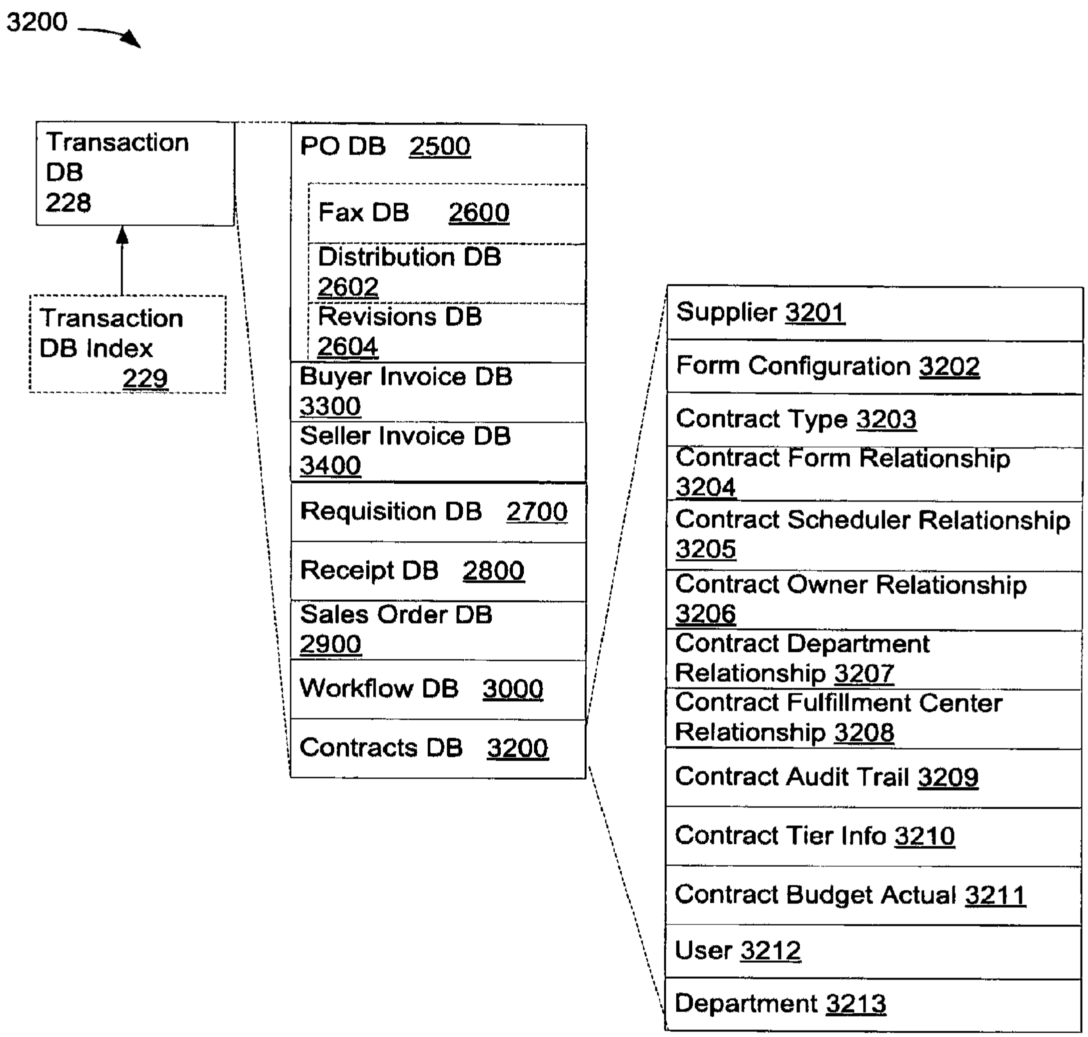
FIG. 32 illustrates a data structure for a transaction database, showing contents of a contracts database.

FIG. 32 shows a database diagram 3200 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the contracts database 3200 includes one or more of:

Supplier 3201;

Form Configuration 3202;

Contract Type 3203;

Contract Form Relationship 3204, in some embodiments an relationship between a contract and a form;

Contract Scheduler Relationship 3205, in some embodiments an relationship between a contract and a scheduler;

Contract Owner Relationship 3206, in some embodiments an relationship between a contract and an owner;

Contract Department Relationship 3207, in some embodiments an relationship between a contract and a department;

Contract Fulfillment Center Relationship 3208, in some embodiments an relationship between a contract and a fulfillment center;

Contract Audi Trail 3209, in some embodiments a list of changes to data or an audit trail for a contract;

Contract Tier Info 3210, in some embodiments tier information for a contract;

Contract Budget Actual 3211, in some embodiments an actual budget for a contract;

User 3212; and

Department 3213.

Figure 33:
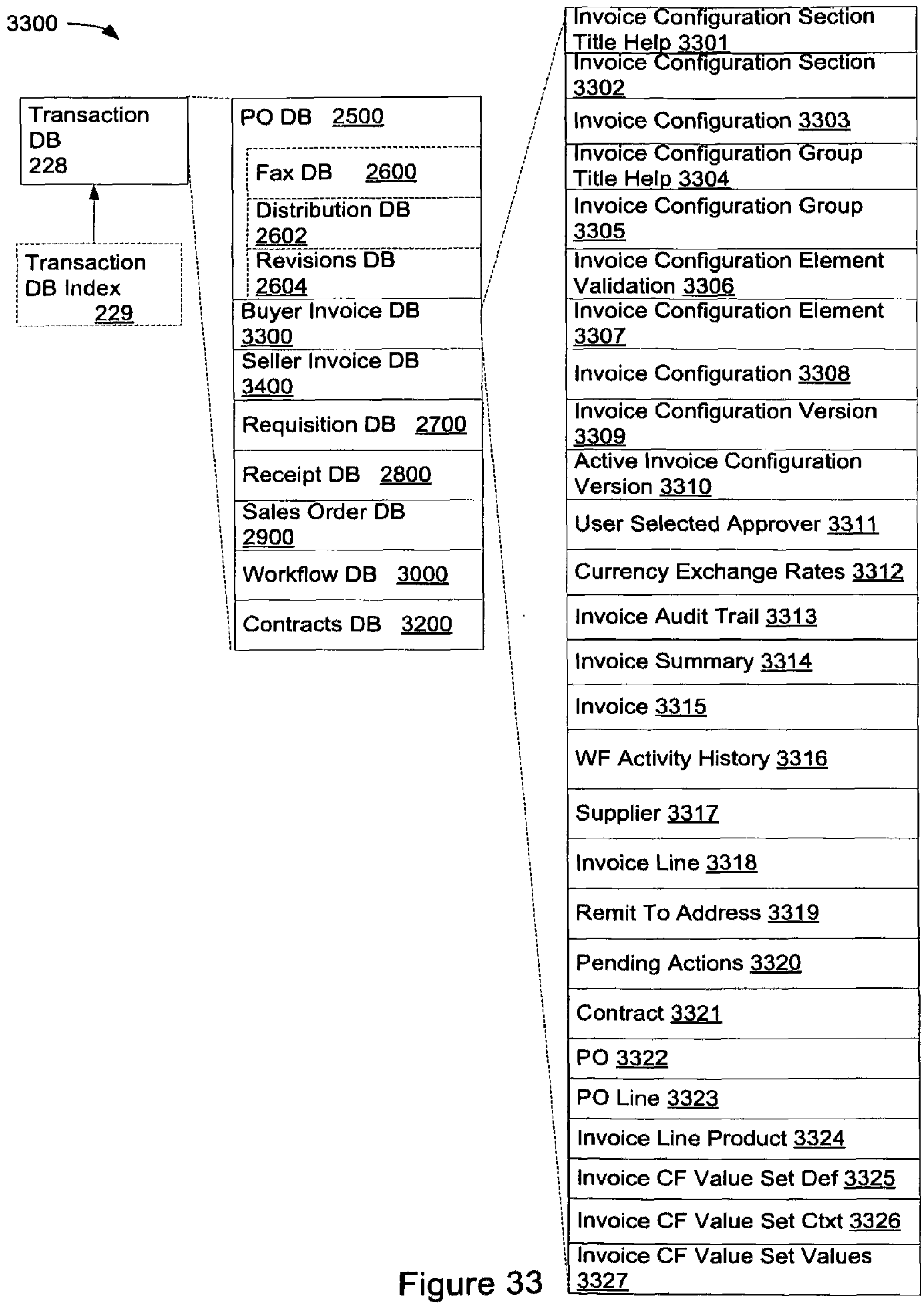
FIG. 33 illustrates a data structure for a transaction database, showing contents of a buyer invoice database.

FIG. 33 shows a database diagram 3300 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the buyer invoice database 3300 includes one or more of:

Invoice Configuration Section Title Help 3301, in some embodiments help information for configuring an invoice section title;

Invoice Configuration Section 3202, in some embodiments configuration of a invoice section;

Invoice Configuration 3203;

Invoice Configuration Group Title Help 3304, in some embodiments help information for configuring an invoice group title;

Invoice Configuration Group 3305, in some embodiments configuration of an invoice group;

Invoice Configuration Element Validation 3306;

Invoice Configuration Element 3307, in some embodiments configuration of an invoice element;

Invoice Configuration 3308;

Invoice Configuration Version 3309;

Active Invoice Configuration Version 3310;

User Selected Approver 3311;

Currency Exchange Rates 3312;

Invoice Audit Trail 3313, in some embodiments a list of changes (audit trail) to an item attribute for auditing purposes;

Invoice Summary 3314;

Invoice 3315;

Workflow Activity History 3316;

Supplier 3317;

Invoice Line 3318;

Remit to Address 3319;

Pending Actions 3320, in some embodiments pending actions relating to an invoice;

Contract 3321;

PO 3322, in some embodiments a purchase order;

PO Line 3323, in some embodiments a purchase order line;

Invoice Line Product 3324, some embodiments a product line relating to an invoice;

Invoice CF Value Set Def 3325, in some embodiments to set the definition of a custom field value in an invoice;

Invoice CF Value Set Ctxt 3326, in some embodiments to set the context of a custom field value in an invoice; and Invoice CF Value Set Value 3327, in some embodiments to set the value of a custom field value in an invoice.

Figure 34:
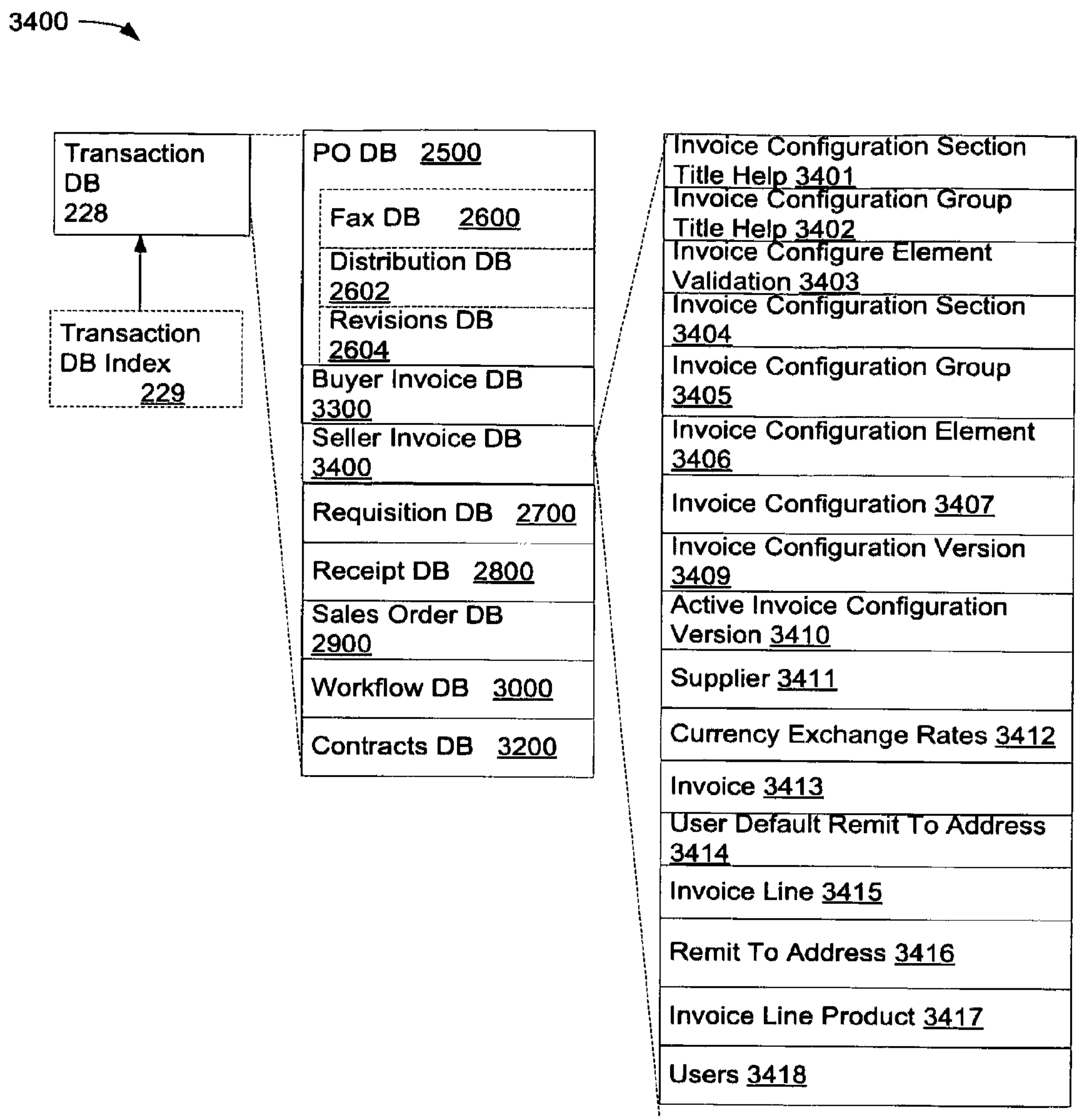
FIG. 34 illustrates a data structure for a transaction database, showing contents of a seller invoice database.

FIG. 34 shows a database diagram 3400 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the seller invoice database 3400 includes one or more of:

Invoice Configuration Section Title Help 3401, in some embodiments help information for configuring an invoice section title;

Invoice Configuration Group Title Help 3402, in some embodiments help information for configuring an invoice group title;

Invoice Configure Element Validation 3403;

Invoice Configuration Section 3404, in some embodiments configuration of an invoice section;

Invoice Configuration Group 3405, in some embodiments configuration of an invoice group;

Invoice Configuration Element 3406, in some embodiments configuration of an invoice element;

Invoice Configuration 3407, in some embodiments configuration of an invoice;

Invoice Configuration Version 3409, in some embodiments configuration version of an invoice;

Active Invoice Configuration Version 3410, in some embodiments configuration of an active invoice;

Supplier 3411;

Currency Exchange Rates 3412, in some embodiments currency exchange rates associated with an invoice;

Invoice 3413;

User Default Remit To Address 3414, in some embodiments a default remit-to address for a user associated with an invoice;

Invoice Line 3415;

Remit To Address 3416, in some embodiments a remit-to address associated with an invoice;

Invoice Line Product 3417; and

User 3418.

Figure 35:
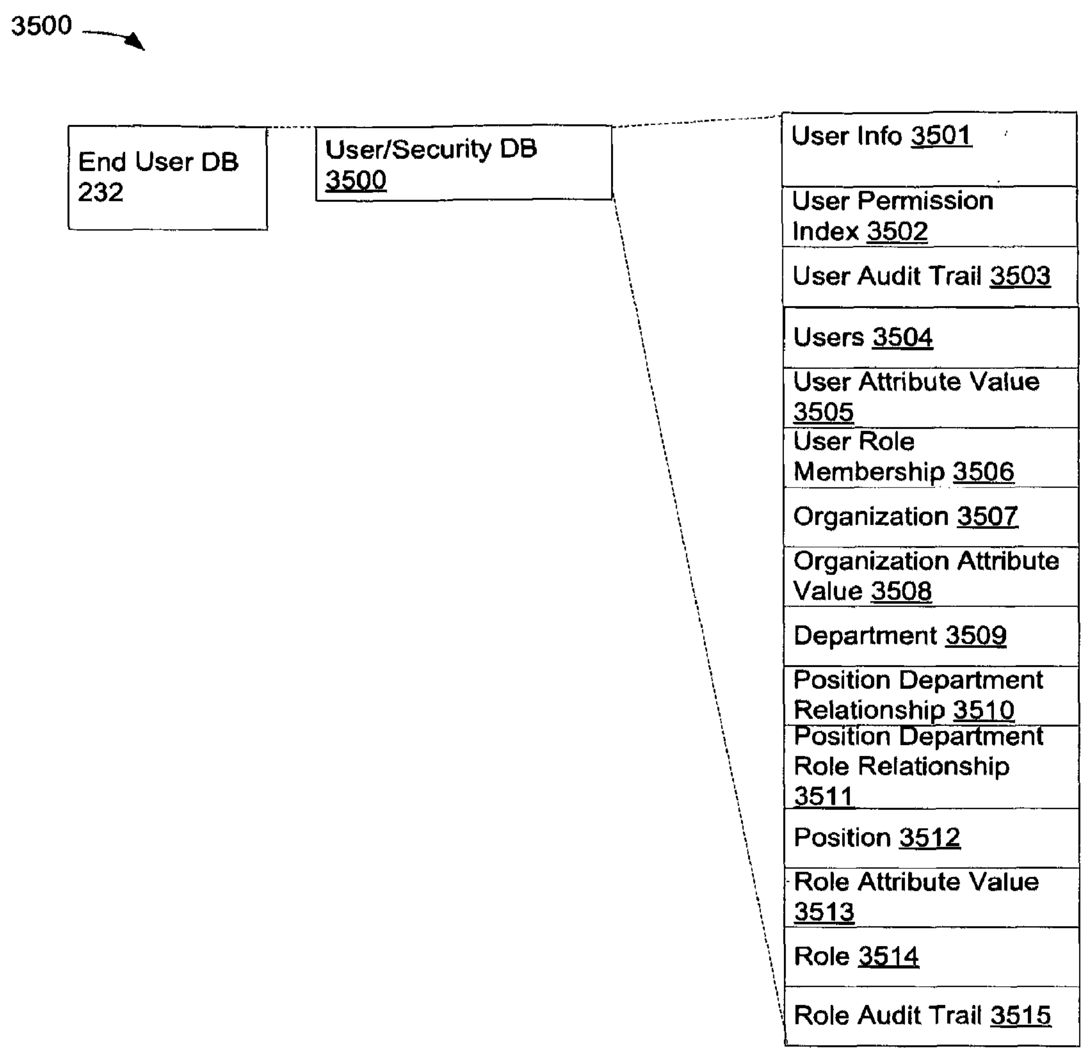
FIG. 35 illustrates a data structure for an end user database, showing contents of a user/security database.

FIG. 35 shows a database diagram 3500 including the end user database 232, associated with the user/security database 3500. In an embodiment, the user/security database 3500 includes one or more of:

User Info 3501, in some embodiments information relating to a user;

User Permission Index 3502, in some embodiments an index of permissions relating to a user;

User Audit Trail 3503, in some embodiments a list of changes (audit trail) for a user for auditing purposes;

Users 3504;

User Attribute Value 3505, in some embodiments the value of an attribute associated with a user;

User Role Membership 3506, in some embodiments membership associated with a user role;

Organization 3507;

Organization Attribute Value 3508, in some embodiments a value of an attribute associated with an organization;

Department 3509;

Position Department Relationship 3510, in some embodiments a relationship between a position and a department;

Position Department Role Relationship 3511, in some embodiments a relationship between a position and a department role;

Position 3512;

Role Attribute Value 3513, in some embodiments the value of an attribute associated with a role;

Role 3514; and

Role Audit Trail 3515, in some embodiments a list of changes (audit trail) for a role for auditing purposes.

Figure 36:
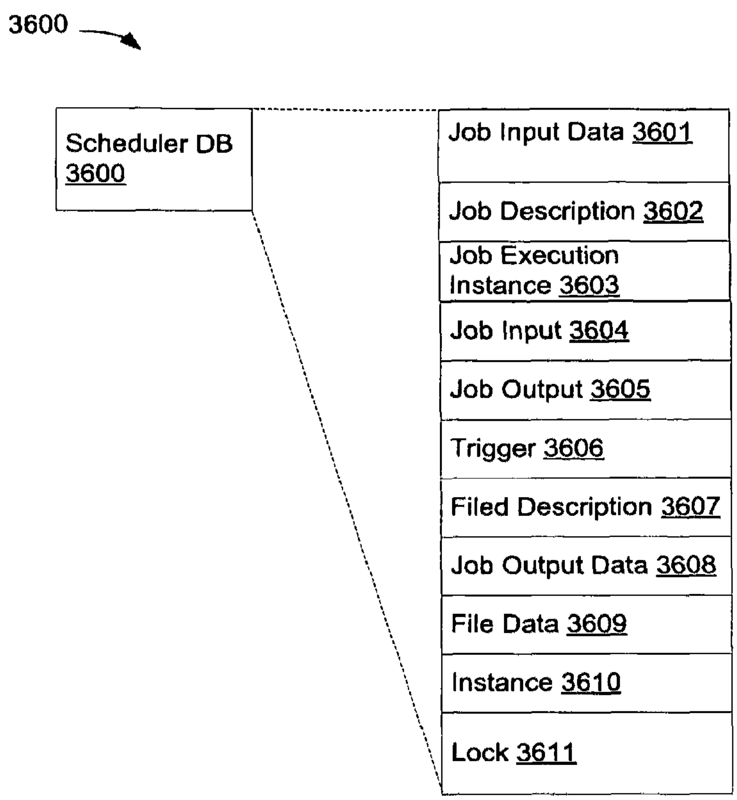
FIG. 36 illustrates a data structure for a scheduler database, showing contents of the scheduler database.

FIG. 36 shows a database diagram 3600 including the scheduler database 3600. In an embodiment, the scheduler database 3600 includes one or more of:

Job Input Data 3601, in some embodiments data relating to a job input;

Job Description 3602, in some embodiments a description relating to a job;

Job Execution Instance 3603, in some embodiments an execution instance relating to a job;

Job Input 3604;

Job Output 3605;

Trigger 3606;

Filed Description 3607;

Job Output Data 3608, in some embodiments data relating to a job output;

File Data 3609;

Instance 3610; and

Lock 3611.

Figure 37:
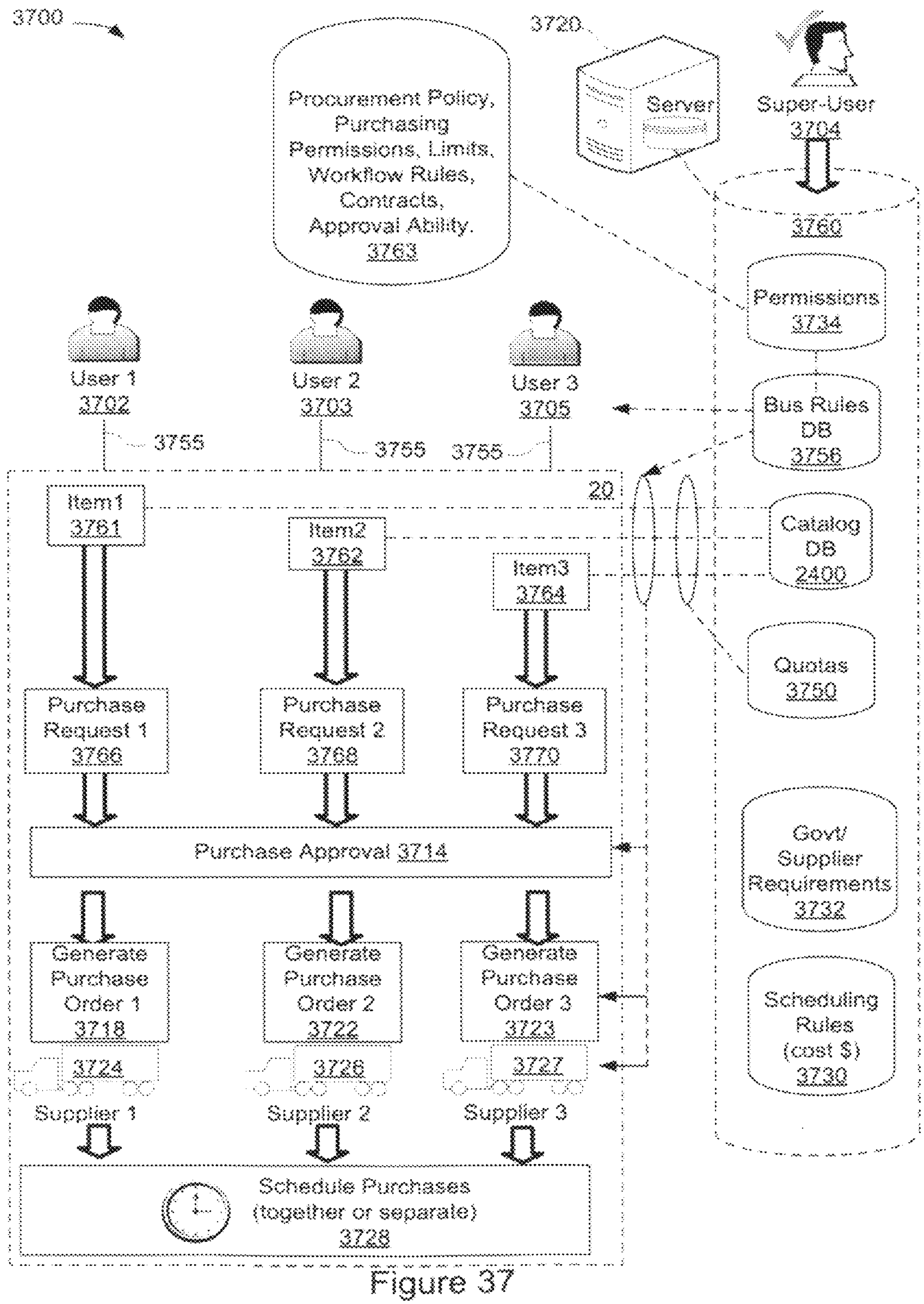
FIG. 37 illustrates a prophetic block diagram of a server system, according to some embodiments.

FIG. 37 is a block diagram of a server system 3700. The system 3700 comprises an electronic procurement (eProcurement) server 3720, located at an eProcurement provider 20 as previously described. The server 3720 is coupled, either locally or remotely, to a database/storage 3760 that hosts a plurality of databases. These stored databases can include one or more of a catalog database 2400, a staging database 3100, a buyer/end user database 232, permissions 3734, a business rules database 3756, requirements 3732, quotas 3750, and other databases as described. In some embodiments, the catalog database 2400 can correspond to a master product database 236 as described earlier.

In some embodiments, the server 3720 can include one or more of a web server 225, a middleware/methods server 224, a transaction processing server 223, a custom database server 222, and an end user processing servers 221, as described earlier.

In some embodiments, the electronic procurement system includes a plurality of purchasing organizations, each having at least one user (e.g., users 3702, 3703, 3705) with permissions 3734 associated with the at least one user. In some embodiments, the permissions are determined in accordance with business rules 3756. In some embodiments, the business rules are associated with at least one of supplier requirements, purchaser requirements, and governmental requirements 3732. In some embodiments, the permissions are determined by a super-user as described earlier, e.g., super-user 3704.

In some embodiments, the permissions 3734 associated with the user 3702 determine the user's ability to purchase from the catalogs 2400 associated with suppliers, and also to purchase non-catalog items. The permissions define a particular user's ability to purchase items based on such criteria as the amount (e.g., dollar limit or number of purchases), type (e.g., lab/office supplies only or electronic/consumer/personal items also), and priority of items (e.g., speed of fulfillment) the user can purchase.

FIG. 37 shows a first user 3702, a second user 3703 and a third user 3705, who access the server system through an internet connection, which in one embodiment is a web connection 3755.

Business rules 3756 are associated with the plurality of users (users 3702, 3703 and 3705). The business rules associated with each respective user may be different. In some embodiments, these business rules determine user permissions 3734 as described, workflow steps and operations, order submission, order approval, and order payment, etc.

Catalog items from catalog database 2400, and also non-catalog items, are displayed to a respective user in accordance with the respective business rules associated with the respective user. If a business rule prohibits a user from viewing a certain item, category, or supplier, then the respective item, category or supplier will not be displayed to that user, even if other users with appropriate permissions may see it.

Throughout this application, "displaying" means at least that the server sends data for display to a client associated with the user. Prior to display, the data for display may be formatted by the server prior to sending to the client associated with the user, or may be formatted by the client after receiving the data, or may include a combination of these operations.

A first item 3761, a second item 3762, and a third item 3764 are displayed to respective users 3702, 3703 and 3705 in accordance with the business rules 3756 and permissions 3734. The users submit respective purchase requests 3766, 3768, and 3770 to purchase the respective items.

Following a purchase request, a purchase approval is determined 3714 (in some embodiments as an individual operation per item, or by group of items) for the catalog items displayed to the users and selected by the users for purchasing. In some embodiments, the purchase approval can be performed when a user submits a request to purchase the item (respective purchase requests 3766, 3768 and 3770), or later (e.g., when a purchase request is routed to an approving party for approval). The permissions 3734 associated with a user may determine a purchasing amount that a user may purchase before approvals are required (e.g., purchase up to $25 without approval) as an individual transaction or an aggregate transaction over time (e.g., $100 total purchases per month).

A purchase order is generated (in some embodiments, following a purchase approval) 3718, 3722, 3723 respectively for the purchase requisitions 3766, 3768, 3770 respectively. Suppliers 3724, 3726, 3727 may be associated with the purchase orders 3718, 3722, 3723 respectively.

The purchase orders may be combined into a large purchaser order or maintained separately, according to business rules. As an example, if the users 3702, 3703, 3705 are at the same purchasing organization, and the items for purchase all come from one supplier, then in some embodiments it would be appropriate to have one purchase order for all three items ordered. In some embodiments, government and supplier requirements 3732 determine if some items (e.g., special items such as radioactive materials, toxins, biohazards, select agents) must have their own separate purchase requisitions and/or purchase orders In some embodiments, the purchases may be scheduled 3728, in accordance with scheduling rules 3730.

In some embodiments, the business rules are specified by a super-user 3704. The super-user 3704 may be a system administrator or manager at a purchasing organization associated with the users 3702, 3703, 3705. The super user 3704 determines the permissions 3734 associated with the users and the business rules 3756 applicable to the users and the purchasing organization. In some embodiments, the business rules and/or permissions include a procurement policy and purchasing permissions 3763. The purchasing permissions may include definitions of purchasing approval ability and purchasing limits for users. Purchasing approval ability determines which user can purchase or approve what type of item (e.g., only managers can purchase toxins or radioactive items). Purchase limits determines who can approve a purchase and to what dollar amount (e.g., any purchase requisition over $25 needs management approval), as described.

In some embodiments, the business rules 3756 may be customized according to at least one of a group consisting of by user (as described), by role, and/or by department. For example, certain classes (job roles) of users (e.g., lab technicians) may have business rules associated with that class, and different classes of users (e.g., senior scientist) may have different rules associated with their job role. In another example, users associated with a first department (e.g., engineering) may have different permissions (e.g., ability to purchase engine parts) associated with them than users associated with a second department (e.g., accounting, having permission to purchase calculators.)

In some embodiments, the business rules 3756 and/or permissions 3734 may have an option to prevent approval by a user of his or her own purchase request, in accordance with the business rules. This option may be enabled by user, by role, and/or by department, as described. This option may reduce inappropriate use (e.g., unauthorized personal purchases) of the electronic procurement system 20. In this case, if a user submits a purchase request for an item, the purchase request is routed for approval by a person other than the user (in some embodiments, more senior than the user), even though the user may otherwise have sufficient purchasing ability (within the user's purchasing limit) to purchase the item without approval.

In some embodiments, business rules 3756 and/or permissions 3734 may have an option to prevent approval by a user of his or her own purchase request over a spending limit, in accordance with the business rules. As described, a user may have permission to purchase up to a certain amount (as described) without requiring approval, as determined by business rules and permissions.

In some embodiments, the business rules are stored at the server 3720. In some embodiments, the purchase requisitions (3766, 3768, 3770) and purchase orders (3718, 3722, 3723) are stored at the server.

In some embodiments, the supplier (e.g., 3724, 3726, 3727) to which a purchase order is assigned is determined according to a procurement policy and with contractual agreements. For example, a purchasing organization may obtain a quantity discount if a quota 3750 of units is purchased from a particular supplier. In this instance, purchase orders may be preferentially assigned to that supplier to meet the quota and obtain the discount. Similarly, contracts may require that certain types of items be ordered from contracting suppliers. In some embodiments, items may be preferentially displayed to users based on quotas of purchases to be filled. In some embodiments, generating a purchase order includes associating workflow rules with the purchase order, in accordance with business rules.

In some embodiments, items (catalog and non-catalog) are displayed to a user in accordance with the respective business rules 3756 associated with the respective items. In some embodiments, items (catalog and non-catalog) are displayed to a user in accordance with the respective business rules associated with the supplier.

Figure 38:
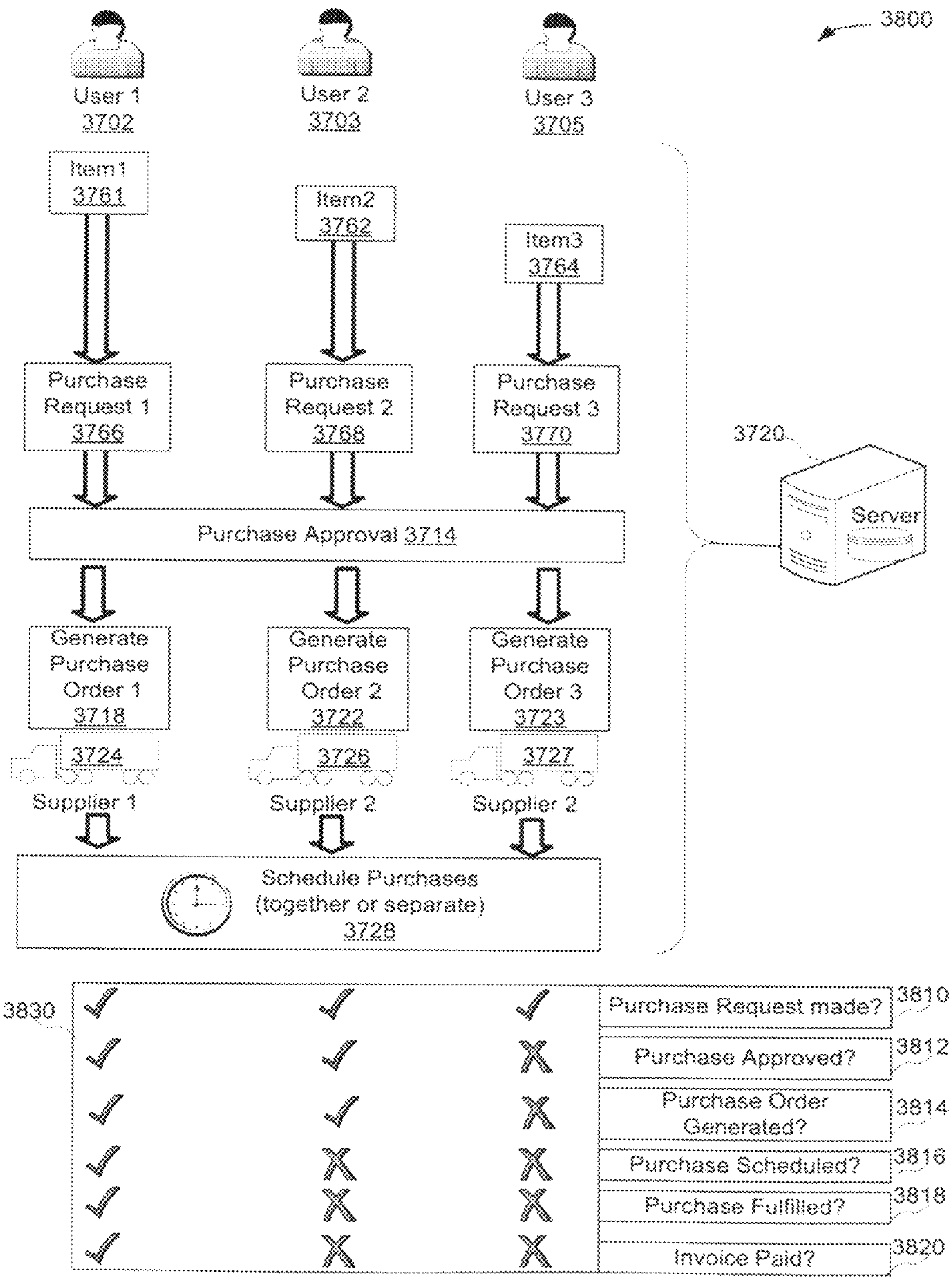
FIG. 38 illustrates a prophetic block diagram of a server system, according to some embodiments.

FIG. 38 is a block diagram of a server system 3800. The server system 3800 includes users (3702, 3703, 3705), items (3761, 3762, 3764), purchase requests (3766, 3768, 3770), purchase approval 3714, purchase orders (3718, 3722, 3723), suppliers 3724, 3726, 3727, and purchase scheduling 3728, as described.

FIG. 38 illustrates a schematic of an exemplary graphical dashboard 3830 displaying status for the purchase requisition, purchase approvals, and purchase orders as described. A purchase request made status 3810 shows whether a purchase request has been submitted for a user or item. A purchase approved status 3812 shows if a purchase request for the user has been approved. A purchase order generated status 3814 shows if a purchase order associated with the user has been generated. In some embodiments, the status information is determined by checking one or more of the Purchase Order Database 2500, the Purchase Order Workflow Activity History 2510, Purchase Order User Selected Approver 2536, and Purchase Order Pending Actions 2538. A purchase scheduled status 3816 shows if a purchase associated with the user has been scheduled. A purchase fulfilled status 3818 shows if a purchase associated with the user has been fulfilled. An invoice paid status 3820 shows if an invoice associated with the user's purchase has been paid.

In some embodiments, these statuses may be associated with a user, an item, or a supplier. The status are displayed on the graphical dashboard 3830 (in some embodiments generated at the server 3720 but displayed at a user's client), including on a sales order queue 5300, a graphical display of sales orders status, which is described below in FIG. 53. The displaying includes presenting on the graphical dashboard approval, purchasing and fulfillment status for the item. In some embodiments, the graphical dashboard is dynamically generated at the server 3720 in accordance with business rules 3756 stored at the server, as described.

Figure 39:
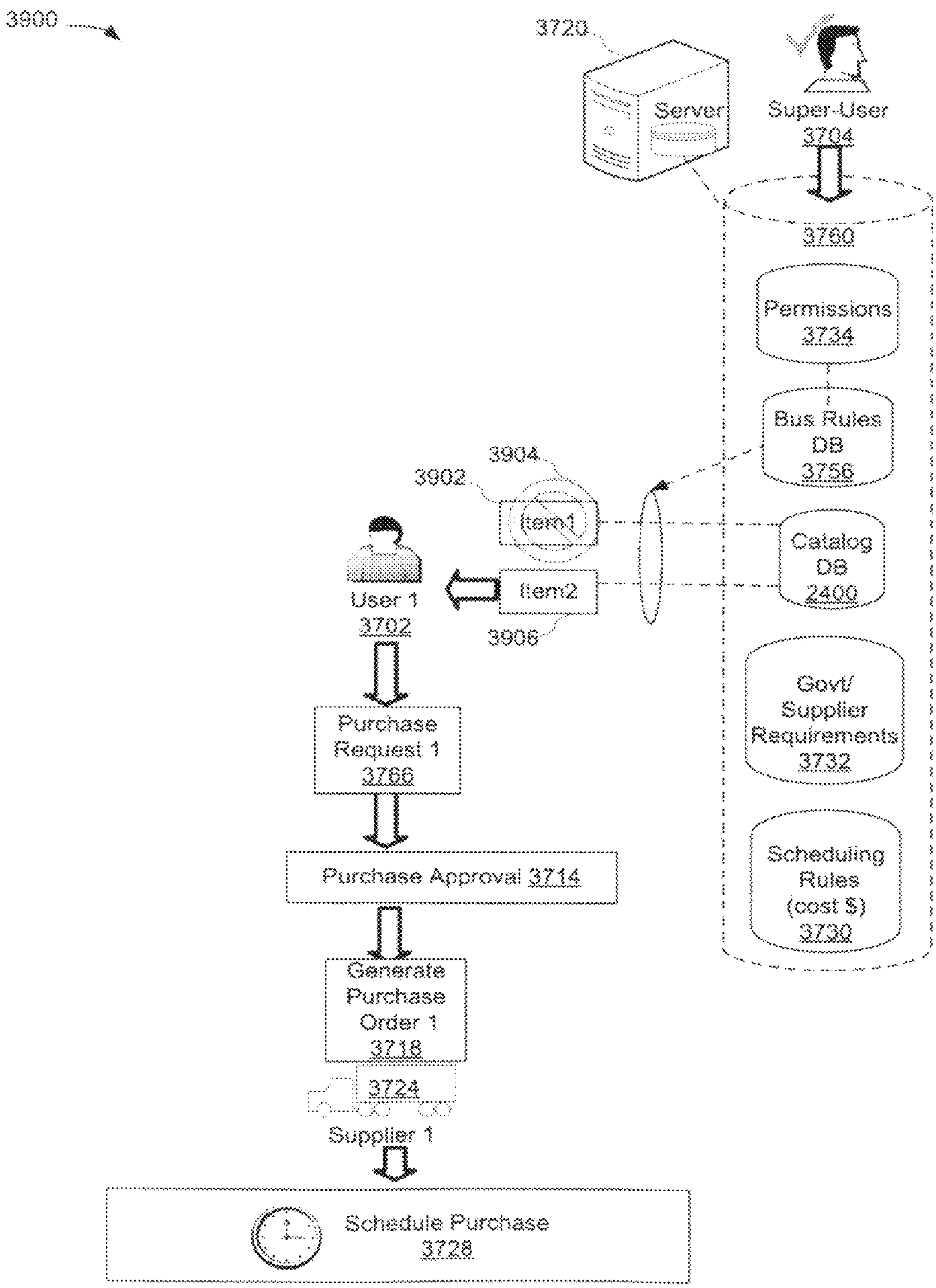
FIG. 39 illustrates a prophetic block diagram of a process flow implemented at a server system, according to some embodiments.
Figure 40:
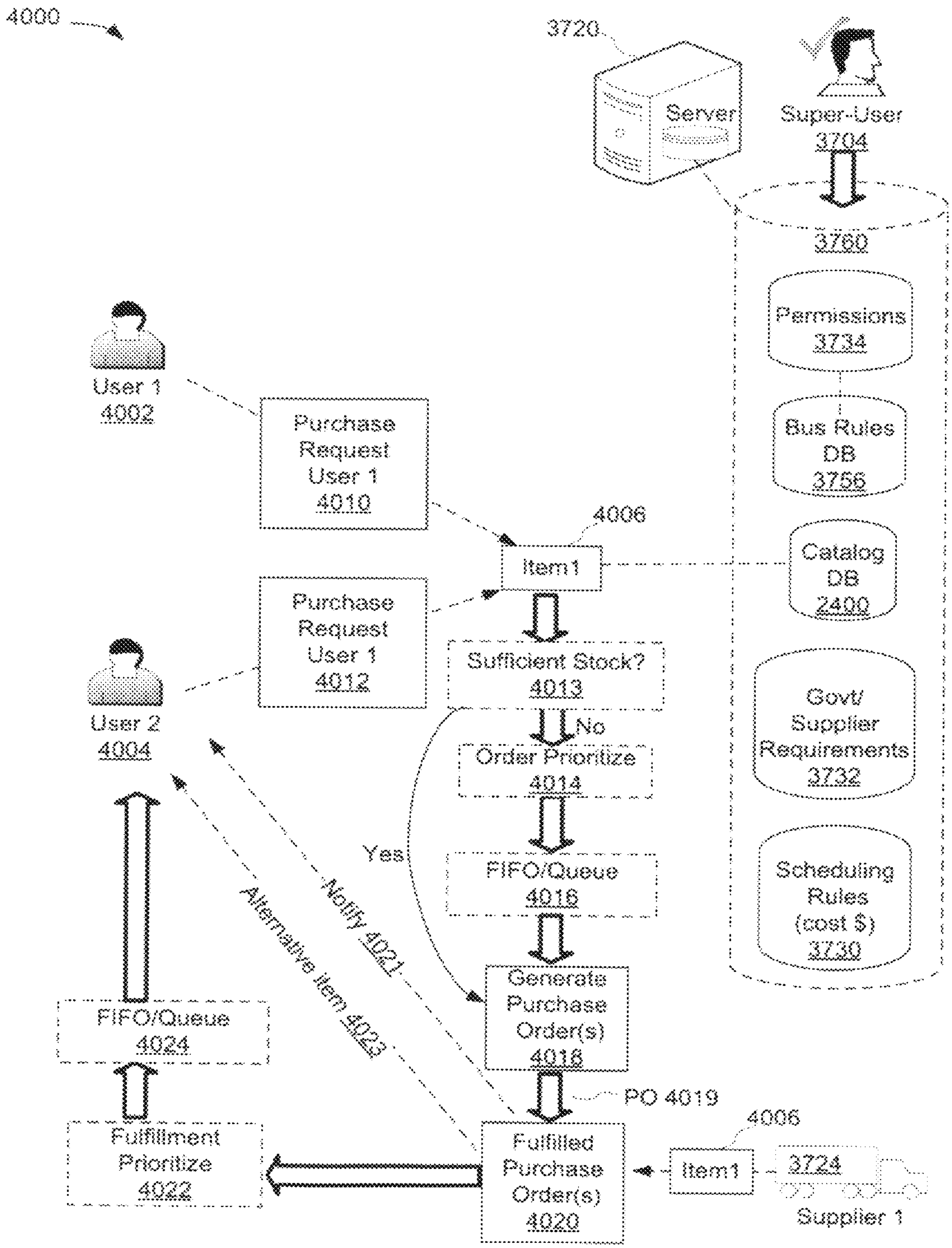

FIG. 39 shows a block diagram of a process flow implemented at a server system 3900. A user 3702 accesses the server system 3900, and attempts to order a product that is not available. The server system 3900 includes a purchase request 3766, a purchase approval 3714, a purchase order generation 3718, and a purchase scheduling 3728 as described. Server system 3900 also includes server 3720 and databases 3760 as described. The databases include catalog database 2400, permissions 3734, a business rules database 3756, requirements 3732, scheduling rules 3730, and other databases as described.

In FIG. 39, the user 3702 requests access to a first item 3902. The first item 3902 may be a catalog or non catalog item associated with the electronic procurement system. If the first item is unavailable 3904, a second available item 3906 corresponding to the first item 3902 is identified. The second item could be a similar item as identified in the catalog 2400, or could be a non-catalog item. An available item is one that is in stock at a supplier or at an internal stockroom, and may be ordered for prompt delivery. An unavailable item includes one that is out of stock, back-ordered, discontinued, or one that cannot otherwise be delivered promptly via the electronic procurement system.

The second available item 3906 is displayed to the user in accordance with business rules 3756 associated with the user. In some embodiments, the business rules are associated with the item. In some embodiments, the business rules are associated with a supplier of the item.

The user submits a purchase request 3766 for the second available item 3906, and a purchase approval 3714 is determined. A purchase order 3718 is generated for the item. The purchase order may be associated with a supplier 3724. The purchase request may be scheduled 3728, all as described.

Figure 40:
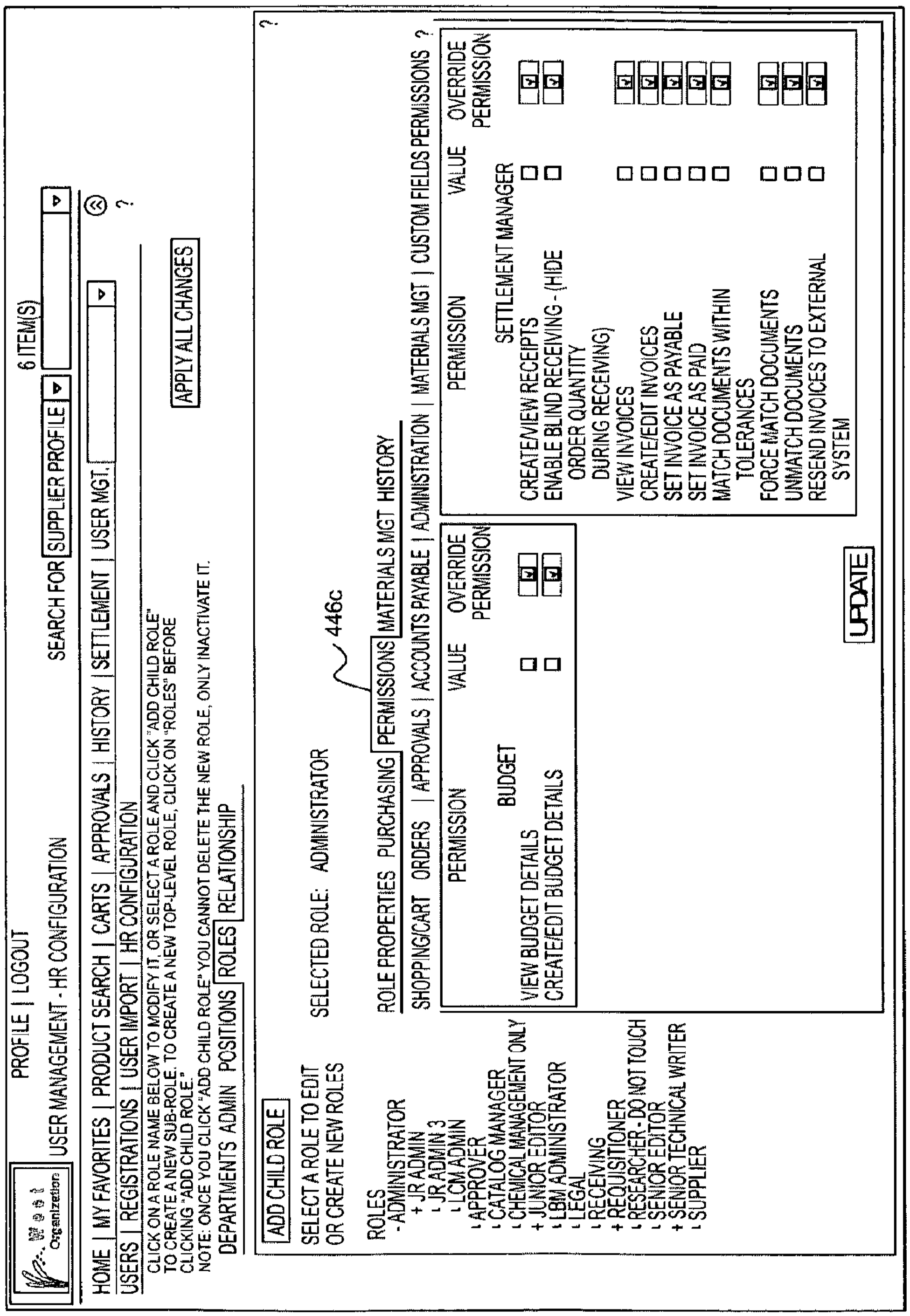
FIG. 40 illustrates a prophetic block diagram of an e-procurement process flow implemented at a server system, according to some embodiments.

FIG. 40 shows a block diagram of an e-procurement process flow operating on a server system 4000. Server system 4000 also includes server 3720 and databases as described. The databases include catalog database 2400, permissions 3734, a business rules database 3756, requirements 3732, scheduling rules 3730, and other databases as described.

In FIG. 40, first user 4002 submits a purchase request 4010 to the server for an item 4006. The item 4006 may be a catalog item (e.g., an item from catalog database 2400) or non catalog item associated with the electronic procurement system. A second user 4004 also submits a purchase request 4012 to the server for the same item 4006. In some embodiments, the second user is from the same organization as the first user.

A determination is made (4013) whether there is sufficient stock of the item available to fulfill both user purchase requests. If there is insufficient stock of the item available to fulfill both purchase requests, the user purchase requests are prioritized (4014). If there is sufficient stock, then purchase orders may be generated (4018) without prioritizing. Prioritizing (4014) can include determining which user request (if any) is highest priority, as described. In some embodiments, user requests of a similar priority level are filled according to a first in, first out (FIFO) method. In some embodiments, one or both of the user purchase requests are placed in a queue (4016) according to the prioritizing. One or more purchase orders 4019, 4020 are generated (4018).

In some embodiments, prioritizing the user purchase requests is performed in accordance with the importance of a respective project or task associated with each respective user. In some embodiments, importance may include factors such as remaining schedule, amount of budget, including budget overruns, proximity to deadlines or milestones, and other business or project management factors.

In some embodiments, user purchase requests of a similar priority level in the queue are fulfilled according to a first in, first out (FIFO) method. In some embodiments, the order of insertion of a purchase request into the queue is determined by prioritizing 4014. In this case, the prioritizing may include sorting purchase orders into priority groups, which are then inserted into the FIFO in order of priority group. A highest priority group is placed in the FIFO first, a next highest priority group goes next into the FIFO, and finally a lowest priority group goes into the FIFO last.

In some embodiments, a user having an order in the queue 4016 is notified 4021 when the ordered item is ready for fulfillment 4020. In some embodiments, this occurs when the item 4006 is delivered by supplier 3724.

In some embodiments, an alternative available item 3906 (as described) is presented (4023) to a user 4004 having an order in the queue, in accordance with a predicted fulfillment delay. For example, if a user has already placed an order, and the electronic procurement system determines that the already-placed order will be delayed, an alternative item may be presented to the user as described in reference to the process flow 3900. The alternative item may be presented as an item to be ordered from an external supplier or an item from an internal stockroom. In some embodiments, where the original (unavailable) item 4006 was already approved for purchase, the alternative item 3906 may not require submission of a purchase request, approval, etc. since it is a substitute for the originally approved item.

In some embodiments, the prioritizing is performed according to fees associated with the respective users. In some embodiments, a purchasing organization (buyer) may choose to subscribe or pay for a higher lever of service, including receiving preferential ordering position for a short-supply or allocated product. Tiers of service may be implemented in the electronic procurement system, where lower tier (lower paying or free) users of the system receive lower priority service that premium (higher fee paying) users. In some embodiments, if an item is in short supply, the purchasing process may become a bidding or auction process, whereupon users submit orders as bids.

In some embodiments, prioritizing (4022) may be performed upon fulfillment of the item order (4020), in addition to or instead of at the time of order. Upon fulfillment (delivery of the item), a determination may be made whether there is sufficient stock of the item available to fulfill both user purchase requests 4010 and 4012. The prioritized requests may be placed (4024) in a fulfillment FIFO or queue. The prioritized requests may be fulfilled according to the priority.

In some embodiments, if at time of delivery an alternative item comparable with the requested item is available, and the requested item is not available in sufficient stock to satisfy both the first user request 4010 and second user request 4012, one or more of the user purchase requests may be fulfilled with the alternative item. For example, if a first user A and second user B each order one ten-pack of notepads, the delivery fulfillment might include just one ten-pack and one twelve-pack. In this delivery, the twelve-pack is an alternative item comparable with the requested item ten-pack (as it can provide at least ten notepads, even if there are two left over), so the twelve pack can be used to fulfill the purchase request for a ten pack, as a substitute.

FIG. 41 illustrates an exemplary data structure 4100 for an inventory of an item. In some embodiments, this data structure is stored in the item database 2410, in the master database 236, at the eProcurement server 20. In some embodiments, the inventory data structure could be stored at a purchaser server, or at a purchaser client. The data structure may include purchase prices 4012, purchase quantities 4104, dates of purchase 4106, average cost of items per purchase 4108, shelf age of each purchase 4110, markup to be added to each purchase 4112, sale price 4114, and inventory 4116 of the item. An exemplary history of purchases (4118, 4120, 4122, 4124) is shown also. An exemplary sale history may also be included in the data structure.

In some embodiments, by analyzing a series of user purchases of an item (e.g. history 4118, 4120, 4122, 4124), a property (such as cost, time in inventory, spoilage status, etc.) per item purchased is determined. Inventory 4116 is managed (by the server, or by a user accessing the server) based on the property per item. The managing includes making decisions to purchase items to replenish inventory, to deplete inventory in order to sell items by a 'best before' date, determining pricing to achieve a desired markup, etc. In some embodiments, the property per item is a cost per item purchased (e.g. average cost 4108). The average cost may be calculated by dividing the purchase price 4102 (total) by the quantity purchased 4104.

In some embodiments, the cost per item includes a holding cost per unit of that item. This holding cost can include depreciation, value reduction due to obsolescence, shrinkage, reduction of remaining shelf life, etc. In some embodiments, managing includes determining a sale price per item 4114, based on the cost per item 4108 and a markup 4112. In some embodiments, the managing is performed by a user at the purchaser using manage purchases engine 1533. The sale price may also be reduced in accordance with shelf age 4110. The shelf age may be calculated by subtracting the date purchased from the current date to find the number of days since purchase of that batch of items. The sale price 4114 may be calculated by multiplying the average cost per item 4108 by the markup 4112.

In some embodiments, the property per item is a spoilage status, based upon an average holding time per item. This is used for food, medicines, and organics that have 'best before' date. In some embodiments, the property per item is velocity of purchases and/or velocity of sales for that item. In some embodiments, the property per item is a predicted out-of-stock time based upon the velocity of purchases and a velocity of sales.

The categories and values described here are exemplary, and other properties and calculations could be used to achieve the result of managing inventory.

Figure 42:
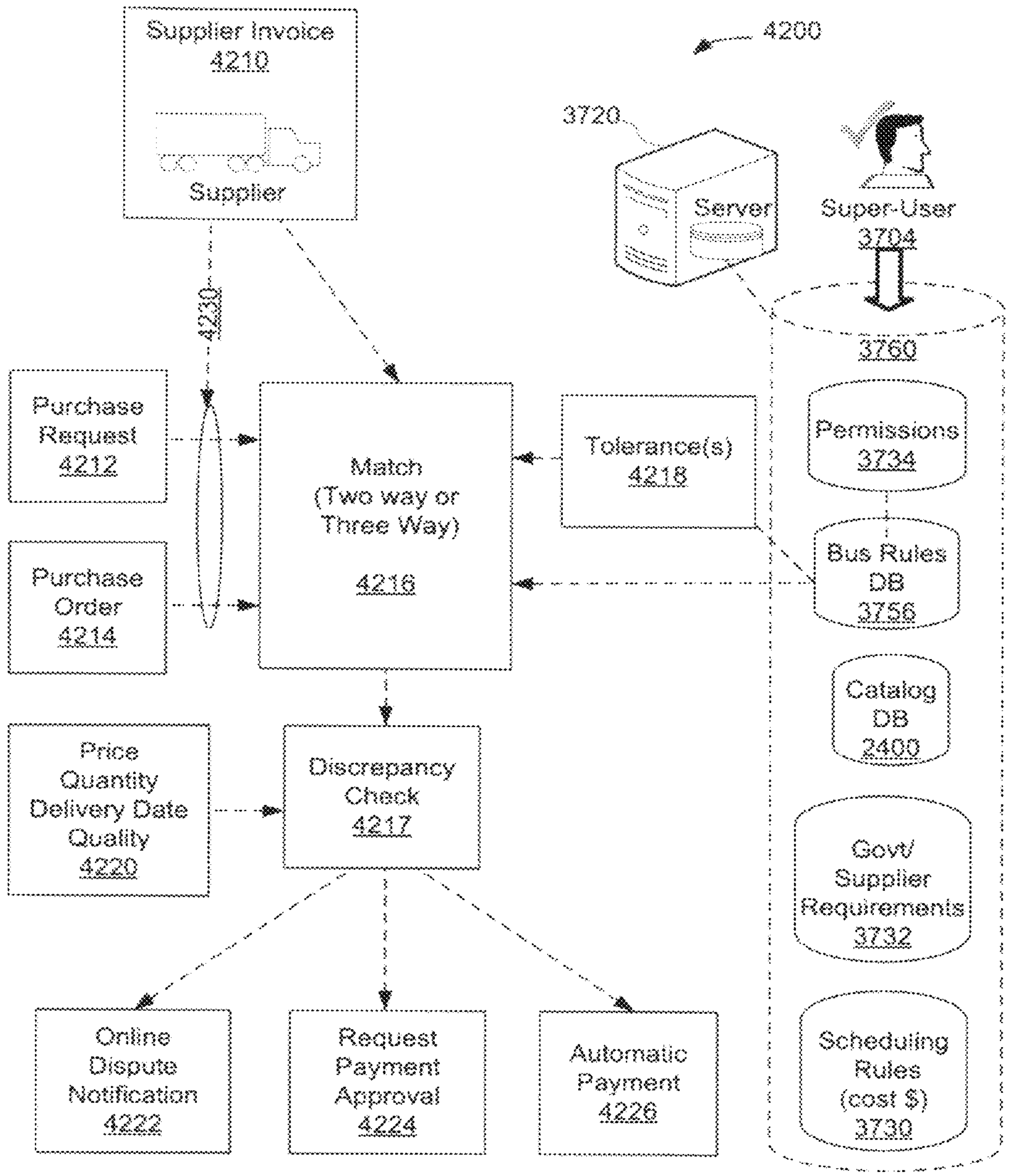
FIG. 42 illustrates a prophetic block diagram of a process flow, implemented at a server system, according to some embodiments.

FIG. 42 shows a block diagram of a process flow, implemented at a server system 4200. The process flow shows an e-procurement process for identifying a discrepancy between a purchase document and an invoice.

Server system 4200 also includes server 3720 and databases as described. The databases include catalog database 2400, permissions 3734, a business rules database 3756, requirements 3732, scheduling rules 3730, and other databases as described.

A supplier invoice 4210 is received by the electronic procurement system. In response to the receiving, a purchase document corresponding to the invoice is identified (4230). Purchase documents may include one or more of a purchase request 4212 and a purchase order 4214. The content of the purchase document is compared (4216) to the supplier invoice 4210. A discrepancy is identified (4217) between the purchase document and the invoice. A notification is generated based upon the identified discrepancy, and may be sent to a user associated with the purchase order 4212 or request 4214. The notification can include an online dispute notification 4222, a request for payment approval 4224, or a notification of automatic payment (4226).

The discrepancy check 4217 compares properties such as price, quantity, and delivery date 4220 between the purchase documents and the invoice. In some embodiments, identifying a discrepancy includes determining if a property associated with the invoice is outside of a tolerance range 4218. The tolerance range may be specified by business rules 3756. If the discrepancy between the purchase document and the invoice is above a threshold (e.g. percentage mismatch, dollar value, number of days late, number of defects, etc.), then the dispute notification 4222 is sent to the supplier, and in some embodiments to a user associated with the purchase request and purchase order. In some embodiments, the supplier and a purchaser associated with the invoice may access an online dispute resolution mechanism 4222, which may be hosted at the electronic procurement system. If the discrepancy is minor, the invoice can be sent to the user with a request for payment approval 4224, i.e. a request to verify that the match is correct. If there is no discrepancy, then the invoice is sent for automatic payment 4226.

The discrepancy check 4217 can include performing at least a two way match between the invoice and the purchase document. A two way match is where one of the purchase request 4212 and purchase order 4214 are matched with the invoice 4210. In some embodiments, the discrepancy check 4217 can include performing a three way match, including: comparing both the purchase request 4212 and the purchase order 4214 to the invoice 4210. In some embodiments, delivery documents may be compared with the purchase documents and the invoice.

In some embodiments, identifying a discrepancy (4216) includes determining if an alternative item comparable with the requested item has been delivered. If the purchase order or request has been satisfied by the alternative item, then the purchase request or purchase order may be treated as satisfied and the invoice paid by the user. For example, if a twelve pack of notepads is delivered instead of a ten pack, as described.

Figure 43:
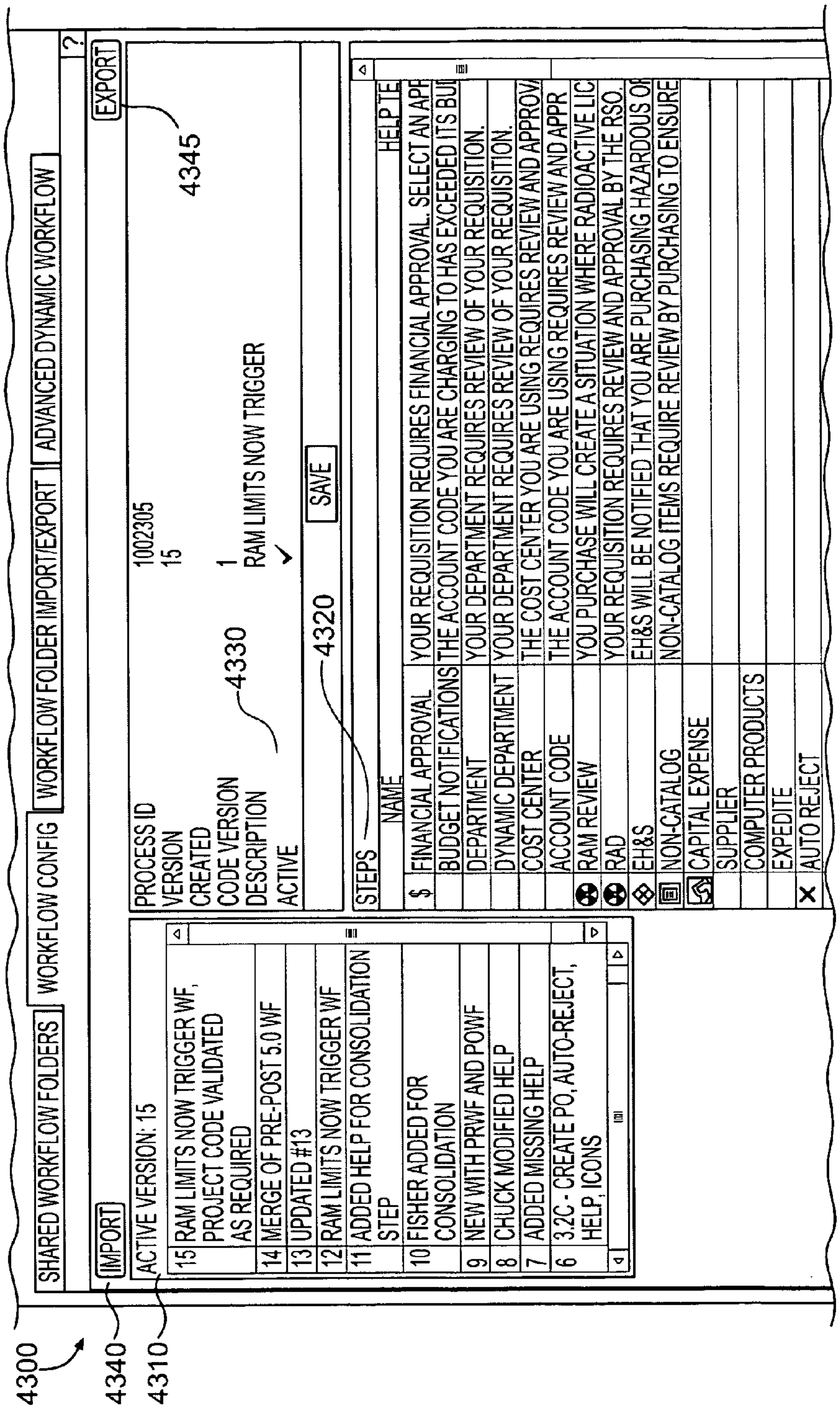
FIG. 43 illustrates an exemplary screenshot of a workflow configuration user interface, according to some embodiments.

FIG. 43 is an exemplary screenshot 4300 of a workflow configuration user interface, generated by workflow management engine 1680. A super user or administrator uses this interface to configure steps and operations associated with a workflow. This configuration is typically performed at the super user's client, and the configuration data is saved at the eProcurement system 20.

Window 4310 shows status items for a particular step in the workflow. Save option 4330 allows changes to the workflow to be saved. Steps 4320 shows steps in the workflow associated with a purchase or operation. Import button 4340 allows workflow steps to be imported. Export button 4345 allows workflow steps to be exported. These workflow steps are stored in the workflow database 3000, in at least workflow step 3002.

Figure 44:
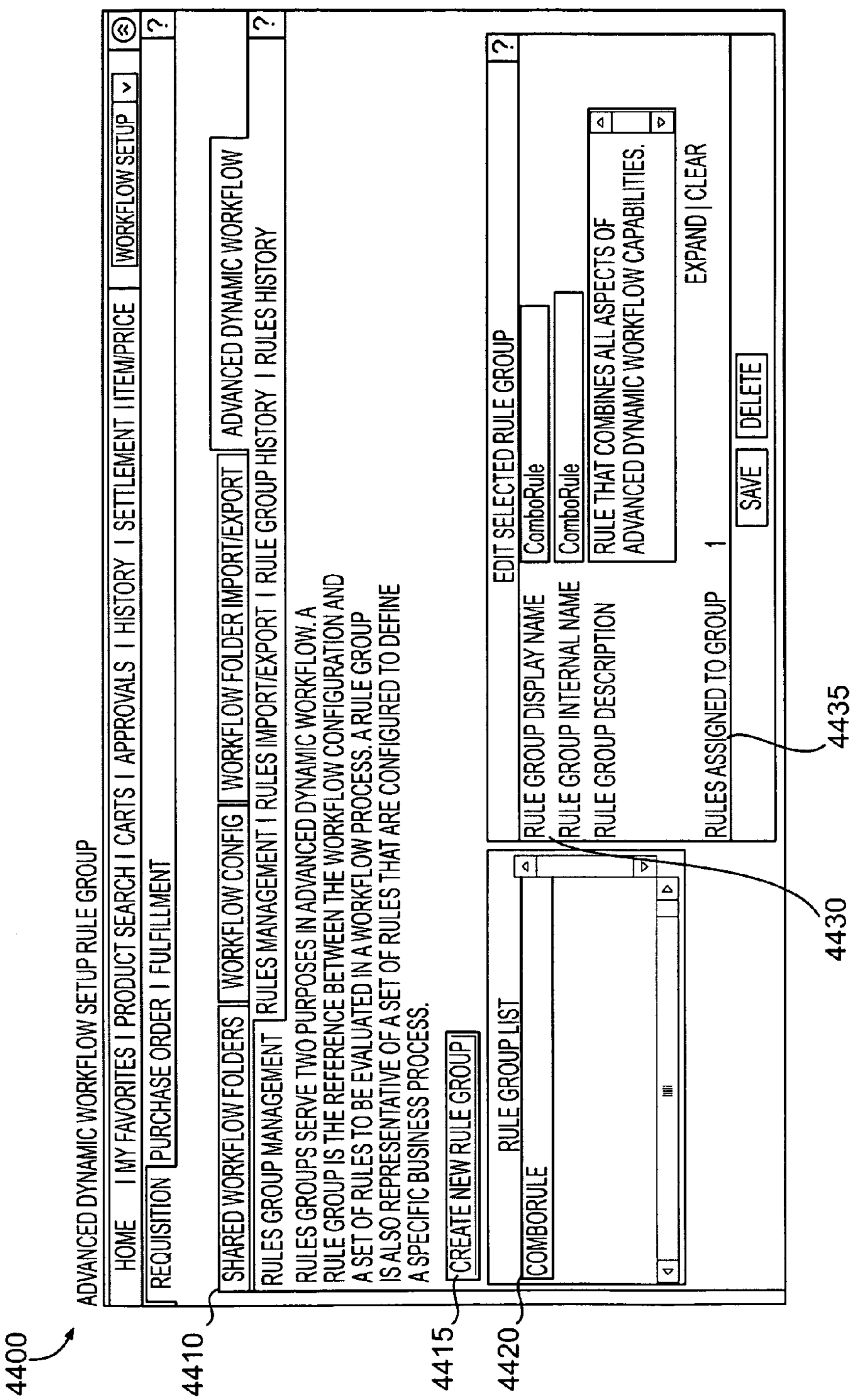
FIG. 44 illustrates an exemplary screenshot of an advanced dynamic workflow setup rule group menu, according to some embodiments.

FIG. 44 is an exemplary screenshot 4400 of an advanced dynamic workflow setup rule group menu, generated by workflow management engine 1680. This interface is used by a super user or administrator to setup rule groups, and changes are stored at the eProcurement system 20, as described. Changes are made to the workflow dynamic rule group 3034, and workflow dynamic rule group audit trail 3036, both stored in workflow database 3000.

In this menu, groups are used for easy reference and organization of individual rules. Groups are referenced within the workflow configuration. The menu includes workflow tabs 4410 to navigate through the workflow options. A create new rule group button 4415 allows creation of new workflow rules. A rule group list 4420 shows created rules. An edit selected rule group menu 4430 allows a user to select individual rule groups for editing. A pair of save and delete buttons 4435 allow changed rules to be saved or rules to be deleted.

Figure 45:
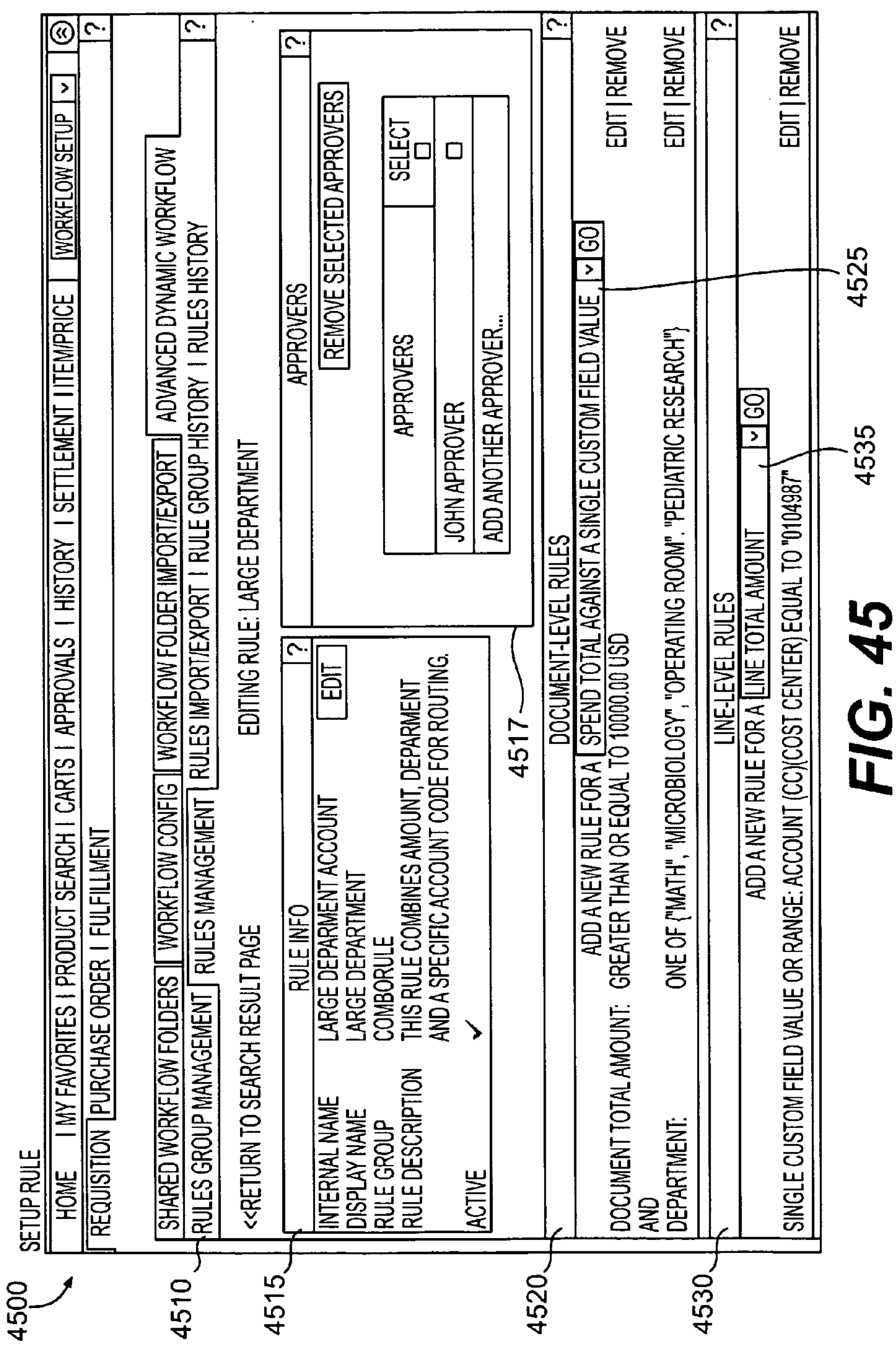
FIG. 45 illustrates an exemplary screenshot of a rules management setup menu, according to some embodiments.
Figure 46:
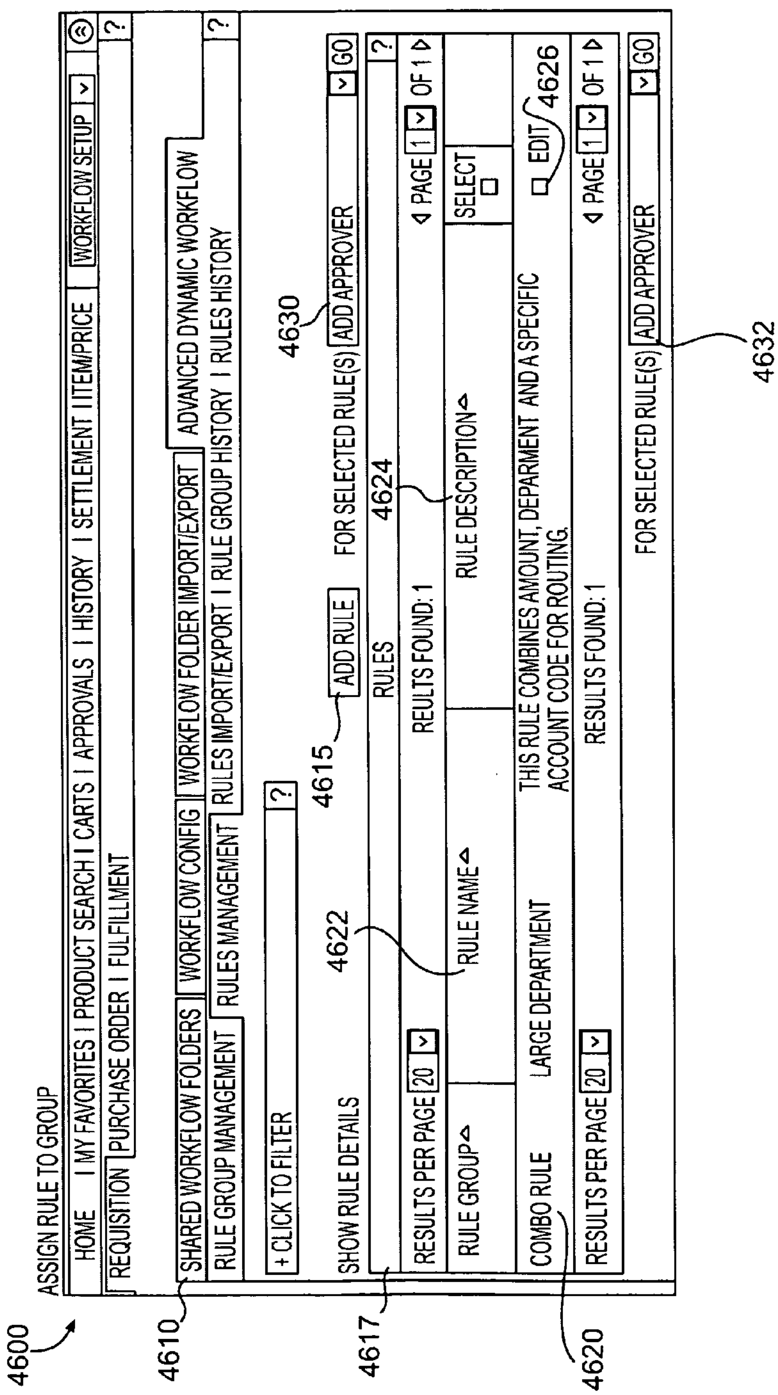
FIG. 46 illustrates an exemplary screenshot of an assign rule to group menu, according to some embodiments.
Figure 47:
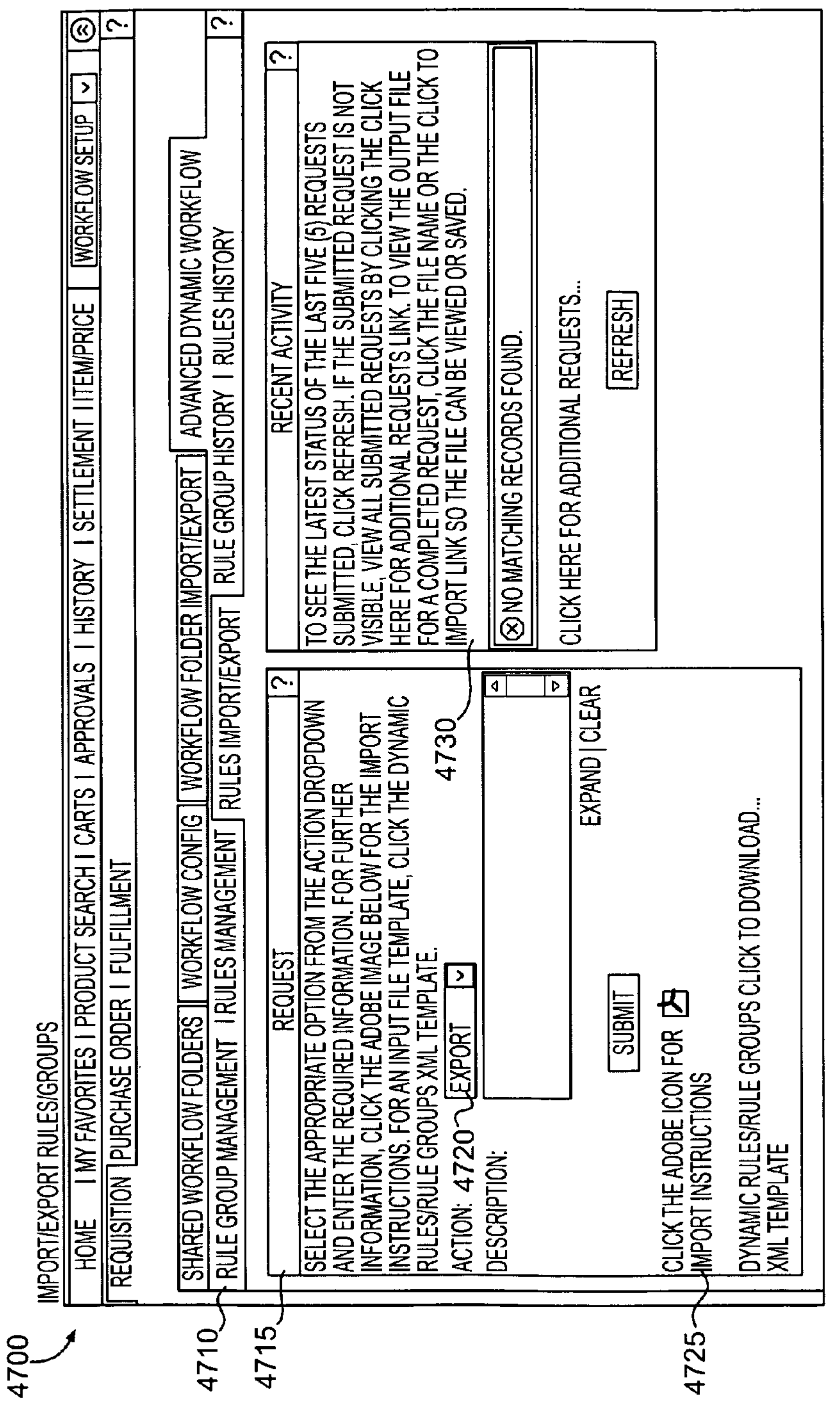
FIG. 47 illustrates an exemplary screenshot of an import/export rules group menu, according to some embodiments.

The rule management operations described (as follows) in FIGS. 45, 46, 47 may be performed using one or more of the Workflow Folder Selection Rule 3014, Workflow Dynamic Rule Group 3034, Workflow Dynamic Rule Group Audit Trail 3036, Workflow Dynamic Rule 3038, Workflow Dynamic Rule Element 3040, and Workflow Dynamic Rule Audit Trail 3042, in workflow database 3000, shown in FIG. 30. Product rule management may be performed using Product Rule 3122, from summary search database 3130, shown in FIG. 31. The menus described in FIGS. 45, 46, 47 are accessed by a super user or administrator when configuring the workflow rules, and changes are stored at the eProcurement system 20, as described. The menus described are generated by the workflow management engine 1680, residing on the eProcurement system 20.

FIG. 45 is an exemplary screenshot 4500 of a rules management setup menu. This menu allows rules controlling workflow operations to be specified by the super user or administrator. In this menu, rules can be created at the header and line item levels. Rules can be created and updated on an ad-hoc basis, since only the rule group is referenced in the workflow configuration. Approvers can be assigned to rules on an ad-hoc basis. Numerous rule types are supported including document total value, department, accounting codes, custom fields setup by the organization for the document, form type, line amount, line commodity code, and others.

The rules management setup menu includes workflow tabs 4510 to navigate through the workflow options. A rule information menu 4515 shows information regarding a particular rule. An approver menu 4517 shows approvers for a rule and allows approvers to be added and removed. A document level rules menu 4520 allows rules to be specified per document, via a drop down menu 4525. A line level rules menu 4530 allows rules to be specified per line item, via a drop down item 4535.

FIG. 46 is an exemplary screenshot 4600 of an assign rule to group menu. In this menu, multiple rules can be assigned to a single group by the user or super user. This offers flexibility in being able to add/modify/delete rules to workflow without having to change the workflow configuration since the configuration references a Rule Group and not the rules themselves.

The assign rule to group menu includes workflow tabs 4610 to navigate through the workflow options. An add rule button 4615 allows a new rule to be added. A rules menu 4617 shows rules assigned with a particular group. The rules menu includes a rule group field 4620, a rule name field 4622, a rule description field 4624, and a select field 4626. Drop down menus 4630 and 4632 allow actions to be selected for a rule or rules.

FIG. 47 is an exemplary screenshot 4700 of an import/export rules group menu. In this menu, individual rules and groups of rules can be imported or exported by a super user or administrator to facilitate integration with other systems. Additionally, groups and rules can be ported via electronic file between application environments, such as from test to production environments. In some embodiments, the groups and rules are ported as an XML based file.

The import/export rules group menu includes workflow tabs 4710 to navigate through the workflow options. A request menu 4715 allows import or export actions to be initiated. An action drop down menu 4720 allows a user to select a desired action. A recent activity window 4730 shows recent import/export requests submitted. Import instructions 4725 assist a user in importing rules.

Figure 48:
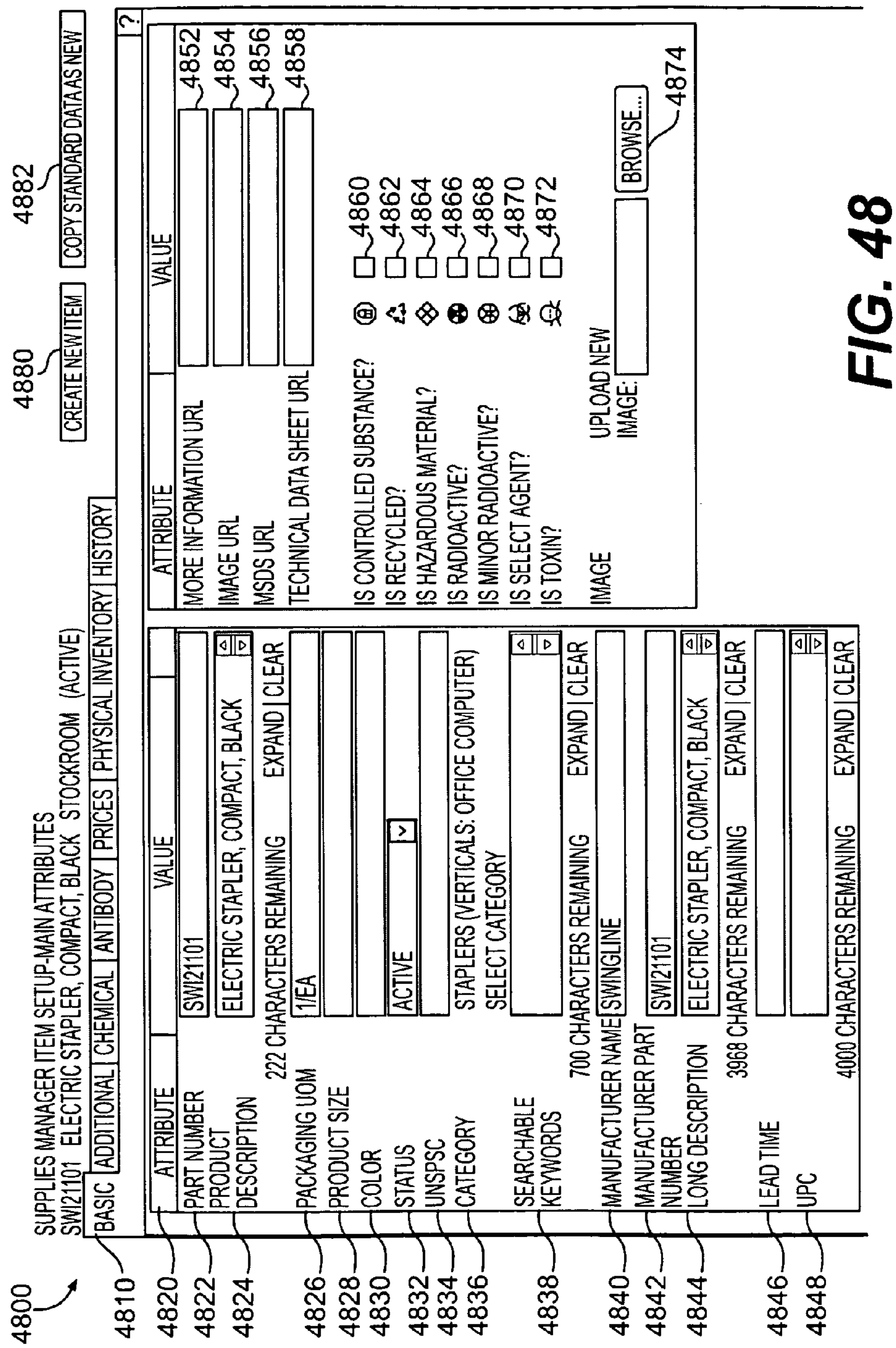
FIG. 48 illustrates an exemplary screenshot of an item setup menu within a supplies manager application, according to some embodiments.

FIG. 48 is an exemplary screenshot 4800 of an item setup menu within a supplies manager application. This menu allows key attributes of an item to be managed and pricing for fixed pricing items to be managed. This menu is generated at the eProcurement server 20, in some embodiments by the catalog management engine 1695 and/or the catalog module 2120. The menu is accessed by a user (or super user) at the supplier when setting attributes and pricing for items. Attributes and prices for items, set using the item setup menu, are stored at the catalog database 2400, under items data base 2401 (for individual item attributes) and price database 2430 (for prices associated with items).

The item setup menu includes workflow tabs 4810 to navigate through the supplies manager options. The attribute value menu 4820 includes the following fields:

Part number 4822, a part number for the product;

Product Description 4824;

Packaging UOM 4826, unit of measure for packaging;

Product Size 4828

Product Color 4830;

Status 4832, the status relating to a product (e.g., available, unavailable, backordered, etc);

UNSPSC 4834, the United Nations Standard Products and Services Code, where UNSPSC is a coding system to classify both products and services for use throughout the global eCommerce marketplace;

Category 4836, for product category;

Searchable Keywords 4838, keywords or tags best describing the product that are used as hits for a user search;

Manufacturer Name 4840;

Manufacturer Part Number 4842;

Long description 4744, a detailed description of the product;

Lead Time 4846, expected time between ordering and receiving the item;

UPC 4848, the universal product code (barcode) for the product;

More Information URL 4852, URL link to more information about the item;

Image URL 4854, product image URL;

MSDS URL 4856, material safety data sheet URL;

Technical Data Sheet URL 4858, a URL link to a datasheet for the item;

Is Recycled? 4862;

Is Controlled Substance? 4860, a flag indicating a potential controlled substance such as certain drugs, opiates, etc.;

Is Hazardous Material 4864, a flag indicating a potential hazardous (e.g., biohazard, fumes, etc) item;

Is Radioactive? 4866, a flag indicating a potential restricted radioactive item;

Is Minor Radioactive? 4868, a flag indicating a potential restricted radioactive item;

Is Toxin? 4872 a flag indicating a potential toxic substance such as poison;

Is Select Agent? 4870 a flag indicating select agents, which are pathogens or biological toxins that have been declared by the U.S. Department of Health and Human Services or by the U.S. Department of Agriculture to have the "potential to pose a severe threat to public health and safety"; and Upload new image field and button 4874.

A create new item button 4880 and copy standard data to new button 4882 are also present.

Figure 49A:
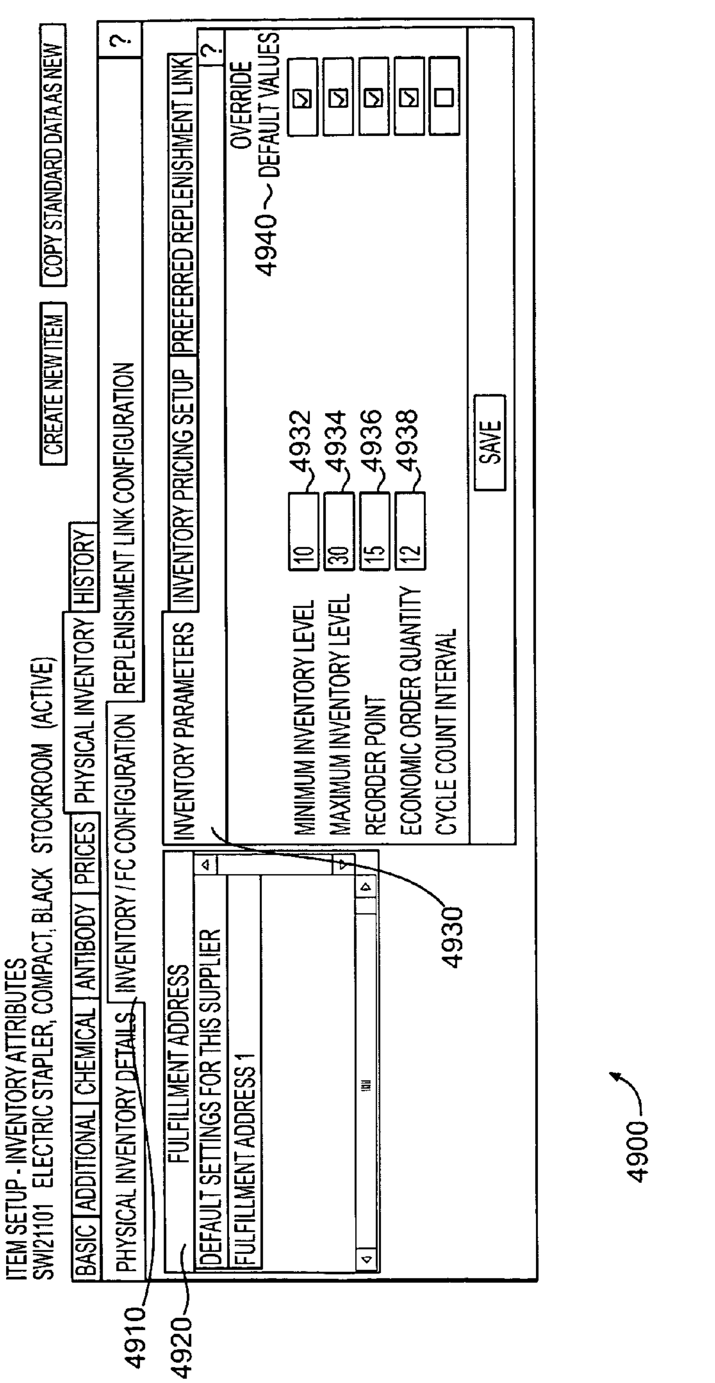
FIG. 49A illustrates an exemplary screenshot of a setup inventory attributes menu, according to some embodiments.

FIG. 49A is an exemplary screenshot 4900 of a setup inventory attributes menu. In this menu, inventory parameters are inherited from the fulfillment center where the item is stocked. The parameters can be overridden at the item level as necessary. The parameters drive replenishment functionality. This menu is generated at the eProcurement server 20, in some embodiments by the catalog management engine 1695 and/or the catalog module 2120. For non-catalog items, it may be generated using a purchasing engine 1681. The menu is accessed by a user (or super user) at the supplier when setting attributes for inventory. These inventory attributes are stored at the catalog database 2400, under item inventory config 2526, and changes are stored in item inventory config audit trail 2428.

The setup inventory attributes menu includes workflow tabs 4910 to navigate through the workflow options. A fulfillment address menu 4920 shows an address for a supplier. An inventory parameter menu with tabs 4930 allows navigation through the inventory options.

The inventory parameter menu 4930 includes the following fields:

Minimum inventory level 4932;

Maximum inventory level 4934;

Reorder point 4936; and

Economic Order Quantity 4938.

A select box menu to override default values 4940 is also present.

In some embodiments, the item attribute/parameter management may be performed using the items database 2401, including Item Inventory Config 2426 for configuring inventory of an item, and Item Inventory Config Audit Trail 2428 for tracking changes in inventory configuration.

Figure 49B:
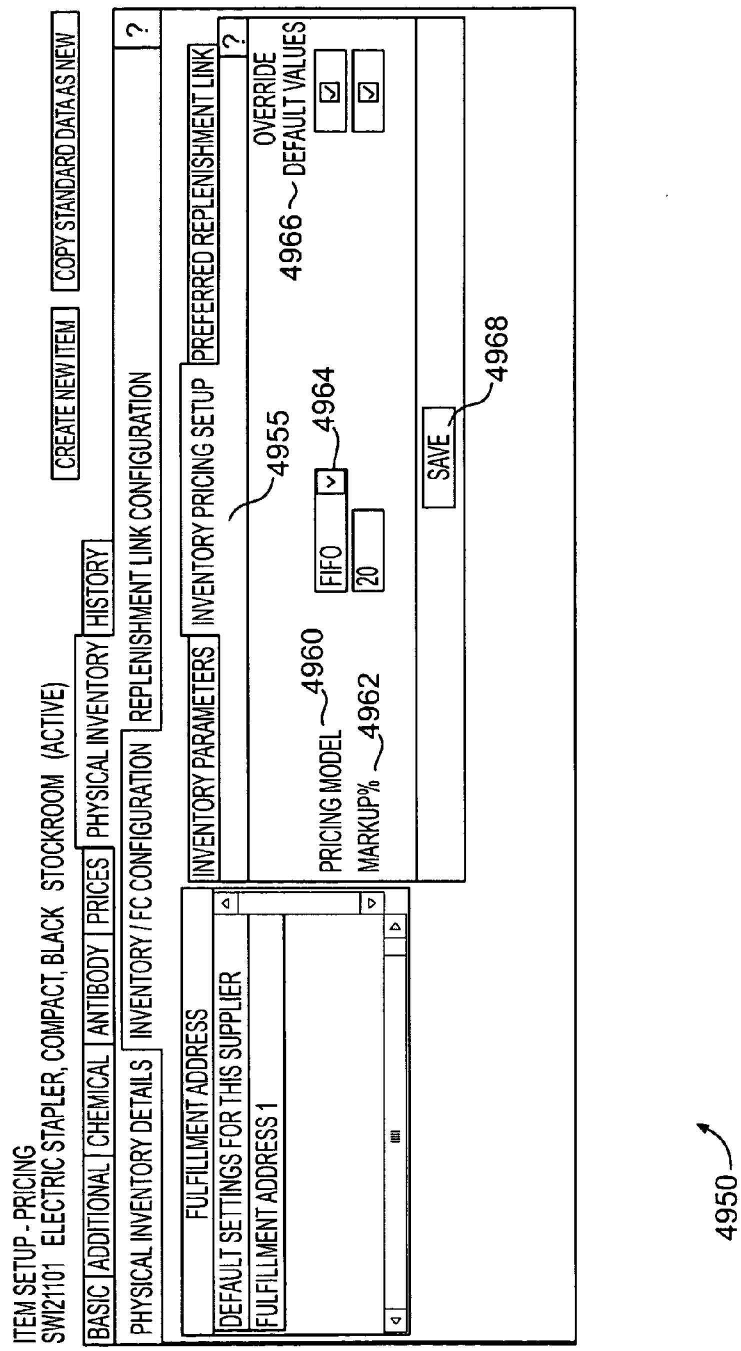
FIG. 49B illustrates an exemplary screenshot of an item setup pricing menu, according to some embodiments.

FIG. 49B is an exemplary screenshot 4950 of an item setup pricing menu. In this menu, a pricing model is inherited from the fulfillment center default pricing model. The pricing model can be overridden at the item level. In some embodiments, the pricing models may include fixed (price is constant), FIFO (First in first out—price is based on cost of items plus a markup using a FIFO model, e.g., the price for an item is the price of the oldest one in inventory plus a markup), and cost averaging where the price of an item is based on the average cost of all of the item in inventory plus a markup.

In some embodiments, the item pricing management may be performed by a user (or super user) using the price database 2430, including Price Set 2440 (a price for the item), Price Version Approval 2442, and Price Version 2444 (a version of a price associated with the item). This menu is generated at the server 20, in some embodiments by the catalog management engine 1695 and/or the catalog module 2120. For non-catalog items, it can be generated using a database management module 2170. The menu is accessed by a user (or super user) at the supplier when setting attributes and pricing for items. Attributes and prices for items, set using the item setup menu, are stored at the catalog database 2400, under items data base 2401 (for individual item attributes) and price database 2430 (for prices associated with items).

The item setup pricing menu includes menu tab 4955 to navigate through the pricing options. The setup pricing menu 4950 includes a pricing model 4960 with drop down menu 4964 to select the pricing style and a markup percentage 4963. A select box menu to override default values 4966 and a save button 4968 are also present.

Figure 49C:
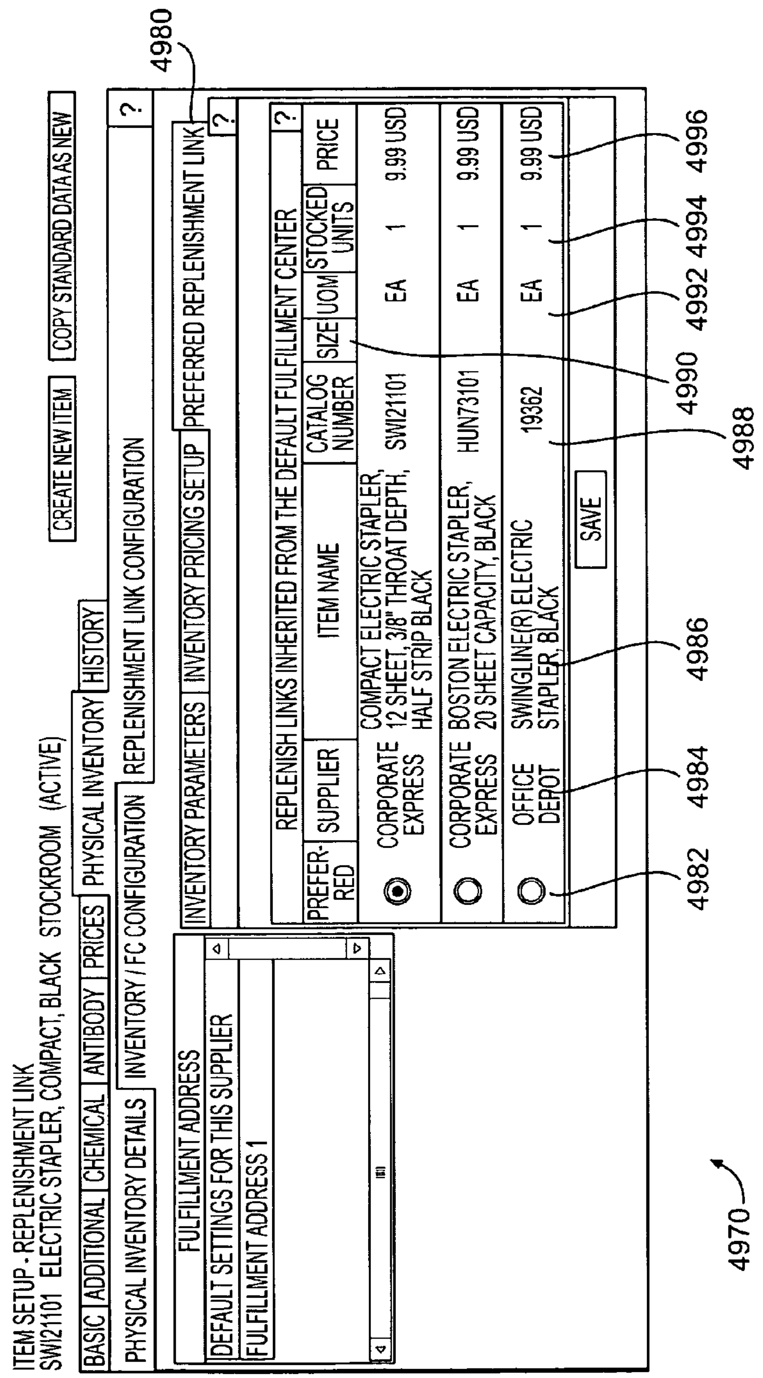
FIG. 49C illustrates an exemplary screenshot of an item setup replenishment link menu, according to some embodiments.
Figure 50:
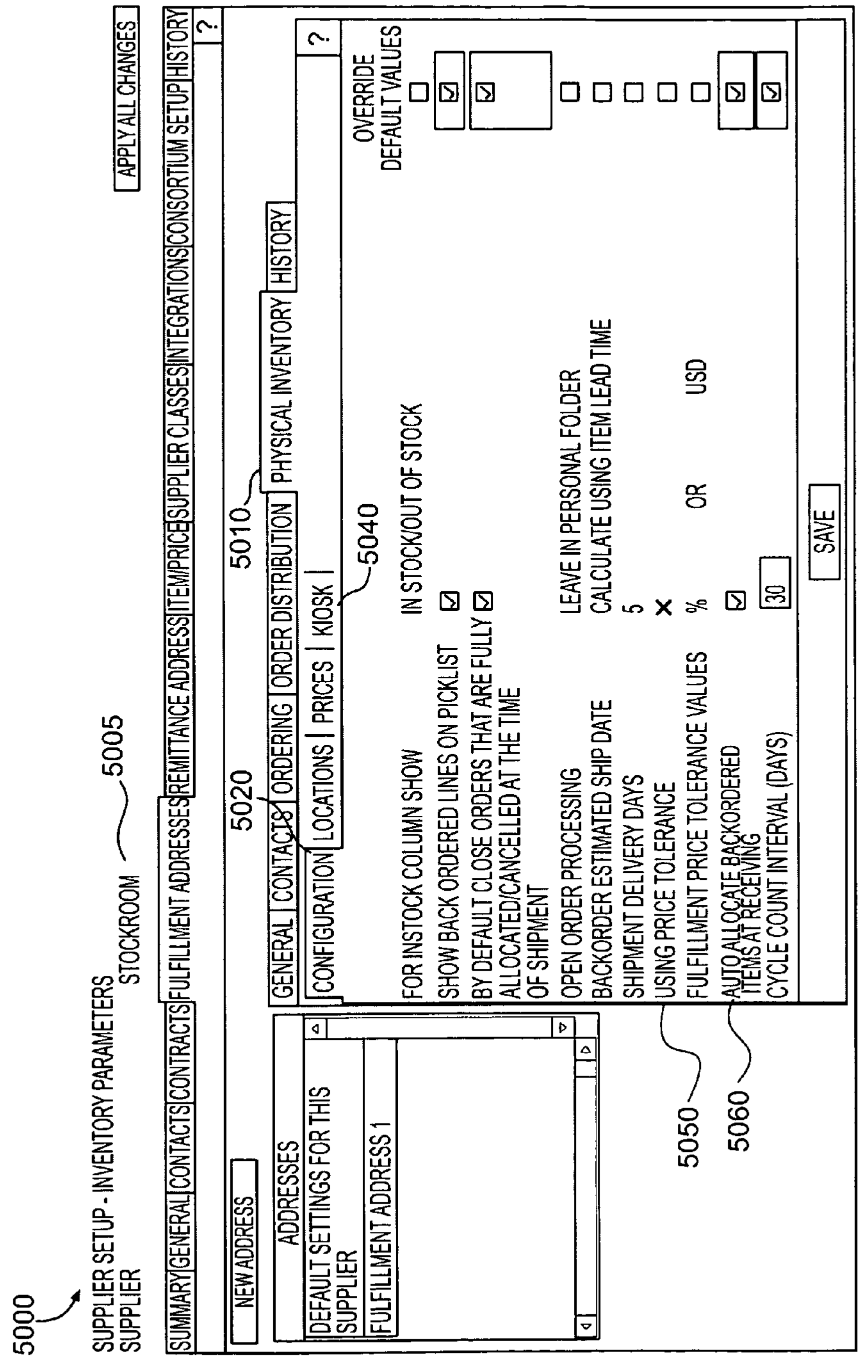

FIG. 49C is an exemplary screenshot 4970 of an item setup replenishment link menu. In this menu, an item managed in inventory can be linked to one or more e-commerce items or non-catalog items for replenishment. A default item can be configured for use in the replenishment report. This menu is generated at the server 20, in some embodiments by the purchasing engine 1681. The menu is accessed by a user (or super user) at the supplier when maintaining an item in inventory.

In some embodiments, the item replenishment management may be performed using the receipt database 2800. This database includes a Receipt Line Inventory Replenishment field 2818, which may correspond to an inventory replenishment line for a receipt.

The item setup replenishment link menu includes menu tab 4980 to navigate through the replenishment options. The setup replenishment link menu 4980 includes a set preferred supplier button 4982, a supplier field 4984, an item name field 4986, a catalog number field 4988, a size field 4990, a unit of measure field (UOM) 4992, a stocked units field 4994, and a price field 4996. Selecting any of these buttons updates the items database 2401 and/or the price database 2430.

Figure 50:
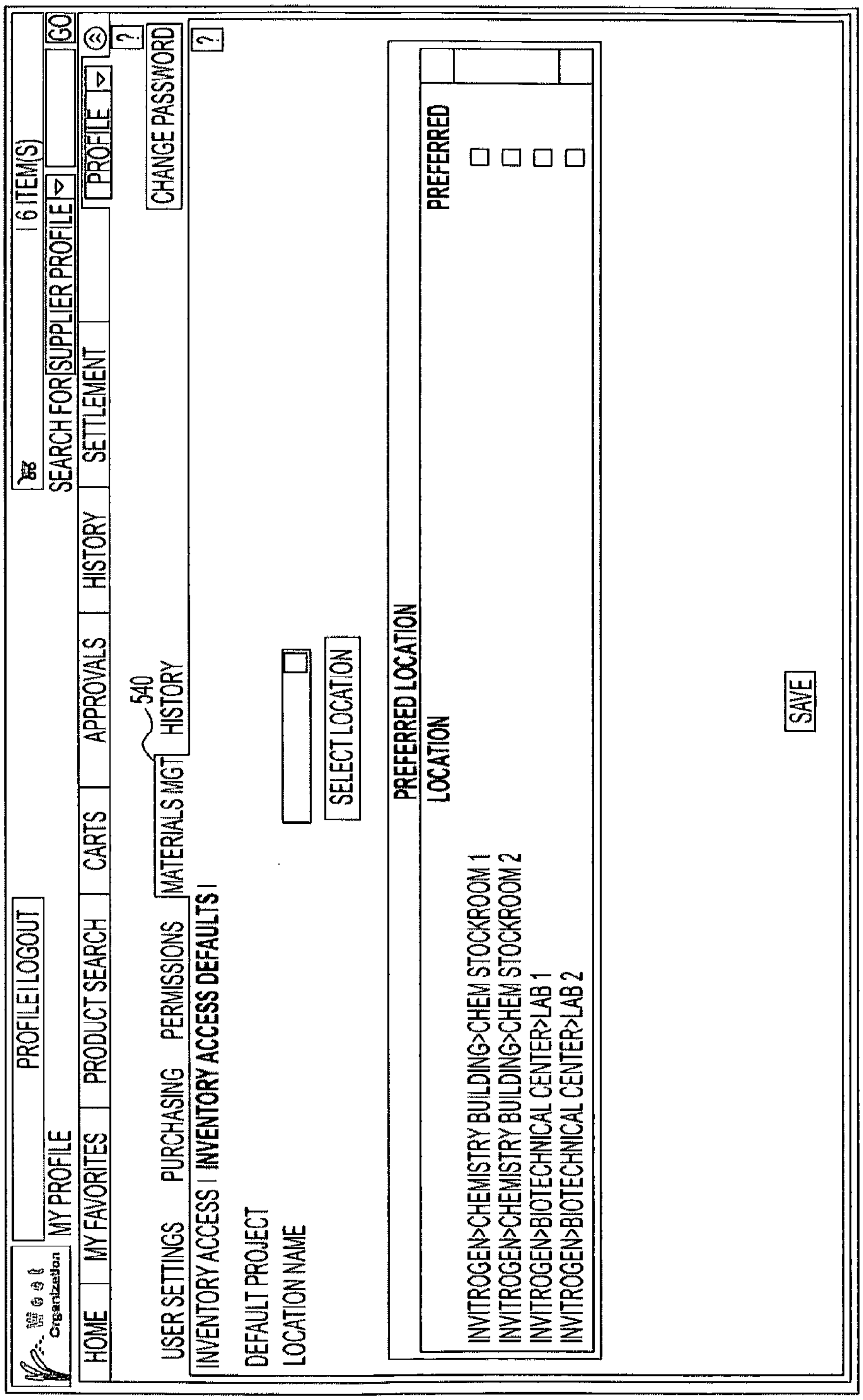
FIG. 50 illustrates an exemplary screenshot of a supplier setup inventory parameters menu, according to some embodiments.

FIG. 50 is an exemplary screenshot 5000 of a supplier setup inventory parameters menu. This menu is generated at the eProcurement server 20, in some embodiments by the sales management engine 1760. The menu is accessed by a user (or super user) at the supplier responsible for setting parameters for sales inventory.

In this menu, inventory parameter defaults can be set for all items stocked within the fulfillment center. The quantity on hand or in/out of stock displayed in search results is configured. Default parameters for fulfillment for all sales orders managed at this fulfillment center are configured. Default parameters for pricing models for items stocked in the fulfillment center are configured. A location hierarchy is configured, e.g., shelves, bins, etc. Kiosk (self-checkout) parameters are configured.

The supplier setup inventory parameters menu includes menu tabs 5010 and 5020 to navigate through the inventory options. A supplier label 5005 shows an internal stockroom as the supplier. A kiosk tab 5040 shows options associated with a self-checkout option. A price tolerance select box 5050 allows selection of a price tolerance. An auto-allocate backordered items box 5060 allows back ordered items to be allocated.

FIG. 51 is an exemplary screenshot 5100 of a search results menu. This menu is generated at the eProcurement server 20, in some embodiments by the purchasing engine 1681 and/or catalog engine 1655. The menu is accessed by a user at the purchaser when ordering items and monitoring stock of items. In this menu, both internally stocked (stockroom) and external vendor products are searched upon and shown in results. The menu displays whether an item is in/out of stock for internally stocked items in the stockroom, and actual quantity on hand can be seen.

Supplier name and/or an icon 5110 may be used to indicate that an internal stockroom holds the searched items (staplers). Add to active cart option in drop down menu 5112 allows a user to select items to be added to a shopping cart.

Figure 52:
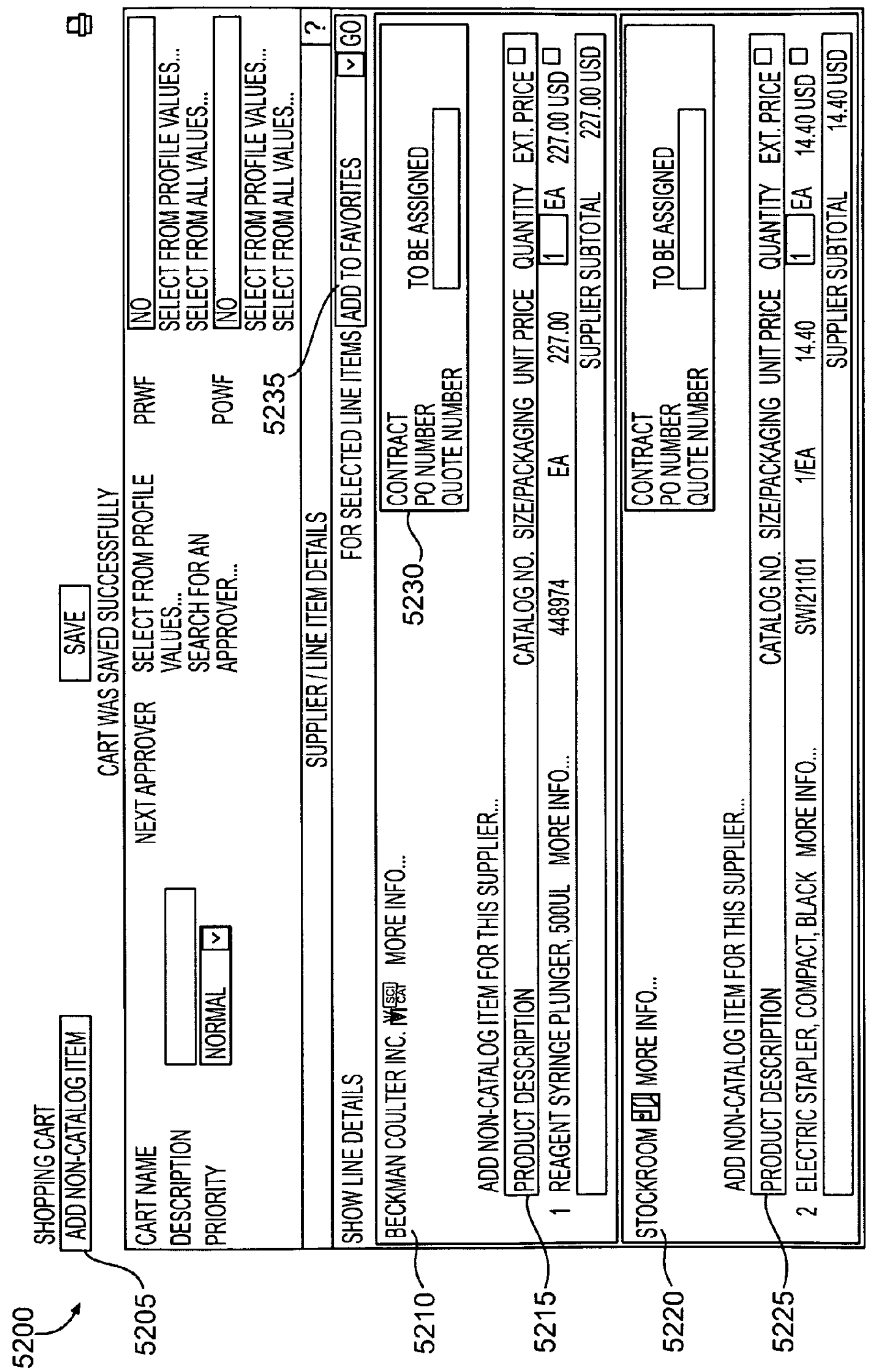
FIG. 52 illustrates an exemplary screenshot of a shopping cart menu, according to some embodiments.

FIG. 52 is an exemplary screenshot 5200 of a shopping cart menu. The menu is generated at eProcurement server 20, and is accessed by a user at the purchaser when ordering items, e.g., an individual user with purchasing permissions or a purchasing department. In this menu, both internally stocked/ fulfilled and external vendor products are ordered using the same interface. Stocked and external vendor products can be part of the same requisition.

An add non-catalog item button 5205 allows non-catalog items to be added to the cart. A first line item 5210 shows a product description 5215 from an external supplier. A supplier information window 5230 shows contract, purchaser order, and quote details for the external supplier. A second line item 5220 shows a product description 5225 from an external supplier. A drop down menu 5235 allows actions (e.g., add to favorites) for selected suppliers.

Figure 53:
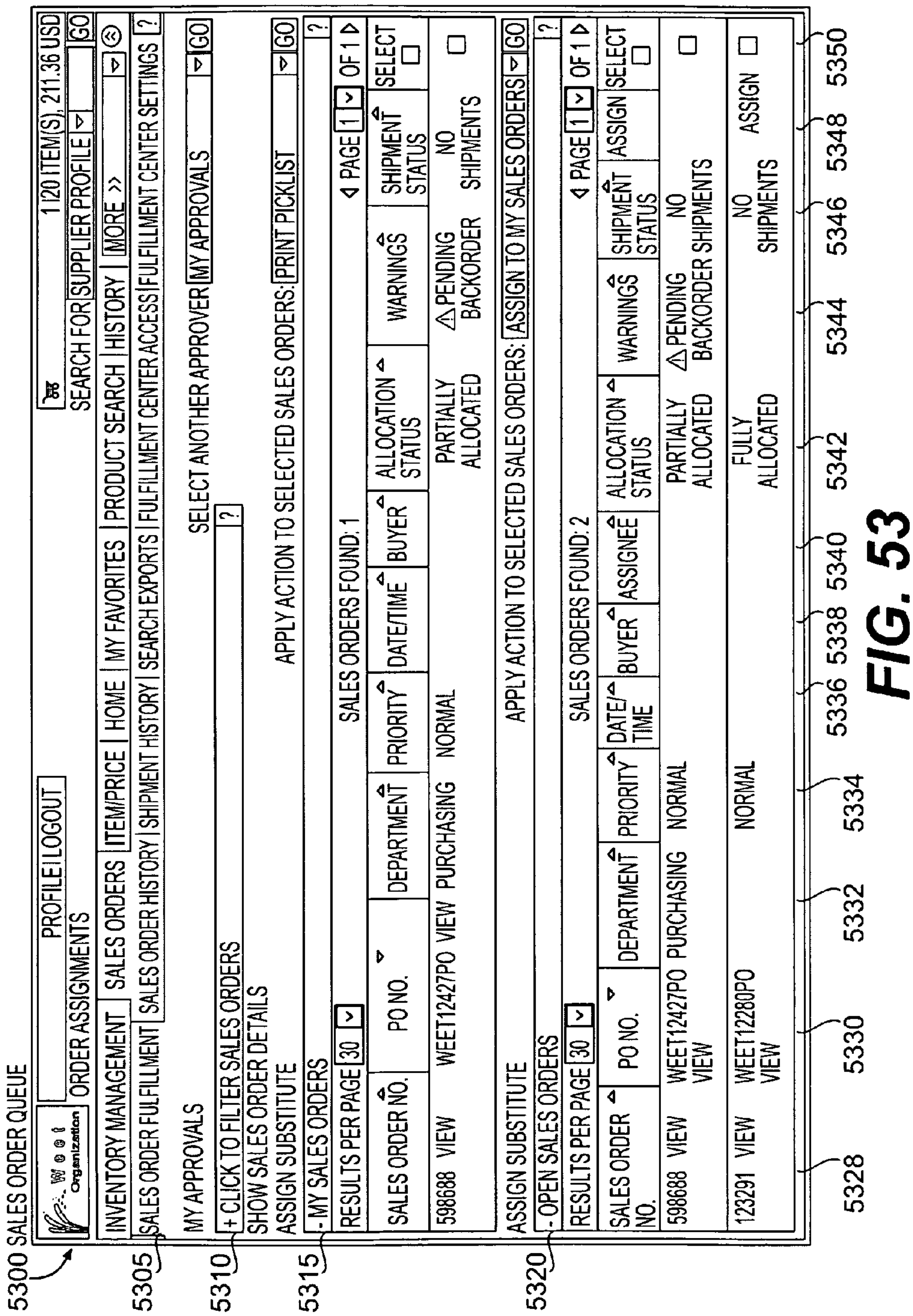
FIG. 53 illustrates an exemplary screenshot of a sales order queue, according to some embodiments.

FIG. 53 is an exemplary screenshot 5300 of a sales order queue. In this menu, sales orders are routed to the appropriate departments, users, and queues depending on organization-specific rules. This menu is generated at the eProcurement system 20 using a rules based sales engine 1760, in some embodiments similar to engines used for other documents, e.g., requisitions and purchase orders using purchasing engine 1681. The sales order queue is accessed by a user at a supplier when monitoring or managing sales order status.

Allocation status and shipment status are shown. Backorder and other exceptions for the sales order are shown. Order fulfillment is performed from this screen.

The sales order queue includes a workflow tab 5305 to navigate through the workflow options. An approval filter 5310 allows sales orders to be filtered. A ‘my sales orders’ menu 5315 shows sales orders associated with a particular user. An open sales orders menu shows sales orders that are in progress. The sales orders menus include fields for sales order information 5328, purchase order number 5330, department 5332, priority 5334, date/time 5336, buyer information 5338, assignee information 5340, allocation information 5340, warning information 5344, shipment status information 5346, assignment information 5348, and a select box 5350.

Figure 54:
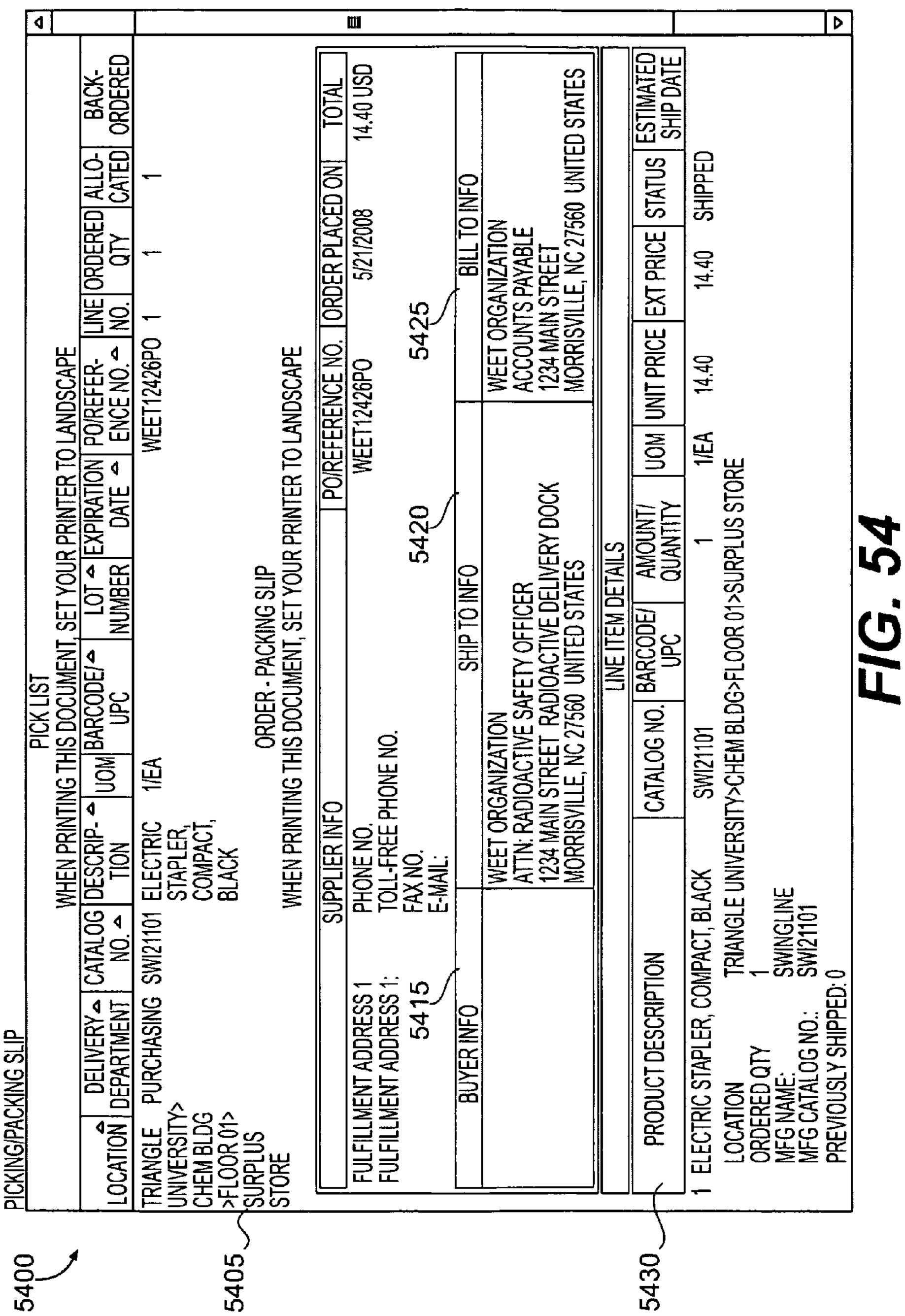
FIG. 54 illustrates an exemplary screenshot of a picking/packing slip, according to some embodiments.

FIG. 54 is an exemplary screenshot 5400 of a picking/packing slip. This slip menu shows where items are to be picked from within the internal stockroom, and shows delivery information and line item status. The menu is generated at the eProcurement server 20, in some embodiments accessing the purchase order database 2500, and is accessed by a user at the purchaser responsible for receiving ordered (fulfilled) items when they arrive in stock.

Location field 5405 shows the location of the internal stockroom. Buyer window 5415 shows buyer information. Ship to window 5420 shows shipping information; here it is the same as the supplier (internal stockroom). Bill-to window 5425 shows billing information, here it is the same as the supplier. Line item window 5430 gives a line item description of items ordered.

Figure 55:
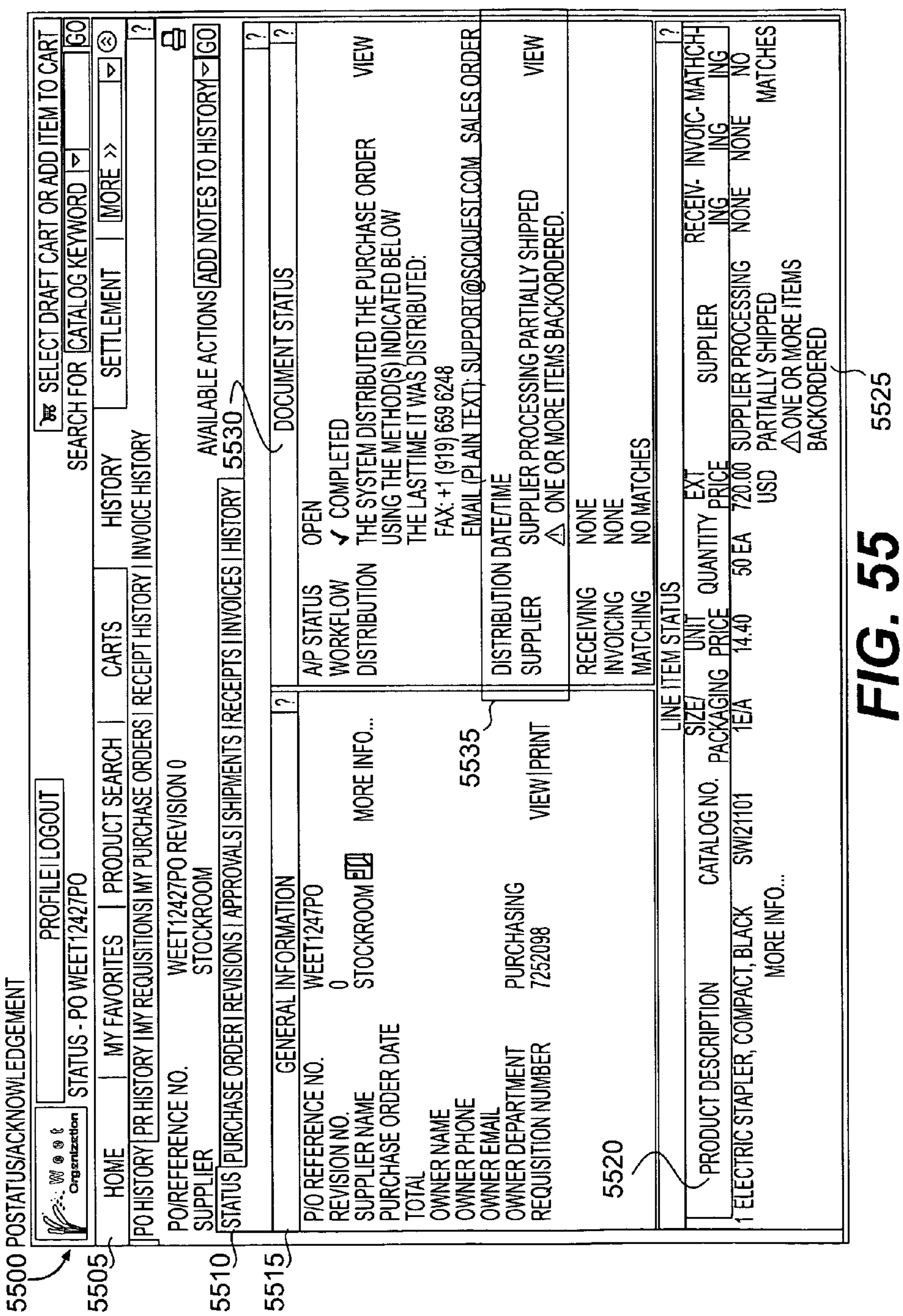
FIG. 55 illustrates an exemplary screenshot of a purchase order status/acknowledgement, according to some embodiments.

FIG. 55 is an exemplary screenshot 5500 of a purchase order status/acknowledgement. The menu is generated at the eProcurement server 20 by purchase engine 1931, in some embodiments including order entry module 1933 and order approval module 1934, and is accessed by a user at the purchaser responsible for ordering items. In some embodiments, the eProcurement server 20 accesses the purchase order database 2500 to determine purchase order status. This menu shows purchase order statuses within the purchase order user interface. Delivery, backorder, and related information are shown here. The status is automatically updated based on fulfillment activities within the stockroom.

The purchase order status/acknowledgement includes workflow tabs 5505 and 5510 to navigate through the workflow options. General information window 5515 gives details regarding an order, and document status window 5530 gives details of documents relating to the order. A line item status window 5520 shows the status of each line item. A backorder warning field 5525 shows that an item is backordered.

Figure 56:
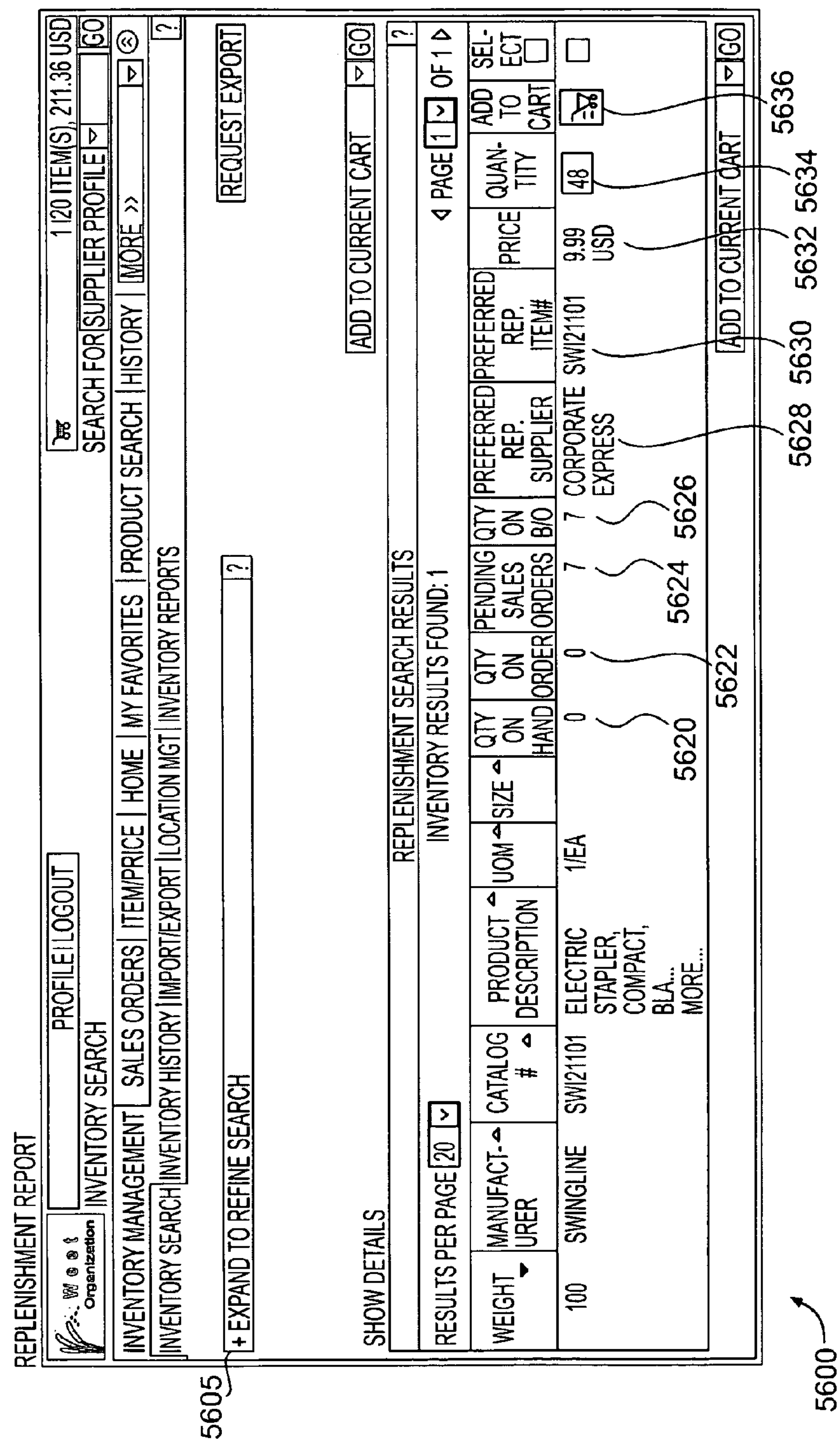
FIG. 56 illustrates an exemplary screenshot of a replenishment report, according to some embodiments.

FIG. 56 is an exemplary screenshot 5600 of a replenishment report. The menu is generated at the eProcurement server 20, in some embodiments by the purchasing engine 1681 accessing requisition database 2700, and is accessed by a user at the purchaser when managing the inventory of items. This menu shows all items requiring replenishment (restocking). The quantity to order based on inventory parameters (MAX, ROP, EOQ), quantity on hand, on order, and backordered, is automatically populated into a purchase request. In some embodiments the automatic population is performed by a robot as described in FIG. 75. In some embodiments, this automatic population is performed by Invoice, PO, Order, Requisition Module (2082, FIG. 20).

The replenishment report includes menu tab 5605 to navigate through the replenishment options. Quantity on hand field 5620, quantity on order field 5622, pending sales order field 5624, quantity on backorder field 5626, preferred supplier field 5628, preferred item number field 5630, price field 5632, quantity box 5634, and add to cart icon 5636 are also shown.

Figure 57:
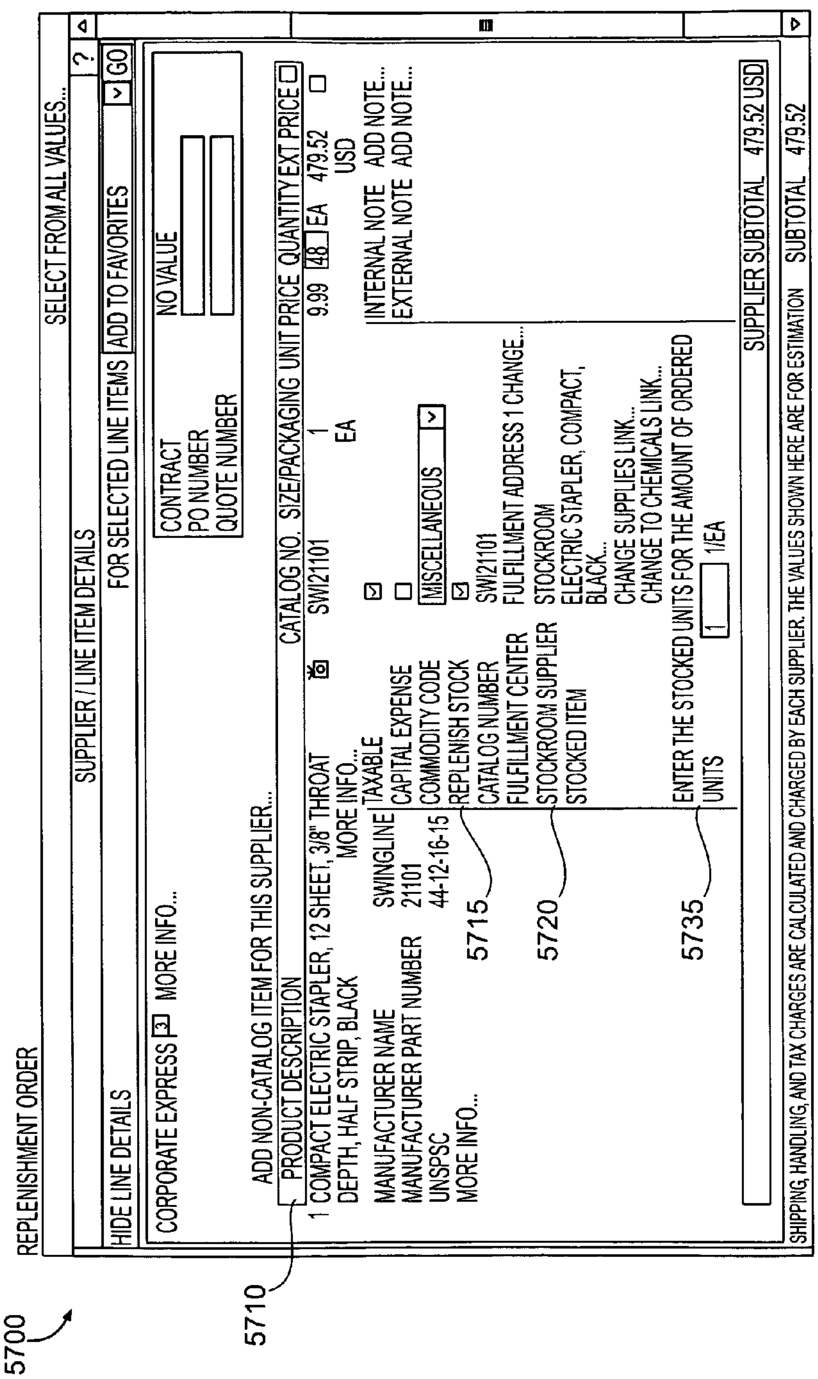
FIG. 57 illustrates an exemplary screenshot of a replenishment order, according to some embodiments.

FIG. 57 is an exemplary screenshot 5700 of a replenishment order. This menu shows an order marked as a replenishment order. The order is generated at the eProcurement server 20, in some embodiments by the requisition fulfillment engine 1686 accessing requisition database 2700, and is accessed by a user at the purchaser responsible for replenishing inventory items. This order lists inventory item and location where the item is being stocked. Stocked unit conversion can be overridden from item default. For example, conversion may be performed from units ordered, such as case to units sold, where a case of 24 is sold in units of each.

Product description line item 5710 gives details of a particular product. A replenish stock box 5715 allows stock to be automatically replenished. A supplier field shows that the supplier is an internal stockroom. A stocked units box 5735 allows a user to enter the number of items to be kept in stock.

Figure 58A:
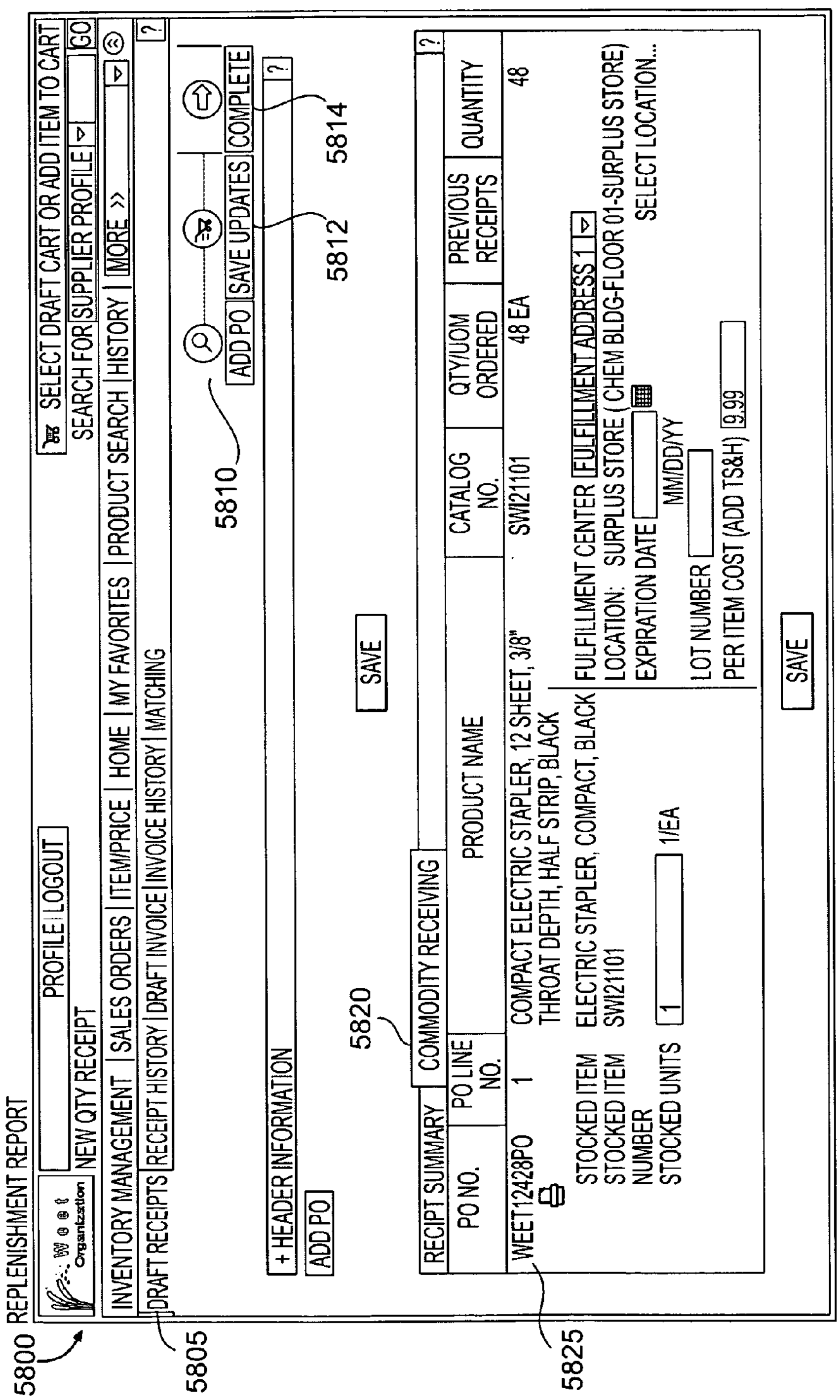
FIG. 58A illustrates an exemplary screenshot of a replenishment receipt, according to some embodiments.

FIG. 58A is an exemplary screenshot 5800 of a replenishment receipt. This receipt is generated at the eProcurement server 20, in some embodiments by the requisition fulfillment engine 1686 accessing the receipt database 2800, and is accessed by a user at the purchaser responsible for replenishing inventory items. This menu shows replenishment details, and the default location for an item is automatically populated. In some embodiments, upon receipt, items are automatically placed into inventory in their appropriate location. In some embodiments, items are physically placed (e.g., by an operator with a forklift) into a physical inventory location (e.g., a stockroom or warehouse) and the electronic procurement system is updated accordingly. In some embodiments, an item count is just updated in the electronic procurement system, without any corresponding physical movement of the item by an operator.

The replenishment receipt includes menu tabs 5805 and 5820 to navigate through the receiving options. Add purchase order button 5810 allows a purchase order to be added. Save updates button 5812 allows changes to be saved. Complete button 5814 allows a user to indicate that the receipt is complete. A purchase order number field 5825 specifies the purchase order. The purchase order includes details such as PO line number, product name, catalog number, quantity or units of measure, previous receipts, and quantity ordered. Additional information such as stocked item information (item, item number, stocked units) is shown, along with fulfillment center information (e.g., surplus store) and lot tracking information.

As described, the receipt replenishment may be performed using the receipt database 2800, including Receipt Line Inventory Replenishment 2818, in some embodiments an inventory replenishment line for a receipt.

Figure 58B:
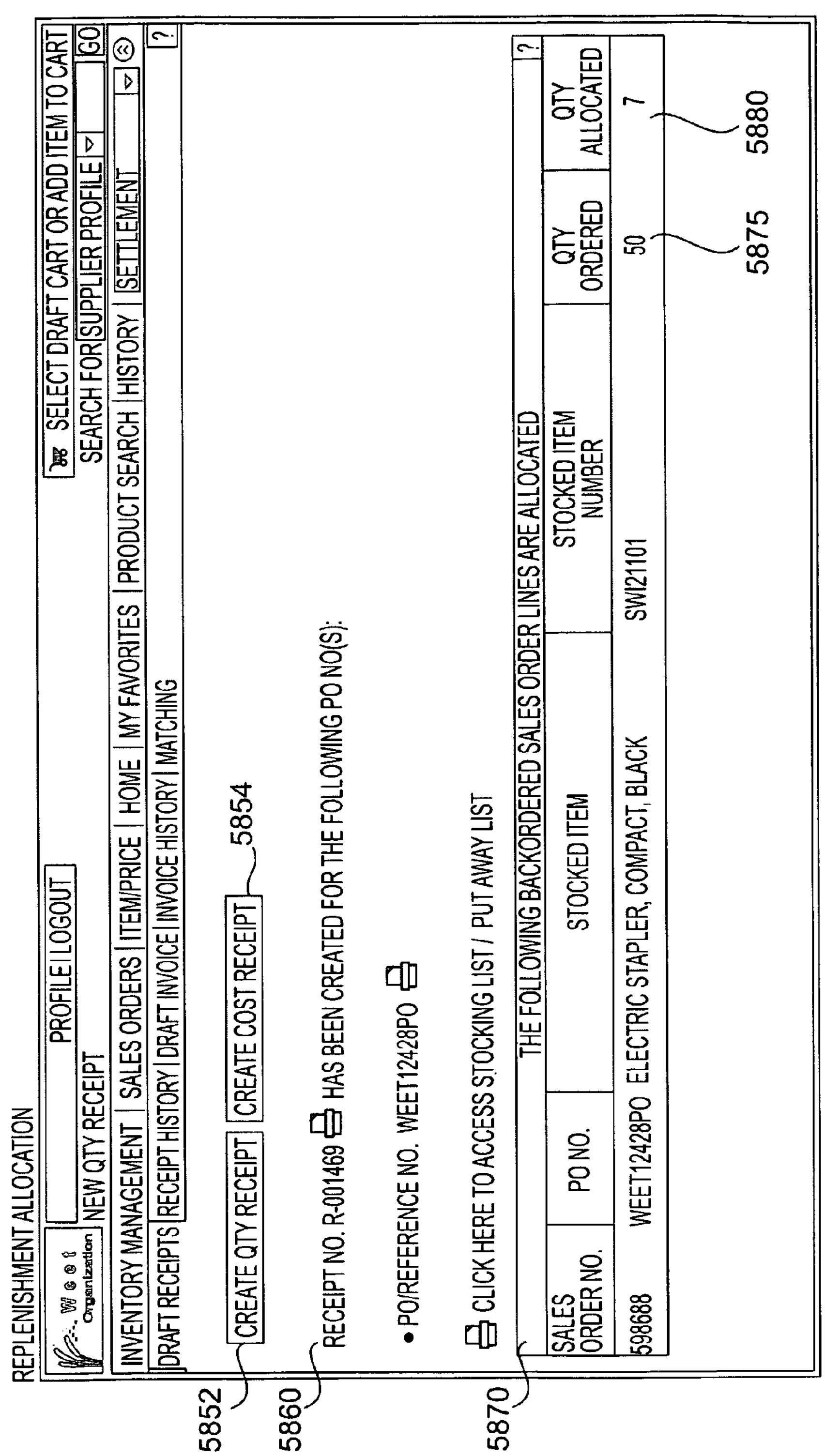
FIG. 58B illustrates an exemplary screenshot of a replenishment allocation, according to some embodiments.

FIG. 58B is an exemplary screenshot 5850 of a replenishment allocation. This allocation is generated at the eProcurement server 20, in some embodiments by the purchasing engine 1681 accessing the requisition database 2700, and is accessed by a user at the purchaser responsible for replenishing inventory items. This menu shows that sales orders pending backorder for an item are automatically allocated inventory upon receipt of the new inventory.

A create quantity receipt 5852 button and create cost receipt button 5854 allow a user to create receipts based on quantity or cost respectively. Receipt number field 5860 shows that a receipt has been created for a particular PO number. Allocation menu 5870 shows orders that have been allocated, including sales order number, PO number, stocked item, stocked item number, quantity ordered, and quantity allocated.

Figure 59A:
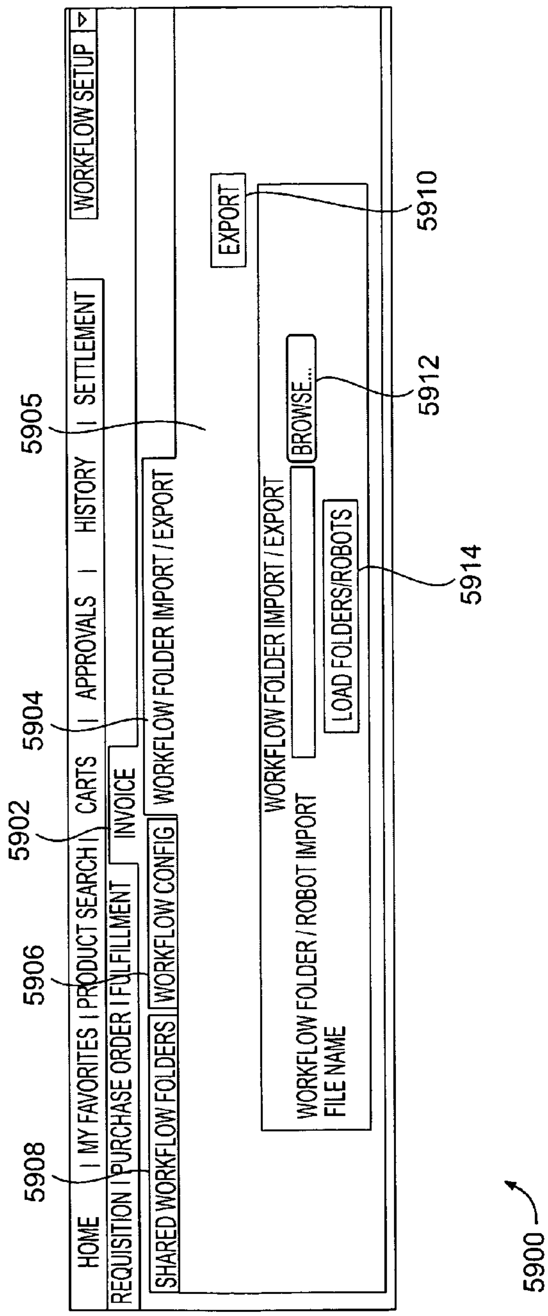
FIG. 59A illustrates an exemplary screenshot of a setup folders/automated robots screen, according to some embodiments.

FIG. 59A is an exemplary screenshot 5900 of a setup folders/automated robots screen. In some embodiments, a robot is an automated set of instructions for performing a specific task, and for supporting the various workflow processes. Several robots exits to perform various tasks. In some embodiments robots are created by the electronic procurement system (or system vendor or creator) and may not be edited by a user. In some embodiments robots, or parameters of the robot, may be edited by a user. Exemplary robots and their tasks are described with regard to FIG. 75. In some embodiment, a robot may perform functions from a script of operations. In some embodiments, a folder is an approval queue within a system. In some embodiments, one or more approvers are assigned to folders, and they are notified when documents are placed within the folder(s) for their review and/or approval. In some embodiments folders, or parameters of the folder, may be edited by a user.

This screen is generated at the eProcurement server 20, in some embodiments by sales/purchase management module 2046 (FIG. 20) in coordination with information stored in the buyer invoice database 3300 and/or sales invoice database 3400 (FIG. 22), accessed by invoice requisition module 2082 (FIG. 20). This screen is presented to a user developing workflow functions and importing or exporting them. In other embodiments, the screens, workflows, folders, and rules described in the following figures could apply to any transaction workflow, such as a purchase workflow, a sales workflow, an invoice workflow, a payment workflow, a shipping workflow, or any other type of transaction workflow.

FIG. 59A shows an invoice menu tab 5902, including a workflow folder import/export tab 5904. A window 5905 is associated with the import/export tab 5904. This window 5905 includes an export button 5910 that allows a user to export a workflow e.g., to a web location, to a file, to a library, to local storage, etc. The window 5905 includes a browse button 5912 that enables a user to select folders or robots to import. The window 5905 includes a load folders/robots button 5914, in some embodiments to import an invoice workflow electronic file, including a folders, and/or a robots file. These folders and robots can be imported (e.g., from a web location, a file, a library, a local storage, or a combination of these etc.) and exported (e.g., from the locations described) to facilitate the setup of the invoice workflow. Additionally, folders and robots can be ported via electronic file between application environments, e.g. test to production. In some embodiments, a test environment is a 'safe' environment where new workflows, rules, folders and robots may be created, tested, and verified. When a user is satisfied that the new workflow, etc. is functional and ready for use, the user can then enable the new workflow and put it into production. This may be referred to as moving from test to production.

Thus, a user can develop the functions he needs and test them in a safe (i.e., development) environment, and when the test is successful, port the functions to the active workflow for normal use. An example of this workflow development is illustrated in FIGS. 44-48, and described accordingly. In some embodiments, the folders and/or robots are XML based files. In other embodiments, the folders and/or robots could be in other related languages such as hypertext markup language (HTML), comma separated variables (CSV), tab delimited text files, name value pairs, or any other markup language, or text based language.

Figure 59B:
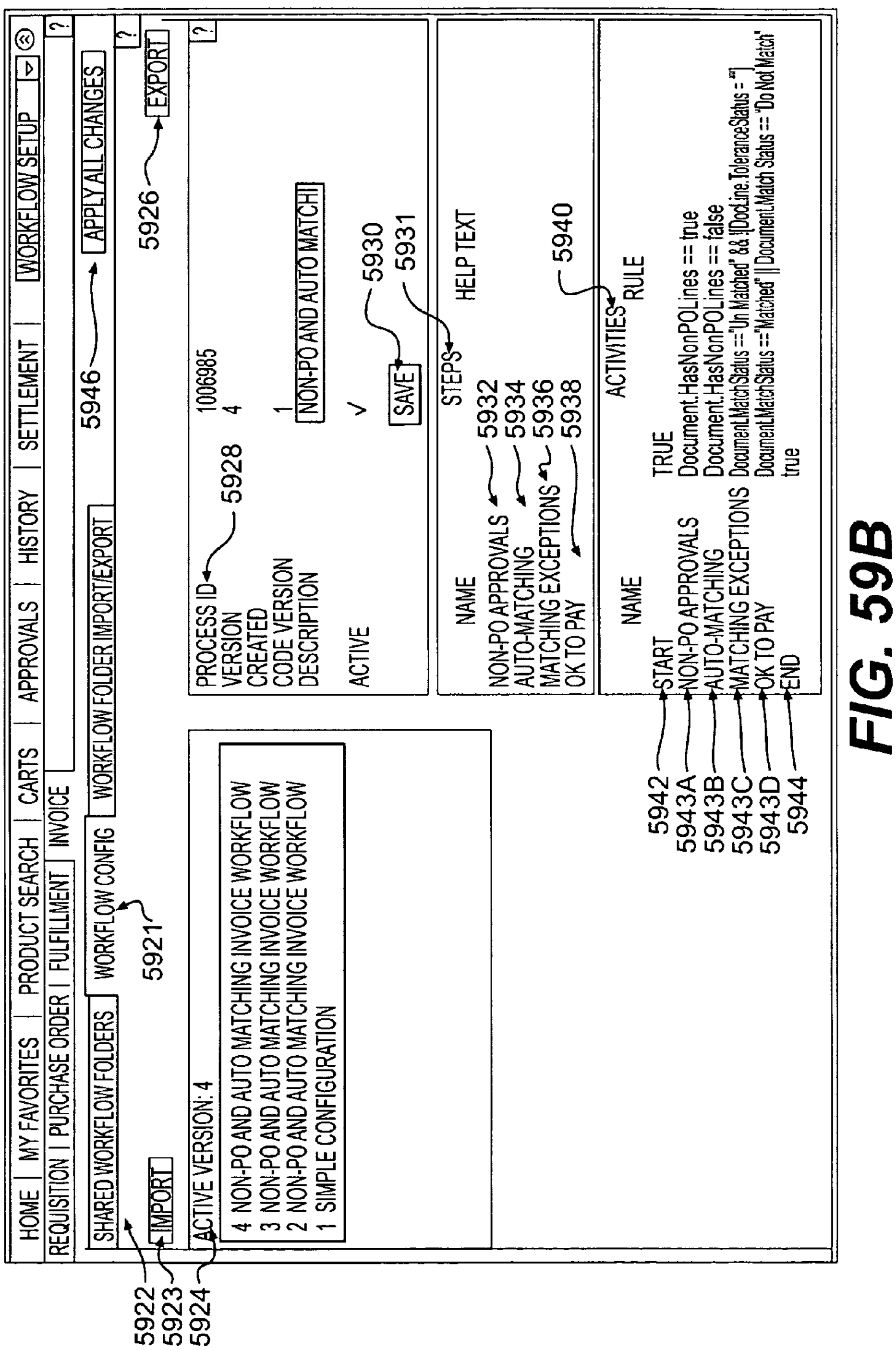
FIG. 59B illustrates an exemplary screenshot of a setup workflow process screen, according to some embodiments.

FIG. 59B is an exemplary screenshot 5920 of a setup workflow process screen. This screen is generated at the eProcurement server 20, in some embodiments by sales/purchase management module 2046 (FIG. 20), as described with reference to FIG. 59A. This screen is presented to a user developing workflow functions and specifying rules associated with the workflow functions.

FIG. 59B includes a workflow configuration menu tab 5921 and its associated window 5122. The window 5122 may include an active version window 5924, a process id window 5928, a steps window 5931, and an activities window 5940. The workflow configuration menu tab 5921 may include an import tab 5921 and an export tab 5946, for importing and exporting folders and/or robots to and from the workflow, as described.

A active version window 5924 displays a list of workflow versions, and shows the active version. In some embodiment, a user may have one or more versions of a workflow, and may have the option of activating or deactivating versions in order to test a newer version or to revert to an older workflow version. In some embodiments, a user has an option of creating a new version or deleting one or more versions of a workflow. In some embodiments, a user may save a current workflow as a new workflow version, so that the user can edit it but leave the original version intact.

A process id window 5928 shows a process identifier, version, creation date, user defined description, and active status, along with save button 5930 for saving changes to the workflow.

A steps window 5931 shows exemplary steps or operations in the workflow robot and/or folder, including non-purchase order approvals 5932, auto-matching (e.g., of invoices to purchase documents) 5934, matching exceptions 5936, and OK (approval) to pay 5938. In some embodiments, more or fewer operations may be specified. In some embodiments, non-purchase order approval is an approval for a purchase request that does not have an associated purchaser order. In some embodiments, auto-matching is a process whereby a first document (e.g., a an invoice) is compared to a corresponding second document (e.g., a purchase request or purchase order) to find if the amounts, quantities, etc. on the first document and second document correspond. In some embodiments, there may be a tolerance level (e.g., measured in dollar value, percentage of invoice total, percentage of quantity, etc.) within which a match is deemed acceptable. For example, a tolerance of 1% might be permitted on a shipment of items, so that if the invoice and purchase order totals fall within this tolerance range of 1%, the match is deemed acceptable. In some embodiments, a default tolerance range may be provided by the electronic procurement system. In some embodiments, a user may select one or more tolerance values or ranges according to his preferences.

A practical example of where this tolerance would be valuable is where a user orders several items and the shipping cost varies from an expected shipping cost due to (for example) a weight of the items. In this example, a user would probably consider the order satisfied (e.g., a match) even if the shipping cost is slightly different from expected, within a tolerance range. In another example, if a tax rate (e.g., a state sales tax rate) changes slightly, a user would probably consider the order satisfied (e.g., a match) if the invoice price is slightly different from expected due to the change in tax rate, within a tolerance range. In another example, if a first type of unit (e.g. 12 oz beaker) is ordered, but a second item (e.g., 12.5 oz beaker) is delivered, and the delivered beaker is within the cost and/or other tolerance range set by the user, then the order is satisfied (e.g., a match).

An activities window 5940 shows activity names and rules associated with each of the steps. A start instruction 5942 and an end instruction 5944 specify a start and an end respectively for steps associated with a folder and/or robot. A set of rules 5943A-D describe exemplary rules and conditions associated with them for processing invoices (e.g., purchase invoices and/or sales invoices).

In an exemplary embodiment, rule 5942A determines if a document needs to be submitted for a non-purchase order approval, i.e., for approval outside of the regular approval process. In an example, rule 5942A indicates that if a document (e.g., an invoice, a purchase order, purchase requisition, or any other document) has non-purchase order lines (value is true) then the non-purchase order approval workflow is started. In some embodiments, having non-purchase order lines means that a field (e.g., in a database associated with the document) indicates that non-purchase order lines are present, or alternatively, upon running a function on the database, it returns a result indicating that non-purchase order lines are present.

In an exemplary embodiment, rule 5942B determines automatic matching of invoices and purchase documents. In an example, rule 5942B indicates that if a document (e.g., an invoice, a purchase order, purchase requisition, or any other document) does not (value is false) have non-purchaser order lines (as described above) then an automatic matching workflow is started.

In an exemplary embodiment, rule 5942C determines matching exceptions between (for example) invoices and purchase documents. A matching exception is where (for example) an invoice does not correspond to (match up with) a purchase document, within a specified tolerance range, as described. In an example, if a matching status field (e.g. match status) of a database associated with the document (e.g. document) has a value of unmatched, and is not within a tolerance value of the document (e.g., tolerance status), then a document exception workflow is started.

In an exemplary embodiment, rule 5942D determines if an invoice payment workflow (e.g., OK to Pay) is to be started. In an example, rule 5942D indicates that if a match status field (e.g., match status) in a database associated with the document or a returned value from a function performed on the database, has a value of "matched," or if a match status field (or returned value) has a status of "do not match," then the invoice payment workflow is started. This means that if a document (e.g., an invoice) is matched, or if the document indicates that no match is required, then the document should be paid.

In some embodiments, exemplary rules and conditions may be described for processing other business documents such as purchase orders, purchase requisitions, credit memos, receipts, contracts, tax documents, employment documents, or any other financial, governmental, or transactional document.

In some embodiments, the rules are logical statements which, if met, cause the step to be executed. In some embodiments, more complex logical or programming instructions may be used to implement rules in the workflow folder and/or robot.

The setup workflow process of FIG. 59B allows for the creation of a unique workflow process for invoices and credit memos based on the customer's business processes. The invoice workflow steps are steps that will be visible to end users of the system. In some embodiments, other steps that are only visible to a super-user or system administrator may be specified also. The invoice activities window 5940 allows the administrator or super-user to view the workflow steps and the rules associated with each step. The activities have rules that define which documents will fall into the activity. The invoice workflow configuration can be imported/exported to facilitate the setup of invoice workflow. Additionally, invoice workflow configurations can be ported via electronic file between application environments, e.g. from test to production, as discussed. In some embodiments, this file is XML-based, as described.

Figure 59C:
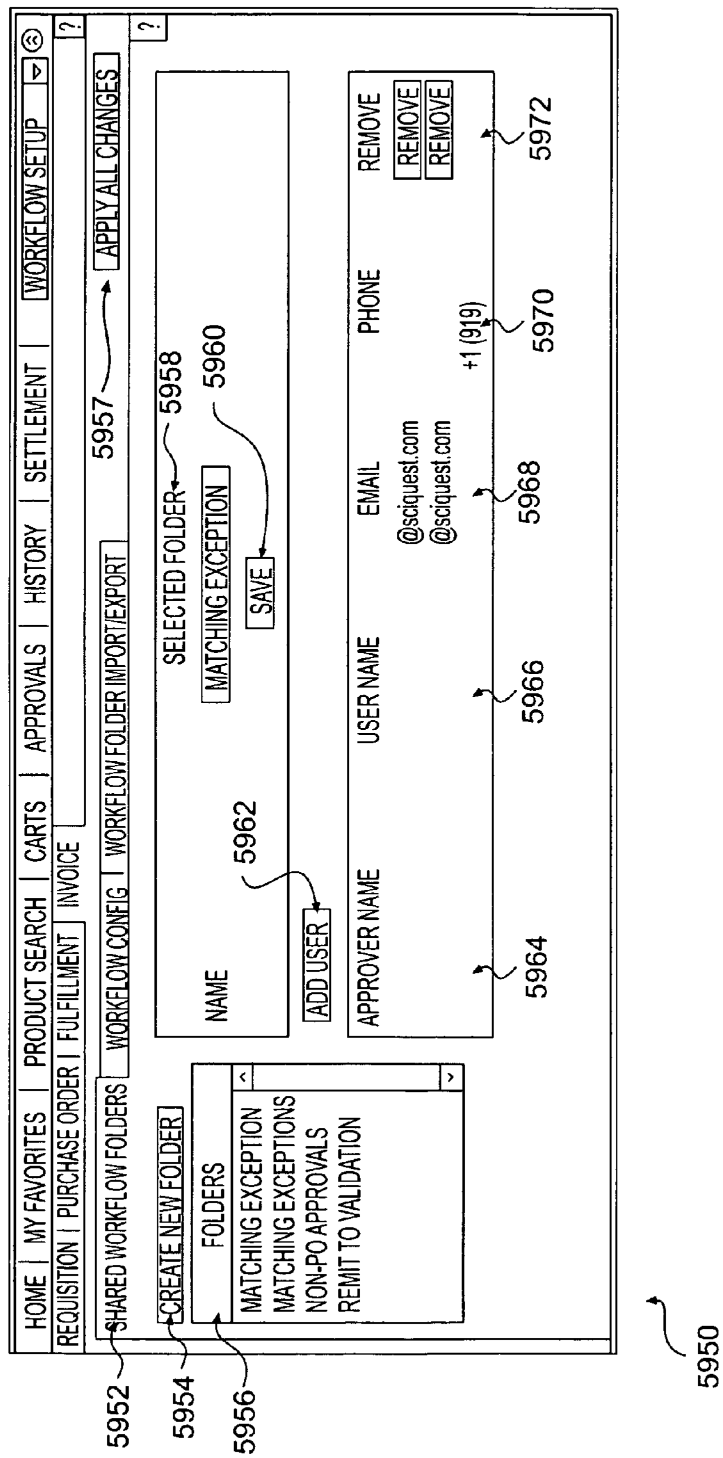
FIG. 59C illustrates an exemplary screenshot of an assign approvers screen, according to some embodiments.

FIG. 59C shows an exemplary screenshot 5950 of an assign approvers screen. This screen is generated at the eProcurement server 20, in some embodiments by sales/purchase management module 2046 (FIG. 20), as described with reference to FIG. 59A. In some embodiments, this screen is displayed to a super-user to assign one or more approvers for a workflow folder. In some embodiments, this screen is displayed to an approver to assign one or more approvers for an invoice.

FIG. 59C includes a shared workflow folders menu tab 5952, with an associated window 5953. The window 5953 includes an apply all changes button 5953, for applying changes made in the window. The window 5953 also includes a create new folder button 5954 to allow a user to create a new folder and/or robot to implement a rule, as described. Exemplary folders include matching exception(s), non-purchase order approvals, remit to validation, and others. The window 5953 includes a selected folder window 5958 that shows a folder currently selected (e.g., "matching exception" in this example) by the user and a save button 5960 allows a user to make changes to that folder. As described, the matching exception rule is invoked when the system fails to find a match between documents, e.g., between a purchase document and an invoice. In some embodiments, a matching exception may check for matches between three or more documents (e.g. between a purchase order, an invoice, and a delivery slip) and if all three fail to match, then report a matching exception. In some embodiments, an auto-matching function can check for matches between three or more documents, and, if all three match, approve a document (e.g., an invoice) for payment.

An add user button 5962 allows an administrator or super-user to add approvers to a folder and/or robot in the selected folder window 5958 above. In some embodiments, the approver user information includes approver name 5964, user name 5966, approver email 5968, and approver phone 5970. In some embodiments, a remove button 5972 allows an administrator or super-user to remove an approver.

This screen of FIG. 59C allows a user to assign approvers to shared workflow folders. This assignment allows approvers to distribute the approval workload among themselves, which will lead to overall faster approvals as bottlenecks are likely to be eliminated.

Figure 59D:
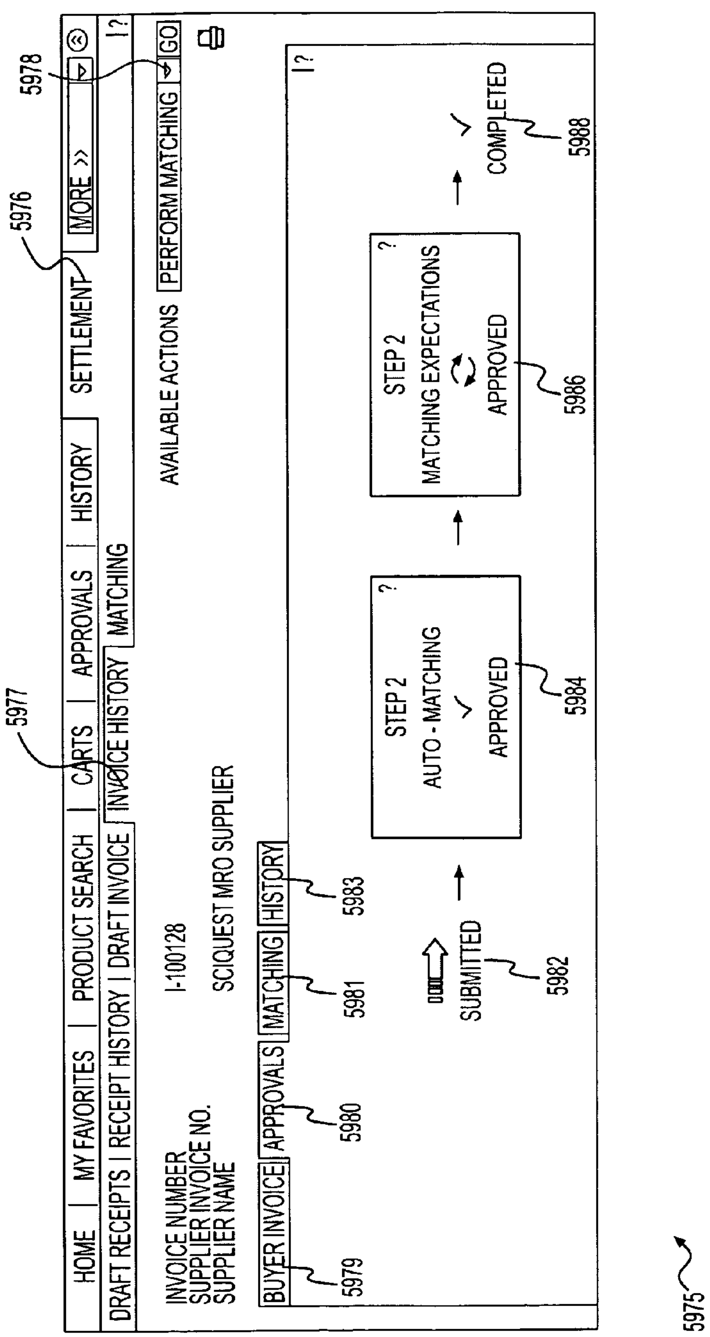
FIG. 59D illustrates an exemplary screenshot of a review required approvals screen, according to some embodiments.

FIG. 59D shows an exemplary screenshot 5975 of a review required approvals screen. This screen is generated at the eProcurement server 20, in some embodiments by sales/purchase management module 2046 (FIG. 20), as described with reference to FIG. 59A. This screen is displayed to a user wishing to see the status of a document (e.g., an invoice) in the workflow as it is being processed.

FIG. 59D includes a settlement menu tab 5976, including an invoice history menu tab 5977. This invoice history tab includes information such as invoice number, supplier invoice number, supplier name, and also includes a drop down menu 5978 for performing available actions (e.g., perform matching). An approvals menu tab 5980 shows at what stage in the approvals process an invoice is currently active. Approvals stages include invoice submitted 5982, auto matching performed 5984, matching exceptions resolved 5986, and invoice completed 5988. In some embodiments, more or fewer stages are possible, depending on the number of steps in the folders and/or robots specified.

In some embodiments, the screen of FIG. 59D allows the user to view the current state of the document within invoice workflow. This screen shows the completed, active and pending steps. In some embodiments, another step shows the assigned approver associated with an invoice. In some embodiments, the screen shows a plurality of tabs representing buyer invoice 5979, approvals 5980, matching 5981, and history 5983. The buyer invoice tab 5979 represents a buyer invoice to be approved for payment. The approvals tab 5980 represents the approvals and matching process shown in FIG. 59D. The matching tab 5981 represents matching documents corresponding to the buyer invoice. The history tab 5983 represents a history of events associated with the buyer invoice.

Figure 59E:
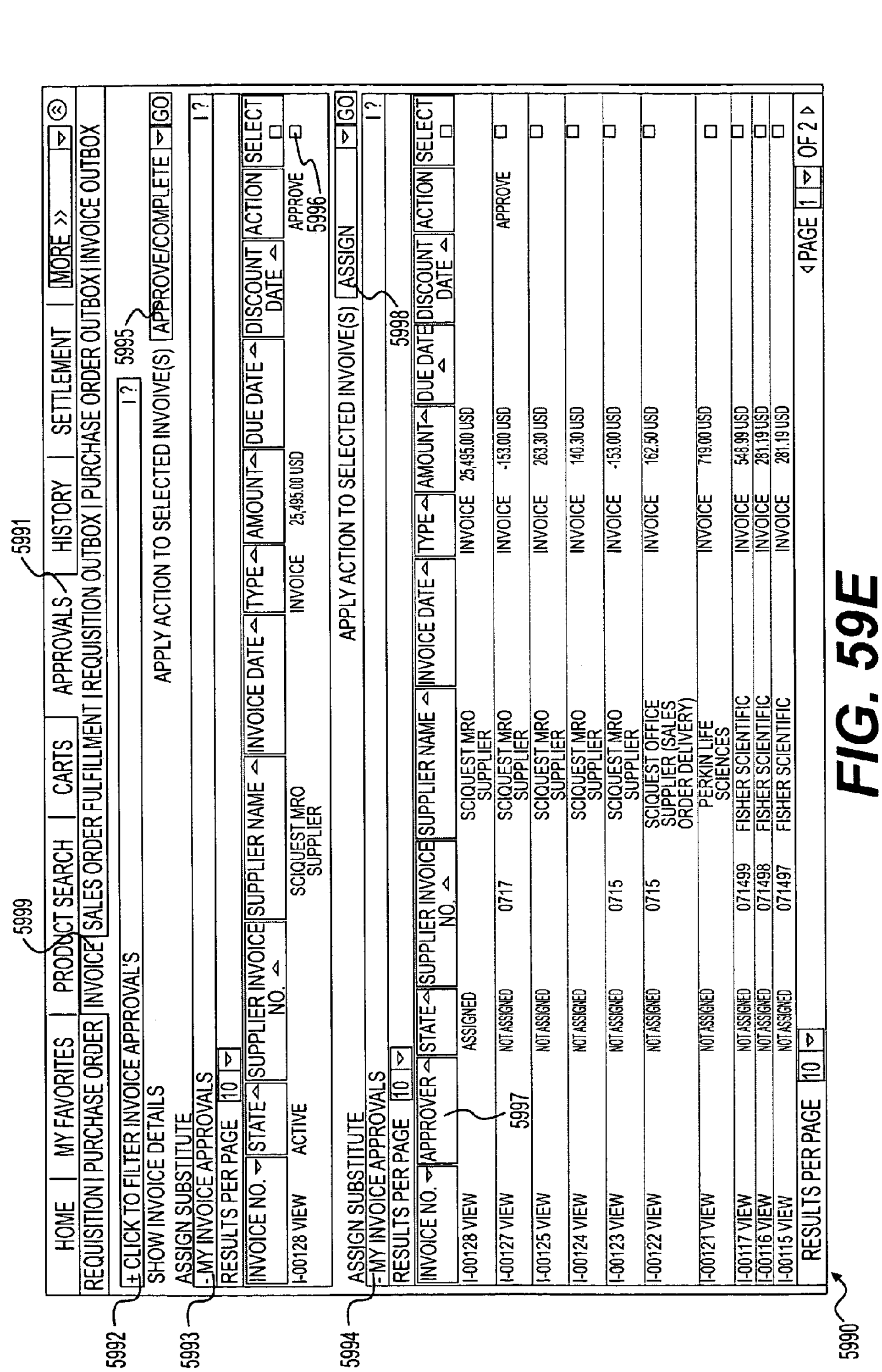
FIG. 59E illustrates an exemplary screenshot of a review invoices requiring approval screen, according to some embodiments.

FIG. 59E shows an exemplary screenshot 5990 of a "review invoices requiring approval screen." This screen is generated at the eProcurement server 20, in some embodiments by sales/purchase management module 2046 (FIG. 20), as described with reference to FIG. 59A. This screen is presented to an approver checking the status of invoices assigned to him/her for review/approval.

FIG. 59E includes an approvals menu tab 5991, including an invoice menu tab 5999. The invoice menu tab includes a toolbar 5992 to filter invoice approvals provided to the user approver (in some embodiments with sub options to show invoice details and assign substitute approvers), and a drop down menu 5995 to apply actions to selected invoices (e.g., approve/complete invoice). In some embodiments, the filtering includes showing invoices that are approved, or showing invoices that are not approved, or a combination thereof. In some embodiments, the filtering includes showing invoices that are assigned to the user, showing invoices that are assigned to a pool of approvers, showing invoices for which the user is a substitute approver, or a combination thereof.

A window 5993 shows a 'my invoice approvals' personal folder, showing invoice approvals associated with the current user. The invoice approvals may in some embodiments include one or more details such as invoice number, state (e.g., active, inactive, etc.), supplier invoice number, supplier name, invoice date, invoice type, amount of invoice, due date, discount date (date by which if paid, a discount is applied), action (e.g. approve, deny, etc.), and a select box 5996 for indicating that an action (e.g., from drop down menu 5995) should be performed on the invoice. A matching exceptions window 5994 shows matching exceptions for invoices and the approval state, approver, supplier, invoice and due dates, amount, and discount date associated with each invoice, and a select box indicating that an action (e.g., from drop down menu 5995) should be performed to the invoice.

The matching exceptions window 5994 may show an invoice (e.g., reference I-00128) with a status 'assigned' that has been assigned to the user, as shown in the 'My Invoice Approvals' window 5993. The matching exceptions window 5997 may also show other non-assigned invoices (e.g., those listed below the assigned invoice I-00128 in window 5994).

In some embodiments, this window 5994 is a shared approver folder, in which a plurality of approvers 5997 may review invoices and make approval decisions regarding them. This shared approver folder may help reduce bottlenecks in the system if one approver is unavailable or too busy to approve invoices, by sharing the workload among other approvers. Apply action button 5998 chooses an action to apply to a selected invoice.

The "review invoices requiring approval" screen of FIG. 59E allows the approver to view their personal workflow approval list, e.g. the documents currently assigned to them for review. This screen allows the approver to view all shared folders assigned to them as part of the Workflow Setup process. In some embodiments, a user or users have the capabilities to perform from such a screen one or more of: approving or completing invoices, rejecting invoices, placing documents (invoices) on hold, and forwarding invoices to other approvers. In some embodiments, substitute approvers may be assigned to personal and shared folders. In some embodiments, users with advanced management permissions (super users or administrators) may manage folders and documents on behalf of other approvers.

Figure 60:
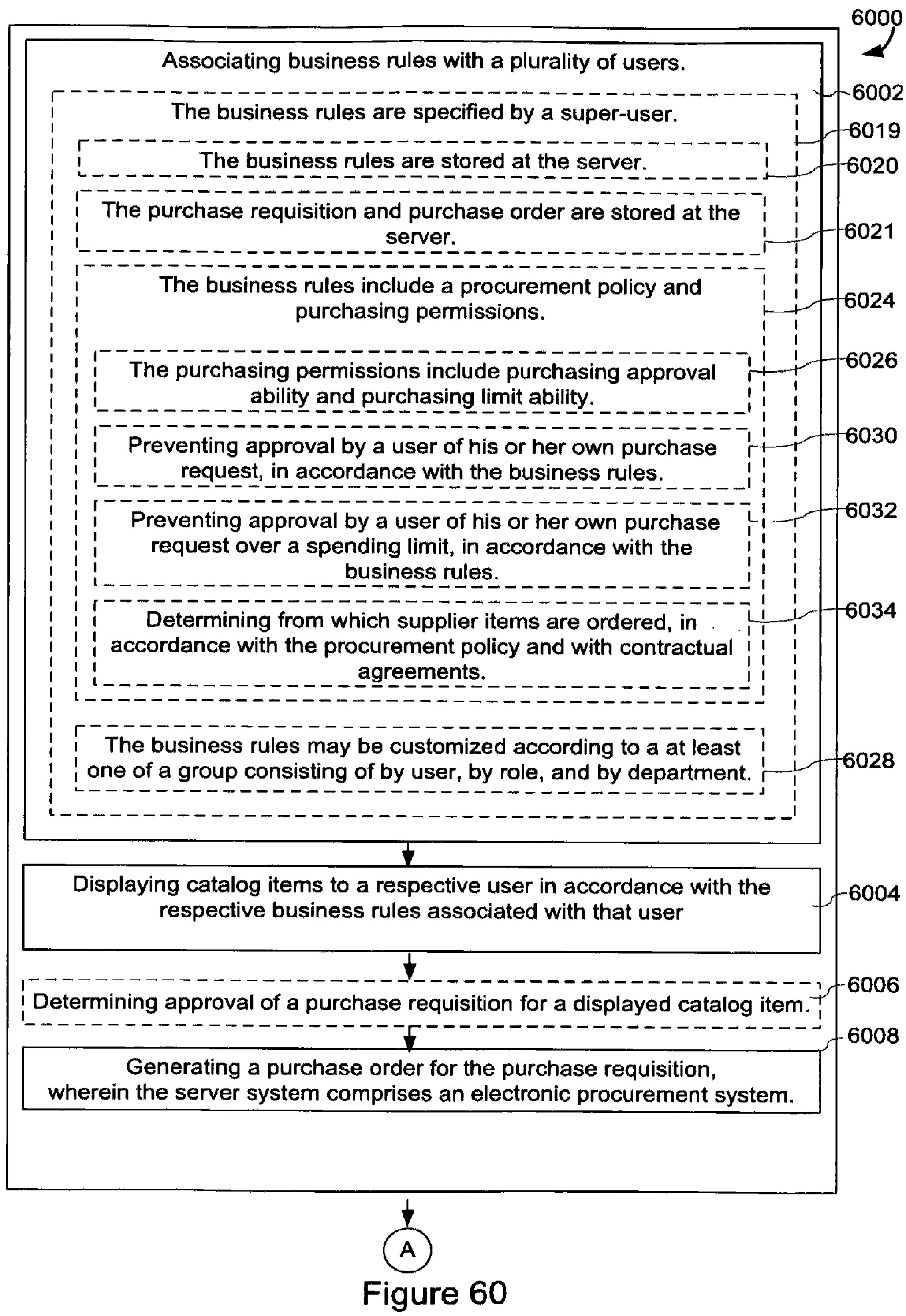
FIG. 60 illustrates a flowchart representing a server method for hosting an eProcurement system, according to some embodiments.

FIG. 60 is a flowchart representing a server method 6000 for hosting an eProcurement system, according to certain embodiments of the invention. The server method 6000 may be governed by instructions that are stored in a computer readable storage medium and that are executed by one or more processors of one or more servers. Each of the operations shown in FIG. 60 may correspond to instructions stored in a computer memory or computer readable storage medium. The computer readable storage medium may include a magnetic or optical disk storage device, solid state storage devices such as flash memory, or other non-volatile memory device or devices. The computer readable instructions stored on the computer readable storage medium are in source code, assembly language code, object code, or other instruction format that is interpreted by one or more processors. In the following flowchart, dashed line boxes indicate optional operations or steps that may be implemented in some embodiments.

In the following descriptions and embodiments, purchase orders may be accessed in purchase orders database (FIG. 22, 2500), requisitions may be accessed in requisitions database (FIG. 22, 2700) invoices may be accessed in buyers invoice database (FIG. 22, 3300) and sales invoice database (FIG. 22, 3400), and business rules may be accessed in a business rules database, all as described. The databases may be accessed by database and management module (FIG. 20, 2070) and invoice, purchase order, order and requisition module (FIG. 20, 2082).

In some embodiments, the server method 6000 includes the following operations, performed at a server hosting an electronic procurement system. The server method includes associating business rules with a plurality of users (6002). One or more catalog items are displayed (6004) to a respective user in accordance with the respective business rules associated with that user. In some embodiments, approval of a purchase requisition is determined (6006) for a displayed catalog item. A purchase order is generated (6008), in some embodiments for the purchase requisition, and/or in some embodiments for a displayed item.

In some embodiments, the business rules are specified by a super-user (6019). In some embodiments, the business rules are stored at the server (6020). In some embodiments, the purchase documents (including purchase requisition and purchase order) are stored at the server (6021). In some embodiments, the business rules include a procurement policy and purchasing permissions (6024). In some embodiments, the purchasing permissions include purchasing approval ability and purchasing limit ability (6026).

In some embodiments, the business rules may be customized according to at least one of a group consisting of by user, by role, and/or by department (6028). In some embodiments, approval by a user of his or her own purchase request may be prevented in accordance with the business rules (6030). In some embodiments, approval by a user of his or her own purchase request over a spending limit may be prevented in accordance with the business rules (6032). In some embodiments, the system determines from which supplier items are ordered in accordance with the procurement policy and contractual agreements (6034).

Figure 61:
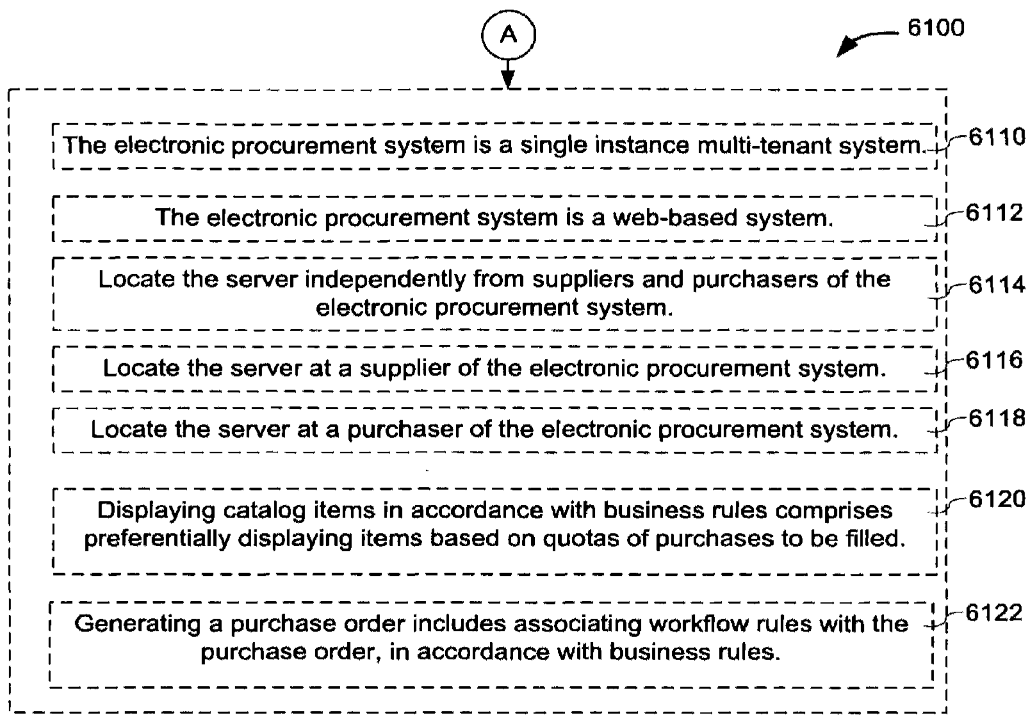
FIG. 61 illustrates a flowchart continuing the flowchart of FIG. 60, according to some embodiments.

FIG. 61 is a flowchart 6100, continuing the flowchart of FIG. 60. In some embodiments, the electronic procurement system is a single instance multi-tenant system (6110). In some embodiments, the electronic procurement system is a web-based system (6112). In some embodiments, the server is located independently from suppliers and purchasers of the electronic procurement system (6114). In some embodiments, the server is located at a supplier of the electronic procurement system (6116). In some embodiments, the server is located at a purchaser of the electronic procurement system (6118). These features of FIG. 61 apply in part or in whole to all systems described here, including systems 6900, 7000, 7100 as described.

In some embodiments, displaying catalog items in accordance with business rules comprises preferentially displaying items based on quotas of purchases to be filled (6120). In some embodiments, generating a purchase order includes associating workflow rules with the purchase order, in accordance with business rules (6122).

Figure 62:
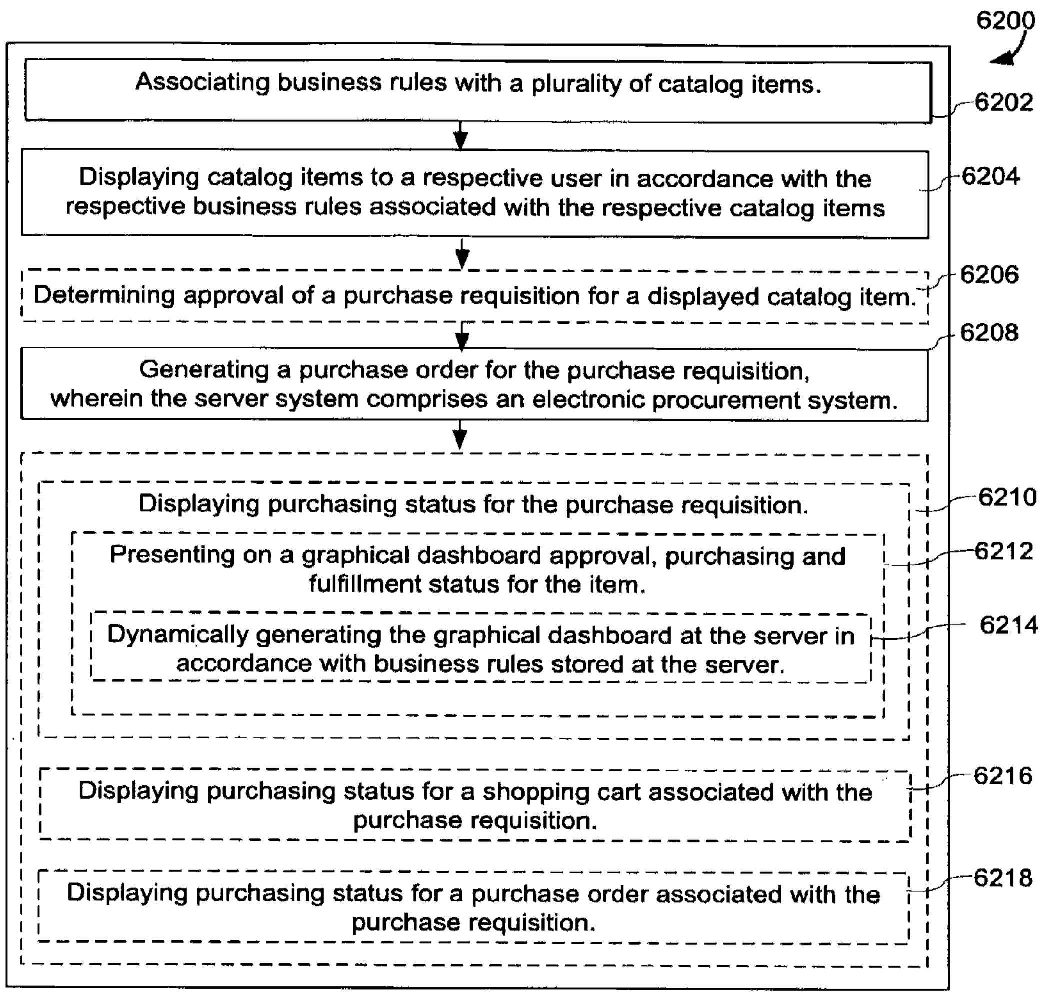
FIG. 62 illustrates a flowchart representing a server method for hosting an eProcurement system, according to some embodiments.

FIG. 62 is a flowchart representing a server method 6200 for hosting an eProcurement system, according to certain embodiments of the invention. The server method 6200 may be governed by instructions that are stored in a computer readable storage medium, as described.

In some embodiments, server method 6200 includes the following operations. Business rules are associated (6202) with a plurality of catalog items. In some embodiments, the business rules are associated with a supplier. One or more catalog items are displayed (6204) to a respective user in accordance with the respective business rules associated with the respective catalog items. In some embodiments, the display is in accordance with business rules associated with a supplier. In some embodiments, approval is determined (6206) for a purchase requisition for a displayed catalog item. A purchase order is generated (6208), in some embodiments for the purchase requisition and/or in some embodiments for a displayed item.

In some embodiments, purchasing status is displayed for the purchase requisition (6210). In some embodiments, purchasing status is displayed for the purchase order. In some embodiments, displaying includes presenting on a graphical dashboard approval, purchasing, and fulfillment status for the item (6212).

In some embodiments, the graphical dashboard is dynamically generated at the server in accordance with business rules stored at the server (6214). In some embodiments, purchasing status is displayed for a shopping cart associated with the purchase requisition (6216). In some embodiments, purchasing status is displayed for a purchase order associated with the purchase requisition (6218).

Figure 63:
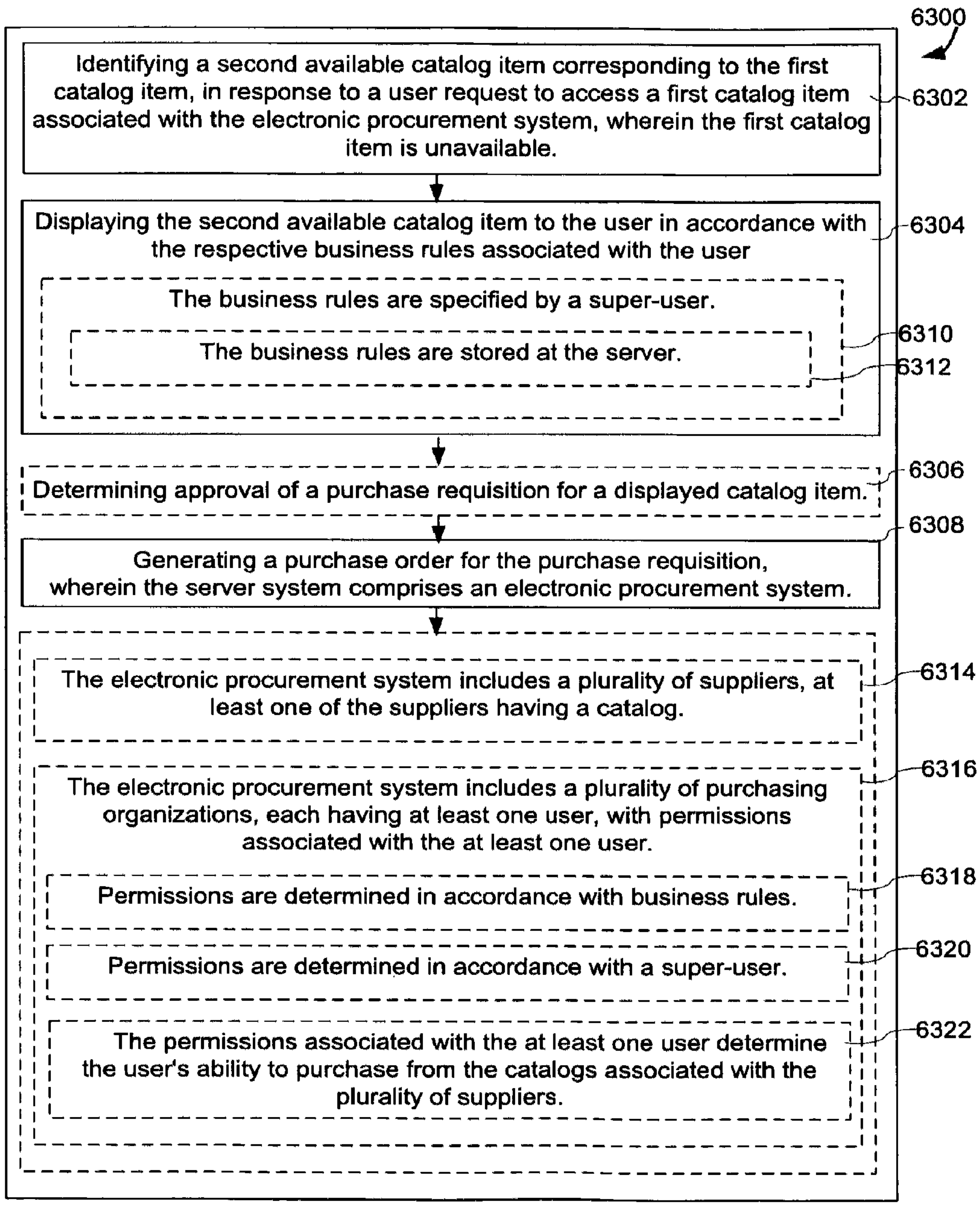
FIG. 63 illustrates a flowchart representing a server method for hosting an eProcurement system, according to some embodiments.

FIG. 63 is a flowchart representing a server method 6300 for hosting an eProcurement system, according to certain embodiments of the invention. The server method 6300 may be governed by instructions that are stored in a computer readable storage medium, as described.

In some embodiments, server method 6300 includes the following, performed at a server hosting an electronic procurement system. A second available catalog item is identified (6302) corresponding to a first catalog item, in response to a user request to access the first catalog item associated with the electronic procurement system, wherein the first catalog item is unavailable. The second available catalog item is displayed (6304) to the user in accordance with business rules associated with the user. In some embodiments, approval of a purchase requisition is determined (6306) for the displayed catalog item. A purchase order is generated (6308), in some embodiments for the purchase requisition, and/or in some embodiments for a displayed item.

In some embodiments, the business rules associated with the user are determined by a super user (6310). In some embodiments, the super user is at an organization associated with the user. In some embodiments, the business rules associated with the user are stored at the server hosting the electronic procurement system (6312).

In some embodiments, the electronic procurement system includes a plurality of suppliers, at least one of the suppliers having a catalog (6314). In some embodiments, the electronic procurement system includes a plurality of purchasing organizations, each having at least one user, with permissions associated with the at least one user (6316). In some embodiments, the permissions are determined in accordance with business rules (6318). In some embodiments, the permissions are determined by a super user (6320). In some embodiments, the permissions associated with the at least one user determine the user's ability to purchase from the catalogs associated with the plurality of suppliers (6322).

Figure 64:
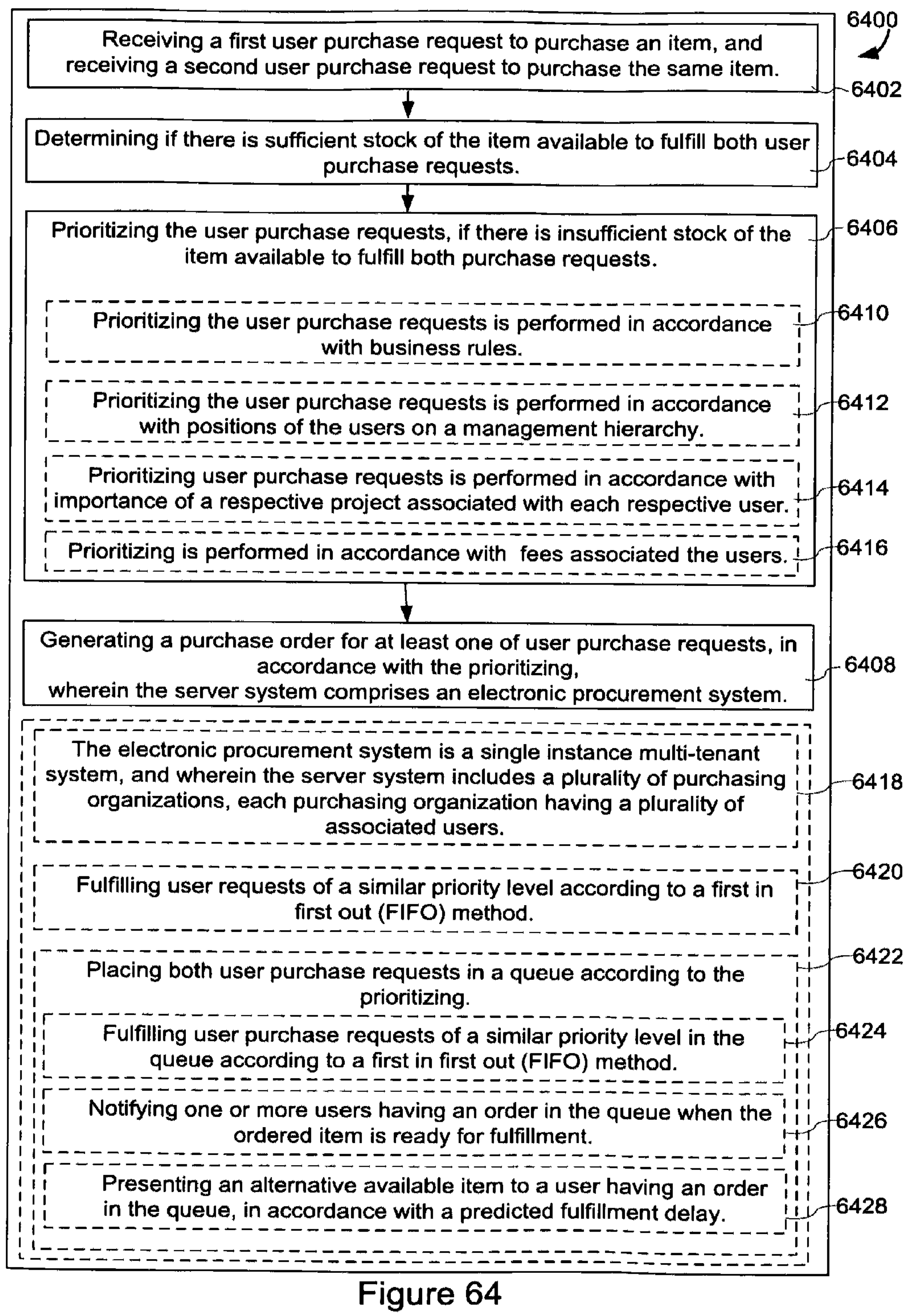
FIG. 64 illustrates a flowchart representing a server method for hosting an eProcurement system, according to some embodiments.

FIG. 64 is a flowchart representing a server method 6400 for hosting an eProcurement system, according to certain embodiments of the invention. The server method 6400 may be governed by instructions that are stored in a computer readable storage medium, as described.

In some embodiments, server method 6400 includes the following operations. A first user purchase request to purchase an item and a second user purchase request to purchase the same item are received (6402). A determination is made (6404) if there is sufficient stock of the item available to fulfill both user purchase requests. User purchase requests are prioritized (6406) if there is insufficient stock of the item available to fulfill both purchase requests. A purchase order is generated (6408) for at least one of the user purchase requests in accordance with the prioritizing.

In some embodiments, the electronic procurement system is a single instance multi-tenant system (6418). In some embodiments, the server system includes a plurality of purchasing organizations, each purchasing organization having a plurality of associated users. In some embodiments, prioritizing the user purchase requests is performed in accordance with business rules (6410). In some embodiments, prioritizing the user purchase requests is performed in accordance with positions of the users on a management hierarchy (6412). In some embodiments, prioritizing the user purchase requests is performed in accordance with the importance of a respective project associated with a user (6414).

In some embodiments, user purchase requests of a similar priority level are fulfilled according to a first in, first out (FIFO) method (6420). In some embodiments both user purchase requests are placed in a queue according to the prioritizing (6422). In some embodiments user purchase requests of a similar priority level in the queue are fulfilled according to a first in, first out (FIFO) method (6424). In some embodiments, a FIFO method is used for filling purchase orders in queue, but a user's order of insertion in the queue is determined by prioritizing.

In some embodiments, one or more users having an order in the queue are notified when the ordered item is ready for fulfillment (6426). In some embodiments, an alternative available item is presented to a user having an order in the queue, in accordance with a predicted fulfillment delay (6428). In some embodiments, if a user has placed an order, and the order is delayed or expected to be delayed, an alternative item is presented to the user for selection.

In some embodiments, prioritizing is performed according to fees associated with the respective users (6416).

Figure 65:
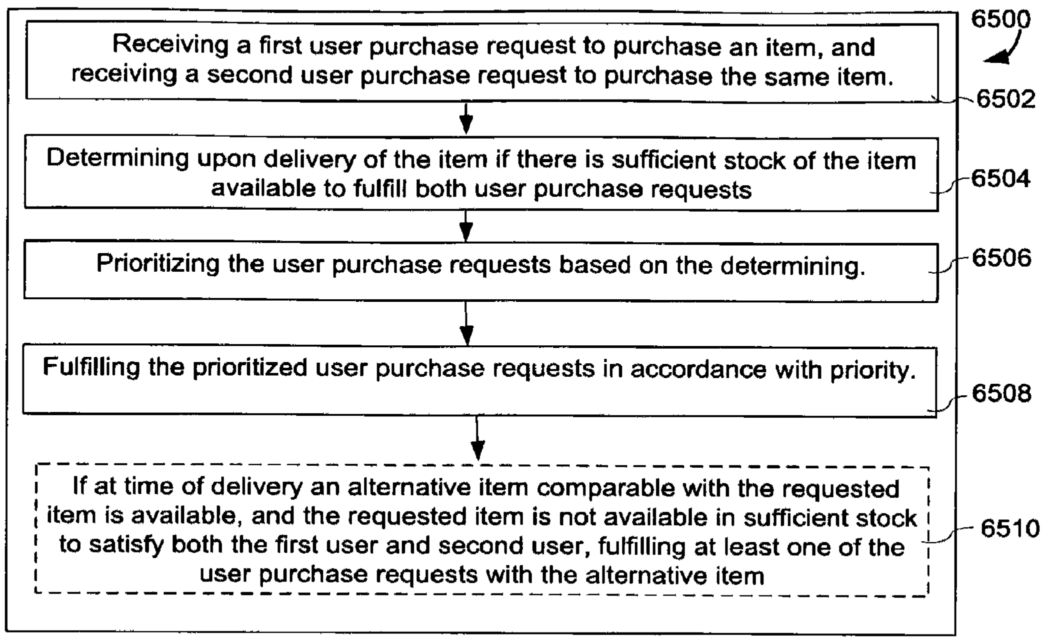
FIG. 65 illustrates a flowchart representing a server method for hosting an eProcurement system, according to some embodiments.

FIG. 65 is a flowchart representing a server method 6500 for hosting an eProcurement system, according to certain embodiments of the invention. The server method 6500 may be governed by instructions that are stored in a computer readable storage medium, as described.

In some embodiments, the server method 6500 includes the following, performed at a server hosting an electronic procurement system. A first user purchase request to purchase an item associated with the electronic procurement system and a second user purchase request to purchase the same item are received (6502). A determination is made (6504) upon delivery of the item whether there is sufficient stock of the item available to fulfill both user purchase requests. The user purchase requests are prioritized (6506) based on the determining. The prioritized user purchase requests are fulfilled (6508) in accordance with priority. In some embodiments, prioritizing includes determining which request is the most important or highest priority.

In some embodiments, if, at time of delivery, an alternative item comparable with the requested item is available, and the requested item is not available in sufficient stock to satisfy both the first user and second user, one or more of the user purchase requests are fulfilled with the alternative item 6510.

Figure 66:
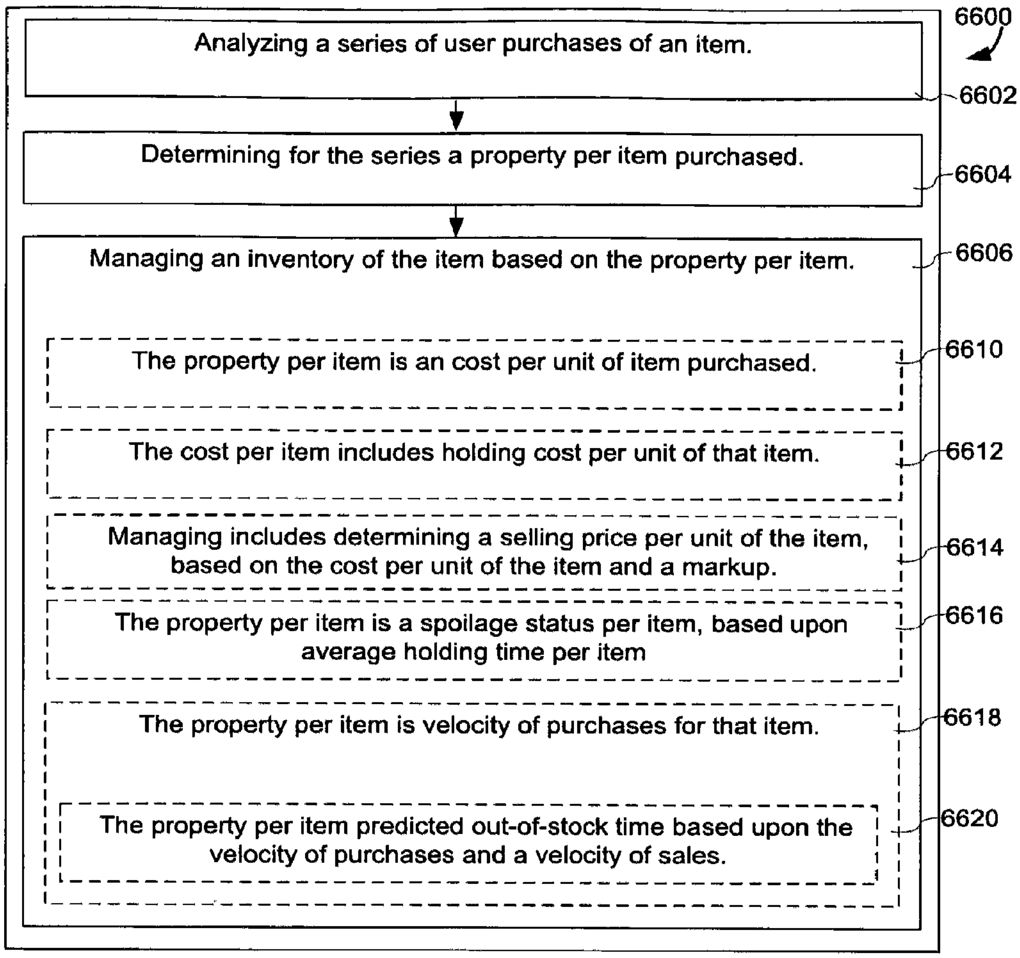
FIG. 66 illustrates a flowchart representing a server method for hosting an eProcurement system, according to some embodiments.

FIG. 66 is a flowchart representing a server method 6600 for hosting an eProcurement system, according to certain embodiments of the invention. The server method 6600 may be governed by instructions that are stored in a computer readable storage medium, as described.

In some embodiments, the server method 6600 includes the following, performed at a server hosting an electronic procurement system. A series of user purchases of an item is analyzed (6602). A property per item purchased in the series is determined (6604). An inventory of the item is managed based on the property per item (6606).

In some embodiments, the property per item is a cost per unit of item purchased (6610). In some embodiments, the cost per item includes the holding cost per unit of that item (6612). In some embodiments, the holding cost includes depreciation. In some embodiments, the holding cost includes interest expense.

In some embodiments, managing includes determining a selling price per unit of the item, based on the cost per unit of the item and a markup (6614). In some embodiments, the property per item is a spoilage status, based upon average holding time per item (6616). In some embodiments, the spoilage status is a 'best before' date for food, medicines, or other organic items. In some embodiments, the property per item is velocity of purchases for that item (6618). In some embodiments, the property per item is a predicted out-of-stock time based upon the velocity of purchases and a velocity of sales (6620).

Figure 67:
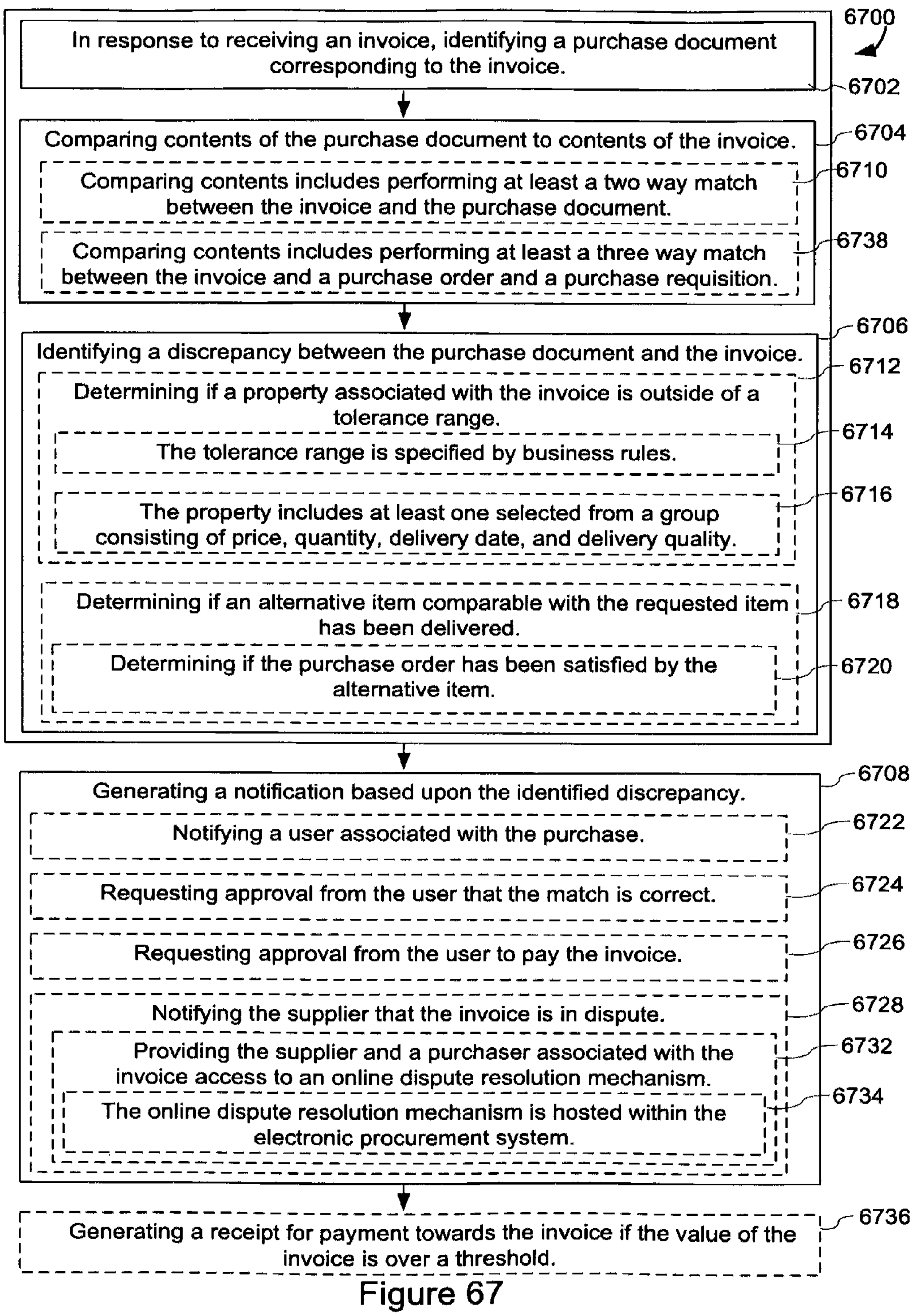
FIG. 67 illustrates a flowchart representing a server method for hosting an eProcurement system, according to some embodiments.

FIG. 67 is a flowchart representing a server method 6700 for hosting an eProcurement system, according to certain embodiments of the invention. The server method 6700 may be governed by instructions that are stored in a computer readable storage medium, as described.

In some embodiments, the server method 6700 includes the following, performed at server hosting an electronic procurement system. In response to receiving an invoice (e.g., stored in sales invoice database 3400, or buyer invoice database 3300, FIG. 22), a purchase document (e.g., from purchase order database 2500 or purchase request database 2700, FIG. 22) corresponding to the invoice is identified (6702), for example by sales/purchasing management module 2046, FIG. 20. Contents of the purchase document are compared (e.g., auto-matching 5984, and perform matching action 5978, FIG. 59D) against contents of the invoice (6704). A discrepancy (e.g., matching exception 5986, FIG. 59D) between the purchase document and the invoice is identified (6706). A notification is generated based upon the identified discrepancy (6708). In some embodiments, the invoice is provided by a supplier to the electronic procurement system. In some embodiments, the purchase document is a purchase order or a purchase requisition.

In some embodiments, the comparing is performed by comparing fields of the buyer invoice database 3300 and/or seller invoice database 3400 with corresponding fields from the purchase order database 2500, all in FIG. 22. In some embodiments, these fields include one or more of Purchase Order Workflow Activity History 2510, Supplier 2532, Purchase Order Line Product 2548, and/or Purchase Order User Selected Approver 2562, all in FIG. 25. The selected fields are exemplary, and in other embodiments a different selection of fields could be compared.

In some embodiments, comparing contents includes performing at least a two way match (e.g., auto-match 5984, FIG. 59D) between the invoice and the purchase document (6170). In some embodiments, at least a two way match includes a two way match and a three way match. In some embodiments, generating a notification includes notifying a user (e.g., matching exceptions 5994) associated with the purchase of the match (6722). In some embodiments, approval is requested from the user that the match is correct (6724). In some embodiments, approval is requested from the user to pay the invoice (6726), e.g., approve box 5996, FIG. 59E. In some embodiments, identifying a discrepancy includes determining if a property associated with the invoice is outside of a tolerance range (6712). In some embodiments, the tolerance range is specified by business rules (6714). In some embodiments, the property includes at least one selected from a group consisting of price, quantity, delivery date, and/or delivery quality (6716).

In some embodiments, generating a notification includes notifying the supplier that the invoice is in dispute (6728). In some embodiments, the supplier and a purchaser associated with the invoice are provided with access to an online dispute resolution mechanism (6732). In some embodiments, the online dispute resolution mechanism is hosted within the electronic procurement system (6734).

In some embodiments, a receipt (e.g., from receipt database 2800) is generated for payment towards the invoice if the value of the invoice is over a threshold (6736).

In some embodiments, identifying a discrepancy includes determining if an alternative item comparable with the requested item has been delivered (6718). In some embodiments, a determination is made whether the purchase order has been satisfied by the alternative item (6720). In some embodiments, comparing contents includes performing at least a three way match between the invoice and a purchase order and a purchase requisition (6738).

Figure 68:
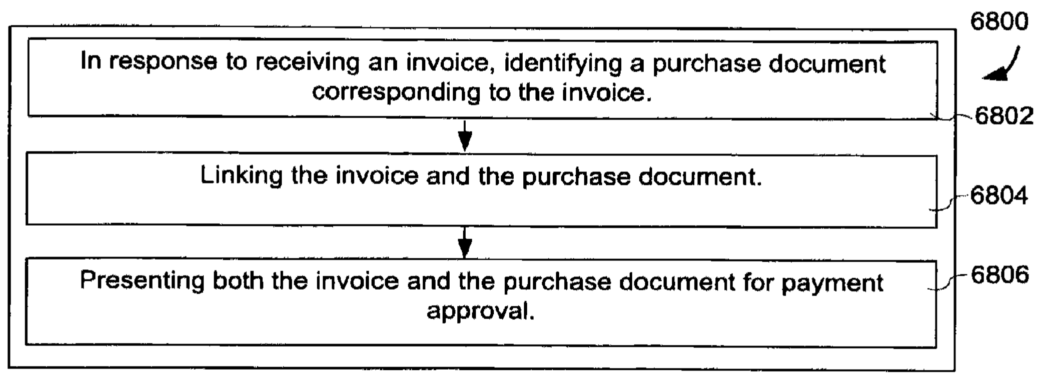
FIG. 68 illustrates a flowchart representing a server method for hosting an eProcurement system, according to some embodiments.

FIG. 68 is a flowchart representing a server method 6800 for hosting an eProcurement system, according to certain embodiments of the invention. The server method 6800 may be governed by instructions that are stored in a computer readable storage medium, as described. In some embodiments, server method 6800 includes the following, performed at server hosting an electronic procurement system. In response to receiving an invoice, a purchase document corresponding to the invoice is identified (6802). The invoice and the purchase document are linked (6804). The invoice and the purchase document are presented (e.g. 5995, FIG. 59E) for payment approval (6806).

In some embodiments, the identifying operation (6802) is performed by comparing fields of the buyer invoice database 3300 and/or seller invoice database 3400 with corresponding fields from the purchase order database 2500 and/or purchase requisition database 2700, as described in FIG. 22.

In some embodiments, the linking and presenting for approval is performed by associating the buyer invoice database 3300 and/or seller invoice database 3400 with the purchase order database 2500 and/or purchase requisition database 2700. When the invoice is presented for approval, the associated purchase document is retrieved from the respective purchase database (2500 or 2700) and presented to the approver. This permits the approver to perform an 'eyeball' compare, i.e. human review, to ensure everything is correct prior to payment. This avoids the need for the approver to manually search for the purchase document and manually retrieve it (which may be time consuming) prior to approval.

Figure 69:
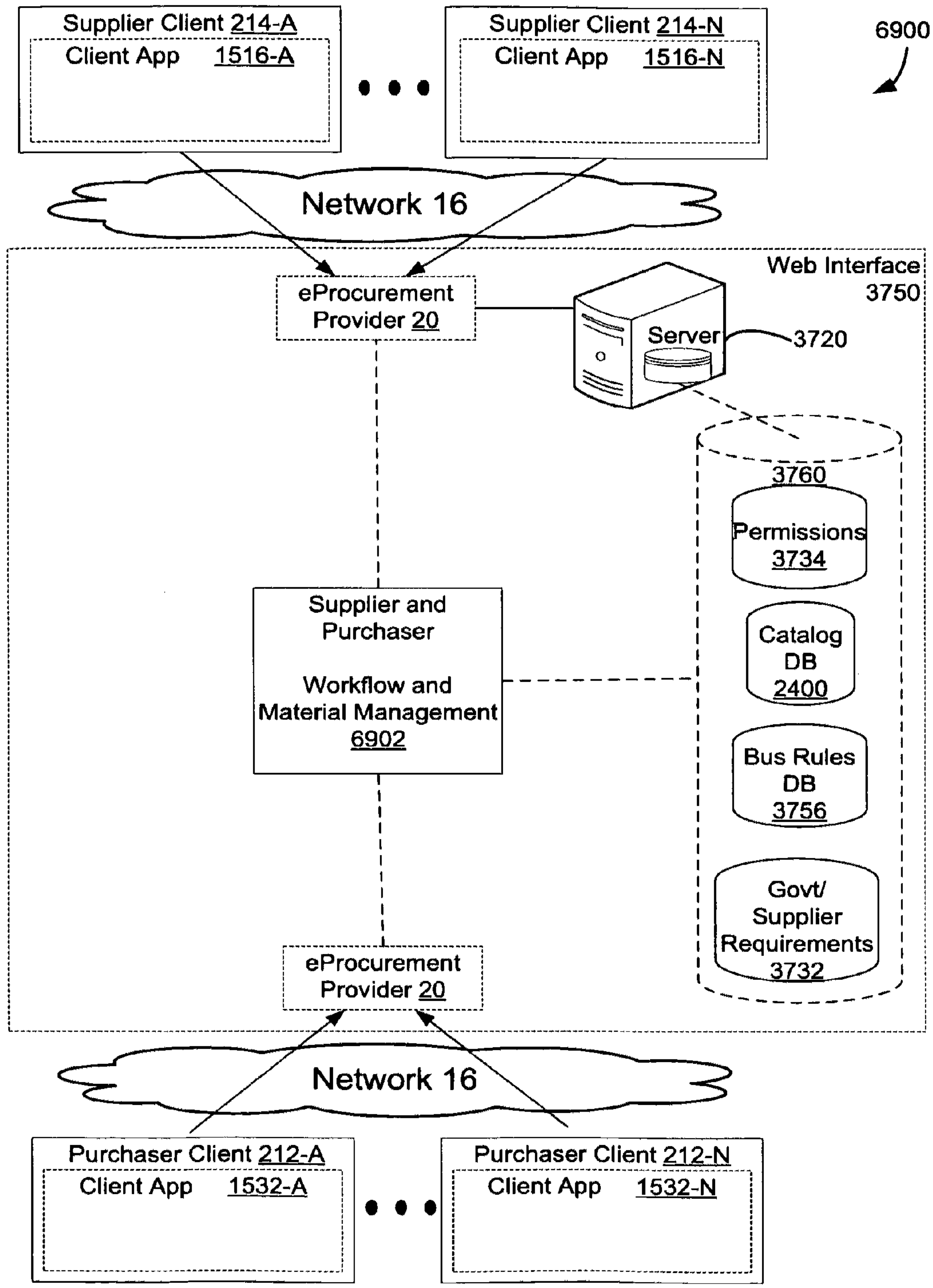
FIG. 69 illustrates a prophetic block diagram of a server system, including an eProcurement provider hosted at the server system, according to some embodiments.

FIG. 69 is a block diagram of a server system 6900, including an eProcurement provider 20 hosted at server 3720. The server 3720 is coupled, either locally or remotely, to a database/storage 3760 that hosts a plurality of databases, as previously described.

The electronic procurement (eProcurement) provider 20 interacts over a network 16 with a plurality of purchaser clients 212, both as described earlier. The purchaser clients run client application 1532. The eProcurement provider 20 also interacts over network 16 with a plurality of supplier clients 214, wherein at least one of the suppliers has an associated catalog, as described earlier. The supplier clients run client application 1516. The supplier and client applications may include a web-browser interface or a stand alone application for accessing the eProcurement provider 20 and server 3720. The server 3720 may provide a web interface 3750 as described earlier. The server 3720 hosts a plurality of databases, as described earlier. The electronic procurement provider 20 hosts one or more supplier and purchaser workflow and material management 6902 applications, as described earlier. These applications assist users 212 and suppliers 214 in making transactions using eProcurement provider 20, over the web interface.

In some embodiments, the electronic procurement system 20 is a single instance multi-tenant system. In some embodiments, the electronic procurement system 20 is a web-based system, using web interface 3750. In some embodiments, the server 3720 is located independently from suppliers 214 and purchasers 212 of the electronic procurement system.

Figure 70:
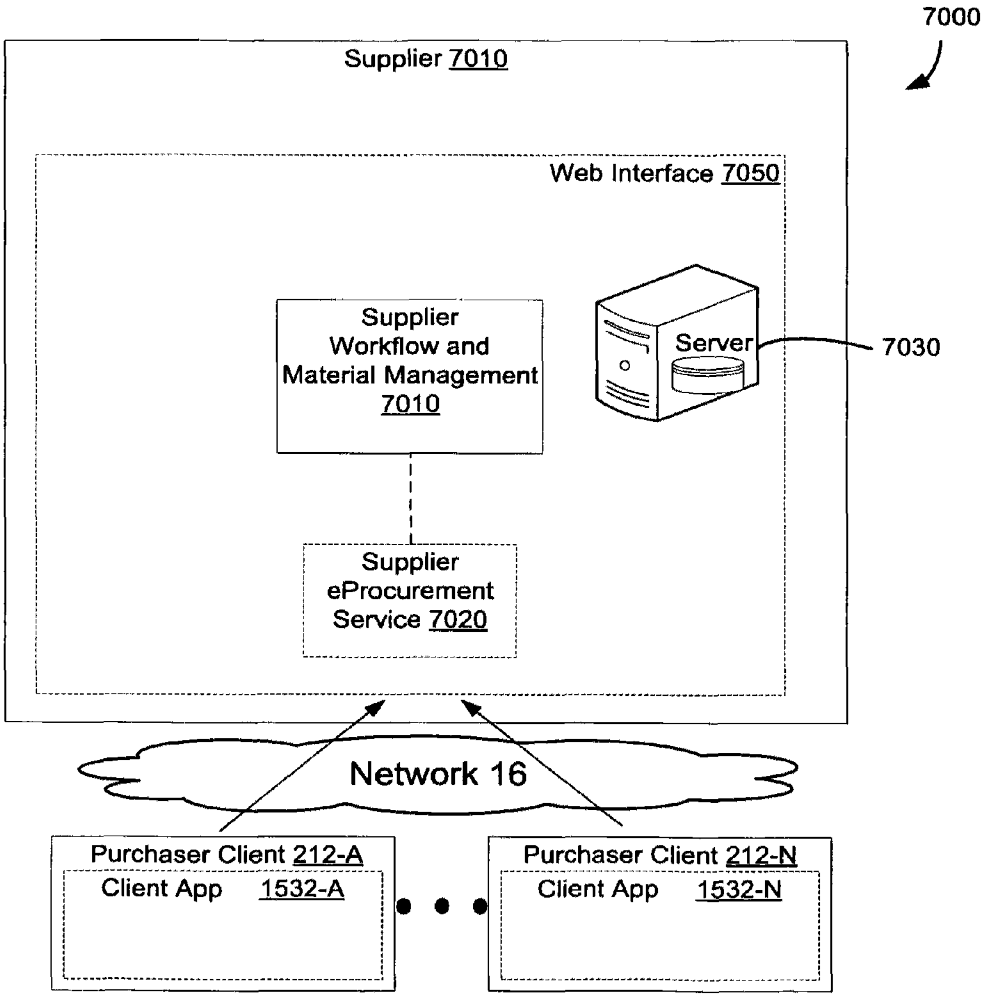
FIG. 70 illustrates a prophetic block diagram of an eProcurement system hosted at a supplier server, according to some embodiments.

FIG. 70 shows an eProcurement system 7000 hosted at a supplier server 7010, which interacts over a network 16 with a plurality of purchaser clients 212, both as described earlier. In this embodiment, the server 7030 is located at a supplier 7010 of the electronic procurement system. The purchaser clients run client applications 1532. This application may include a web-browser interface or a stand alone application, for accessing the supplier electronic procurement service 7020 and server 7030. The server 7030 may provide a web interface 7050 as described earlier. The supplier server 7010 hosts a plurality of databases, as described earlier. The supplier electronic procurement service 7020 hosts one or more supplier workflow and material management 7010 applications, as described earlier.

Figure 71:
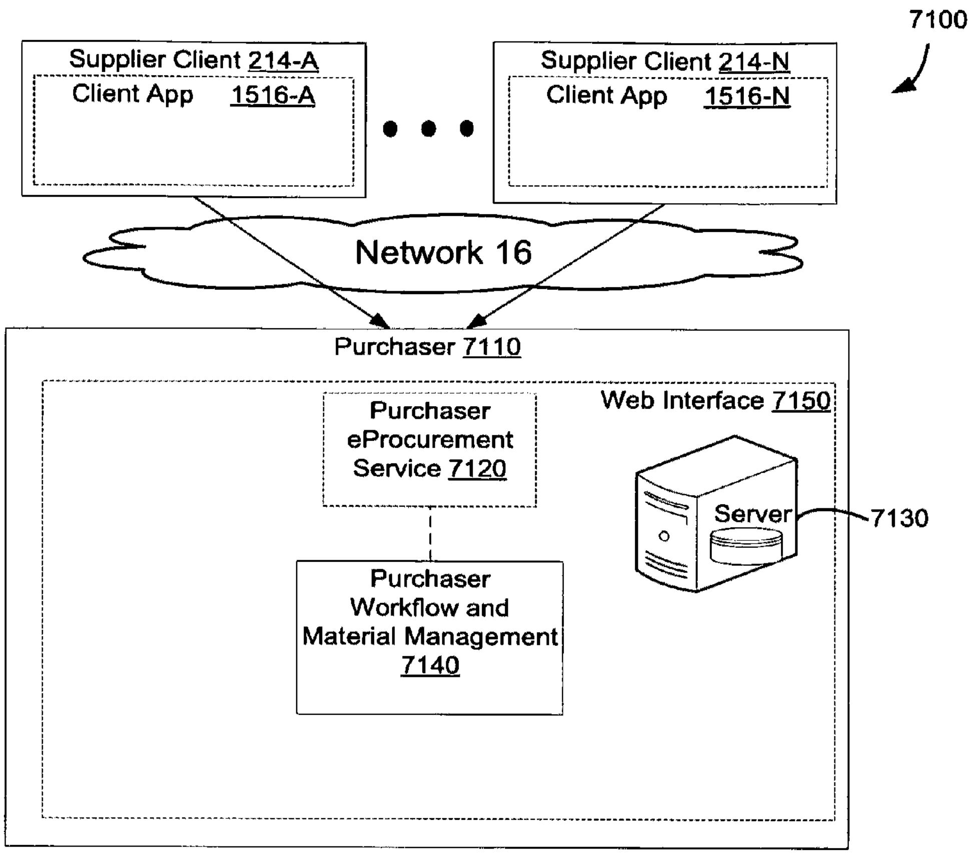
FIG. 71 illustrates a prophetic block diagram of an eProcurement system hosted at a purchaser server, according to some embodiments.

FIG. 71 shows an eProcurement system 7100 hosted at a purchaser server 7110, which interacts over a network 16 with a plurality of supplier clients 214, wherein at least one of the suppliers has an associated catalog, as described earlier. In this embodiment, the server 7130 is located at a purchaser 7110 of the electronic procurement system. The supplier clients run client application 1516. This application may include a web-browser interface or a stand alone application, for accessing the purchaser electronic procurement service 7120 and server 7130. The server 7130 may provide a web interface 7150 as described earlier. The purchaser server 7110 hosts a plurality of databases, as described earlier. The purchaser electronic procurement service 7120 hosts one or more supplier workflow and material management 7140 applications, as described earlier.

Figure 72:
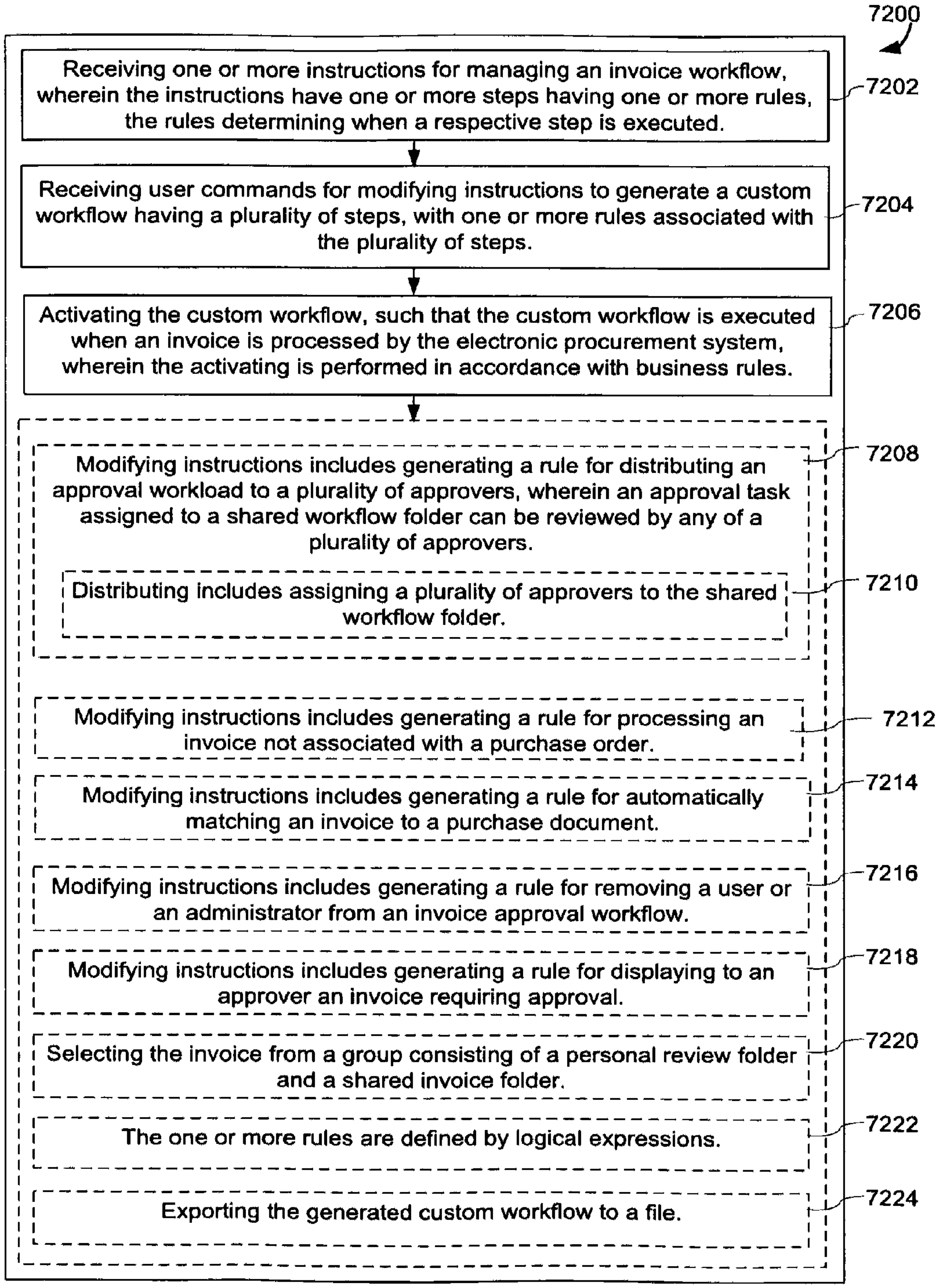
FIG. 72 illustrates a flowchart representing a server method for hosting an eProcurement system, according to some embodiments.

FIG. 72 is a flowchart representing a server method 7200 for hosting an eProcurement system, according to certain embodiments of the invention. The server method 7200 may be governed by instructions that are stored in a computer readable storage medium, as described. In some embodiments, server method 7200 includes the following, performed at server hosting an electronic procurement system.

One or more instructions for managing an invoice workflow are received (e.g. FIG. 59A workflow folder import browse button 5912, load folders/robots button 5914) (7202), wherein the instructions have one or more steps having one or more rules (FIG. 59B, rules 5942 A-C), the rules determining when a respective step is executed.

User commands are received 7204 to modify (FIG. 59B, steps 5931, activities 5940) instructions to generate a custom workflow having a plurality of steps (FIG. 59B, steps start 5943, stop 5944), with one or more rules (associated with the plurality of steps).

The custom workflow is activated 7206 (in accordance with business rules), such that the custom workflow is executed when an invoice is processed by the electronic procurement system (e.g., FIG. 59E matching exception 5994 corresponds to a rule for matching exception 5943C in FIG. 59B).

In some embodiments, modifying instructions (i.e., commands or steps to modify instructions) includes generating 7208 a rule for distributing an approval workload to a plurality of approvers, wherein an approval task assigned to a shared workflow folder (FIG. 59E, folder 5994) can be reviewed by any of a plurality of approvers. In some embodiments, distributing includes assigning a plurality of approvers to the shared workflow folder (7210).

In some embodiments, modifying instructions includes generating 7212 a rule (e.g., FIG. 59B, rule 5943A) for processing an invoice not associated with a purchase order. In some embodiments, modifying instructions includes generating 7214 a rule (e.g., FIG. 59B, rule 5943B) for automatically matching an invoice to a purchase document. In some embodiments, modifying instructions includes generating 7214 a rule (e.g., FIG. 59C, rule 5943B) for processing matching exceptions between an invoice to a purchase document. In some embodiments, modifying instructions includes generating 7214 a rule (e.g., FIG. 59D, rule 5943B) for automatically approving an invoice for payment. In some embodiments, modifying instructions includes generating 7216 a rule for removing (e.g., FIG. 59C, remove user 5972 and add user 5962) a user or an administrator from an invoice approval workflow.

In some embodiments, modifying instructions includes generating 7218 a rule for displaying to an approver (e.g., FIG. 59C approvers 5966) an invoice requiring approval. In some embodiments, the invoice is selected (7220) from a group consisting of a personal review folder and a shared invoice folder. In some embodiments, the one or more rules are defined (7222) by logical expressions (e.g., steps 5931, and rules 5943 A-D).

In some embodiments, the generated custom workflow is exported (7224) to a file (e.g., FIG. 59B, export 5926). This file may be an XML file, a file containing a markup language, a binary file, a text file, or a file with any other format for storing data.

Figure 73:
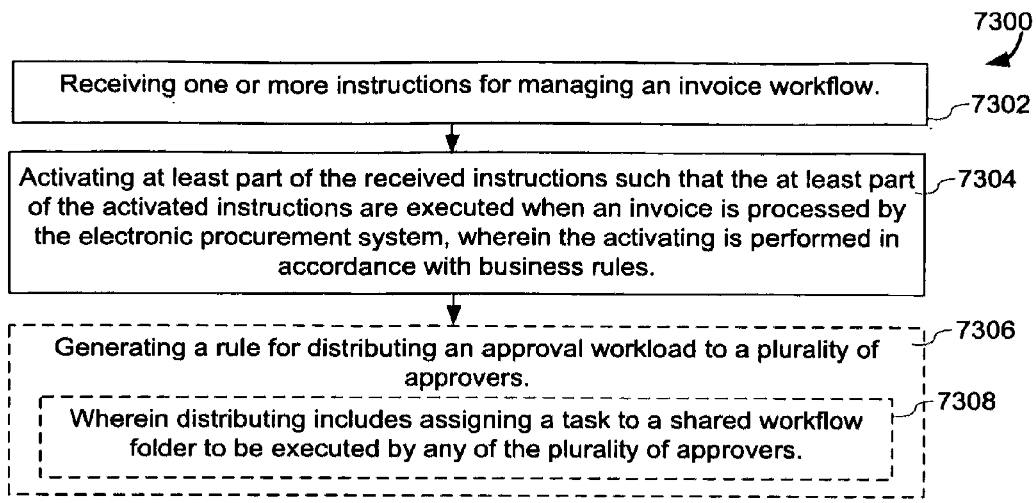
FIG. 73 illustrates a flowchart representing a server method for hosting an eProcurement system, according to some embodiments.

FIG. 73 is a flowchart representing a server method 7300 for hosting an eProcurement system, according to certain embodiments of the invention. The server method 7300 may be governed by instructions that are stored in a computer readable storage medium, as described. In some embodiments, server method 7300 includes the following, performed at server hosting an electronic procurement system.

One or more instructions are received (7302) for managing an invoice workflow. At least part of the received instructions are activated (e.g., FIG. 59A, workflow imported instruction folder/robot 5914) (7304) such that the at least part of the activated instructions are executed (e.g., FIG. 59C invoice workflow approvals 5991, 5993, 5994) when an invoice is processed by the electronic procurement system, wherein the activating is performed in accordance with business rules.

In some embodiments, a rule is generated (7306) for distributing (e.g., FIG. 59C approvers 5964 and users 5968) an approval workload to a plurality of approvers. In some embodiments, the distributing includes assigning (7308) a task to a shared workflow folder to be executed by any of the plurality of approvers.

Figure 74:
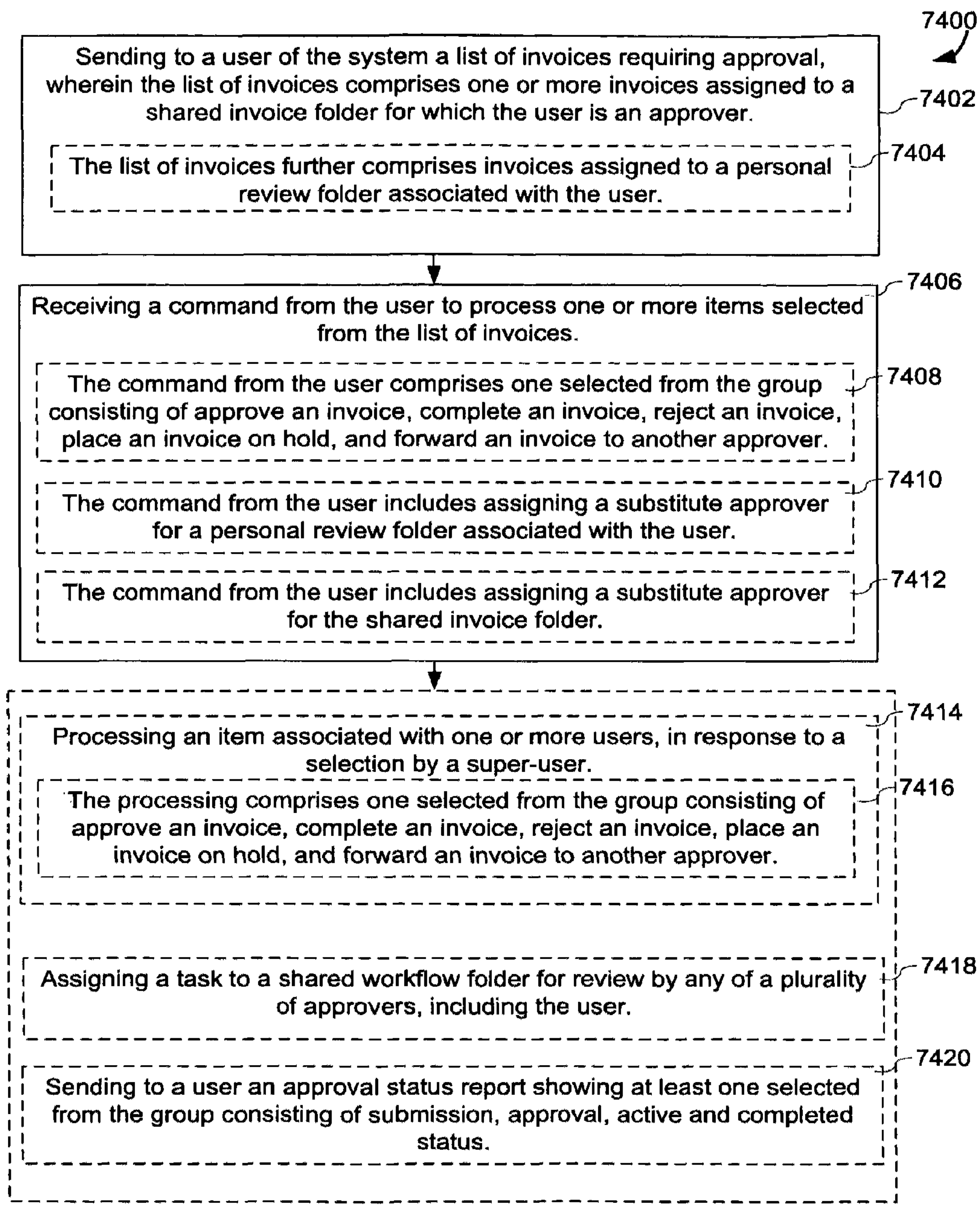
FIG. 74 illustrates a flowchart representing a server method for hosting an eProcurement system, according to some embodiments.

FIG. 74 is a flowchart representing a server method 7400 for hosting an eProcurement system, according to certain embodiments of the invention. The server method 7400 may be governed by instructions that are stored in a computer readable storage medium, as described. In some embodiments, server method 7400 includes the following, performed at server hosting an electronic procurement system.

A list of invoices requiring approval are sent (e.g., FIG. 59E, invoice approvals 5992) (7402) to a user of a system, wherein the list of invoices comprises one or more invoices assigned to a shared invoice folder sent (e.g., FIG. 59E, window 5994 with shared approvers 5997) (5992) for which the user is an approver. In some embodiments, the list of invoices further comprises invoices assigned to a personal review folder (e.g., FIG. 59E my invoice approvals 5993) associated with the user (7404).

A command is received (7408) from the user to process (e.g., FIG. 59E action 5995, select 5996) one or more items selected from the list of invoices. In some embodiments, the command from the user comprises (7408) one selected from the group consisting of approve an invoice, complete an invoice, reject an invoice, place an invoice on hold, and forward an invoice to another approver. In some embodiments, the command from the user includes assigning (7410) a substitute approver (e.g., FIG. 59E assign 5998 approver) for a personal review folder associated with the user. In some embodiments, the command from the user includes assigning (7412) a substitute approver for the shared invoice folder.

In some embodiments, an item associated with one or more users is processed (7414) in response to a selection by a super user. In some embodiments, the processing comprises (7416) one selected from the group consisting of approve an invoice, complete an invoice, reject an invoice, place an invoice on hold, and forward an invoice to another approver.

In some embodiments, a task is assigned (7418) to a shared workflow folder for review by any of a plurality of approvers, including the user. In some embodiments, an approval status report is sent (7420) to the user, showing at least one selected from the group consisting of submission, approval, active and completed status (FIG. 59D, 5982, 5984, 5986, 5988 respectively).

FIG. 75 includes a listing of folder and robots, including a Remit To Validation folder 7502, a Non-PO Approvals folder 7504, a Matching Exceptions folder 7506, a Matching Exception folder 7508, and Over Credits folder 7510, an Auto-Matching folder 7512, an OK to Pay folder 7514, and Over Credit-Auto Reject folder 7516, an Auto Match robot 7518, an Okay to Pay robot 7520, and an Over Credit/Invoice Process robot 1800.

In some embodiments, the Remit To Validation folder 7502 confirms that a supplier address to which funds are remitted is a valid supplier address. In some embodiments, the supplier address associated with an invoice is checked against a database of known supplier address (in some embodiments, controlled by a buyer administrator). Only if the address associated with the invoice matches with a known good supplier address are funds remitted. This may prevent mistaken payments to incorrect suppliers. This may also prevent unauthorized remittances of funds to unapproved suppliers, and thus help prevent fraud or misuse of the electronic procurement system.

In some embodiments, the Non-PO Approvals folder 7504 implements a non-purchase order approval process, as described.

In some embodiments, the Matching Exceptions folder 7506 and Matching Exception folder 7508 implement a matching exception(s) process, as described.

In some embodiments, the Over Credits folder 7510 implements a process to prevent a supplier from over-crediting a returned item or items from a buyer. For example, a buyer may purchase ten units of a product, then return the ten units to the supplier. If the supplier credits the buyer for twelve units returned, then the supplier has over-credited the buyer by two units. The over credits folder 7510 identifies such a situation and flags it to an approver, in one embodiment by comparing the number of returned items from a buyer against the number of credited items from the supplier.

In some embodiments, the Auto-Matching folder 7512 implements an automatic matching process (e.g., between invoices and purchase documents), as described.

In some embodiments, the OK to Pay folder 7514, implements an approval system for processing payment of invoices.

In some embodiments, the Over Credits Auto Reject folder 7516 implements a process to prevent a supplier from over-crediting a returned item or items from a buyer, and for automatically rejecting any invoices having over credits.

In some embodiments, the Auto Match robot 7518, Okay to Pay robot 7520, and Over Credit/Invoice Process robot 1800 operate as described, either alone or in conjunction with the respective folder.

Figure 76:
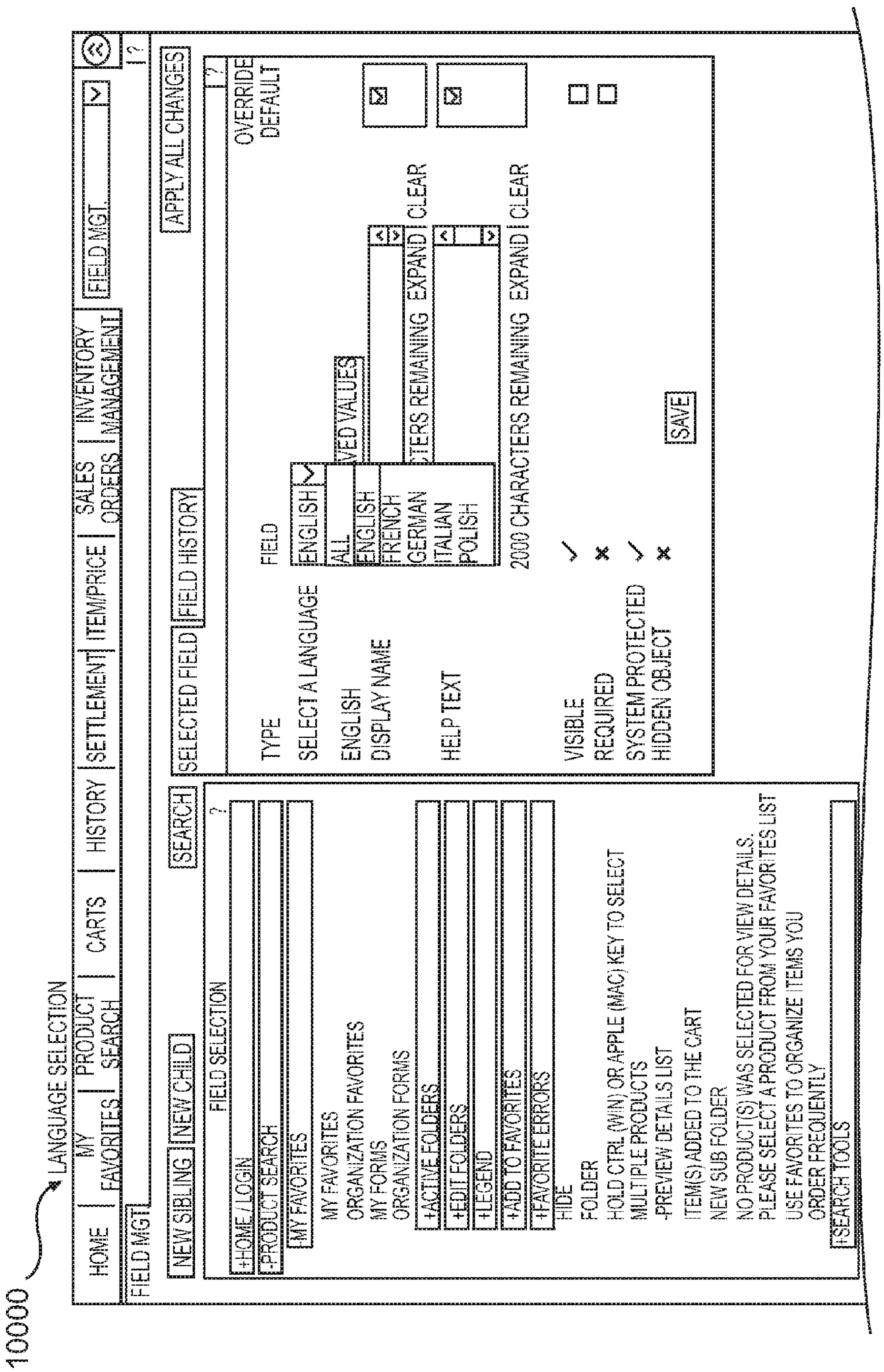
FIG. 76 illustrates an exemplary field management interface in accordance with the present invention.
Figure 76:
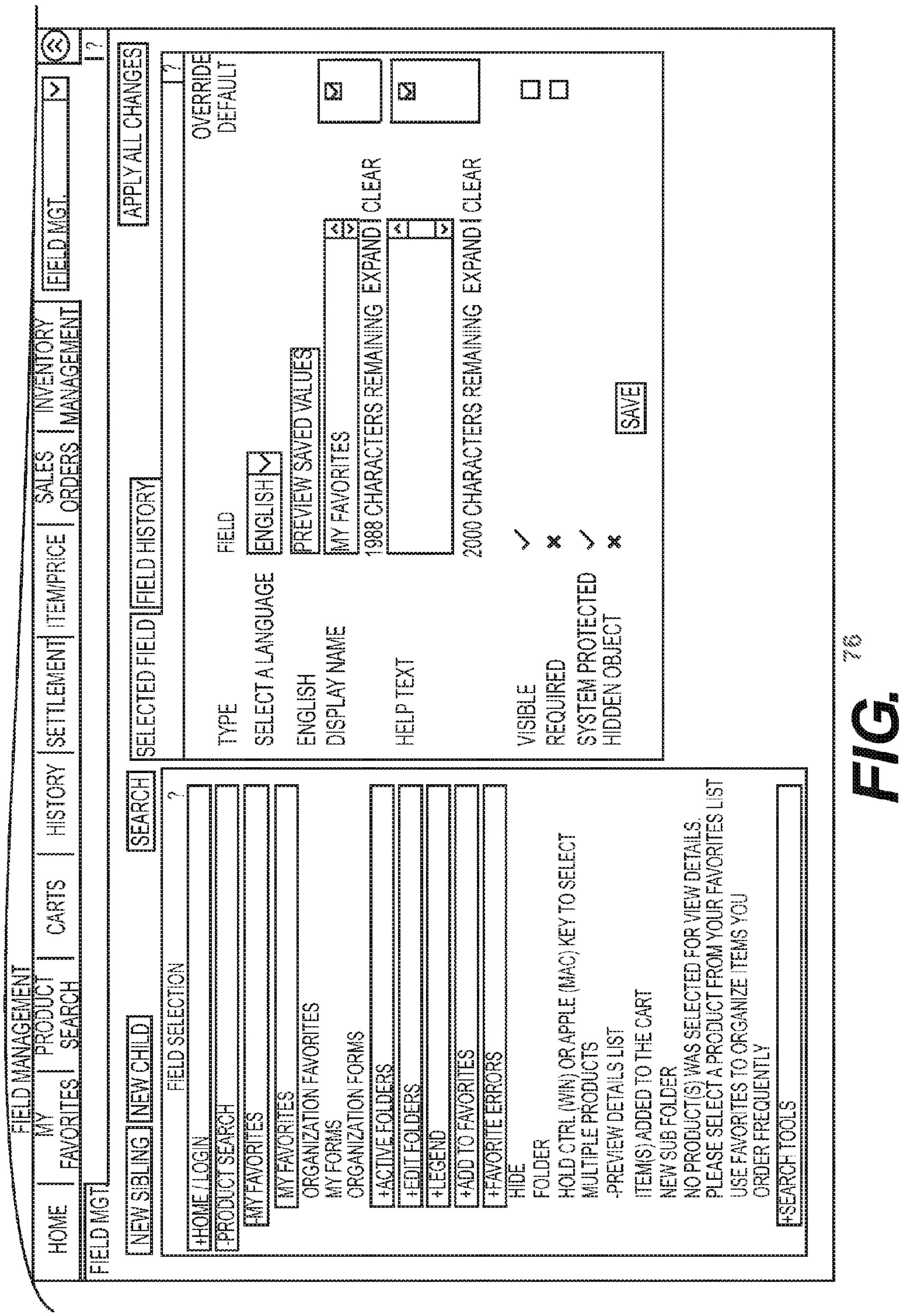

FIG. 76 illustrates an exemplary field management interface in accordance with the present invention, as described. A Language Selection is illustrated, including a 'select a language' option for selecting a language for use in the electronic procurement system. A Field Management selection is illustrated, allowing a user to select fields from a field selection menu, showing a field history, and showing options for creating a new sibling or a new child. A 'save option' and an 'apply all changes' option is shown also.

Figure 77:
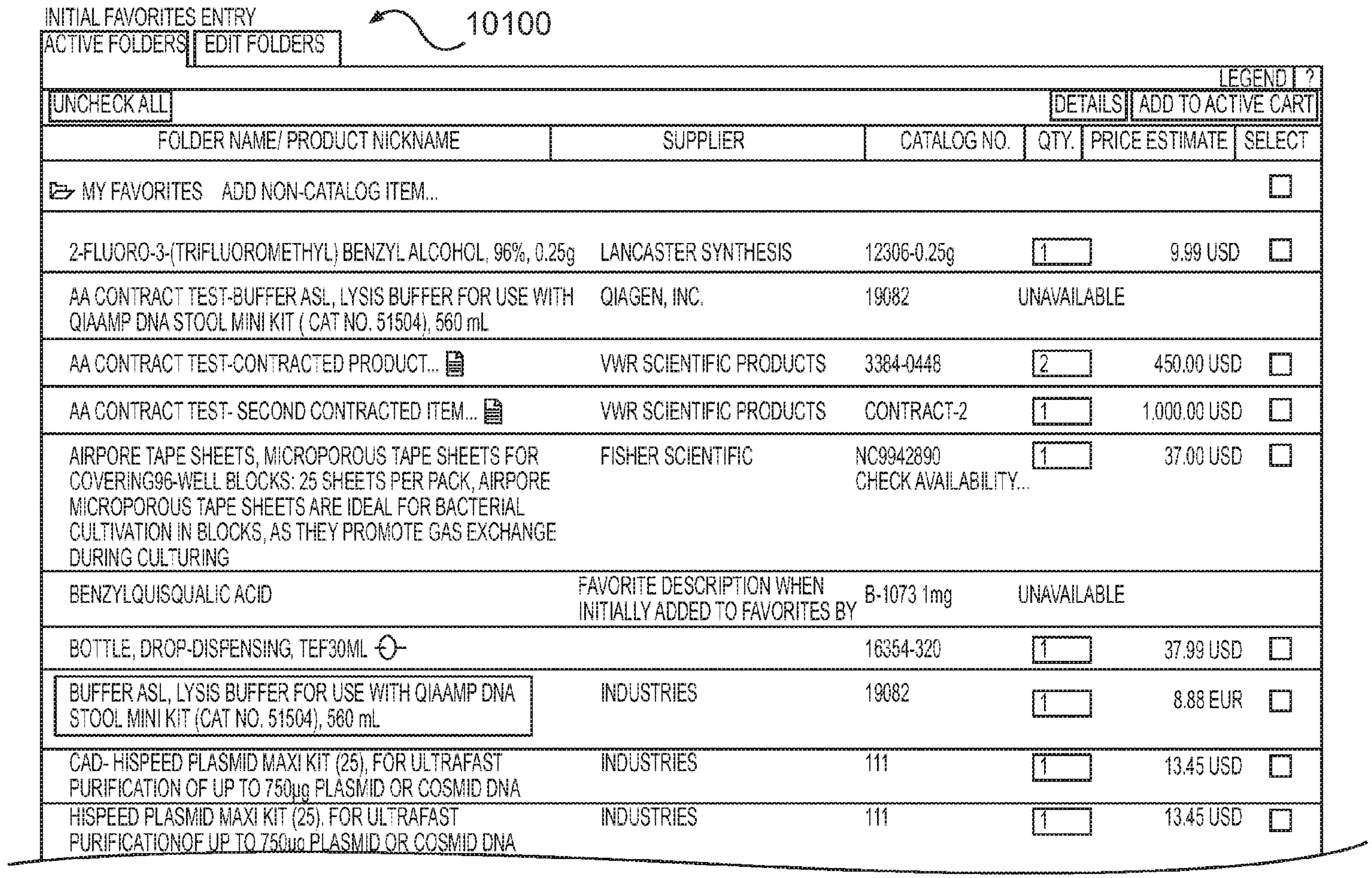
FIG. 77 illustrates an exemplary update favorite(s) process flow in accordance with the present invention.
Figure 77:
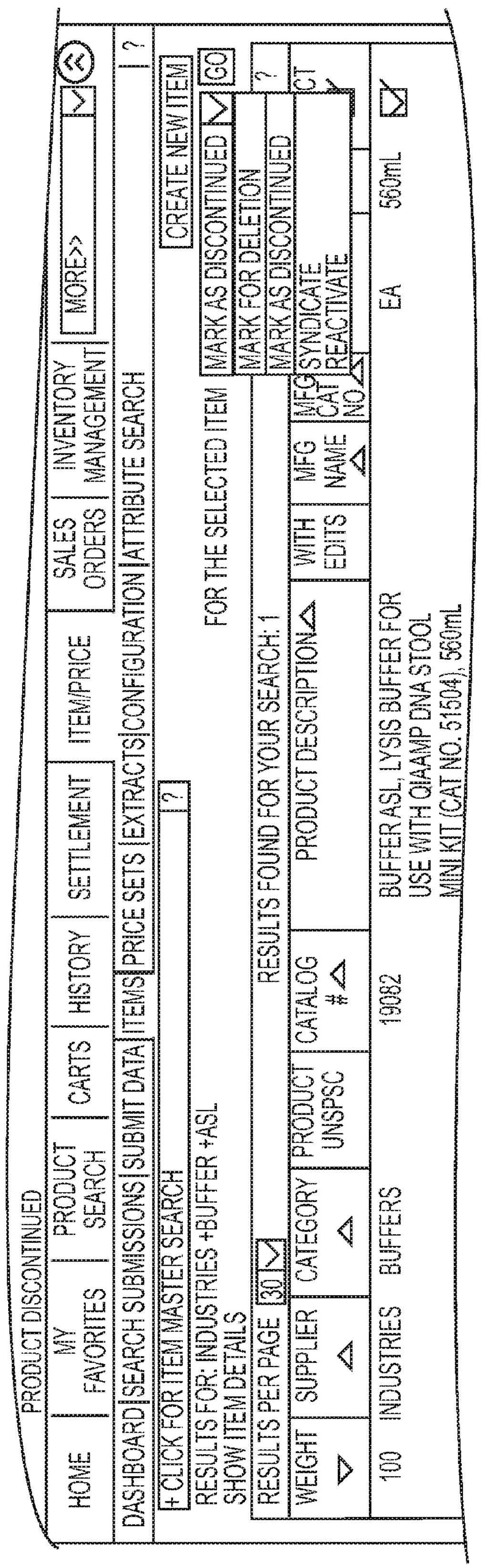
Figure 73:
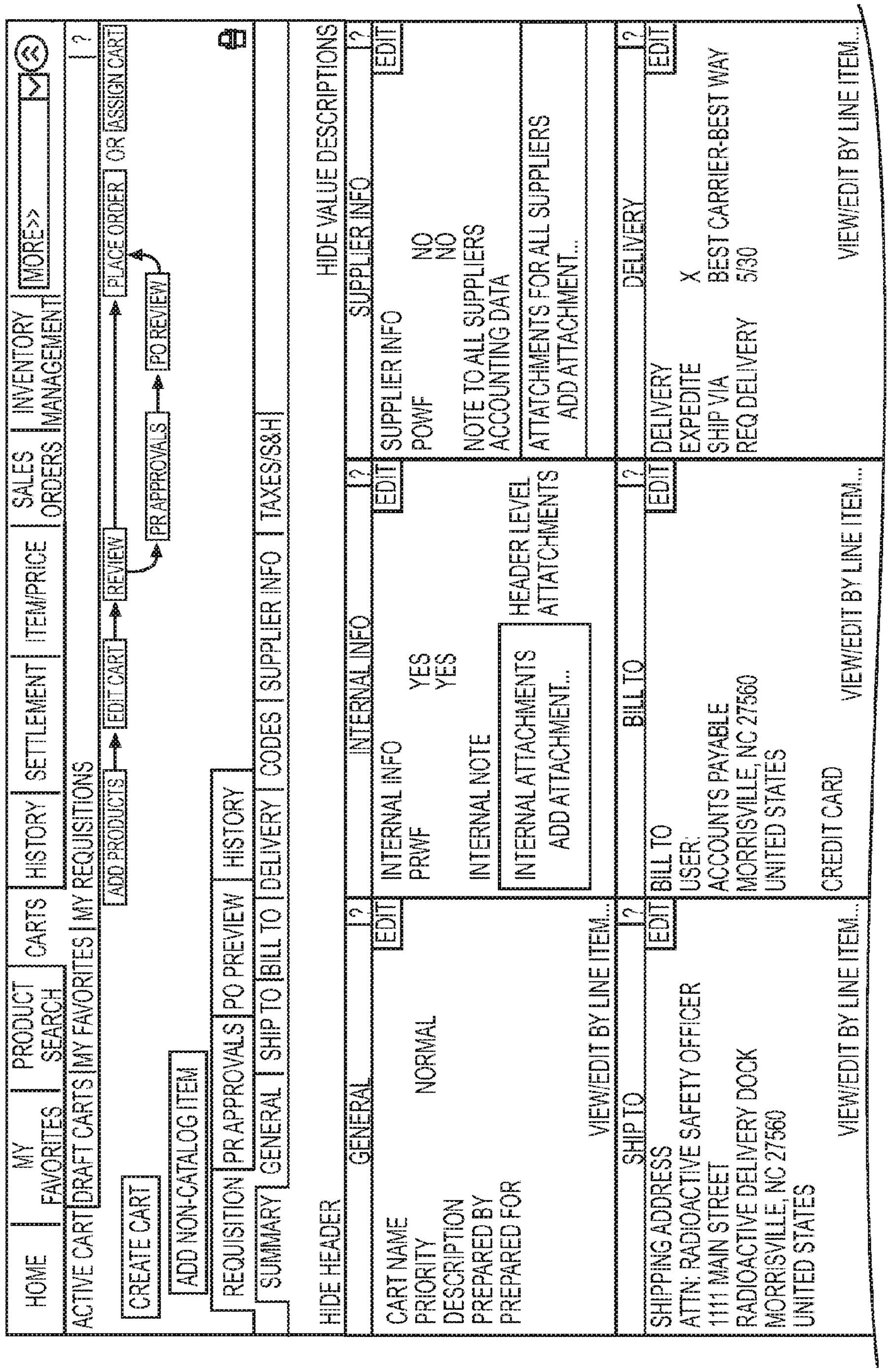

FIG. 77 illustrates an exemplary update favorite(s) process flow in accordance with the present invention, as described. An option is provided for a user to select a favorite description, which may be applied to a product, and which may be placed in a favorites menu.

Figure 78:
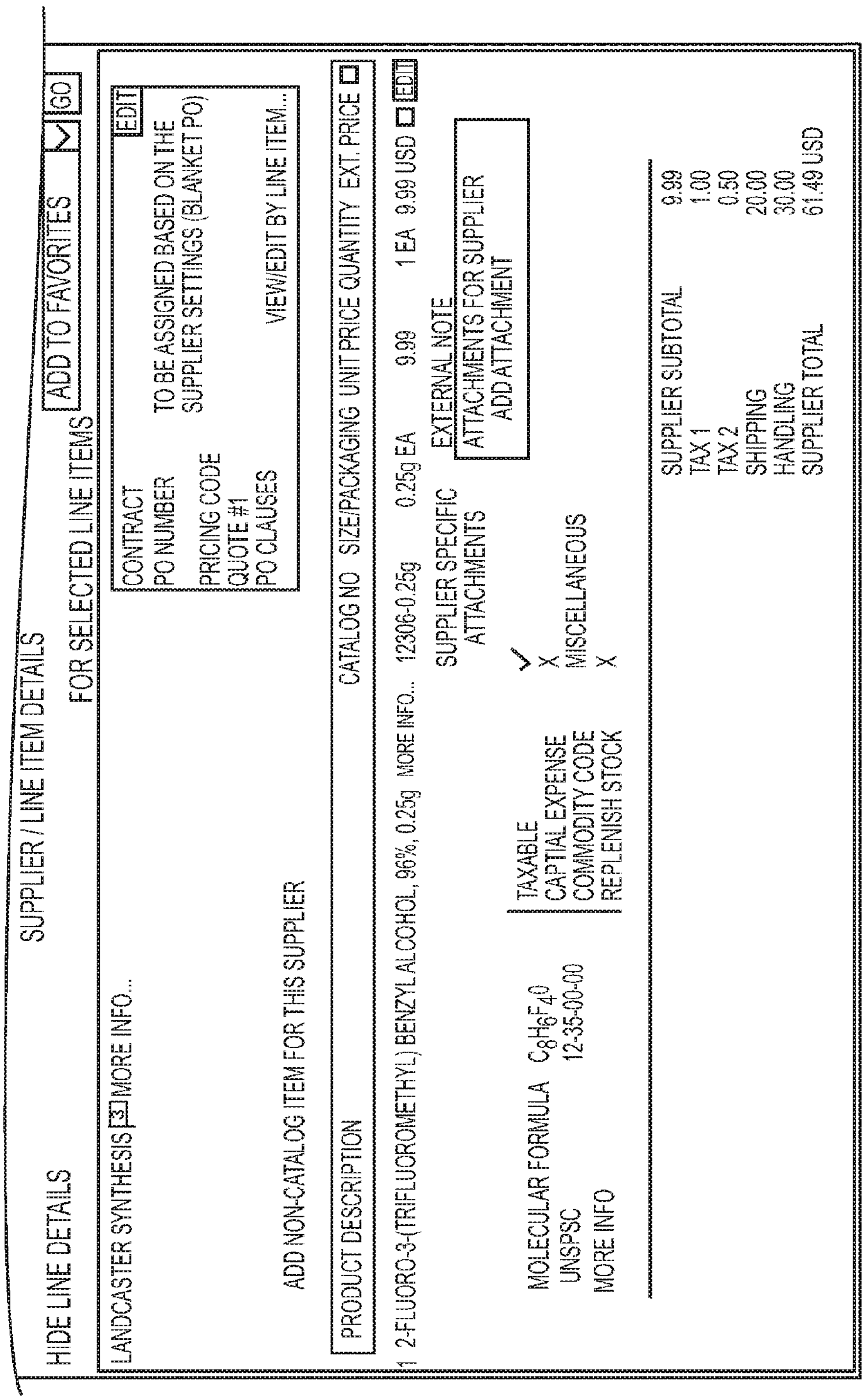
FIG. 78 illustrates an exemplary document setup interface in accordance with the present invention.

FIG. 78 illustrates an exemplary document setup interface in accordance with the present invention, as described. An option to add internal attachments is shown. An option to add attachments for all suppliers is shown.

Figure 79:
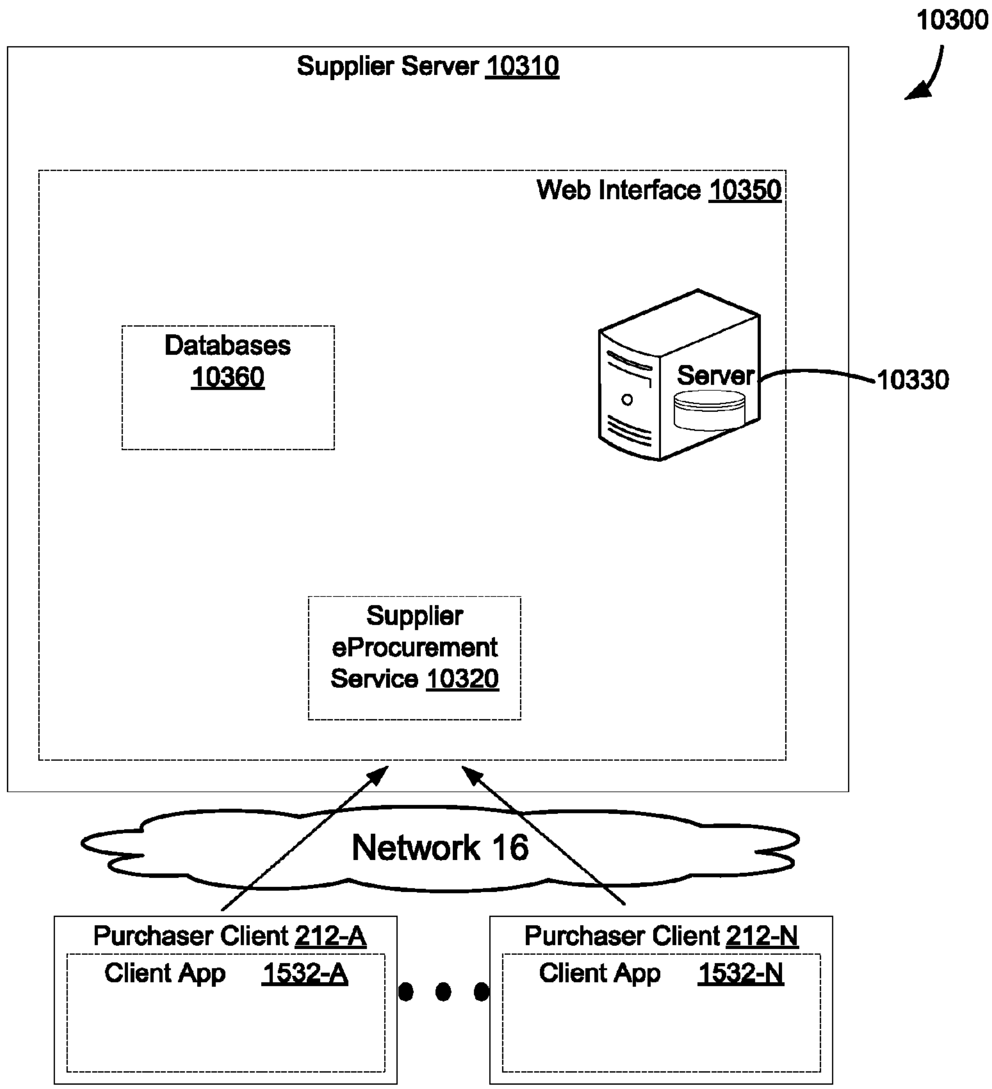
FIG. 79 illustrates an electronic procurement system hosted at a supplier server.

FIG. 79 illustrates shows a system 10300 hosted at a supplier server 10310, which interacts over a network 16 with a plurality of purchaser clients 212, both as described earlier. The purchaser clients run client applications 1532. This application may include a web-browser interface or a stand alone application, for accessing the supplier electronic procurement service 10320 and server 10330. The server 10330 may provide a web interface 10350 as describe earlier. The electronic procurement provider 10320 hosts a plurality of databases 10360, including databases 2200 as described earlier.

Figure 80:
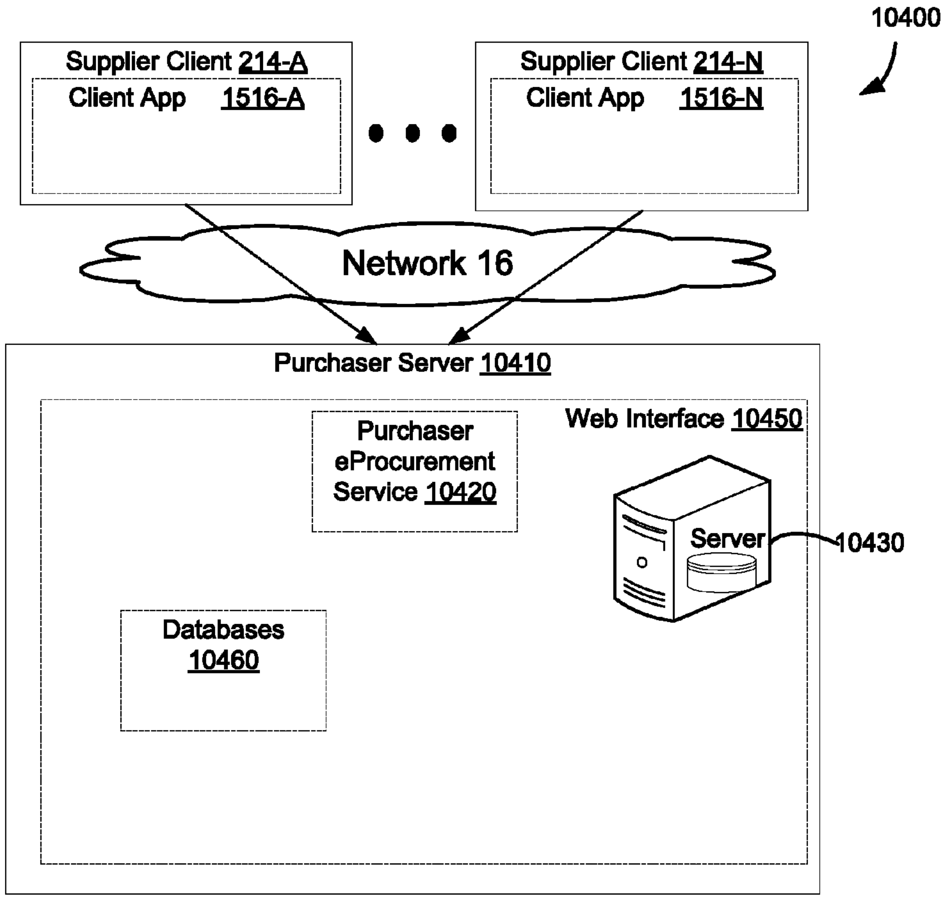
FIG. 80 illustrates an electronic procurement system hosted at a purchaser server.

FIG. 80 illustrates shows a system 10400 hosted at a purchaser server 10410, which interacts over a network 16 with a plurality of supplier clients 214, both as described earlier. The supplier clients run client applications 1516. This application may include a web-browser interface or a stand alone application, for accessing the purchaser electronic procurement service 10420 and server 10430. The server 10430 may provide a web interface 10450 as describe earlier. The electronic procurement provider 10420 hosts a plurality of databases 10460, including databases 2200 as described earlier.

In some embodiments, the electronic procurement system 20 is a single instance multi-tenant system. In some embodiments the electronic procurement system 20 is a web-based system.

In some embodiments the electronic procurement system 20 is located independently from suppliers and purchasers of the electronic procurement system. In some embodiments the electronic procurement system 20 is located at a supplier of the electronic procurement system. In some embodiments the electronic procurement system 20 is located at a purchaser of the electronic procurement system.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 2010 and 2110 may store a subset of the modules and data structures identified above. Furthermore, memory 2010 and 2110 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A computer-implemented method, comprising:

at a server system, wherein the server system comprises an electronic procurement system:

receiving business rules from a first purchasing organization governing interactions between the end users authorized to use the electronic procurement system on behalf of the first purchasing organization and the electronic procurement system;

receiving a first user purchase request from a first end user authorized to use the electronic procurement system on behalf of the first purchasing organization to purchase an item, and a second user purchase request from a second end user authorized to use the electronic procurement system on behalf of the first purchasing organization to purchase the same item;

determining whether there is sufficient stock of the item available to fulfill both user purchase requests;

in accordance with a determination that available stock is less than the stock required to fulfill both purchase quests, prioritizing the first and second user purchase requests in accordance with the business rules received from the first purchasing organization; and generating a purchase order for at least one of the first and second user purchase requests in accordance with the prioritizing.

2. The method of claim 1, wherein the electronic procurement system is a single instance multi-tenant system, and wherein the server system includes a plurality of purchasing organizations, each purchasing organization having a plurality of associated users.

3. The method of claim 1, wherein prioritizing the user purchase requests is performed in accordance with positions of the users on a management hierarchy.

4. The method of claim 1, wherein prioritizing the user purchase requests is performed in accordance with an importance of a respective project associated with each respective user.

5. The method of claim 1, further comprising fulfilling user requests of a similar priority level according to a first in first out (FIFO) method.

6. The method of claim 1, wherein prioritizing is performed according to fees associated with the respective users.

7. The method of claim 1, further comprising placing both user purchase requests in a queue according to the prioritizing.

8. The method of claim 7, further comprising fulfilling user purchase requests of a similar priority level in the queue according to a first in first out (FIFO) method.

9. The method of claim 7, further comprising notifying one or more users having an order in the queue when the ordered item is ready for fulfillment.

10. The method of claim 7, further comprising presenting an alternative available item to a user having an order in the queue, in accordance with a predicted fulfillment delay.

11. A computer-implemented method, comprising:

at a server hosting an electronic procurement system:

receiving business rules from a first purchasing organization governing interactions between the end users authorized to use the electronic procurement system on behalf of the first purchasing organization and the electronic procurement system;

receiving a first user purchase request from a first end user authorized to use the electronic procurement system on behalf of the first purchasing organization to purchase an item associated with the electronic procurement system, and a second user purchase request from a second end user authorized to use the electronic procurement system on behalf of the first purchasing organization to purchase the same item; and to generate a purchase order for the item;

proximate to shipping the requested item, determining whether there is sufficient stock of the item available to fulfill both user purchase requests;

prioritizing the user purchase requests, based on the determining and in accordance with the business rules received from the first purchasing organization; and fulfilling the prioritized user purchase requests in accordance with priority.

12. The method of claim 11, further comprising:

in accordance with a determination that proximate to shipping the requested item an alternative item comparable with the requested item is available, and the requested item is not available in sufficient stock to satisfy both the first user and second user, fulfilling one or more of the user purchase requests with the alternative item.

13. A server system, comprising:

one or more processors;

memory; and one or more programs stored in the memory, the one or more programs comprising instructions to:

receive business rules from a first purchasing organization governing interactions between the end users authorized to use the electronic procurement system on behalf of the first purchasing organization and the server system;

receive a first user purchase request from a first end user authorized to use the electronic procurement system on behalf of the first purchasing organization to purchase an item, and a second user purchase request from a second end user authorized to use the electronic procurement system on behalf of the first purchasing organization to purchase the same item;

determine whether there is sufficient stock of the item available to fulfill both user purchase requests;

in accordance with a determination that available stock is less than the stock required to fulfill both purchase quests, prioritize the user purchase requests, in accordance with the business rules received from the first purchasing organization; and generate a purchase order for at least one of the user purchase requests in accordance with the prioritizing, wherein the server system comprises an electronic procurement system.

14. The system of claim 13, wherein the electronic procurement system is a single instance multi-tenant system, and wherein the server system includes a plurality of purchasing organizations, each purchasing organization having a plurality of associated users.

15. The system of claim 13, wherein instructions to prioritize the user purchase requests are performed in accordance with positions of the users on a management hierarchy.

16. The system of claim 13, wherein instructions to prioritize the user purchase requests are performed in accordance with an importance of a respective project associated with each respective user.

17. The system of claim 13, further comprising instructions to fulfill user requests of a similar priority level according to a first in first out (FIFO) method.

18. The system of claim 13, further comprising instructions to place both user purchase requests in a queue according to the prioritizing.

19. The system of claim 18, further comprising instructions to fulfill user purchase requests of a similar priority level in the queue according to a first in first out (FIFO) method.

20. The system of claim 18, further comprising instructions to notify one or more users having an order in the queue when the ordered item is ready for fulfillment.

21. The system of claim 18, further comprising instructions to present an alternative available item to a user having an order in the queue, in accordance with a predicted fulfillment delay.

22. A server system, comprising:

one or more processors;

memory; and one or more programs stored in the memory, the one or more programs comprising instructions to:

at an electronic procurement system:

receive business rules from a first purchasing organization governing interactions between the end users authorized to use the electronic procurement system on behalf of the first purchasing organization and the electronic procurement system;

receive a first user purchase request from a first end user authorized to use the electronic procurement system on behalf of the first purchasing organization to purchase an item associated with the electronic procurement system, and a second user purchase request from a second end user authorized to use the electronic procurement system on behalf of the first purchasing organization to purchase the same item; and to generate a purchase order for the item;

proximate to shipping the requested item, determine whether there is sufficient stock of the item available to fulfill both user purchase requests;

prioritize the user purchase requests, based on the determining and in accordance with the business rules received from the first purchasing organization; and fulfill the prioritized user purchase requests in accordance with priority.

23. The system of claim 22, further comprising instructions to fulfill the one or more of the user purchase requests with the alternative item, in accordance with a determination that proximate to shipping the requested item an alternative item comparable with the requested item is available, and the requested item is not available in sufficient stock to satisfy both the first user and second user.

24. A computer readable storage medium storing one or more programs configured for execution by a server system, the one or more programs comprising instructions to:

receive business rules from a first purchasing organization governing interactions between the end users authorized to use the electronic procurement system on behalf of the first purchasing organization and the server system;

receive a first user purchase request from a first end user authorized to use the electronic procurement system on behalf of the first purchasing organization to purchase an item, and a second user purchase request from a second end user authorized to use the electronic procurement system on behalf of the first purchasing organization to purchase the same item;

determine whether there is sufficient stock of the item available to fulfill both user purchase requests;

in accordance with a determination that available stock is less than the stock required to fulfill both purchase quests, prioritize the user purchase requests, in accordance with the business rules received from the first purchasing organization; and generate a purchase order for at least one of the user purchase requests in accordance with the prioritizing, wherein the server system comprises an electronic procurement system.

25. The computer readable storage medium of claim 24, wherein the electronic procurement system is a single instance multi-tenant system, and wherein the server system includes a plurality of purchasing organizations, each purchasing organization having a plurality of associated users.

26. The computer readable storage medium of claim 24, wherein instructions to prioritize the user purchase requests are performed in accordance with positions of the users on a management hierarchy.

27. The computer readable storage medium of claim 24, wherein instructions to prioritize the user purchase requests are performed in accordance with an importance of a respective project associated with each respective user.

28. The computer readable storage medium of claim 24, further comprising instructions to fulfill user requests of a similar priority level according to a first in first out (FIFO) method.

29. The computer readable storage medium of claim 24, wherein instructions to prioritize are performed according to fees associated with the respective users.

30. The computer readable storage medium of claim 24, further comprising instructions to place both user purchase requests in a queue according to the prioritizing.

31. The computer readable storage medium of claim 30, further comprising instructions to fulfill user purchase requests of a similar priority level in the queue according to a first in first out (FIFO) method.

32. The computer readable storage medium of claim 30, further comprising instructions to notify one or more users having an order in the queue when the ordered item is ready for fulfillment.

33. The computer readable storage medium of claim 30, further comprising instructions to present an alternative available item to a user having an order in the queue, in accordance with a predicted fulfillment delay.

34. A computer readable storage medium storing one or more programs configured for execution by a server system, the one or more programs comprising instructions to:

at an electronic procurement system:

receive business rules from a first purchasing organization governing interactions between the end users authorized to use the electronic procurement system on behalf of the first purchasing organization and the electronic procurement system;

receive a first user purchase request from a first end user authorized to use the electronic procurement system on behalf of the first purchasing organization to purchase an item associated with the electronic procurement system, and a second user purchase request from a second end user authorized to use the electronic procurement system on behalf of the first purchasing organization to purchase the same item; and to generate a purchase order for the item;

proximate to shipping the requested item, determine whether there is sufficient stock of the item available to fulfill both user purchase requests;

prioritize the user purchase requests, based on the determining and in accordance with the business rules received from the first purchasing organization; and fulfill the prioritized user purchase requests in accordance with priority.

35. The computer readable storage medium of claim 34, further comprising instructions to fulfill one or more of the user purchase requests with the alternative item in accordance with a determination that proximate to shipping the requested item, an alternative item comparable with the requested item is available, and the requested item is not available in sufficient stock to satisfy both the first user and second user.

* * * * *

UNITED STATES PATENT AND TRADEMARK OFFICE

CERTIFICATE OF CORRECTION

PATENT NO. : 8,285,573 B1
APPLICATION NO. : 12/283281
DATED : October 9, 2012
INVENTOR(S) : Ballaro et al.

It is certified that error appears in the above-identified patent and that said Letters Patent is hereby corrected as shown below:

In column 74, line 24, delete “quests” and add -- requests --;

In column 75, line 46, delete “quests” and add -- requests --;

In column 77, line 3, delete “quests” and add -- requests --.

Signed and Sealed this
Fourth Day of December, 2012

David J. Kappos
*Director of the United States Patent and Trademark Office*